United States Patent
Barnehama et al.

(10) Patent No.: US 11,386,289 B2
(45) Date of Patent: Jul. 12, 2022

(54) SYSTEMS AND METHODS FOR ROBOT-AIDED PRODUCT INSPECTION

(71) Applicant: Elementary Robotics, Inc., Pasadena, CA (US)

(72) Inventors: Arye Barnehama, Pasadena, CA (US); Xuefei Dong, Pasadena, CA (US); Dat Do, Los Angeles, CA (US); Nambi Srivatsav, El Monte, CA (US); Petr Lipay, Los Angeles, CA (US); Dan Pipe-Mazo, Redondo Beach, CA (US)

(73) Assignee: Elementary Robotics, Inc., South Pasadena, CA (US)

( * ) Notice: Subject to any disclaimer, the term of this patent is extended or adjusted under 35 U.S.C. 154(b) by 405 days.

(21) Appl. No.: 16/674,637

(22) Filed: Nov. 5, 2019

(65) Prior Publication Data
US 2021/0133496 A1 May 6, 2021

(51) Int. Cl.
| | |
|---|---|
| *G06K 9/62* | (2022.01) |
| *G06N 5/04* | (2006.01) |
| *G06N 20/00* | (2019.01) |
| *B25J 9/16* | (2006.01) |
| *G06T 7/00* | (2017.01) |

(52) U.S. Cl.
CPC ............ *G06K 9/6254* (2013.01); *B25J 9/163* (2013.01); *G06K 9/6257* (2013.01); *G06K 9/6267* (2013.01); *G06N 5/04* (2013.01); *G06N 20/00* (2019.01); *G06T 7/0004* (2013.01); *G06T 2200/24* (2013.01)

(58) Field of Classification Search
CPC ............ A61B 34/30; A61B 2034/2065; G05B 2219/50391; G06V 20/58
See application file for complete search history.

(56) References Cited

U.S. PATENT DOCUMENTS

| | | | | |
|---|---|---|---|---|
| 7,086,293 | B2 * | 8/2006 | Heiligensetzer | B25J 9/1674 73/795 |
| 7,441,298 | B2 * | 10/2008 | Svendsen | A47L 9/009 15/49.1 |
| 7,769,491 | B2 * | 8/2010 | Fukuchi | G05D 1/0251 701/1 |

(Continued)

OTHER PUBLICATIONS

AMS; "AS5047D 14-Bit On-Axis Magnetic Rotary Position Sensor with 11-Bit Decimal and Binary Incremental Pulse Count"; https://ams.com/documents/20143/36005/AS5047D_DS000394_2-00.pdf; Apr. 27, 2016; 40 pages.

(Continued)

*Primary Examiner* — Yosef Kassa
(74) *Attorney, Agent, or Firm* — Jones Day

(57) ABSTRACT

Disclosed herein are embodiments related to robot-aided product inspection. For example, an inspection apparatus may include a processing device to communicatively couple to a robotic apparatus, to a display device, and to a user input device. The processing device may: receive an image of an item, wherein the image was captured by the robotic apparatus; generate a proposed classification for the image, wherein the classification indicates an attribute of the item based on the image; cause the image to be displayed on the display device along with the proposed classification; and receive an indication from the user input device of a final classification of the image.

20 Claims, 56 Drawing Sheets

(56) References Cited

U.S. PATENT DOCUMENTS

| | | | | |
|---|---|---|---|---|
| 8,392,036 | B2* | 3/2013 | Jacobsen | G05D 1/0044 |
| | | | | 701/2 |
| 8,483,816 | B1* | 7/2013 | Payton | A61B 34/30 |
| | | | | 700/245 |
| 8,781,629 | B2* | 7/2014 | Ota | B25J 9/1671 |
| | | | | 700/258 |
| 9,734,425 | B2* | 8/2017 | Zhong | G06V 10/42 |
| 9,762,597 | B2* | 9/2017 | Doganata | H04L 63/20 |
| 10,517,521 | B2* | 12/2019 | el Kaliouby | A61B 5/7246 |
| 10,525,509 | B2* | 1/2020 | Chapelet | B65H 29/58 |
| 10,525,599 | B1* | 1/2020 | Zutshi | G06V 10/751 |

OTHER PUBLICATIONS

Arizona State University; "Building softer, friendlier robots"; https://usenate.asu.edu/building-softer-friendlier-robots; Jan. 27, 2019; 6 pages.

Collins; "FAQ: What is sinusoidal commutation for dc motors?"; http://www.monioncontroltips.com/what-is-sinusoidal-communication-for-dc-motors/; Nov. 6, 2016; 8 pages.

Eignat, "Automatic Commutation of Stepper Motors using low cost standard stepper drivers", Portescap; https://www.portescap.com/sites/default/files/wp_automatic_commutation_of_stepper_motors_0.pdf; 1996; 9 pages.

Gealy et al., "Quasi-Direct Drive for Low-Cost Compliant Robotic Manipulation", https://arxiv.org/abs/1904.03815; Apr. 11, 2019; 8 pages.

Keyence; "Easy 3D/GD &T Measurements by Anyone, Anywhere"; https://www.keyence.com/ss/products/measure=sys/xm_3d/index.jsp; Sep. 9, 2019; 1 page.

Stepperonline, Diagram for Stepper Motor; 23HS17-1008S; https://www.omc-stepperonline.com/download/23HS17-1008S.pdf; Aug. 18, 2018.

STMicroelectronics; "AN3327 Application Note—L9942 back EMF stall detection algorithm"; https://www.st.com/content/ccc/resource/technical/document/application_note/ff/6e/b3/3a/9d/ef/4d/56/CD00294593.pdf/files/CD00294593.pdf/jcr:content/translations/en.CD00294593.pdf; Dec. 2013; 22 pages.

* cited by examiner

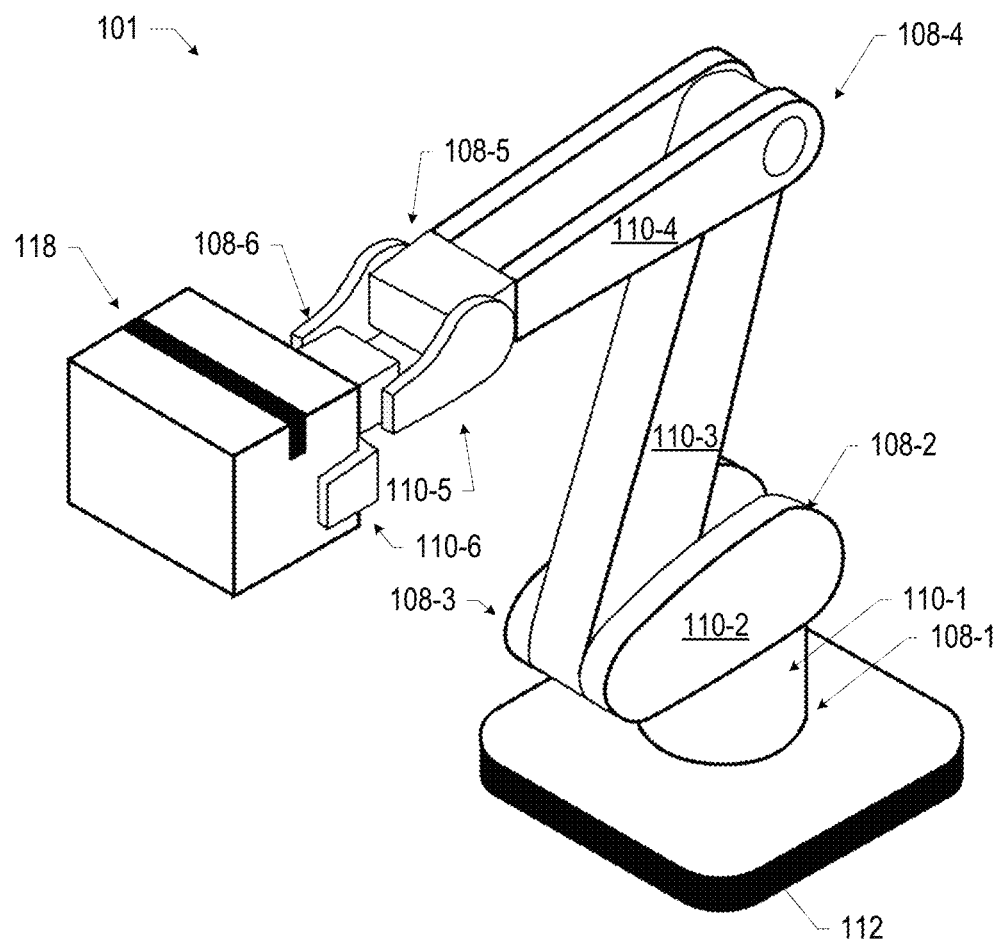
FIG. 4
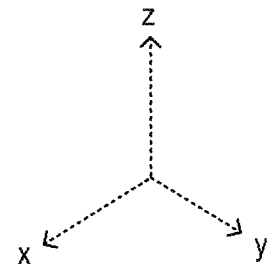

| LOCATION IN STEP CYCLE | A DRIVE CURRENT | B DRIVE CURRENT | DECAY MODE |
|---|---|---|---|
| c1 | a1 | b1 | dm1 |
| c2 | a2 | b2 | dm2 |
| c3 | a3 | b3 | dm3 |
| c4 | a4 | b4 | dm4 |
| c5 | a5 | b5 | dm5 |
| ... | ... | ... | ... |

```
ROUTINE DATA STRUCTURE 404

▪ LOCATION and ANGLE for overview image

▪ LOCATIONS for each LOCATION:

▪ at least one ANGLE at which an IMAGE is to be captured for each ANGLE:

▪ at least one INSPECTION FUNCTION to be applied to the captured IMAGE
```

| LOCATION | ANGLES | INSP. FUNCS. | IMAGES | RESULTS |
|---|---|---|---|---|
| l1 | an11, an12,... | if11, if12,... | im11, im12,... | re111,...; re121,... |
| l2 | an21, an22,... | if21, if22,... | im21, im22,... | re211,...; re221,... |
| l3 | an31, an32,... | if31, if32,... | im31, im32,... | re311,...; re321,... |
| l4 | an41, an42,... | if41, if42,... | im41, im42,... | re411,...; re421,... |
| l5 | an51, an52,... | if51, if52,... | im51, im52,... | re511,...; re521,... |
| ... | ... | ... | ... | ... |

SYSTEMS AND METHODS FOR ROBOT-AIDED PRODUCT INSPECTION

BACKGROUND

Conventional robotic systems employed in commercial settings are typically custom-built for a particular task. The development of such systems requires significant cost and time, and retooling or otherwise changing such systems incurs further expense and delays. The time and cost of development and retooling may be increased yet further as the tasks performed become more complex, limiting the adoption of robotic solutions to commercial problems.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, not by way of limitation, in the figures of the accompanying drawings.

FIGS. 3-5 are perspective views of example robotic apparatuses that may be included in the robotic systems disclosed herein, in accordance with various embodiments.

DETAILED DESCRIPTION

Disclosed herein are embodiments related to robot-aided product inspection. For example, an inspection apparatus may include a processing device to communicatively couple to a robotic apparatus, to a display device, and to a user input device. The processing device may: receive an image of an item, wherein the image was captured by the robotic apparatus; generate a proposed classification for the image, wherein the classification indicates an attribute of the item based on the image; cause the image to be displayed on the display device along with the proposed classification; and receive an indication from the user input device of a final classification of the image.

The robotic systems 100 disclosed herein may be used in a collaborative robotics environment. As used herein, "collaborative robotics" refers to settings in which human beings work alongside robots designed and operated to ensure human safety.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). The drawings are not necessarily to scale. Although many of the drawings illustrate rectilinear structures with flat walls and right-angle corners, this is simply for ease of illustration, and actual devices made using these techniques will exhibit rounded corners, surface roughness, and other features.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. When used to describe a range of dimensions, the phrase "between X and Y" represents a range that includes X and Y.

Figure 1:
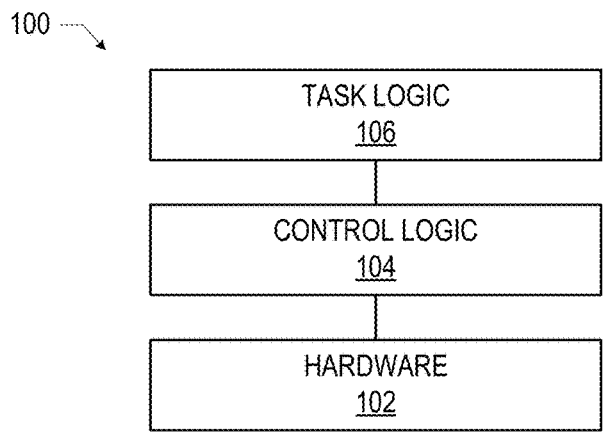
FIG. 1 is a block diagram of a robotic system, in accordance with various embodiments.

FIG. 1 is a block diagram of a robotic system 100, in accordance with various embodiments. The robotic system 100 of FIG. 1 may include hardware 102, control logic 104, and task logic 106. The hardware 102 of a robotic system 100 may include one or more robotic apparatuses 101 (discussed further below with reference to FIG. 2) and hardware that supports the operation of the robotic apparatuses 101 and the performance of tasks by the robotic system 100. The control logic 104 may include specialized circuitry and/or programmed instructions to be executed by one or more processing devices (e.g., included in the robotic apparatus 101 and/or the system-level compute hardware 124, discussed further below) in order to control the operation of one or more robotic apparatuses 101 of the robotic system 100. For example, the control logic 104 may include programmed instructions that, upon execution by one or more processing devices, control the motion and position of the joints 108 of a robotic apparatus 101, as well as the operation of an end effector 118 of the robotic apparatus 101; joints 108 and end effectors 118 of robotic apparatuses 101 are discussed further below. Particular examples of control logic 104 are discussed below with reference to FIG. 7. The task logic 106 may include specialized circuitry and/or programmed instructions to be executed by one or more processing devices (e.g., included in the robotic apparatus 101 and/or the system-level compute hardware 124, discussed further below) in order to perform particular higher-level tasks that include operation of the robotic apparatus 101. The task logic 106 may utilize the functionality of the control logic 104 in the execution of various tasks. For example, the task logic 106 may include programmed instructions that, upon execution by one or more processing devices, cause a robotic apparatus 101 to perform an inspection over a pre-defined inspection path. The task logic 106 may specify parameters of this inspection to the control logic 104, which may "translate" these inspection parameters into specific commands to the components of the robotic apparatus 101 to cause the joints 108 and the end effector 118 of the robotic apparatus 101 to operate in a desired manner. Note that the division herein of various operations into "control logic 104" and "task logic 106" is largely illustrative, and any suitable specialized circuitry or programmed instructions may be used in the robotic systems 100 disclosed herein.

Figure 2:
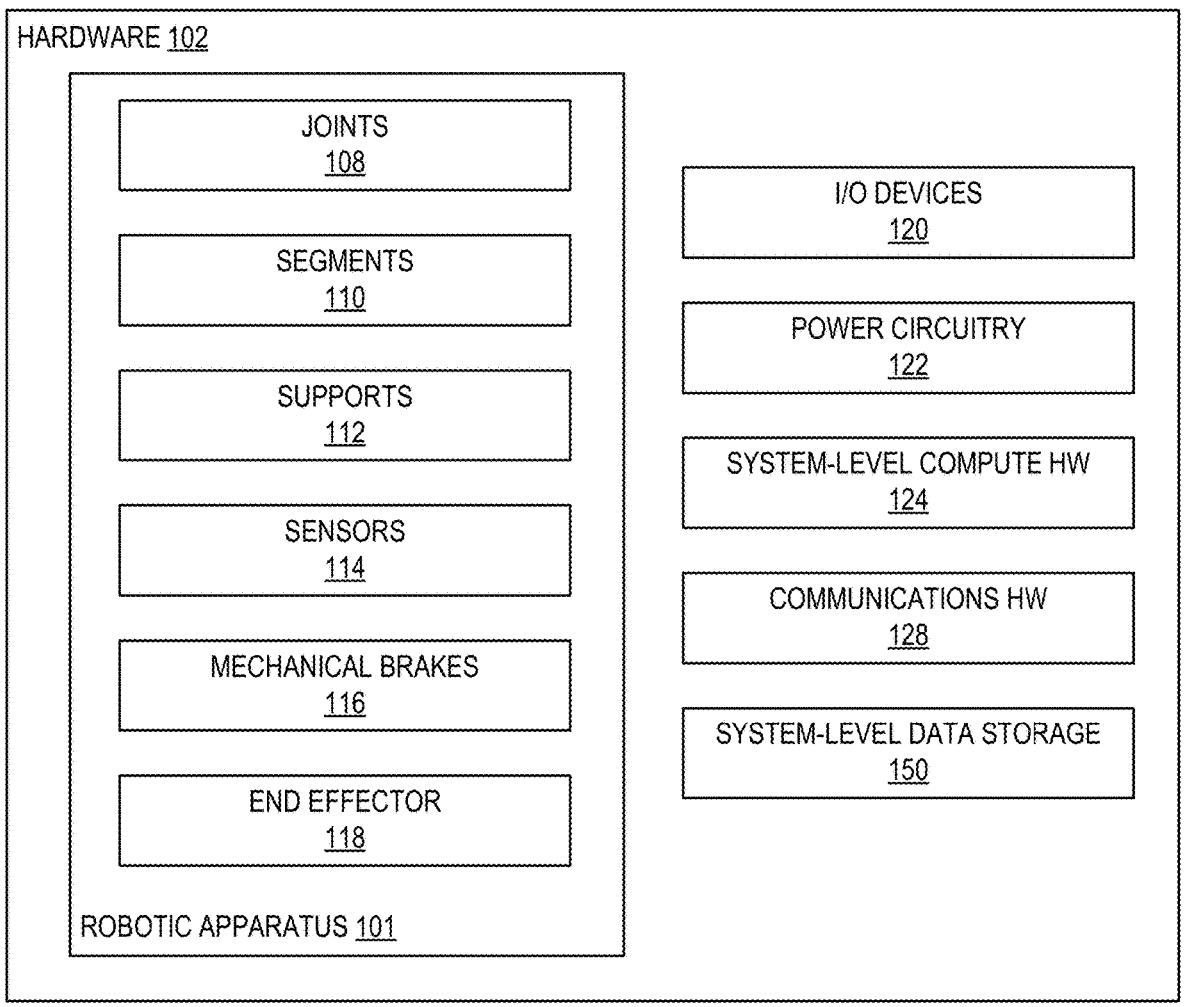
FIG. 2 is a block diagram of example hardware that may be included in a robotic system, in accordance with various embodiments.

FIG. 2 is a block diagram of example hardware 102 that may be included in a robotic system 100, in accordance with various embodiments. The hardware 102 includes various hardware elements that are part of a robotic apparatus 101. As used herein, a "robotic apparatus" may refer to a collection of movable components that may be controlled by computing logic to perform a particular physical task. Many examples of robotic apparatuses 101 are disclosed herein, including gantry-type robotic apparatuses 101 (e.g., as discussed below with reference to FIG. 3) and arm-type robotic apparatuses 101 (e.g., as discussed below with reference to FIGS. 4-5). FIG. 2 illustrates various elements of the hardware 102 (i.e., joints 108, segments 110, supports 112, sensors 114, mechanical brakes 116, and end effectors 118) as being part of a robotic apparatus 101, but this indication of particular hardware as being included in or not included in a robotic apparatus 101 is simply exemplary, and a robotic apparatus 101 may not include all of the elements illustrated in FIG. 2 and/or may include other hardware elements. For example, a robotic apparatus 101 may not include any mechanical brakes 116. In another example, a robotic apparatus 101 may include one or more input/output (I/O) devices 120, in addition to or instead of those included in the joints 108 (discussed below with reference to FIG. 9). In some embodiments, all of the hardware 102 of a robotic system 100 may be part of a robotic apparatus 101, while in other embodiments, a robotic apparatus 101 may communicate with the other hardware 102 of a robotic system 100 by wired and/or wireless communication pathways.

As indicated in FIG. 2, a robotic apparatus 101 may include segments 110 and supports 112. As used herein, a support 112 may represent a portion of a robotic apparatus 101 on which the robotic apparatus 101 rests or is used to couple the robotic apparatus 101 to a surface (e.g., to a wall). A segment 110 may represent a portion of the robotic apparatus 101 between joints 108, or on around which a joint 108 moves; the number of joints 108 in a robotic apparatus 101 represents the degrees of freedom (DOF) of the robotic apparatus 101. Sensors 114 included in a robotic apparatus 101 may include sensors at the joints 108 (examples of which are discussed further below with reference to FIG. 9, or sensors located in the segments 110 or supports 112 (e.g., an accelerometer located in the support 112 for use in zeroing, as discussed further below with reference to FIGS. 33-34). An end effector 118 may be a component that may couple to a segment 110 of a robotic apparatus 101, and may include any desired number of devices (e.g., cameras, lasers, depth sensors, object manipulators, etc.). End effectors 118 may be removable so that different end effectors 118 may be coupled to the remainder of the robotic apparatus 101 to enable different tasks to be performed (e.g., calibration, inspection, and object manipulation, as discussed further herein).

The hardware 102 may include one or more I/O devices 120. The I/O devices 120 may include input and/or output devices not included in the joints 108. Examples of I/O devices 120 may include user-actuable power switches, a heads-up display, a computer monitor, a projector, a touchscreen display, a liquid crystal display (LCD), a light-emitting diode display, lasers, a flat panel display, speakers, headsets, earbuds, microphones, microphone arrays, or digital instruments (e.g., instruments having a musical instrument digital interface (MIDI) output), accelerometer, a gyroscope, a compass, an image capture device, a keyboard, a cursor control device such as a mouse, a stylus, a touchpad, a bar code reader, a Quick Response (QR) code reader, any sensor, and/or a radio frequency identification (RFID) reader.

The hardware 102 may include power circuitry 122. The power circuitry 122 may include one or more energy storage devices (e.g., batteries or capacitors) and/or circuitry for coupling components of the robotic system 100 to an energy source separate from the robotic system 100 (e.g., AC line power). In some embodiments, the power demand of the robotic system 100 may be low enough to be supplied by a battery pack (e.g., a 36 volt scooter battery or a car battery), and thus the robotic systems 100 disclosed herein may be readily implemented on an untethered base, such as a cart, drone, or other vehicle. Such operation represents a significant contrast with conventional industrial robotic systems, which typically require a 240 volt power supply for operation. In some embodiments, the robotic system 100 may be run at 36 volts or more, but may be run from as low as 12 volts.

The hardware 102 may include system-level compute hardware 124. The system-level compute hardware 124 may include one or more processing devices that enable the execution of system-level tasks (e.g., those controlled by the task logic 106, discussed below). The joints 108 may be exposed to the system-level compute hardware 124 by an Application Programming Interface (API) that allows the system-level compute hardware 124 to read/write parameters in the joint-level data storage 229 (e.g., parameters stored in Flash memory such as joint name, gear ratio, control thresholds, control loop tuning parameters, etc., and/or control parameters such as control mode, goal points, etc.), as well as setting the state of the light-emitting diodes (LEDs) 220 at a joint 108 and setting general purpose input/output (GPIO) values (e.g., reading a pin, setting a pin, setting a frequency and duty cycle of pulse width modulation (PWM), etc.) for processing devices (e.g., a microcontroller) of the joint-level compute hardware 210. The system-level compute hardware 124 may be local to the robotic apparatus 101, remote from the robotic apparatus 101, or may include both local and remote processing devices. Examples of the system-level compute hardware 124, and arrangements thereof, are discussed further herein (e.g., with reference to FIGS. 70-72).

The hardware 102 may include communications hardware 128. The communications hardware 128 may facilitate communications between the system-level compute hardware 124 and the joints 108/end effectors 118 of one or more robotic apparatuses 101, and/or between the robotic system 100 and the outside world. In some embodiments, the communications hardware 128 may manage the transfer of a packet of data from each of the joints 108 in a robotic apparatus 101 to the system-level compute hardware 124 at a rate that is greater than 1 kilohertz; this data may represent a current state of the joint 108, and examples of this data are discussed further below. In some embodiments, the communications hardware 128 may include a Universal Serial Bus (USB) interface which may couple to a USB backbone of the robotic apparatus 101, as discussed above. In other embodiments, the communications hardware 128 may support communication with a robotic apparatus 101 with a Controller Area Network (CAN) bus, an RS-485 bus, a Serial Peripheral Interface (SPI) bus, an Inter-Integrated Circuit (I2C) bus, or an RS-232 bus, for example.

The hardware 102 may include system-level data storage 150. The system-level data storage 150 may include one or more memory devices used to store data and/or instructions executable by one or more processing devices to perform any suitable ones of the methods disclosed herein (e.g., with such stored instructions providing any suitable ones of the logic described herein). In some embodiments, the memory devices included in the system-level data storage 150 may include random access memory (RAM) devices, such as a static RAM (SRAM) devices, magnetic RAM (MRAM) devices, resistive RAM (RRAM) devices, or conductive-bridging RAM (CBRAM) devices, hard drive-based memory devices, solid state memory devices, or any combination of memory devices. The memory devices included in the system-level data storage 150 may not be local to each other, or the system-level compute hardware 124 (e.g., as discussed below with reference to FIGS. 70-72).

Figure 3:
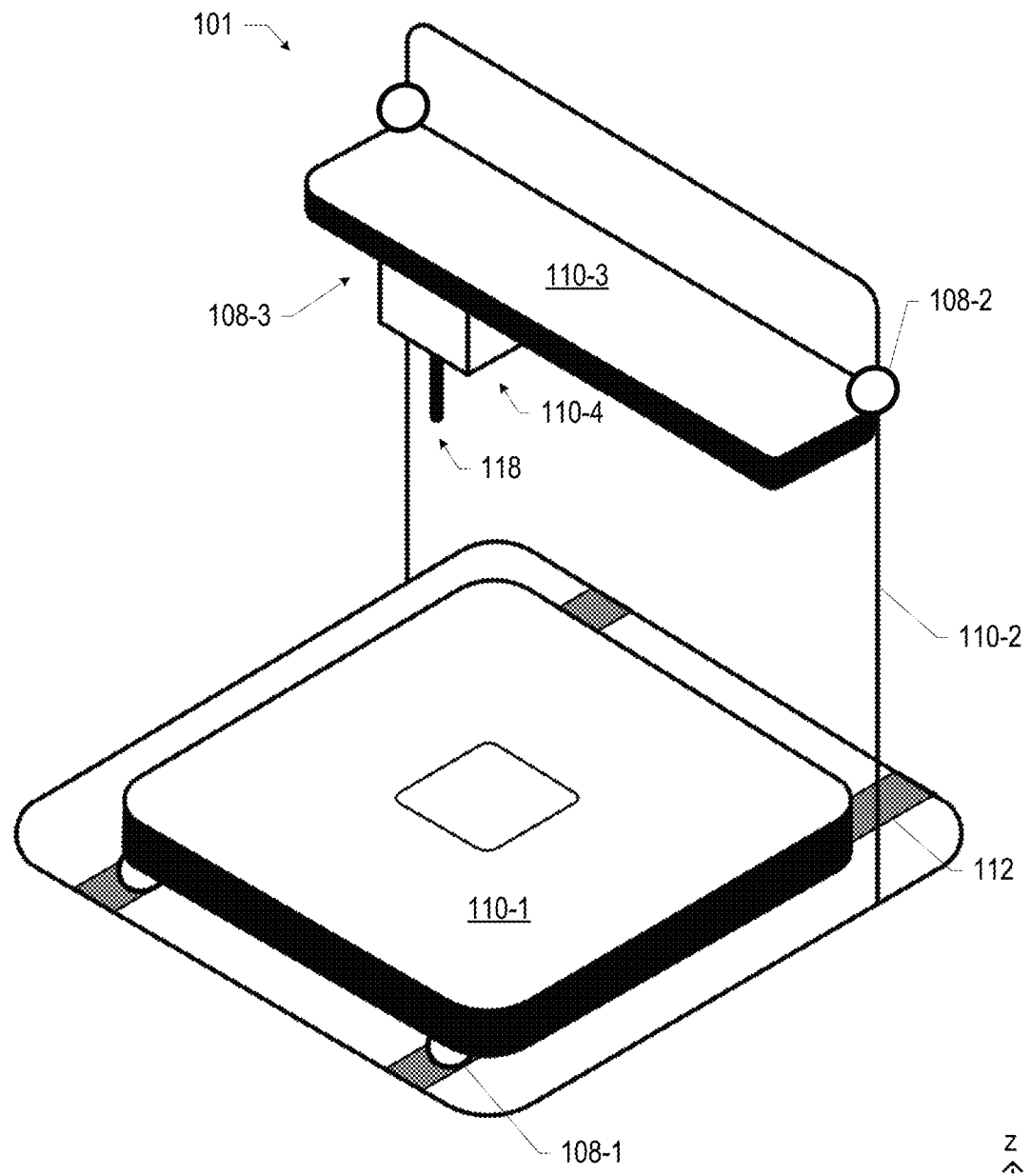
Figure 5:
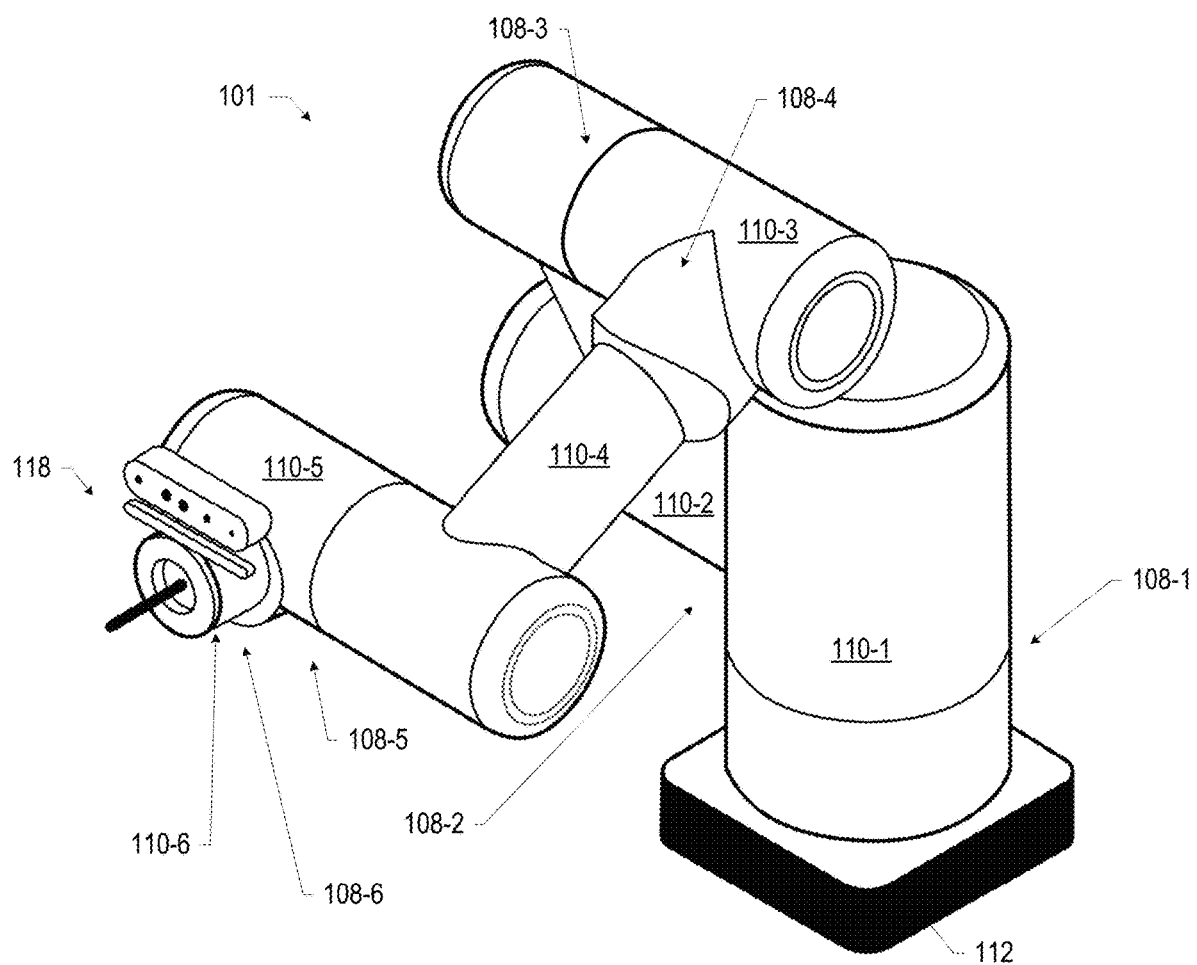

FIGS. 3-5 are perspective views of example robotic apparatuses 101 that may be included in the robotic systems 100 disclosed herein, in accordance with various embodiments. As discussed further below with reference to FIGS. 70 and 71, a robotic system 100 may include more than one robotic apparatus 101. Further, the particular robotic apparatuses 101 illustrated in the accompanying figures are simply examples, and any robotic apparatus 101 implementing any one or more of the embodiments disclosed herein may be part of a robotic system 100.

FIG. 3 illustrates a gantry-type robotic apparatus 101. The robotic apparatus 101 of FIG. 3 includes a support 112 including tracks along which joints 108-1 of a segment 110-1 may move (in the x-direction, in accordance with the coordinate system illustrated in FIG. 3). The robotic apparatus 101 of FIG. 3 also includes segments 110-2 acting as tracks along which joints 108-2 (coupled to a segment 110-3) may move (in the z-direction, in accordance with the coordinate system illustrated in FIG. 3). The robotic apparatus of FIG. 3 also includes a joint 108-3 (located on the underside of the segment 110-3), which may be coupled to a segment 110-4 and may allow the segment 110-4 to move along the segment 110-3 (in the y-direction, in accordance with the coordinate system illustrated in FIG. 3). An end effector 118 may be coupled to the segment 110-4. The end effector 118 may take any desired form (e.g., the form of any of the embodiments discussed below with reference to FIGS. 62-69). Control of the joints 108 of the robotic apparatus 101 may allow the end effector 118 to be placed in a desired location relative to the segment 110-1, and control of the end effector 118 may allow the robotic apparatus 101 of FIG. 3 to manipulate, inspect, or otherwise act with respect to an item disposed on the segment 110-1. Because of its three controllable joints 108, the gantry-type robotic apparatus 101 of FIG. 3 is an example of a three DOF robotic apparatus 101.

FIG. 4 illustrates an arm-type robotic apparatus 101. The robotic apparatus 101 of FIG. 4 includes a support 112, a segment 110-1, and a joint 108-1 between the support 112 and the segment 110-1. The joint 108-1 may be configured for rotation in the x-y plane (in accordance with the coordinate system illustrated in FIG. 4), allowing the segment 110-1 to rotate relative to the support 112. The robotic apparatus 101 of FIG. 4 further includes a segment 110-2 and a joint 108-2 between the segment 110-1 and the segment 110-2. The joint 108-2 may be configured for rotation in the x-z plane (in accordance with the coordinate system illustrated in FIG. 4), allowing the segment 110-2 to move through the x-z plane. The robotic apparatus 101 of FIG. 4 further includes a segment 110-3 and a joint 108-3 between the segment 110-2 and the segment 110-3. The joint 108-3 may be configured for rotation in the x-z plane (in accordance with the coordinate system illustrated in FIG. 4), allowing the segment 110-3 to move through the x-z plane. The robotic apparatus 101 of FIG. 4 further includes a segment 110-4 and a joint 108-4 between the segment 110-3 and the segment 110-4. The joint 108-4 may be configured for rotation in the x-z plane (in accordance with the coordinate system illustrated in FIG. 4), allowing the segment 110-4 to move through the x-z plane. The robotic apparatus 101 of FIG. 4 further includes a segment 110-5 and a joint 108-5 between the segment 110-4 and the segment 110-5. The joint 108-5 may be configured for rotation in the x-z plane (in accordance with the coordinate system illustrated in FIG. 4), allowing the segment 110-5 to move through the x-z plane. The robotic apparatus 101 of FIG. 4 further includes a segment 110-6 and a joint 108-6 between the segment 110-5 and the segment 110-6. The joint 108-6 may be configured for rotation in the x-z plane (in accordance with the coordinate system illustrated in FIG. 4), allowing the segment 110-6 to move through the x-z plane. An end effector 118 may be coupled to the segment 110-6. The end effector 118 may take any desired form (e.g., the form of any of the embodiments discussed below with reference to FIGS. 62-69). Control of the joints 108 of the robotic apparatus 101 may allow the end effector 118 to be placed in a desired location relative to the support 112, which may itself be resting on a surface, such as a table or cart. Control of the end effector 118 may allow the robotic apparatus 101 of FIG. 4 to manipulate, inspect, or otherwise act with respect to an item disposed on the surface. Because of its six controllable joints, the arm-type robotic apparatus 101 of FIG. 4 is an example of a six DOF robotic apparatus 101.

Figure 6:
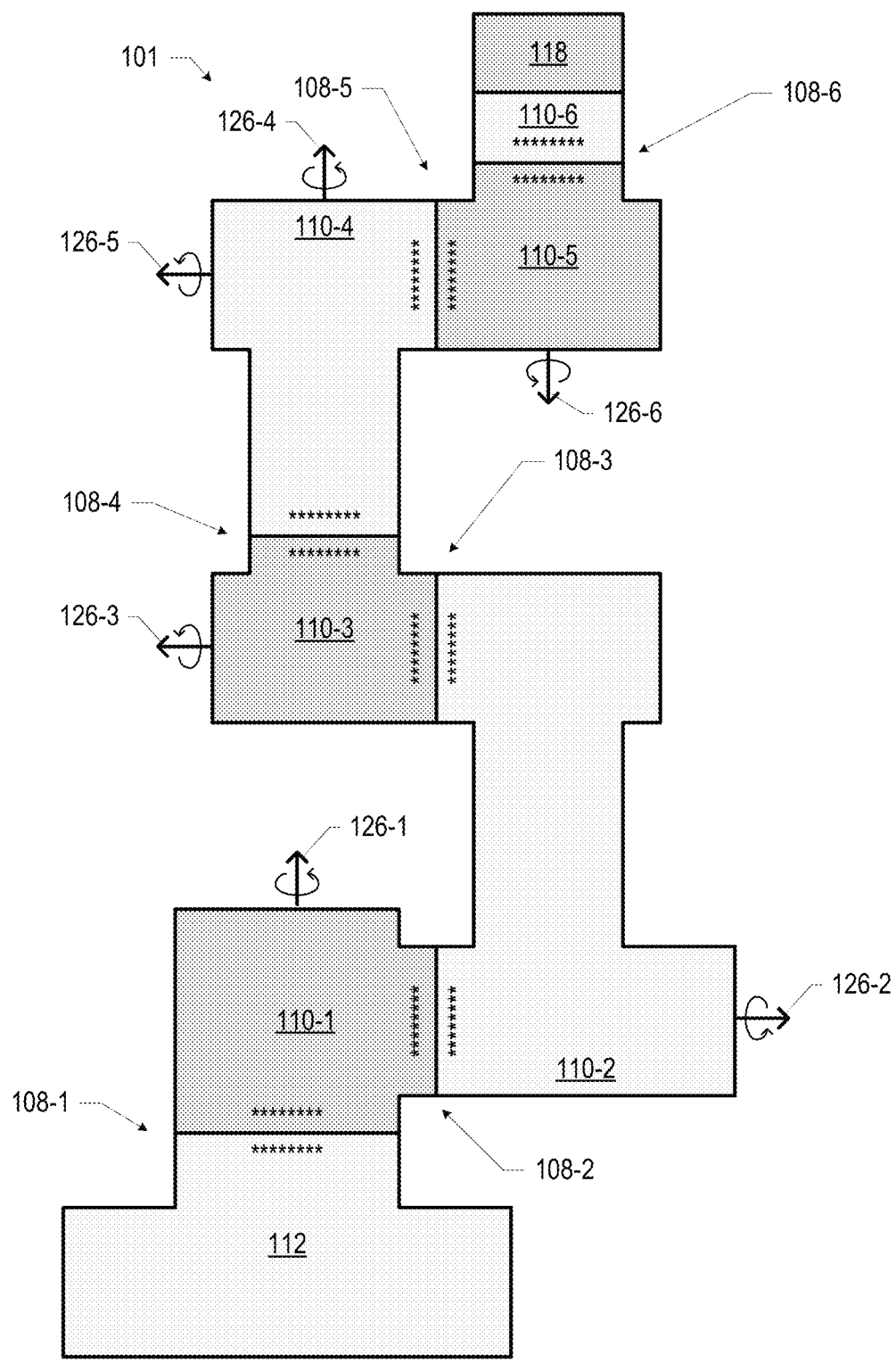
FIG. 6 is a side, cross-sectional view of the robotic apparatus of FIG. 5, in accordance with various embodiments.

FIG. 5 illustrates an arm-type robotic apparatus 101. The robotic apparatus 101 of FIG. 5 includes a support 112, a segment 110-1, and a joint 108-1 between the support 112 and the segment 110-1. The joint 108-1 may be configured for rotation in the x-y plane (in accordance with the coordinate system illustrated in FIG. 4), allowing the segment 110-1 to rotate relative to the support 112. The robotic apparatus 101 of FIG. 5 further includes a segment 110-2 and a joint 108-2 (hidden by the segment 110-1) between the segment 110-1 and the segment 110-2. The joint 108-2 may be configured for rotation in the x-z plane (in accordance with the coordinate system illustrated in FIG. 5), allowing the segment 110-2 to rotate in the x-z plane. The robotic apparatus 101 of FIG. 5 further includes a segment 110-3 and a joint 108-3 between the segment 110-2 and the segment 110-3. The joint 108-3 may be configured for rotation in the x-z plane (in accordance with the coordinate system illustrated in FIG. 5), allowing the segment 110-3 to rotate in the x-z plane. The robotic apparatus 101 of FIG. 5 further includes a segment 110-4 and a joint 108-4 between the segment 110-3 and the segment 110-4. The joint 108-4 may be configured for rotation in the y-z plane (approximately, in accordance with the coordinate system illustrated in FIG. 5), allowing the segment 110-4 to rotate in the y-z plane (approximately). The robotic apparatus 101 of FIG. 5 further includes a segment 110-5 and a joint 108-5 between the segment 110-4 and the segment 110-5. The joint 108-5 may be configured for rotation in the x-z plane (in accordance with the coordinate system illustrated in FIG. 4), allowing the segment 110-5 to rotate in the x-z plane. The robotic apparatus 101 of FIG. 5 further includes a segment 110-6 and a joint 108-6 between the segment 110-5 and the segment 110-6. The joint 108-6 may be configured for rotation in the y-z plane (in accordance with the coordinate system illustrated in FIG. 5), allowing the segment 110-6 to rotate in the x-z plane. An end effector 118 may be coupled to the segment 110-6. The end effector 118 may take any desired form (e.g., the form of any of the embodiments discussed below with reference to FIGS. 62-69). Control of the joints 108 of the robotic apparatus 101 may allow the end effector 118 to be placed in a desired location relative to the support 112, which may itself be resting on a surface, such as a table or cart. Control of the end effector 118 may allow the robotic apparatus 101 of FIG. 5 to manipulate, inspect, or otherwise act with respect to an item disposed on the surface. Because of its six controllable joints, the arm-type robotic apparatus 101 of FIG. 5 is an example of a six DOF robotic apparatus 101. FIG. 6 is a side, cross-sectional view of the robotic apparatus 101 of FIG. 5, with the joints 108 indicated by asterisks. The axis of rotation 126 of each of the joints 108 is also indicated.

Figure 7:
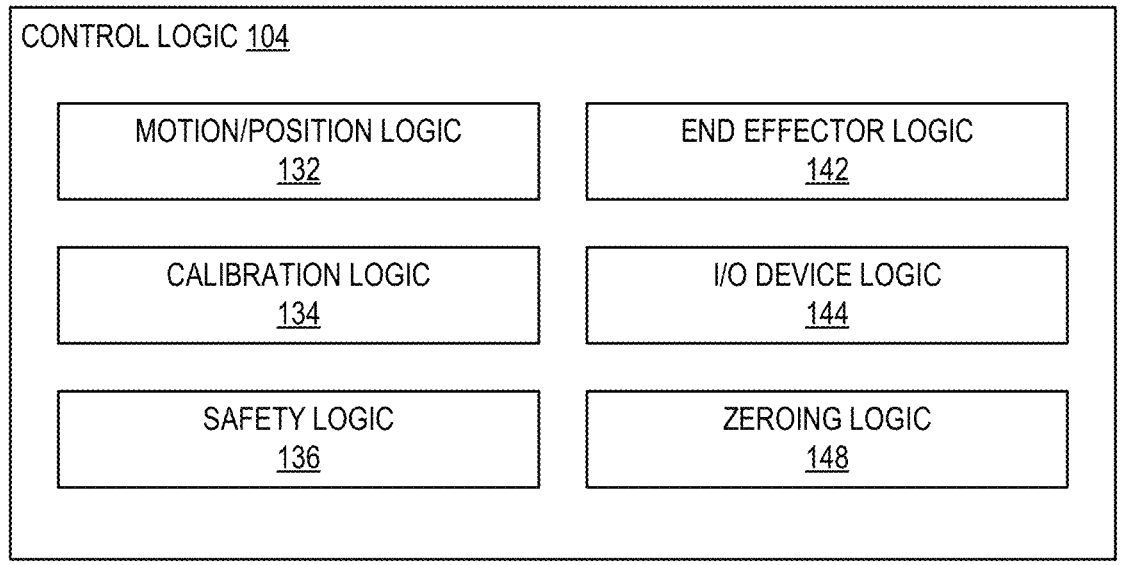
FIG. 7 is a block diagram of example control logic that may be included in a robotic system, in accordance with various embodiments.

FIG. 7 is a block diagram of example control logic 104 that may be included in a robotic system 100, in accordance with various embodiments. The control logic 104 may include logic implemented at the joint level (e.g., by the joint-level compute hardware 210) and logic implemented at the system level (e.g., by the system-level compute hardware 124). The control logic 104 may provide for basic operational control of a robotic apparatus 101, and functions of the control logic 104 may be used by the task logic 106 in the performance of specific tasks (e.g., inspection), as discussed further below.

The control logic 104 may include motion/position logic 132. The motion/position logic 132 may control the motion and position of each of the joints 108 of a robotic apparatus 101. For example, the motion/position logic 132 may include the motor drive logic 230 and the braking logic 234 implemented by the joint-level compute hardware 210. The motion/position logic 132 may receive a command (e.g., from the task logic 106) to move the robotic apparatus 101 to a particular position (e.g., a particular (x, y, z, roll (r), pitch (p), yaw (w)) position of an end effector 118 of the robotic apparatus) and may generate instructions for the motor drive logic 230 and/or the braking logic 234 of the joints 108 to implement the command. Examples of techniques that may be implemented by the motion/position logic 132 are discussed below with reference to FIGS. 17-28 and FIG. 39.

The control logic 104 may include calibration logic 134. The calibration logic 134 may control joint-level and system-level calibration operations in the robotic system 100. For example, the calibration logic 134 may include the joint calibration logic 232, and examples of joint-level calibration techniques are discussed below with reference to FIGS. 13-16. Further, the calibration logic 134 may perform system-level calibration techniques, such as those discussed below with reference to FIGS. 35-38. The calibration techniques disclosed herein may be used to achieve high accuracy and controllability with relatively inexpensive and inaccurate hardware (e.g., inexpensive stepper motors 212), enabling the robotic systems 100 disclosed herein to be utilized in settings in which robotic support was previously cost-prohibitive.

Figure 30:
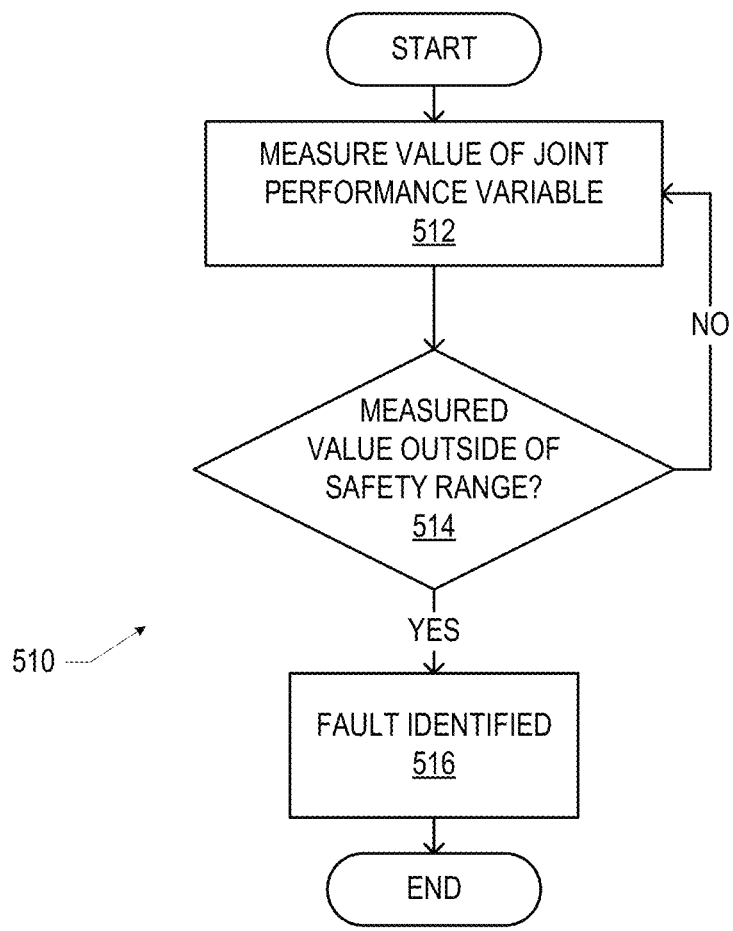
FIG. 30 is a flow diagram of a method of detecting joint-level faults in a robotic system, in accordance with various embodiments.

The control logic 104 may include safety logic 136. The safety logic 136 may control joint-level and system-level safety operations in the robotic system 100. For example, the safety logic 136 may include the joint safety logic 236, and examples of joint-level safety techniques are discussed below with reference to FIGS. 30-31. Further, the safety logic 136 may perform system-level safety techniques, such as those discussed below with reference to FIGS. 40-41.

The control logic 104 may include end effector logic 142. The end effector logic 142 may control operation of one or more devices of the end effector 118 of a robotic apparatus 101. For example, the end effector logic 142 may control the operation of a camera, laser, depth sensor, object manipulator, electrical probe, display, and/or other device included in an end effector 118. The operation of the device(s) of an end effector 118 may be controlled by the end effector logic 142 in accordance with commands from the task logic 106 (e.g., in accordance with an inspection process controlled by inspection logic 160, discussed below).

The control logic 104 may include I/O device logic 144. The I/O device logic 144 may control operation of one or more I/O devices 120 of the robotic system 100. For example, the I/O device logic 144 may include drivers for any of the I/O devices 120 discussed above. The operation of the I/O devices 120 may be controlled by the I/O device logic 144 in accordance with commands from the task logic 106 (e.g., in accordance with an inspection process controlled by inspection logic 160, discussed below).

The control logic 104 may include zeroing logic 148. The zeroing logic 148 may work in conjunction with the motion/position logic 132 to bring the robotic apparatus 101 into a zeroed configuration, as discussed below with reference to FIGS. 33 and 34. The robotic apparatus 101 may be brought into a zeroed configuration upon startup so that the movement of the robotic apparatus 101 may be controlled and monitored from a known start position, and/or brought into a zeroed configuration during operation (e.g., between inspection sessions).

Figure 8:
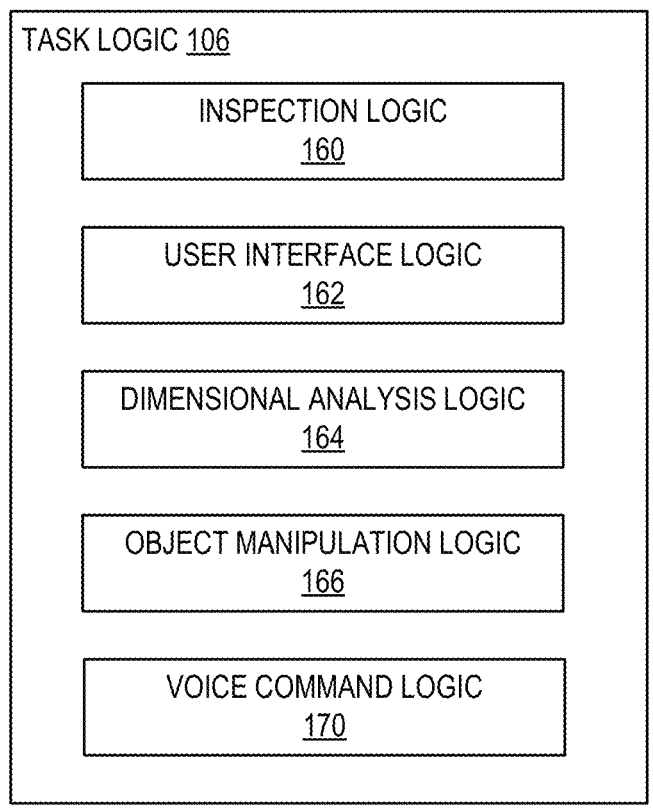
FIG. 8 is a block diagram of example task logic that may be included in a robotic system, in accordance with various embodiments.

FIG. 8 is a block diagram of example task logic 106 that may be included in a robotic system 100, in accordance with various embodiments. The task logic 106 may include logic implemented at the joint level (e.g., by the joint-level compute hardware 210) and logic implemented at the system level (e.g., by the system-level compute hardware 124). The task logic 106 may control the performance of particular tasks by the robotic system 100, and may utilize functions of the control logic 104 to perform these tasks.

The task logic 106 may include inspection logic 160. The inspection logic 160 may enable the robotic system 100 to perform inspections of items in a manufacturing or other commercial setting. For example, the inspection logic 160 may enable the robotic system 100 to visually inspect multiple instances of items and utilize inspection functions (which may include, for example, computational classifiers) to facilitate a robotic or a robot-aided inspection process. Examples of inspection processes, and related devices and techniques, are discussed below with reference to FIGS. 42-61. Further, although various ones of the inspection-related embodiments discussed below focus on visual inspection techniques, the systems and techniques disclosed herein may be utilized to perform other types of inspections or tests, such as electrical inspection (e.g., when the end effector 118 includes an electrical probe and other circuit testing equipment) or materials inspection (e.g., when the end effector 118 includes a tensile test apparatus).

The task logic 106 may include user interface logic 162. The user interface logic 162 may facilitate the provision of user interfaces (e.g., graphical user interfaces (GUIs)) to a user of the robotic system 100 in order for the user to guide operation of the robotic system 100 and/or receive information about the robotic system 100 itself or the tasks performed by the robotic system 100. The user interface logic 162 may provide a GUI to control and monitor an inspection process, for example; particular examples of such embodiments are discussed below with reference to FIGS. 46-53 and 57-60. The user interface logic 162 may support other I/O devices 120 that may provide a user interface, such as alphanumeric displays, LEDs, microphones, speakers, etc.

The task logic 106 may include dimensional analysis logic 164. The dimensional analysis logic 164 may utilize cameras in an end effector 118 of a robotic apparatus 101 to capture one or more images of an item, and analyze the images to determine the dimensions of the item (e.g., diameter, curvature, length, width, height of the overall item and/or features of the item, etc.). Information about those dimensions may be provided to a user (e.g., via a GUI of the user interface logic 162). The dimensional analysis logic 164 may implement any suitable image processing techniques to perform this dimensional analysis, and examples of end effectors 118 including cameras that may be used to support such dimensional analysis are discussed below.

The task logic 106 may include object manipulation logic 166. The object manipulation logic 166 may support the physical manipulation of objects in the environment of the robotic apparatus 101 by the robotic apparatus 101. For example, the object manipulation logic 166 may control the use of an object manipulator 184 in the end effector 118 of a robotic apparatus to allow the object manipulator 184 to move an object (e.g., to rotate, translate, stack, or otherwise move an item during an inspection process, or for packaging an item before shipping). Examples of object manipulators 184 are discussed in detail below, and the object manipulation logic 166 may utilize the object manipulators 184 and other information (e.g., feedback from one or more cameras included in the end effector 118) to effectively manipulate objects.

The task logic 106 may include voice command logic 170. The voice command logic 170 may enable the robotic system 100 to recognize voice commands from users and utilize these voice commands to control the operation of the robotic system 100. The voice command logic 170 may receive the output of one or more microphones included in the I/O devices 120 and may utilize any suitable voice recognition technique to identify whether the microphone output includes a predetermined voice command (whose signature may be stored in the system-level data storage 150). The voice command logic 170 may then act on or route the command appropriately in order to execute operations associated with the command. Examples of a number of voice commands that may be recognized by the voice command logic 170 are discussed herein.

Figure 9:
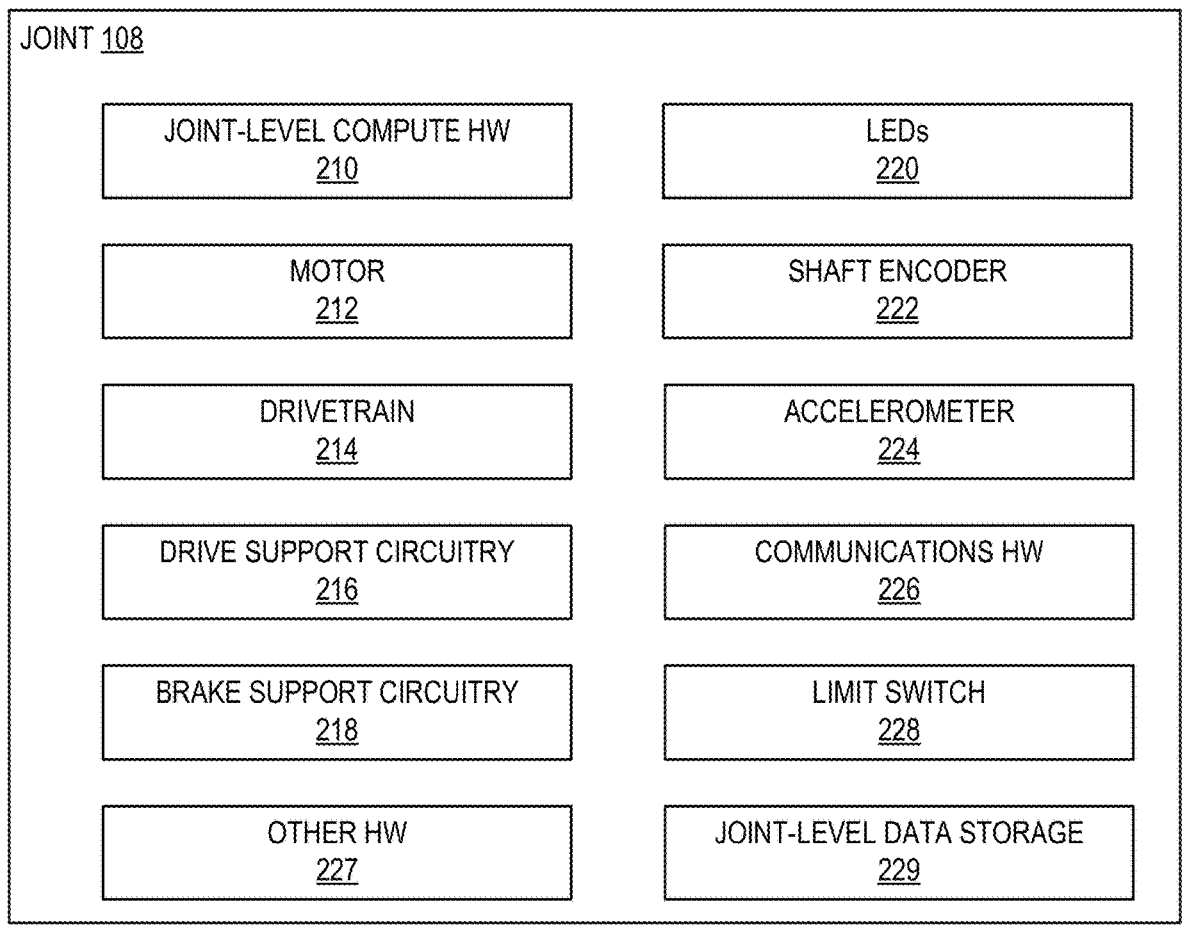
FIG. 9 is a block diagram of example joint elements that may be included in a robotic system, in accordance with various embodiments.

FIG. 9 is a block diagram of example elements of a joint 108 that may be included in a robotic system 100, in accordance with various embodiments.

The joint 108 may include joint-level compute hardware 210. The joint-level compute hardware 210 may include one or more processing devices local to a joint 108 (e.g., attached to one or more printed circuit boards (PCBs) proximate to the joint 108) that help control operation of the joint 108. In some embodiments, the joint-level compute hardware 210 may include a single microcontroller, or multiple microcontrollers. In some embodiments, the reference clocks (e.g., generated by the joint-level compute hardware 210) controlling communication and operation within a single joint 108 may be independent from the reference clocks utilized at others of the joints 108.

The joint 108 may include a motor 212. In some embodiments, the motor 212 may be a stepper motor; particular embodiments of robotic apparatuses 101 that include stepper motors 212, and methods of operating such robotic apparatuses 101, are disclosed herein. Stepper motors have been conventionally considered to be too heavy and inaccurate for use in robotic systems; conventional robotic apparatuses typically utilize brushless motors driven by a strain-wave or cycloidal gearbox, which may achieve high accuracy, but at a high price. The expense of such conventional systems has limited the adoption of robotic systems in many settings in which it might be otherwise useful. Disclosed herein are arrangements and techniques for using stepper motors in robotic apparatuses 101 (e.g., for collaborative robotics); these arrangements and techniques overcome the hurdles conventionally associated with stepper motors, such as accuracy, to enable accurate, safe, and inexpensive stepper motor-based robots. As discussed below, various ones of the embodiments disclosed herein may utilize a closed-loop control scheme around the operation of the stepper motor 212, a further step away from conventional robots.

The joint 108 may include a drivetrain 214. The drivetrain 214 may be coupled to the motor 212 such that the output of a joint 108 is the output of the drivetrain 214. The drivetrain 214 may have a gear ratio that is less than 30:1 (e.g., between 1:1 and 30:1, between 5:1 and 25:1, or between 10:1 and 25:1); a drivetrain 214 with such a gear ratio may be referred to herein as a "quasi-direct drivetrain." Conventional drivetrains used in conventional robots typically utilize a gear ratio that is greater than 30:1 (e.g., 100:1 to 500:1) in conjunction with a brushless motor, as discussed above. Utilizing a quasi-direct drivetrain 214 may enable the motor 212 and the drivetrain 214 to be backdriven (e.g., an external force on the joint 108 will result in a measurable torque at the motor 212, which can be recognized and controlled for), functionality not available in robots whose gear ratios are higher.

The joint 108 may include drive support circuitry 216. The drive support circuitry 216 may include circuitry that supports the driving of the motor 212 of the joint 108. Examples of drive support circuitry 216 are discussed below with reference to FIGS. 23-27.

The joint 108 may include brake support circuitry 218. The brake support circuitry 218 may include circuitry that supports the braking of the motor 212 of the joint 108. In some embodiments in which a joint 108 includes mechanical brakes 116, the brake support circuitry 218 may be coupled between the joint-level compute hardware 210 and the mechanical brakes 116, and may selectively activate the mechanical brakes 116 to slow or stop the motion of the joint 108. In embodiments in which a joint 108 does not include mechanical brakes 116 (or in embodiments in which other braking techniques may be used in addition to mechanical brakes 116), the brake support circuitry 218 may selectively apply signals to the motor 212 to electrically brake the motor 212; examples of such brake support circuitry 218 are discussed below with reference to FIGS. 23-27.

The joint 108 may include LEDs 220. The LEDs 220 may be mounted proximate to the joint 108 so that the light generated by an LED 220 when it is on is visible at an exterior surface of a housing of the robotic apparatus 101. Further, although "the LEDs 220" may be plural, a joint 108 may include a single LED. LEDs 220, or other display devices, may be used to indicate various conditions of the associated joint 108 or the robotic apparatus 101 as a whole; examples of different states of the LEDs indicating different conditions are discussed below with reference to FIG. 32. In some embodiments, the LEDs 220 included in a joint 108 may be full spectrum LEDs. In some embodiments, the color of the LEDs 220 included in a joint 108 may be changed by voice command; in particular, the voice command logic 170 may recognize a "LED color" voice command and may cause the color of the LED to change in response to the command.

Figure 13:
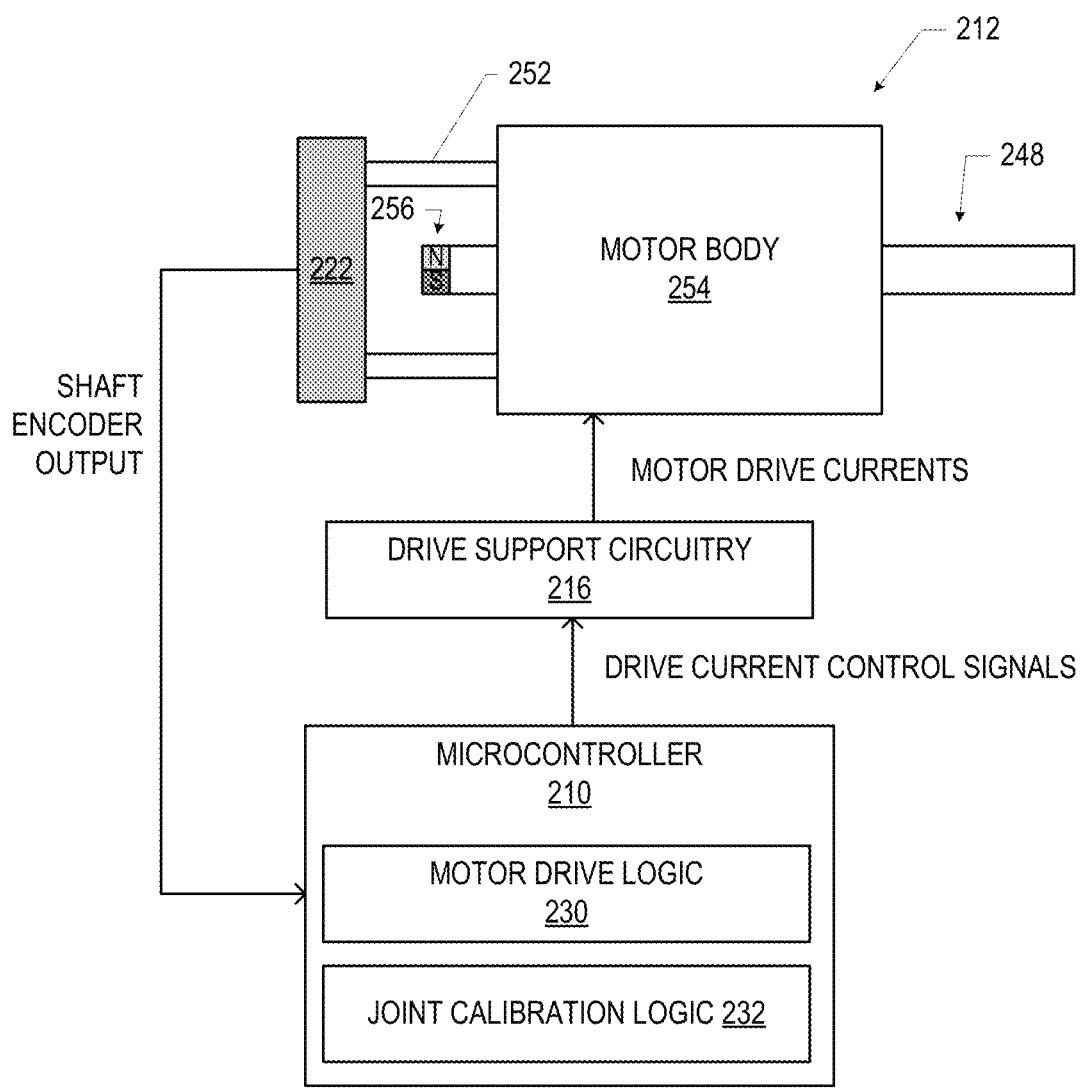
FIG. 13 depicts an example motor drive arrangement that may be included in a robotic system, in accordance with various embodiments.

The joint 108 may include a shaft encoder 222. The shaft encoder 222 may be used to measure the angle of rotation of a shaft 248 of a motor 212, as discussed below with reference to FIGS. 13-21. In some embodiments, the shaft encoder 222 may be contactless in that it does not make physical contact with the shaft 248 to measure the angle of rotation of the shaft 248. In other embodiments, the shaft encoder 222 may make contact with the shaft 248 to measure the angle of rotation of the shaft 248. In some embodiments, the shaft encoder 222 may have a resolution greater than 12 bits (e.g., 14 bits). FIG. 13, discussed further below, illustrates a particular embodiment in which the shaft encoder 222 is a contactless, magnetic angle encoder, but the arrangement of FIG. 13 and the techniques discussed with reference to FIGS. 14-21 may be performed by any other suitable type of angle encoder (e.g., a contact angle encoder, an optical angle encoder, etc.). In conventional robotic systems, shaft encoders are typically not used to monitor a joint due to the extremely high gear ratios of such systems (e.g., greater than 30:1); if a shaft encoder were used in such settings, the error on the output of the drivetrain based on the angle of the motor shaft would be far too large for accurate operation. Instead, conventional robotic systems typically include a joint encoder to monitor the angle of the joint itself (rather than the angle of a shaft of a motor driving the joint). In some embodiments of the joints 108 disclosed herein, no joint encoder may be included at the joint 108; instead, the position of the joint 108 may be determined by in the robotic system 100 by taking the position of the motor shaft 248 and dividing it down by the gear ratio of the drivetrain 214. The gear ratio may be burned into the joint-level data storage 229, for example. Thus, instructions to move a joint 108 may be communicated to the joint 108 in terms of joint degrees.

The joint 108 may include an accelerometer 224. In some embodiments, the accelerometer 224 may be part of an inertial measurement unit (IMU), which may also include a gyroscope. For example, the accelerometer 224 may be provided by a six-axis IMU (including a three-axis accelerometer and a three-axis gyroscope). In other embodiments, the accelerometer 224 may be a standalone device.

The joint 108 may include communications hardware 226. The communications hardware 226 included in a joint 108 may facilitate communication between the elements of the joint 108 and/or between different ones of the joints 108 and/or between a joint 108 and the system-level compute hardware 124. In some embodiments, the communications hardware 226 at different ones of the joints 108 may support a non-deterministic serial bus communication link between the joints 108, and between the joints 108 and the system-level compute hardware 124. In some embodiments, the communications hardware 226 of a joint 108 may include a USB hub (e.g., a four-port hub) to which the joint-level compute hardware 210 may be communicatively coupled via a USB cable. Further, different ones of the USB hubs in the different joints 108 of a robotic apparatus may be communicatively coupled to each other, and further communicatively coupled to the system-level compute hardware 124, in a daisy-chain fashion via USB cables. Such a USB backbone may permit communication of data between joints 108 and between any joint 108 and the system-level compute hardware 124. Any suitable ones of the other elements of a joint 108 may be coupled to the USB hub included in the communications hardware 128, and thus may be visible and addressable by any other USB device coupled to the backbone. Further, a set of USB ports may be exposed to the end effector 118 so that devices of the end effector 118 (e.g., cameras, lasers, depth sensors, lighting devices, etc.) may connect to the USB backbone, and thus may be readily recognized by the system-level compute hardware 124. When the joint-level compute hardware 210 includes a microcontroller with its own communications ports (e.g., GPIO ports), the communications hardware 226 may support the operation of these communications ports. In some embodiments, the communications hardware 226 may support communication with the system-level compute hardware 124 via a CAN bus, an RS-485 bus, a SPI bus, an I2C bus, or an RS-232 bus, for example.

As noted above, in some embodiments, the communications hardware 226 (in conjunction with the communications hardware 128) may manage the transfer of a packet of data from the joint 108 to the system-level compute hardware 124 at a rate that is greater than 1 kilohertz (e.g., between 1 kilohertz and 100 kilohertz). This packet of data may include the position of the joint 108 (as output from the shaft encoder 222), the velocity of the joint 108 (represented by a time derivative of the output of the shaft encoder 222), the acceleration of the joint 108 (represented by the second time derivative of the output of the shaft encoder 222), a counter (representative of a timestamp, incremented at a clock frequency of the joint-level compute hardware 210, used to align timestamps through the robotic system 100 with a timestamp of the system-level compute hardware 124), status flags, the error in a control loop (as discussed below with reference to FIG. 21), the current to the motor 212, acceleration and velocity data output from a multi-axis IMU (which may provide the accelerometer 224, as discussed above), the output of one or more temperature sensors included in the other hardware 227 of the joint (discussed below), and other data, as desired. The data in this packet may be assembled by the joint-level compute hardware 210 (e.g., a microcontroller) and provided to the communications hardware 226 (e.g., to a USB hub via a Universal Asynchronous Receiver/Transmitter (UART) interface of the joint-level compute hardware 210 through a UART to USB module included in the communications hardware 226). The system-level compute hardware 124 may use this data to control the operation of the robotic apparatus 101, as suitable and as discussed herein.

The joint 108 may include a limit switch 228. A limit switch 228 may be located in the joint 108 such that the limit switch 228 is triggered when the joint 108 (e.g., the joint output 258, as discussed below with reference to FIGS. 23-27) reaches a particular, predetermined position. A limit switch 228 may, in some embodiments, be used as part of a joint zeroing method, as discussed below with reference to FIG. 33. In some embodiments, some but not all of the joints 108 in a robotic apparatus 101 may include a limit switch 228. In some embodiments, a joint 108 of a robotic apparatus 101 may include a limit switch 228, but that limit switch 228 may not be used to zero the joint 108 (e.g., the method 610 of FIG. 34 may be used to zero the joint 108).

The joint 108 may include other hardware 227. The other hardware 227 may include additional sensors (e.g., one or more temperature sensors, one or more moisture detection sensors, one or more current sensors, etc.) and/or peripheral devices (e.g., one or more fans, one or more lasers, one or more displays, etc.). In some embodiments, one or more elements of the other hardware 227 may be readily attached to and detached from the rest of the hardware of the joint 108 (e.g., via a USB port of a USB hub of the communications hardware 226).

The joint 108 may include data storage 229. The data storage 229 may include data storage included in the joint-level compute hardware 210 or data storage separate from, but accessible to, the joint-level compute hardware 210. The contents of the data storage 229 may, in some embodiments, be read from and/or written to by remote devices via the communications hardware 226. Although the data storage 229 may be referred to herein in the singular, this is simply for ease of illustration, and the data storage 229 may include multiple data storage devices (e.g., read-only memory (ROM), Flash memory, RAM, etc.). The data storage 229 may include one or more memory devices used to store data and/or instructions executable by one or more processing devices to perform any suitable ones of the methods disclosed herein (e.g., with such stored instructions providing any suitable ones of the logic described herein).

Figure 10:
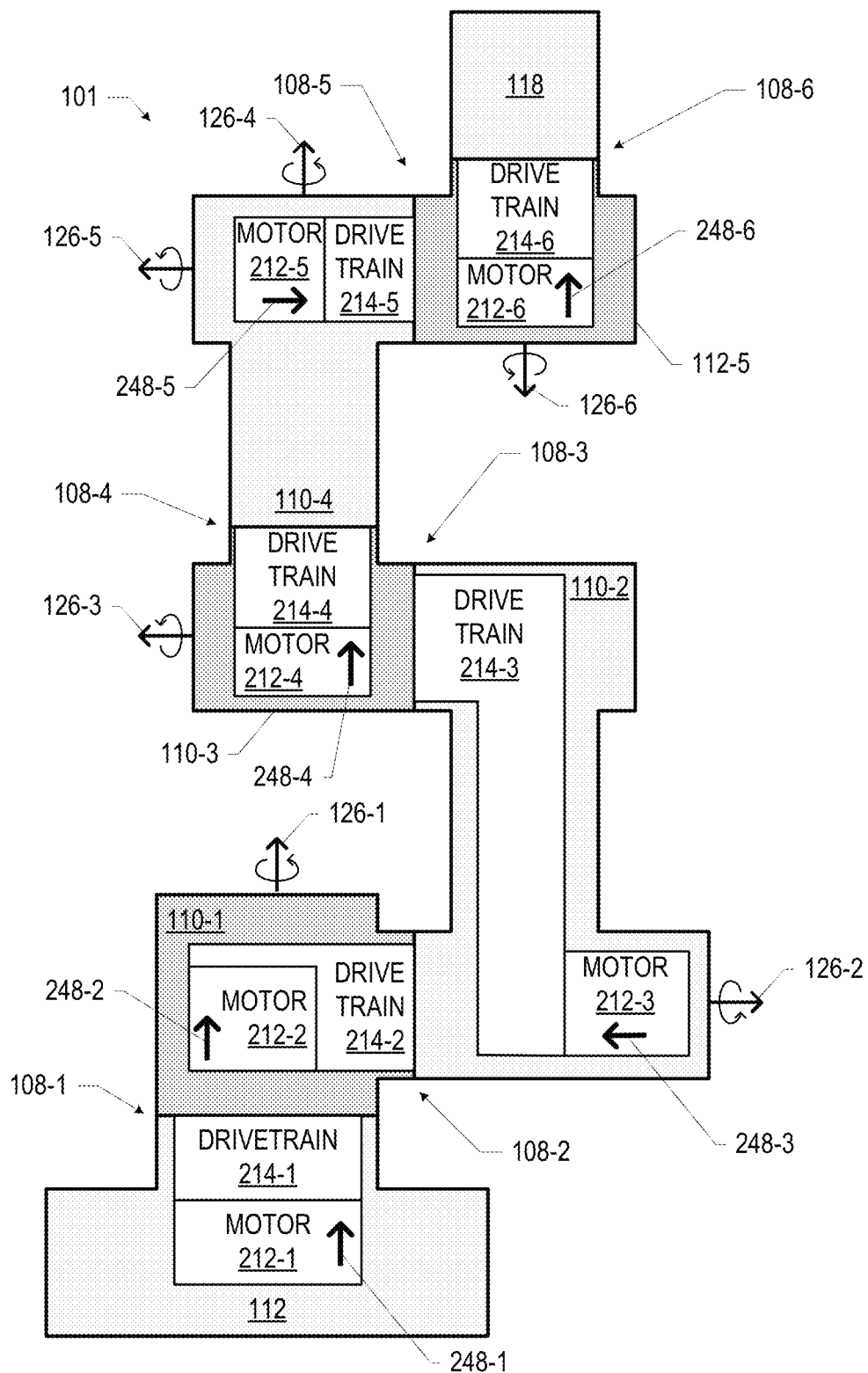
FIG. 10 is a side, cross-sectional view of an example instance of the robotic apparatus of FIG. 6, in accordance with various embodiments.

FIG. 10 is a side, cross-sectional view of an example instance of the robotic apparatus 101 of FIG. 6, in accordance with various embodiments. In particular, FIG. 10 illustrates an example arrangement of a motor 212 and a drivetrain 214 in each of the joints 108 of the robotic apparatus 101 of FIG. 6. The motors 212 associated with each of the joints 108 include an arrow indicating the direction of the longitudinal axis of the shaft 248 of the motor 212. Note that, in FIG. 10, some of the joints 108 include a motor 212 whose shaft 248 is parallel to the axis of rotation 126 of the joint 108 (i.e., the joints 108-1, 108-3, 108-4, 108-5, and 108-6) while others of the joints include a motor 212 whose shaft 248 is not parallel to the axis of rotation 126 of the joint 108 (i.e., the joint 108-2). For the joint 108-2, the shaft 248-2 of the motor 212-2 is rotated 90 degrees with respect to the axis of rotation 126-2 of the joint 108-2, and thus the drivetrain 214-2 may convert rotation by the shaft 248-2 into rotation of the joint 108-2 (e.g., by a belt arrangement). More generally, however, a robotic apparatus 101 may include one or more joints 108 whose motors 212 have shafts 248 that are parallel with the axis of rotation 126 of the joint 108, and/or one or more joints 108 whose motors 212 do not have shafts 248 that are parallel with the axis of rotation 126 of the joint 108.

Further, in FIG. 10, some of the joints 108 having motors 212 with shafts 248 that are parallel with the axis of rotation 126 of the joint 108 may include an offset between the shaft 248 and the axis of rotation 126. For example, for the joint 108-3, the motor 212-3 may be located toward a "bottom" of the segment 110-2, while the axis of rotation 126-3 of the joint 108-3 may be located toward a "top" of the segment 110-2. The drivetrain 214-3 may bridge the offset between the shafts 248-3 of the motor 212-3 and the axis of rotation 126-3 of the joint 108-3. More generally, the robotic apparatus 101 may include one or more joints 108 whose motors 212 have shafts 248 that are offset from the axis of rotation 126 of the joint 108, and/or one or more joints 108 whose motors 212 do not have shafts 248 that are offset from the axis of rotation 126 of the joint 108.

Figure 11:
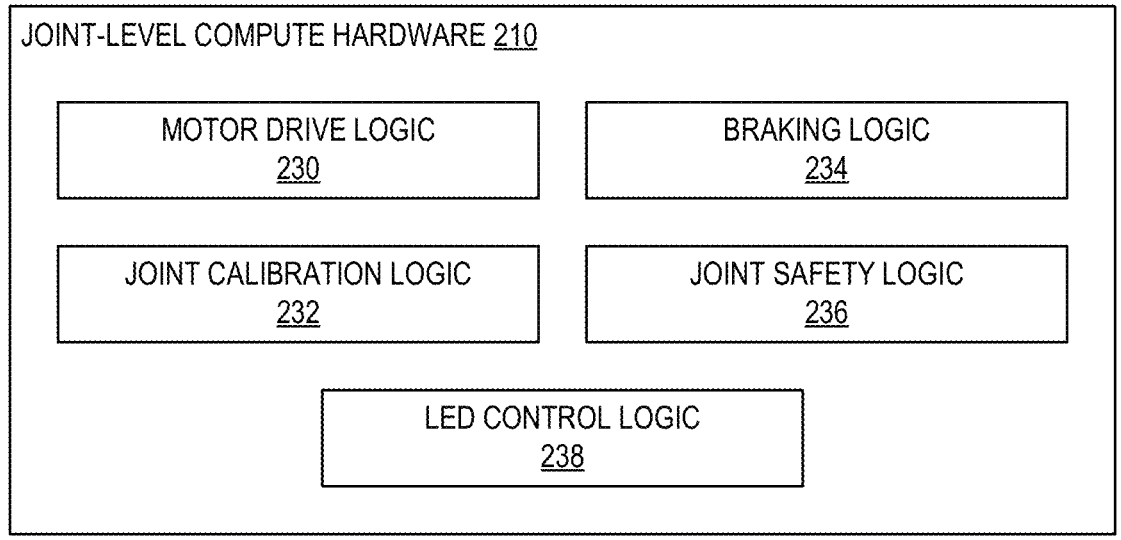
FIG. 11 is a block diagram of logic elements that may be part of joint-level compute hardware, in accordance with various embodiments.

FIG. 11 is a block diagram of logic elements that may be part of a joint-level compute hardware 210, in accordance with various embodiments. In particular, the logic elements illustrated in FIG. 11 may be implemented by programmed instructions stored in the data storage 229 such that, upon execution by one or more processing devices of the joint-level compute hardware 210, cause the joint-level compute hardware 210 to perform the operations disclosed herein. The logic elements illustrated in FIG. 11 may be part of the control logic 104 of a robotic system 100. In particular, the motor drive logic 230 may be part of the motion/position logic 132, the joint calibration logic 232 may be part of the calibration logic 134, the braking logic 234 may be part of the motion/position logic 132, the joint safety logic 236 may be part of the safety logic 136, the LED control logic 238 may be part of the I/O device logic 144, etc.

As noted above, the joint-level compute hardware 210 may include motor drive logic 230.

The joint-level compute hardware 210 may include joint calibration logic 232. The joint calibration logic 232 may cause the robotic apparatus 101 to perform a joint calibration technique that maps the output of the shaft encoder 222 to the true position of the stepper motor 212 for the joint 108. Examples of joint calibration techniques are discussed in further detail below with reference to FIGS. 15-16.

The joint-level compute hardware 210 may include braking logic 234. The braking logic 234 may control the braking of the motor 212 of the joint 108. In some embodiments in which a joint 108 includes mechanical brakes 116, the braking logic 234 may selectively activate the mechanical brakes 116 to slow or stop the motion of the joint 108. In embodiments in which a joint 108 does not include mechanical brakes 116 (or in embodiments in which other braking techniques may be used in addition to mechanical brakes 116), the braking logic 234 may generate signals to the motor 212 to electrically brake the motor 212, as discussed below with reference to FIGS. 23-27.

The joint-level compute hardware 210 may include joint safety logic 236. Examples of joint-level safety techniques that may be performed by the joint safety logic 236 are discussed below with reference to FIGS. 30-31.

The joint-level compute hardware 210 may include LED control logic 238. The LED control logic 238 may control the state (e.g., brightness, flashing frequency, color, etc.) of one or more LEDs 220 included in a joint 108. Examples of methods of controlling LEDs 220 in a joint 108 that may be performed by the LED control logic 238 are discussed below with reference to FIG. 32.

Figure 12:
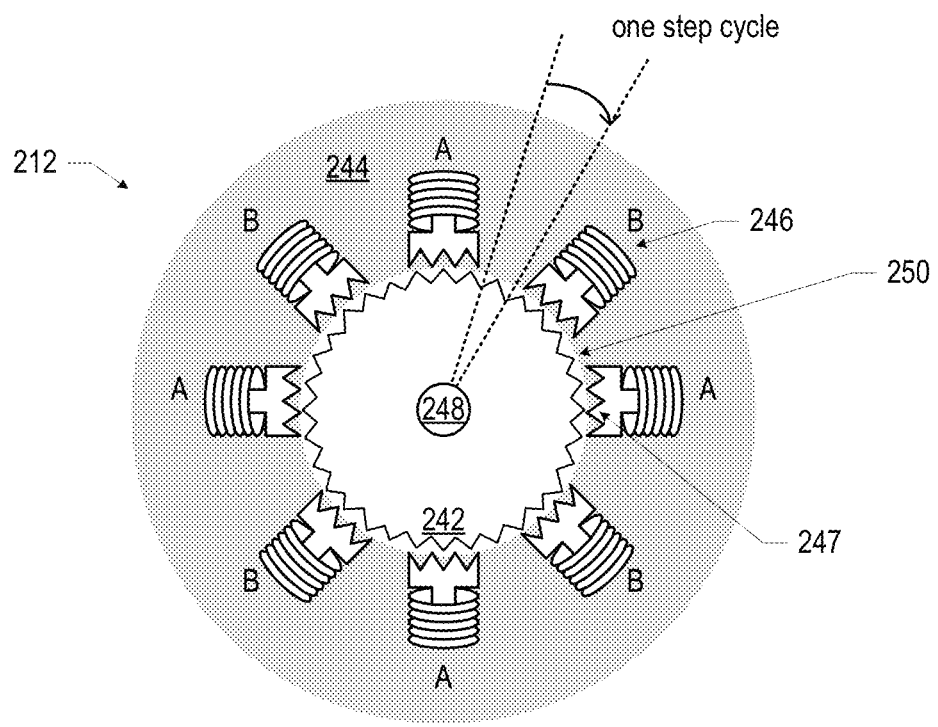
FIG. 12 depicts a stepper motor that may be included in a joint of a robotic system, in accordance with various embodiments.

FIG. 12 depicts a stepper motor 212 that may be included in a joint 108 of a robotic system 100, in accordance with various embodiments. In particular, FIG. 12 is a cross-sectional view perpendicular to the shaft 248 of the motor 212. The stepper motor 212 may include a rotor 242 coupled to the shaft 248. The rotor 242 may include teeth 250, which face complementary teeth 247 of electromagnets 246 of a surrounding stator 244. The electromagnets 246 of the stepper motor 212 illustrated in FIG. 12 are arranged in two phases, labeled "A" and "B," but a stepper motor 212 included in a joint 108 may have more than three phases, if desired. By selectively providing current to the phases of the stepper motor 212, different ones of the electromagnets 246 may be energized so as to cause rotation of the rotor 242 with respect to the stator 244. Four "steps" of the rotor 242 may equal rotation by one full tooth 250; when the rotor 242 rotates by a full tooth 250, the motor 212 may be said to have completed a full "step cycle," as indicated in FIG. 12. Different stepper motors 212 may include different numbers of steps per one full revolution of the shaft 248 (e.g., 200 steps per revolution) and different embodiments of the motor drive logic 230 may support different microstepping capabilities (e.g., the ability to drive the stepper motor 212 at a half-step, a quarter-step, etc.).

Figure 14:
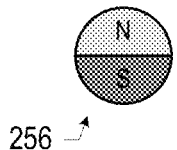
FIG. 14 illustrates a diametric magnet that may be included in a robotic system, in accordance with various embodiments.

FIG. 13 depicts an example motor drive arrangement that may be included in a joint 108 of a robotic system 100, in accordance with various embodiments. In FIG. 13, a stepper motor 212, including a motor body 254 and a shaft 248 that rotates within the motor body 254, is mechanically coupled to a shaft encoder 222 by a shaft encoder support 252. In a particular embodiment illustrated in FIG. 13, the shaft encoder 222 is a magnetic, contactless angle encoder, which senses the orientation of a diametric magnet 256 coupled to an end of the shaft 248. FIG. 14 illustrates a diametric magnet 256 (including north and south poles at opposite ends of a diameter of the magnet 256) that may be included in a robotic system 100, in accordance with various embodiments; the perspective of FIG. 14 is rotated 90 degrees sideways relative to the perspective of FIG. 13, such that the shaft 248 would extend into the page of the drawing from the perspective of FIG. 14.

Returning to FIG. 13, the shaft encoder support 252 may be any suitable mechanical structure (e.g., a plastic frame) that allows the shaft encoder 222 and the diametric magnet 256 to maintain a desired spacing and relative orientation. As noted above with reference to FIG. 9, shaft encoders 222 that are not contactless and/or that are not magnetic may be used to detect the angular position of the shaft 248 of the stepper motor 212. The output of the shaft encoder 222 (indicating the angular position of the shaft 248) may be transmitted to the joint-level compute hardware 210, where it may be used by the motor drive logic 230 during motor drive operations (as discussed further below) and used by the joint calibration logic 232 during joint calibration operations (as discussed further below). The motor drive logic 230 and/or the joint calibration logic 232 may cause the joint-level compute hardware 210 to generate drive current control signals that may be transmitted to drive support circuitry 216 and used by the drive support circuitry 216 to generate motor drive currents. Particular examples of drive support circuitry 216 are discussed below with reference to FIGS. 23-27. The motor drive currents are then provided to the stepper motor 212 (i.e., to the phases of the stepper motor 212, as discussed above with reference to FIG. 12) to cause the stepper motor 212 to move in a desired manner.

Figures 15, 16:
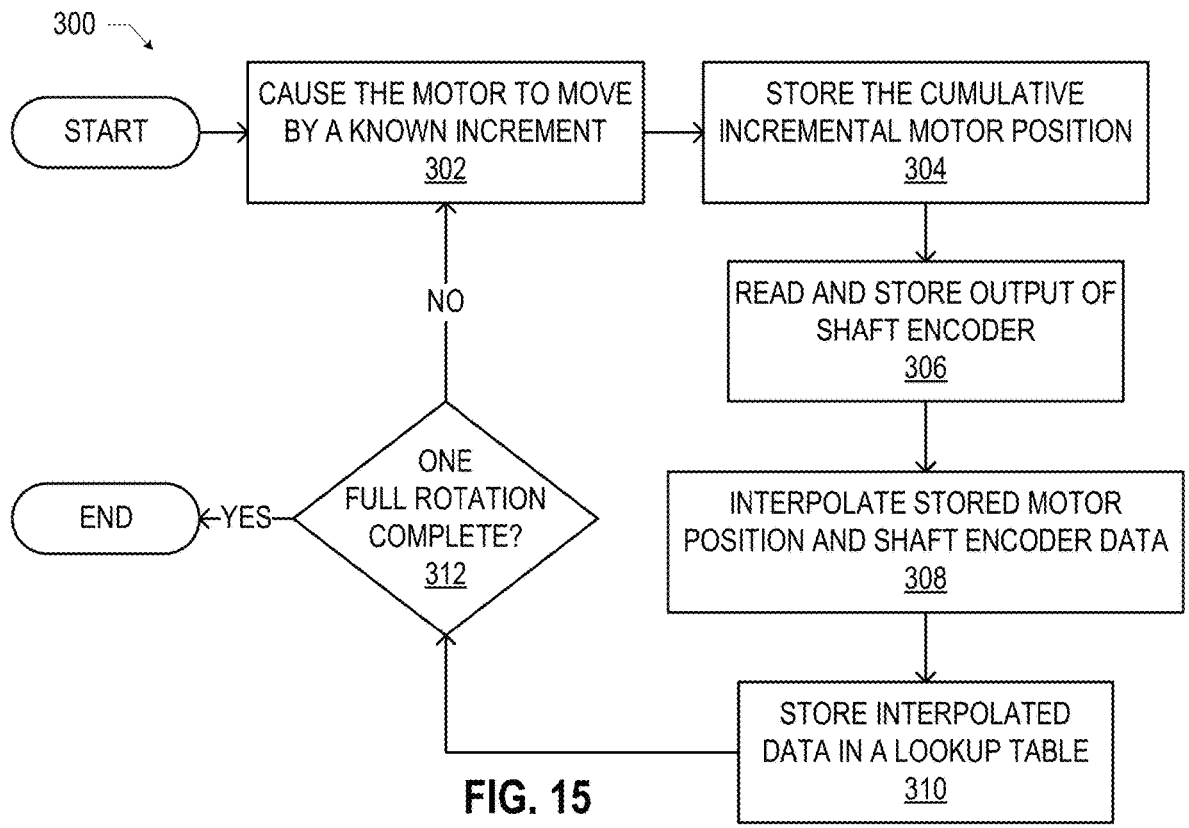
FIG. 15 is a flow diagram of an example method of calibrating a motor in a robotic system, in accordance with various embodiments.
FIG. 16 depicts an example data structure that may be used to calibrate a motor in a robotic system, in accordance with various embodiments.

As noted above, the joint calibration logic 232 may cause the robotic apparatus 101 to perform a joint calibration technique that maps the output of the shaft encoder 222 to the true position of the stepper motor 212 for the joint 108. FIG. 15 is a flow diagram of an example method 300 of calibrating a motor 212 in a robotic system 100, in accordance with various embodiments. The method 300 may be carried out by the joint calibration logic 232 of a joint-level compute hardware 210 (which may be located in the robotic apparatus 101, and physically proximate to the joint 108), and in some embodiments, may be performed in response to an instruction from the control logic 104 (e.g., the calibration logic 134) to calibrate the joint 108. In some embodiments, each of the different joints 108 in a robotic apparatus 101 may include a joint-level compute hardware 210 having joint calibration logic 232 that performs the method 300 for that particular joint 108. Although the operations of the method 300 may be illustrated with reference to particular embodiments of the motors 212 and shaft encoders 222 disclosed herein, the method 300 may be performed using any suitable components; the same is true for any of the other methods disclosed herein. Various operations are illustrated once each and in a particular order in FIG. 15, but the operations may be reordered and/or repeated as desired (e.g., with different operations performed in parallel, as suitable); the same is true for any of the other methods disclosed herein.

At 302, a motor may be caused to move by a known increment from a known starting point. For example, the joint calibration logic 232 may generate drive current control signals for drive support circuitry 216 such that the drive support circuitry 216 provides motor drive currents to the motor 212 to cause the shaft 248 of the motor 212 to rotate through a known angle (corresponding to, e.g., a full step, a half-step, any other suitable microstep, etc.). Zeroing techniques for causing a joint 108 to move to a known "zeroed" position (e.g., the known starting point at which joint calibration may begin) are discussed below with reference to FIGS. 33-34.

At 304, the cumulative incremental motor position may be stored. For example, the joint calibration logic 232 may store, in the data storage 229, the cumulative incremental position of the shaft 248 of the stepper motor 212 (referred to herein as simply "the position of the motor").

At 306, the output of the shaft encoder may be read and stored. For example, the joint calibration logic 232 may receive an output indicative of the angle of the shaft 248 from the shaft encoder 222, and may store that output in association with the cumulative incremental position stored at 304.

At 308, the stored motor position and shaft encoder data may be interpolated. This interpolation may be performed in accordance with any known technique (e.g., linear interpolation, quadratic interpolation, etc.) and with any desired resolution. For example, the joint calibration logic 232 may interpolate the previously stored motor position and shaft encoder data to achieve a lookup table of a desired size at the completion of the method 300.

At 310, the interpolated data may be stored in a lookup table. For example, the joint calibration logic 232 may store the interpolated data as a lookup table in the data storage 229. For example, FIG. 16 depicts an example data structure 400 that may be used to calibrate a stepper motor 212 in a robotic system 100, in accordance with various embodiments. The data structure 400 may be a lookup table that associates shaft encoder values with motor positions.

Returning to FIG. 15, at 312, it may be determined whether one full rotation of the motor has been completed. For example, the joint calibration logic 232 may monitor the cumulative incremental position of the stepper motor 212 to determine whether the shaft 248 has completed a full rotation since the start of the method 300. If one full rotation of the motor has not been completed, the method 300 may proceed to 302, and the motor may be caused to move by a known increment again. If one full rotation has been completed, the method 300 may end.

The results of the joint calibration technique of FIG. 16 is a lookup table of a desired resolution mapping the output of the shaft encoder 222 to the "true" position of the stepper motor 212. This lookup table may be used to accurately drive the motor 212 to a desired position (e.g., in a closed-loop fashion, as discussed below with reference to FIG. 18) while compensating for errors in the output of the shaft encoder 222 (due to, for example, variations in the mounting of the shaft encoder 222, errors in the shaft encoder 222 itself, etc.). In some embodiments, the lookup table may have one entry per encoder reading, but the size of the lookup table may be scaled based on available Flash memory in the joint-level data storage 229. For example, a 14-bit shaft encoder 22 may generate $2^{14}$ 16-bit values, requiring 32 kilobytes of memory; if the position of the motor 212 is encoded with 16-bit values, this will allow the motor position to be specified with approximately 0.005 degrees of resolution.

As noted above, the motor drive logic 230 may generate drive current control signals for drive support circuitry 216, which may use those drive current control signals to generate motor drive currents for the stepper motor 212. The motor drive logic 230 may generate drive current control signals in an open-loop fashion or in a closed-loop fashion.

In some embodiments, a joint 108 may be switched (e.g., by task logic 106) between open-loop control and close-loop control depending upon the task to be performed.

Figure 17:
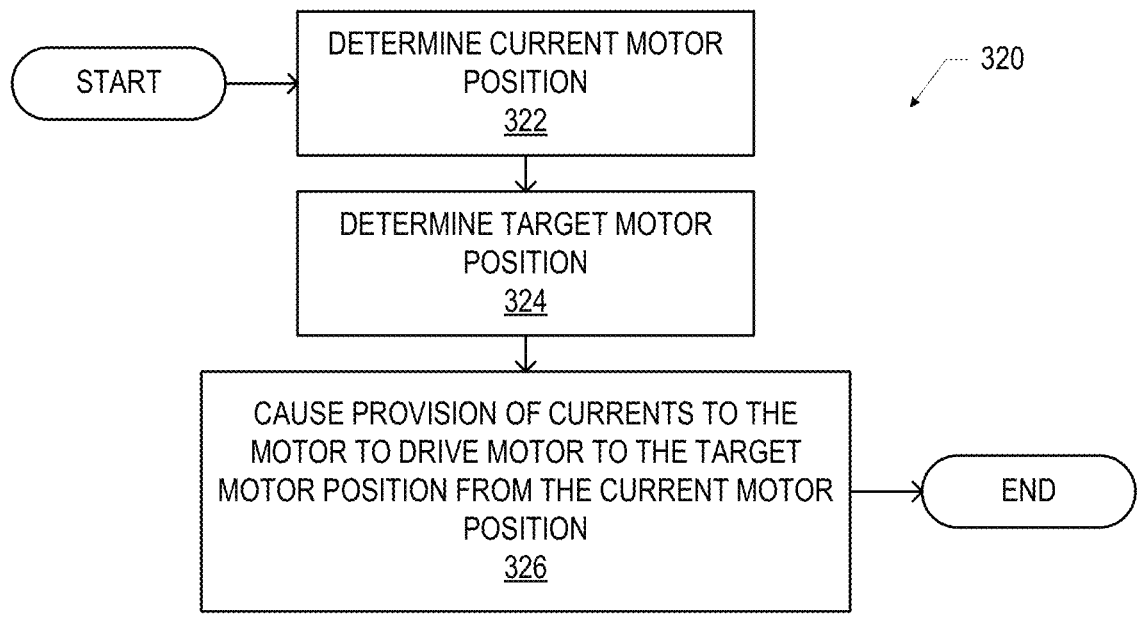
FIG. 17 is a flow diagram of an example open-loop method of driving a motor in a robotic system, in accordance with various embodiments.

FIG. 17 is a flow diagram of an example open-loop method 320 of driving a motor 212 in a robotic system 100, in accordance with various embodiments. The method 320 may be carried out by the motor drive logic 230 of a joint-level compute hardware 210 (which may be located in the robotic apparatus 101, and physically proximate to the joint 108), and in some embodiments, may be performed in response to an instruction from the control logic 104 (e.g., the motion/position logic 132) to move the joint 108. In some embodiments, each of the different joints 108 in a robotic apparatus 101 may include a joint-level compute hardware 210 having motor drive logic 230 that performs the method 320 for that particular joint 108.

At 322, the current motor position may be determined. For example, the motor drive logic 230 may receive an output of a shaft encoder 222 indicating a current angular position of the shaft 248 of a stepper motor 212 (e.g., as discussed above with reference to FIG. 13), and the motor drive logic 230 may utilize a lookup table stored in the data storage 229 (e.g., the data structure 400 of FIG. 16) to determine the motor position corresponding to the current angular position.

At 324, the target motor position may be determined. For example, the motor drive logic 230 may receive an instruction from the control logic 104 (e.g., the motion/position logic 132) to move the joint 108 by causing the stepper motor 212 to rotate through a desired angle.

At 326, provision of currents to the motor may be caused to drive the motor to the target motor position from the current motor position. For example, the motor drive logic 230 may provide currents to the phases of the stepper motor 212 (e.g., as discussed above with reference to FIG. 12) to cause the stepper motor 212 2 move through the desired angle. The magnitude and timing of the currents provided to the phases of the stepper motor 212 may be based on a predetermined relationship between currents and motor position (e.g., using conventional open-loop stepper motor drive schemes). Note that, in an open-loop motor drive method like the method 320, the position of the stepper motor 212 may not be monitored during driving of the stepper motor 212.

Figure 18:
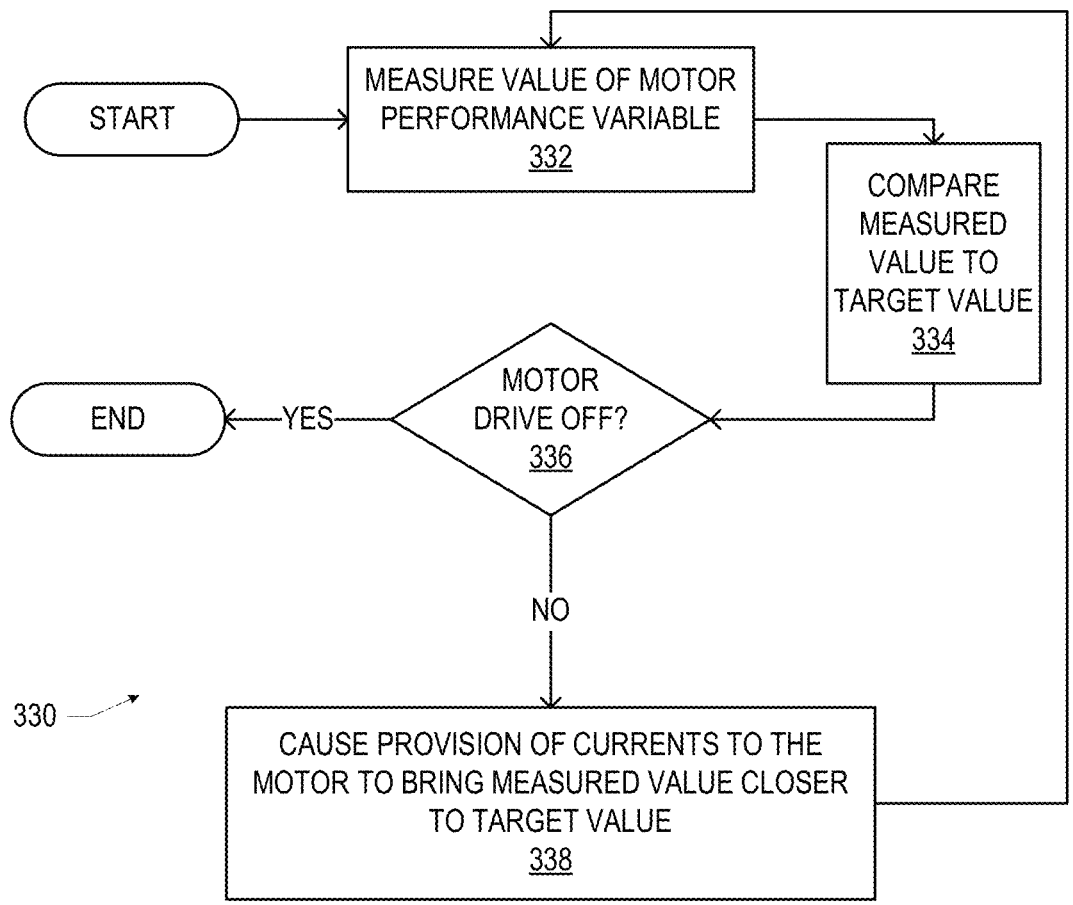
FIG. 18 is a flow diagram of an example closed-loop method of driving a motor in a robotic system, in accordance with various embodiments.

FIG. 18 is a flow diagram of an example closed-loop method 330 of driving a motor 212 in a robotic system 100, in accordance with various embodiments. The method 330 may be carried out by the motor drive logic 230 of a joint-level compute hardware 210 (which may be located in the robotic apparatus 101, and physically proximate to the joint 108), and in some embodiments, may be performed in response to an instruction from the control logic 104 (e.g., the motion/position logic 132) to move the joint 108. In some embodiments, each of the different joints 108 in a robotic apparatus 101 may include a joint-level compute hardware 210 having motor drive logic 230 that performs the method 330 for that particular joint 108. Although motor position may be referred to herein as the variable around which closed-loop motor control is performed, this need not be the case, and in other embodiments, a closed-loop motor control method may be performed around other motor performance variables, such as velocity, current, or torque.

At 332, a value of a motor performance variable may be measured. The motor performance variable may be motor position, motor velocity, motor current, etc. For example, the motor drive logic 230 may measure the position of a stepper motor 212 by receiving an output of a shaft encoder 222 indicating a current angular position of the shaft 248 of a stepper motor 212 (e.g., as discussed above with reference to FIG. 13), and the motor drive logic 230 may utilize a lookup table stored in the data storage 229 (e.g., the data structure 400 of FIG. 16) to determine the motor position corresponding to the current angular position.

At 334, the measured value may be compared to a target value. For example, the motor drive logic 230 may compare the current position of a stepper motor 212 to a target position of the stepper motor 212 (e.g., as specified by an instruction from the control logic 104).

At 336, it may be determined whether motor drive should be turned off. For example, the motor drive logic 230 may determine that the motor drive should be turned off in accordance with the method 360 of FIG. 29, discussed below.

If it is determined at 336 that the motor drive should not be turned off, the method 330 may proceed to 338, and provision of currents to the motor may be caused in order to bring the measured value closer to the target value. For example, the motor drive logic 230 may generate drive current control signals for the drive support circuitry 216 to cause the drive support circuitry 216 to provide motor drive currents to the stepper motor 212 (as discussed above with reference to FIG. 13) to bring the position of the stepper motor 212 closer to the target position. A control loop may generate appropriate currents to provide to the motor to bring it closer to the target value. Such a control loop may determine the error between the measured value and the target value (at 334), and may provide, as an output, drive current control signals for the motor. This control loop may take any suitable form known in the art, such as a proportional (P) control loop, an integral (I) control loop, a derivative (D) control loop, any combination thereof (e.g., a proportional-integral-derivative (PID) control loop), or any other suitable control loop. A particular example of a method that may be performed at 332/334/338 is the method 340 of FIG. 21 (discussed below). The method 330 may then proceed to 332, and the value of the motor performance variable may be measured again.

If it is determined at 336 that the motor drive should be turned off, the method 330 may end.

Figures 19, 20:
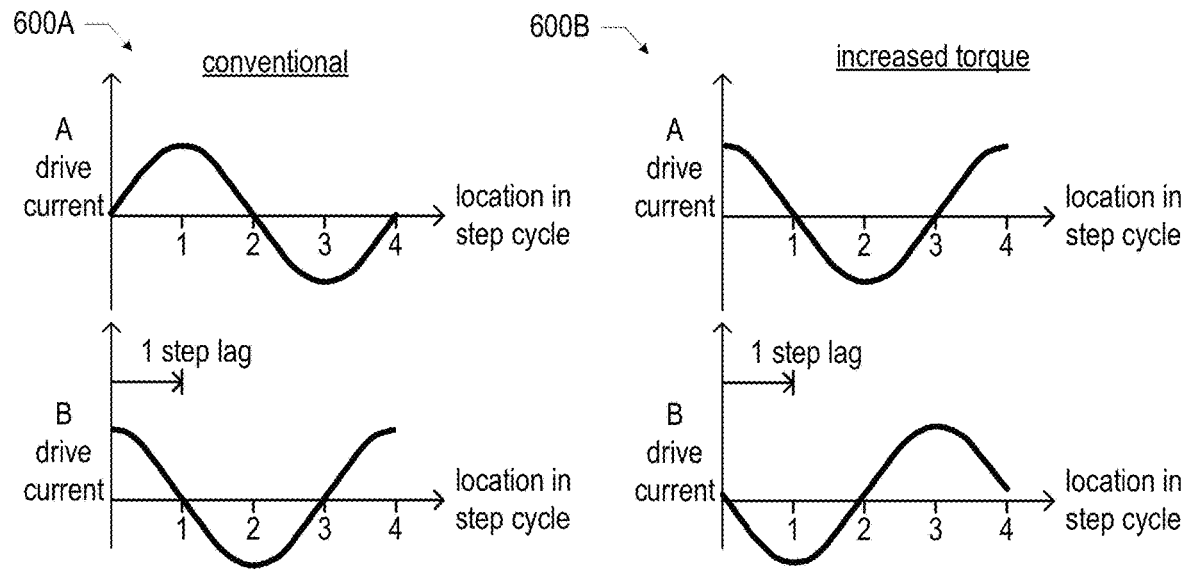
FIG. 19 illustrates conventional and increased-torque drive currents over a step cycle for different phases of a stepper motor that may be used in a robotic system, in accordance with various embodiments.
FIG. 20 depicts an example data structure that may be used to determine drive currents for different phases of a stepper motor in a robotic system, in accordance with various embodiments.

As discussed above, causing a stepper motor 212 to move to a desired position involves the provision of motor drive currents to the stepper motor 212. FIG. 19 includes two plots; a plot 600A of conventional drive currents for each phase ("A" and "B") of a two-phase stepper motor 212, and a plot 600B of increased-torque drive currents for each phase of a two-phase stepper motor 212. The drive currents of FIG. 19 may be provided to a stepper motor 212 under the control of the motor drive logic 230, in accordance with various embodiments. The drive currents of FIG. 19 are illustrated as being delivered over four steps of a step cycle of a stepper motor 212. The "A" and "B" curves in the plot 600A are sinusoids separated by a 90 degree lag, as shown, as are the "A" and "B" curves in the plot 600B. The plots 600A and 600B indicate the relative magnitudes of the currents that may be provided to the phases of the stepper motor 212 as a function of the current position of the stepper motor 212 in a step cycle. The plots 600A and 600B may be normalized so that the drive currents provided to a stepper motor 212 are based on the relative values indicated by the plot 600A or 600B, multiplied by a drive current scale factor, as discussed below with reference to FIG. 21. The relative magnitudes of the "A" and "B" currents at a position along a step cycle may be referred to as the "commutation" of the stepper motor 212 at that position.

When a conventional drive scheme like that of the plot 600A is used to drive a stepper motor 212 (e.g., in an open-loop manner, as discussed above with reference to FIG. 17), the torque of the stepper motor 212 may vary in an undesirable manner over the step cycle. In particular, when the current is first changed at the beginning of a new step cycle, the torque is largest, and decreases to zero as the shaft 248 of the stepper motor 212 aligns with the magnetic field. When a drive scheme like that of the plot 600B is used to drive a stepper motor 212, the current provided (e.g., in a closed-loop manner, as discussed above with reference to FIG. 18) may always be set at a full step ahead of the current motor position across the entire step cycle, increasing the instantaneous torque provided by the stepper motor 212 of a joint 108 across the drive operation relative to conventional drive schemes. Further, in conventional motor drive schemes, the current level provided to the motor must be set high enough to generate enough torque to overcome the worst-case loading of the motor (e.g., by a safety factor of 2). Such a drive scheme often results in unnecessary torque (which requires additional power that is dissipated as heat), and also limits the ability to run the motor near its performance limits. The increased-torque drive schemes disclosed herein allow the motor 212 to be run at a greater torque than conventionally achieved, and also with only enough current (and therefore, power) to move the motor 212 as needed, eliminating the need for a conventional current safety factor and reducing the amount of wasted power.

Implementing the drive scheme of the plot 600B may take any of a number of forms. For example, in some embodiments, the drive current scheme illustrated in the plot 600B of FIG. 19 may be stored in a lookup table to allow the motor drive logic 230 to determine the appropriate drive current for each of the phases of a stepper motor 212 based on the current location of the stepper motor 212 in a step cycle. For example, FIG. 20 depicts an example data structure 402 that the motor drive logic 230 may use to determine drive currents for different phases of a stepper motor 212 in a robotic system 100, in accordance with various embodiments. The data structure 402, which may be a lookup table, may relate locations of the stepper motor 212 in the step cycle to the drive currents for the phases "A" and "B" of a two-phase stepper motor 212 in accordance with the plot 600B. The number of entries in the lookup table (corresponding to the resolution of the "sampling" of the plot 600B) may have any desired value. For example, when the motor drive logic 230 supports microstepping at 32 microsteps per step, the lookup table may have 128 entries (corresponding to 32 microsteps for each of the four steps in a step cycle); when the motor drive logic 230 supports microstepping at other intervals, the number of entries in the lookup table may vary accordingly, or in any other desired manner.

In some other embodiments, the drive current scheme illustrated in the plot 600A of FIG. 19 may be stored in a lookup table and used by the motor drive logic 230 to determine the appropriate drive current for each of the phases of a stepper motor 212 based on the current location of the stepper motor 212 in a step cycle by looking ahead in the lookup table by a full step. For example, the example data structure 402 of FIG. 20 may relate locations in the step cycle to the drive currents for the phases "A" and "B" of a two-phase stepper motor 212 in accordance with the plot 600A; in use, the motor drive logic 230 may determine the normalized drive currents to apply by identifying the entry in the data structure 402 corresponding to the location that is one full step ahead of the current location in the step cycle. The number of entries in the lookup table (corresponding to the resolution of the "sampling" of the plot 600A) may have any desired value. Storing the drive currents of the plot 600A in the data structure 402 of FIG. 20 may advantageously allow the data structure 402 to be used in two different ways; in a conventional manner (e.g., when the motor 212 is being controlled in an open-loop fashion, with drive currents identified by looking at the entry in the lookup table associated with the current motor position) and in an increased-torque manner (e.g., when the motor 212 is being controlled in a closed-loop fashion, with drive currents identified by "looking ahead" to the entry in the lookup table corresponding to one step ahead of the current motor position).

The data structure 402 of FIG. 20 also includes a "decay mode" column, which may be used to specify a decay mode for an H-bridge 260 included in the drive support circuitry 216, as discussed below with reference to FIGS. 24-28. As known in the art, H-bridges 260 may be used to pulse width modulate an on/off circuit to approximate a desired value; some H-bridges 260 may enable a "decay mode" to be set to control how current is managed during the "off" times of the pulse width modulated signal. In some embodiments, different decay modes (e.g., slow, fast, mixed, etc.) may be utilized at different points in the step cycle; for example, when the current to a phase is increasing, a "slow decay" mode may be used, and when the current to a phase is increasing, the "fast decay" mode may be used.

Figure 21:
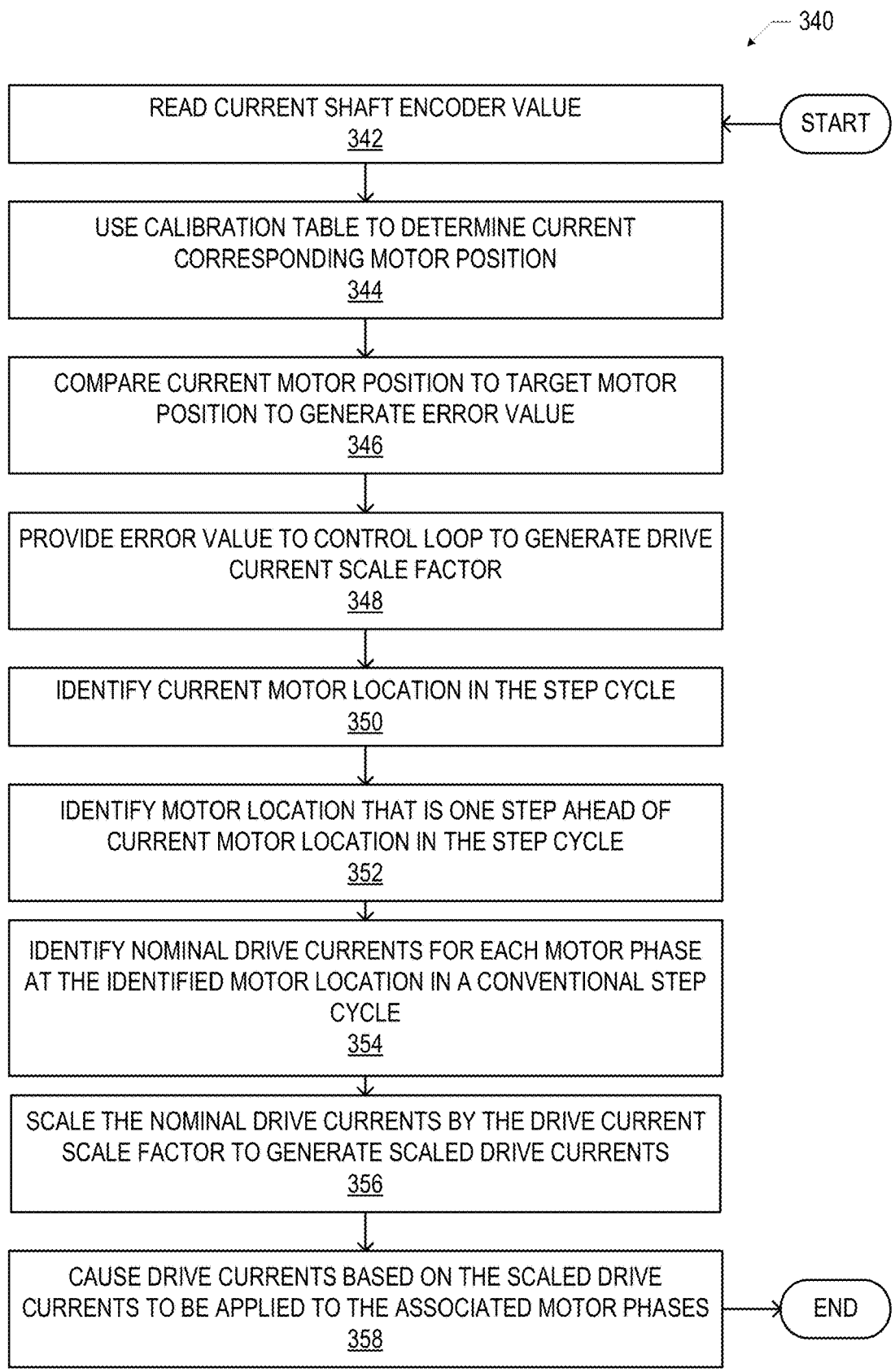
FIG. 21 is a flow diagram of an example method of driving a motor in a robotic system, in accordance with various embodiments.

FIG. 21 is a flow diagram of an example method 340 of driving a motor 212 in a robotic system 100, in accordance with various embodiments. The method 340 may be carried out by the motor drive logic 230 of a joint-level compute hardware 210 (which may be located in the robotic apparatus 101, and physically proximate to the joint 108), and in some embodiments, may be performed in response to an instruction from the control logic 104 (e.g., the motion/position logic 132) to move the joint 108. In some embodiments, each of the different joints 108 in a robotic apparatus 101 may include a joint-level compute hardware 210 having motor drive logic 230 that performs the method 340 for that particular joint 108. In some embodiments, the method 340 is a particular example of a method that may be performed at 338 of the closed-loop control method 330 of FIG. 18.

At 342, a current value of a shaft encoder may be read. As discussed above, the shaft encoder may monitor the angular position of the shaft of a motor (e.g., the shaft 248 of the stepper motor 212). For example, the motor drive logic 230 may receive output data from the shaft encoder 222.

At 344, a calibration table may be used to determine a current motor position corresponding to the current shaft encoder value. For example, the motor drive logic 230 may use a lookup table like the data structure 400 of FIG. 16 to determine a current position of a stepper motor 212 based on the shaft encoder value of 342.

At 346, the current motor position may be compared to a target motor position to generate an error value. For example, the motor drive logic 230 may compare the current position of the stepper motor 212 (determined at 344) to a target position of the stepper motor 212 (e.g., as specified by an instruction from the control logic 104).

At 348, the error value may be provided to a control loop to generate a drive current scale factor. For example, the motor drive logic 230 may implement any of the control loops discussed above with reference to FIG. 18 (e.g., a PID control loop) such that inputting an error value to the control loop results in the output of a drive current scale factor.

At 350, the current location of the motor in the step cycle may be determined. For example, the motor drive logic 230 may determine a current location in the step cycle based on the motor position determined at 344. The determination of the step cycle location may utilize a lookup table relating locations in the step cycle to motor position, or may use a calculation relating locations in the step cycle to motor position (e.g., dividing the current motor position by the number of degrees per step cycle, and then dividing the remainder by the number of degrees per step cycle).

At 352, the motor location one full step ahead of the current motor location in the step cycle may be identified. For example, the motor drive logic 230 may determine that the stepper motor 212 is currently at a location of X steps in the step cycle, and thus the motor drive logic 230 may identify X+1 steps in the step cycle.

At 354, nominal drive currents for each motor phase at the identified motor location in a conventional step cycle may be looked up. For example, the motor drive logic 230 may utilize a lookup table like the data structure 402 of FIG. 20 to determine a nominal A drive current and a nominal B drive current in the conventional drive scheme of the plot 600A of FIG. 19 corresponding to the step cycle location identified at 352 (i.e., X+1 steps). When the data structure 402 stores the A drive current and the B drive current of the conventional drive scheme plot 600A of FIG. 19, this use of the data structure 402 of FIG. 20 at 354 is not to identify the A drive current and the B drive current corresponding to the current step cycle location, but to the step cycle location that is one step advanced from the current step cycle location. When the data structure 402 stores the A drive current and the B drive current of the increased-torque drive scheme plot 600B of FIG. 19, this use of the data structure 402 of FIG. 20 at 354 is to identify the A drive current and the B drive current corresponding to the current step cycle location.

At 356, the nominal drive currents (looked up at 354) may be scaled by the drive current scale factor (generated at 348) to generate scaled drive currents. For example, the motor drive logic 230 may multiply the nominal A and B drive currents (looked up in the data structure 402 of FIG. 20 at 354) by the drive current scale factor (generated by the control loop at 348) to generate scaled drive currents for the A and B phases of the stepper motor 212.

At 358, drive currents may be caused to be applied to the associated motor phases based on the scaled drive currents (generated at 356). For example, the motor drive logic 230 may generate a drive current control signals for drive support circuitry 216 to cause the drive support circuitry 216 to generate motor drive currents based on the scaled drive currents generated at 356. In some embodiments, the motor drive currents may be equal to the scaled drive currents generated at 356, while in other embodiments, further operations may be performed on the scaled drive currents in order to generate the motor drive currents.

In some embodiments, determining A and B drive currents in accordance with the increased-torque drive schemes disclosed herein may also include adjusting the A and B drive currents from their nominal increased-torque values to account for back electromotive forces and other non-idealities encountered during the operation of the motor 212. For example, determining A and B drive currents in accordance with the increased-torque drive schemes disclosed herein may include increasing or decreasing the nominal increased-torque A and B drive currents to account for back electromotive forces (which may vary as a function of the A and B drive currents). Such "adjusted" currents may further increase the torque provided by a motor 212. In some embodiments, adjusting the A and B drive currents to account for back electromotive forces may be performed by identifying the motor location that is more or less than one full step away from the current motor location in a step cycle by some amount, and then nominal drive currents for each motor phase at the identified motor location in a conventional step cycle may be looked up and utilized as discussed above.

Figure 22:
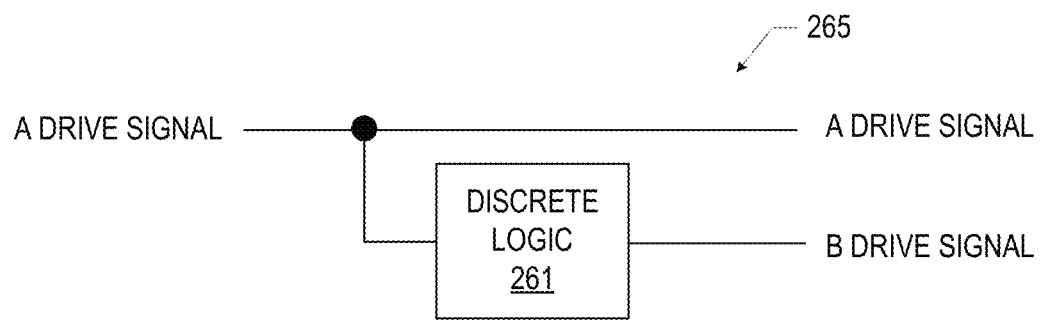
FIG. 22 is an example of driver phase control circuitry that may be used in a robotic system, in accordance with various embodiments.

FIG. 22 is an example of driver phase control circuitry 265 that may be used in a robotic system 100, in accordance with various embodiments. In particular, the driver phase control circuitry 265 may be used to generate the "B" drive signal for the "B" phase of a stepper motor 212 from the "A" drive signal for the "A" phase of the stepper motor 212 (or vice versa, as will be understood from the diagram and the accompanying description). Using driver phase control circuitry 265 to generate the "B" drive signal from the "A" drive signal may reduce the number of output pins required from the joint-level compute hardware 210 to generate drive signals for the stepper motor 212, thereby allowing those pins to be used for other functions and/or allowing a joint-level compute hardware 210 with a reduced number of output pins (e.g., GPIO pins) to be used in a joint 108. The driver phase control circuitry 265 of FIG. 22 may be part of the drive support circuitry 216 of a joint 108 (e.g., as discussed below with reference to FIGS. 24-27). The driver phase control circuitry 265 may receive, as an input (e.g., from the joint-level compute hardware 210 of a joint 108), an "A" drive signal (representative of an A phase drive current), which may be passed through to the output (e.g., to other portions of the drive support circuitry 216, such as the H-bridges 260 discussed below). The driver phase control circuitry 265 may include discrete logic 261, which may be coupled to the "A" input and may invert this input by subtracting their value from one; the output of the discrete logic 261 may be a "B" drive signal (representative of a B phase drive current, and which may be provided, e.g., to other portions of the drive support circuitry 216, such as the H-bridges 260 discussed below). The use of the discrete logic 261 to generate the "B" drive signal from the "A" drive signal enforces the one-step offset between the "A" and "B" drive signals illustrated in the plots 600A and 600B, without requiring dedicated output pins for the "B" drive signal from the joint-level compute hardware 210, as discussed above.

Figure 23:
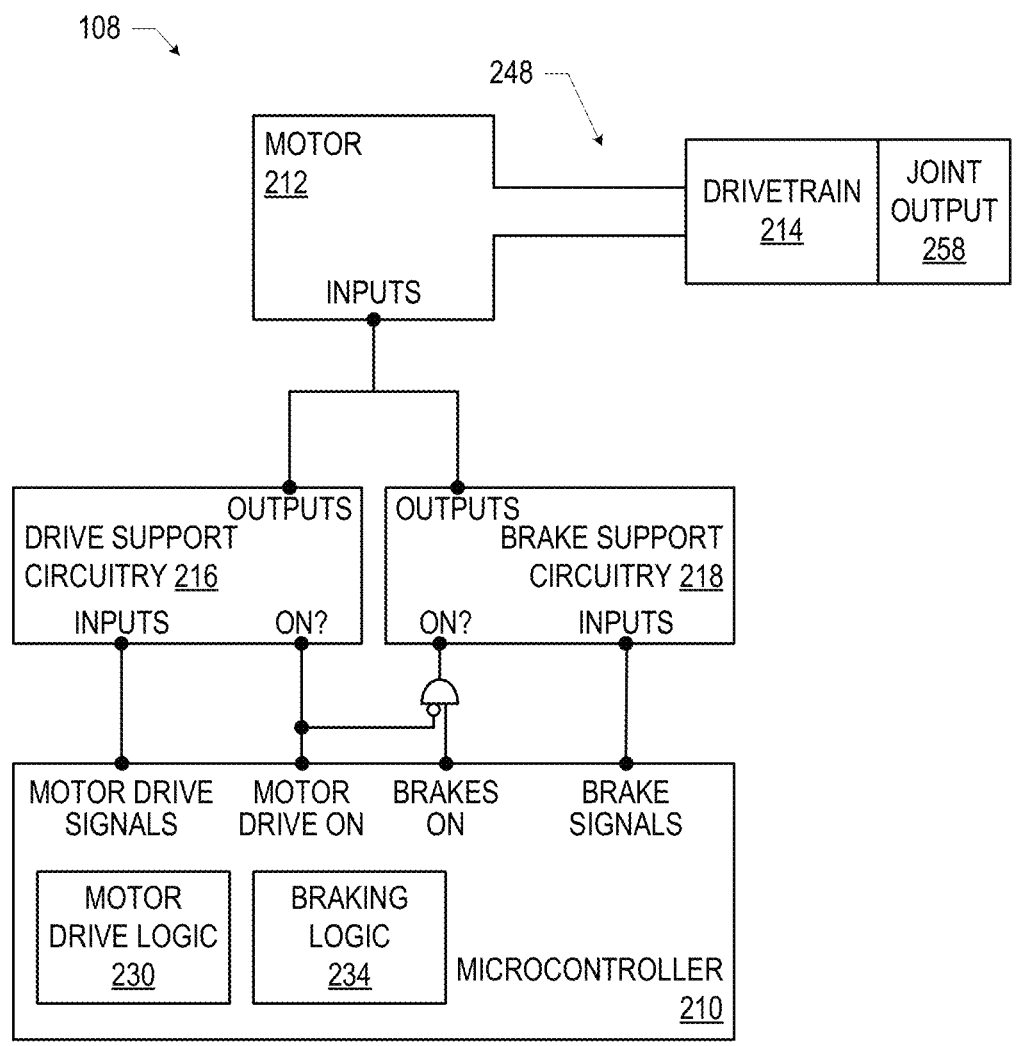
FIGS. 23-24 illustrate example motor drive arrangements that may be included in a robotic system, in accordance with various embodiments.
Figure 24:
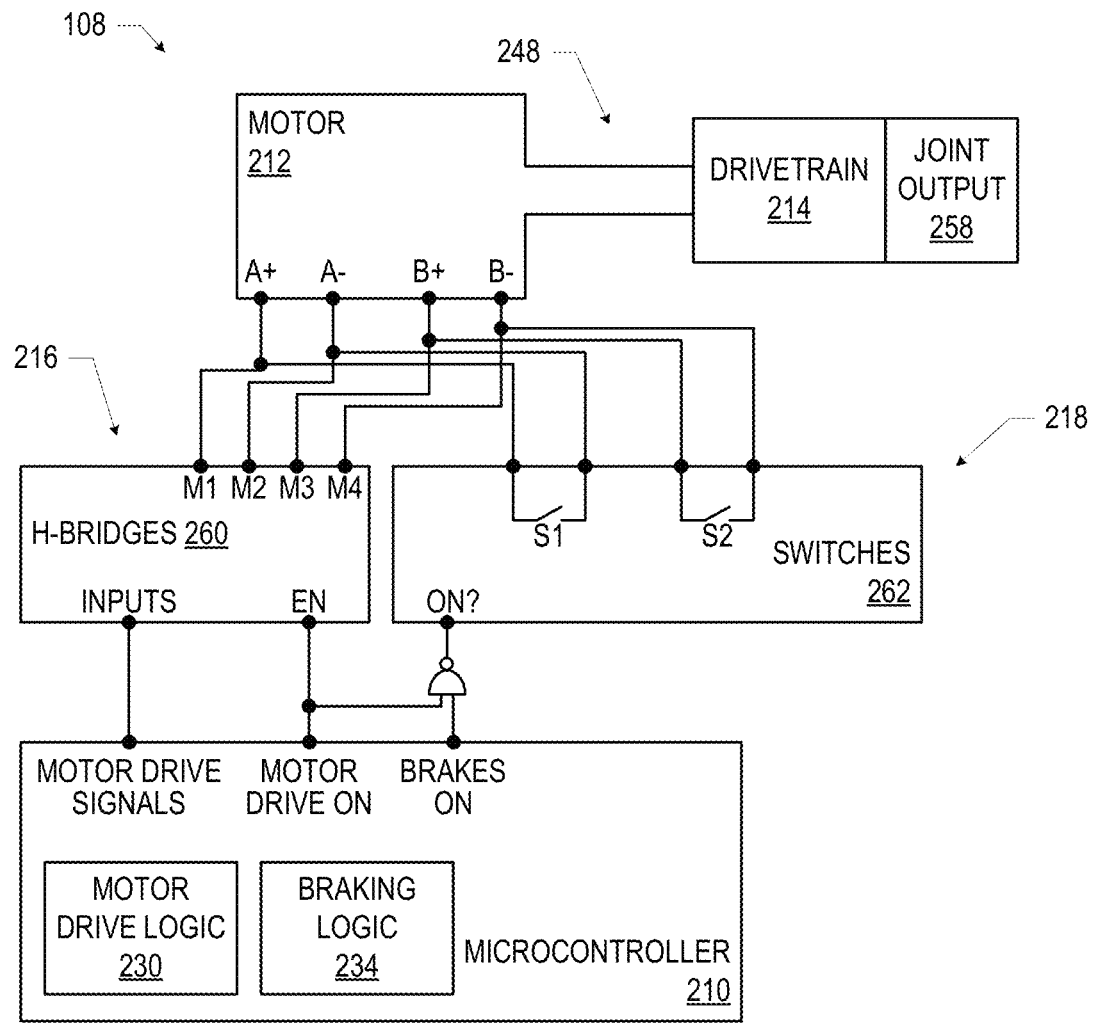

FIGS. 23-24 illustrate example motor drive arrangements that may be included in joint 108 of a robotic system 100, in accordance with various embodiments. FIG. 23 depicts a motor 212 having a shaft 248 coupled to a drivetrain 214; the output of the drivetrain 214 serves as the joint output 258. The motor 212 may receive inputs from drive support circuitry 216 and brake support circuitry 218 (as discussed above with reference to FIG. 9). The drive support circuitry 216 and the brake support circuitry 218 may receive inputs from the joint-level compute hardware 210 (generated by the motor drive logic 230 and/or the braking logic 234, as discussed herein). The drive support circuitry 216 and the brake support circuitry 218 may also receive "on" signals from a "motor drive on" and a "brakes on" output, respectively, of the joint-level compute hardware 210. The "motor drive on" and the "brakes on" outputs of the joint-level compute hardware 210 (which may be logical outputs) may serve to enable motor drive and braking, respectively (e.g., as discussed below with reference to FIG. 32); although the joint-level compute hardware 210 may be configured to only enable one of motor drive and braking at any particular time, discrete logic (e.g., a NAND gate, as shown) may be coupled between the joint-level compute hardware 210 and the brake support circuitry 218 to provide a further, hardware-based control to prevent the simultaneous enabling of motor drive and braking. In some embodiments, the brake support circuitry 218 may further be coupled to a set of mechanical brakes 116 (not shown in FIG. 23, but discussed above with reference to FIG. 2), while in other embodiments, the braking logic 234 and brake support circuitry 218 (when utilized), may be used in accordance with the embodiments discussed below instead of the use of mechanical brakes 116. The braking techniques disclosed herein may remove or reduce the need for heavy, expensive mechanical brakes 116, further enabling the use of the robotic systems 100 disclosed herein in new settings.

Figure 25:
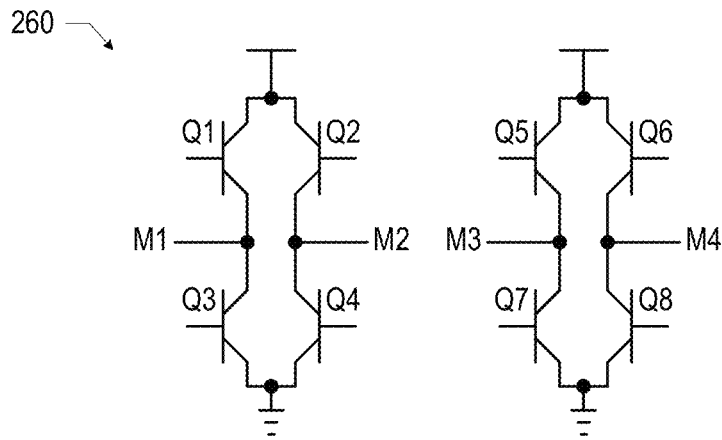
FIG. 25 illustrates H-bridge circuit elements that may be included in a motor drive arrangement in a robotic system, in accordance with various embodiments.

FIG. 24 illustrates a particular embodiment of the arrangement of FIG. 23. In FIG. 24, the motor 212 may include "A+", "A−", "B+", and "B−" inputs to drive the associated phases of the motor 212; the arrangement of FIG. 24 (and the other arrangements disclosed herein) may be generalized to motors 212 with any desired number of phases (e.g., four phases). The drive support circuitry 216 may include a set of H-bridges 260 and the driver phase control circuitry 265 of FIG. 22; in some embodiments, the driver phase control circuitry 265 may not be included, the joint-level compute hardware 210 itself may generate the "B" drive signals, as discussed above. In particular, motor drive signals (e.g., drive signals for the "A" phase of the stepper motor 212) may be output from the joint-level compute hardware 210 to the driver phase control circuitry 265, the driver phase control circuitry 265 may output drive signals for both the "A" and "B" phases of the motor 212 to the H-bridges 260, and the H-bridges 260 may generate M1, M2, M3, and M4 outputs for the "A+", "A−", "B+", and "B−" inputs of the motor 212. The "motor drive on" output of the joint-level compute hardware 210 may be provided to an enable input of the H-bridges 260. FIG. 25 illustrates H-bridges 260 that may be included in a motor drive arrangement in a robotic system 100, in accordance with various embodiments.

Returning to FIG. 24, the brake support circuitry 218 may include switch circuitry 262, which may include a switch "S1" and a switch "S2." The switch "S1" may be coupled between the "A+" and "A−" inputs of the stepper motor 212, and the switch "S2" may be coupled between the "B+" and "B−" inputs of the stepper motor 212. Although the switches S1 and S2 are illustrated as open in FIG. 24, the switches S1 and S2 may be normally closed, and only opened when the switch circuitry 262 does not receive a "brakes on" signal from the joint-level compute hardware 210 (also referred to herein as receiving a "brakes off" signal). Shorting the leads of each phase of the stepper motor 212 (also referred to herein as "shorting each phase") may, in conjunction with a quasi-direct drivetrain 214 (e.g., having a gear ratio between 1:1 and 20:1), produce enough braking force to serve as a brake on a joint 108 (e.g., enough force to overcome gravity when the robotic system 100 is powered off, and thus maintain the joint 108 in a particular position). However, the braking force provided by such braking techniques may be overcome by typical human force, and thus may be particularly suitable for use in collaborative robotics settings.

Figure 26:
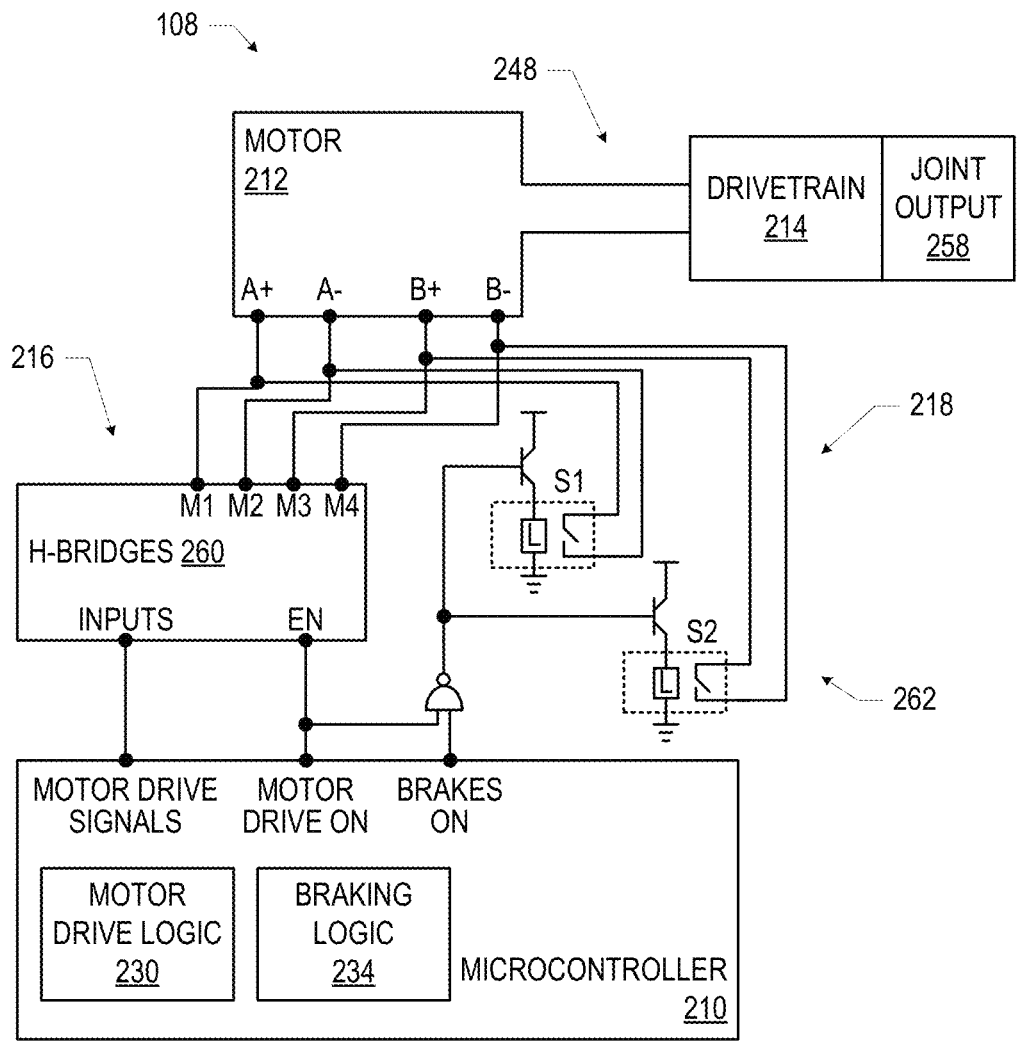
FIGS. 26 and 27 illustrate example motor drive arrangements that may be included in a robotic system, in accordance with various embodiments.

FIG. 26 illustrates a particular embodiment of the arrangement of FIG. 24. In FIG. 26, the switch circuitry 262 may include solid state or mechanical relays as the switches S1 and S2. These relays may be normally closed (e.g., closed in a zero-power situation) so that the braking force applies when the robotic system 100 is powered down.

Figure 27:
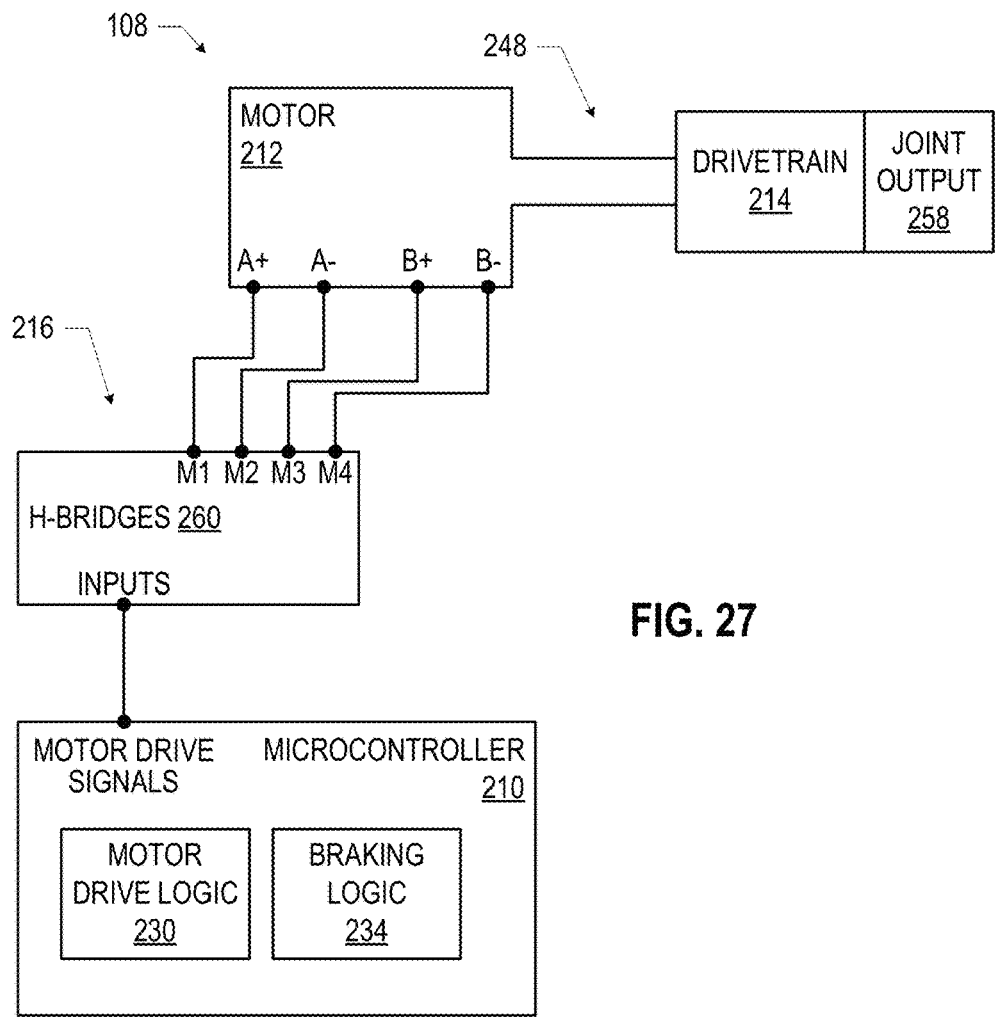

FIG. 27 illustrates another embodiment of the arrangement of FIG. 26, one in which the drive support circuitry 216 takes the form of the drive support circuitry 216 of FIG. 24.

Further, in the embodiment of FIG. 27, no brake support circuitry 218 is included. Instead, the braking logic 234 of the joint-level compute hardware 210 may cause switches (e.g., metal oxide semiconductor field effect transistors (MOSFETs)) in the H-bridges 260 to short the phases of the stepper motor 212 to provide a braking force. Such MOSFETs may desirably have a low Rds(on). In such an embodiment, the H-bridges 260 may be configured to short the phases of the stepper motor 212 to provide a braking force in a zero-power situation.

Figure 28:
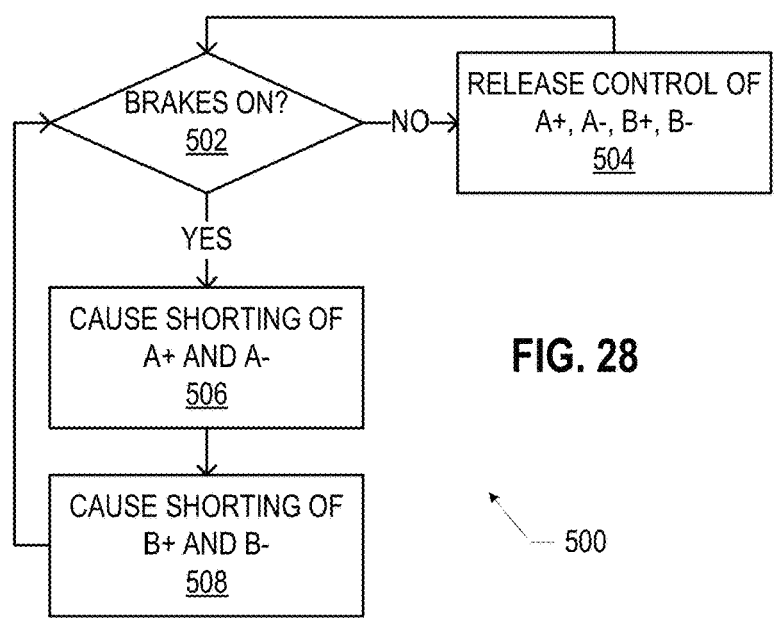
FIG. 28 is a flow diagram of a method of braking in a robotic system, in accordance with various embodiments.

FIG. 28 is a flow diagram of a method 500 of braking in a robotic system 100, in accordance with various embodiments. The method 500 may be carried out by the braking logic 234 of a joint-level compute hardware 210 (which may be located in the robotic apparatus 101, and physically proximate to the joint 108), and in some embodiments, may be carried out continuously (e.g., as part of a state machine flow). In some embodiments, each of the different joints 108 in a robotic apparatus 101 may include a joint-level compute hardware 210 having braking logic 234 that performs the method 500 for that particular joint 108.

At 502, it may be determined whether brakes should be on. For example, the braking logic 234 of a joint-level compute hardware 210 may receive an instruction to turn brakes on or off from system-level compute hardware 124 (which may be performing the method 360 of FIG. 32, discussed further below). Alternately or additionally, the braking logic 234 of a joint-level compute hardware 210 may receive an instruction to turn brakes on in response to detection of a fault by the joint safety logic 236 of the joint-level compute hardware 210 (e.g., as discussed below with reference to FIGS. 31 and 32).

If it is determined at 502 that brakes should not be on, the method 500 may proceed to 504 and control of the "A+", "A−", "B+", and "B−" phases of a stepper motor may be released. For example, the braking logic 234 of a joint-level compute hardware 210 may generate a "brakes off" signal and provide that "brakes off" signal to brake support circuitry 218 (which may cause, for example, switches "S1" and "S2" of the brake support circuitry 218 to open). The method 500 may then return to 502.

If it is determined at 502 that brakes should be on, the method 500 may proceed to 506 and shorting of the "A+" and "A−" phases of the stepper motor may be caused. The method 500 may then proceed to 508 and shorting of the "B+" and "B−" phases of the stepper motor may be caused. For example, the braking logic 234 of a joint-level compute hardware 210 may generate a "brakes on" signal and provide that "brakes on" signal to brake support circuitry 218 (which may cause, for example, switches "S1" and "S2" of the brake support circuitry 218 to close). As noted above, the particular ordering of the steps in the method 500 is simply illustrative, and in some embodiments, the operations of 506 and 508 may be performed simultaneously. The method 500 may then return to 502.

Figure 29:
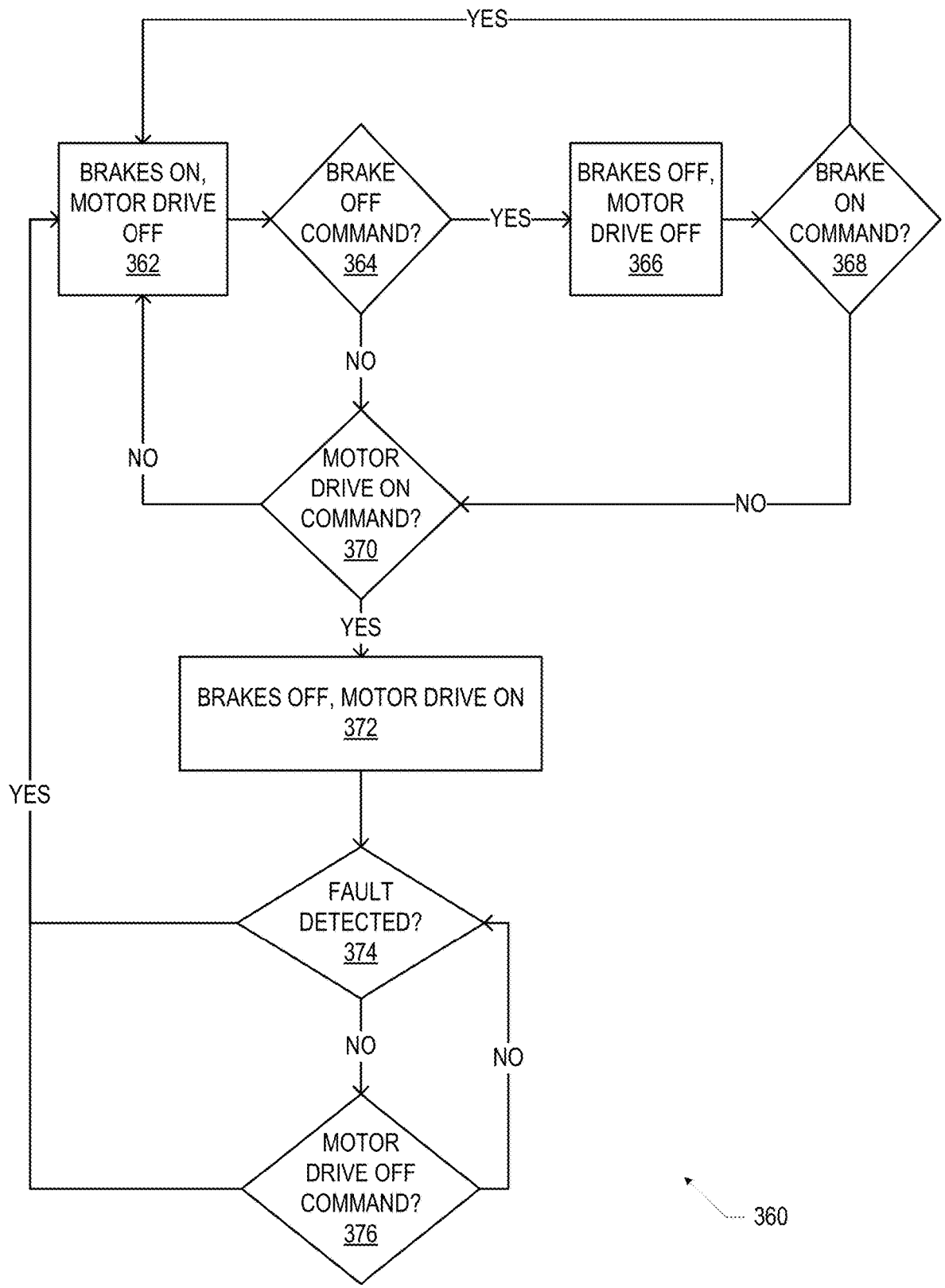
FIG. 29 is a flow diagram of an example method of enabling motor drive and braking in a robotic system, in accordance with various embodiments.

As noted above, in a joint 108, motor drive and braking may not be turned on at the same time. FIG. 29 is a flow diagram of an example method 360 of enabling motor drive and braking in a robotic system 100, in accordance with various embodiments. The method 360 may be carried out by the motor drive logic 230 in conjunction with the braking logic 234 of a joint-level compute hardware 210 (which may be located in the robotic apparatus 101, and physically proximate to the joint 108), and in some embodiments, may be performed upon startup of a robotic system 100. In some embodiments, each of the different joints 108 in a robotic apparatus 101 may include a joint-level compute hardware 210 having motor drive logic 230/braking logic 234 that performs the method 360 for that particular joint 108.

At 362, brakes may be on and motor drive may be off. For example, the braking logic 234 may generate a "brakes on" signal for communication to the brake support circuitry 218 and the motor drive logic 230 may generate a "motor drive off" signal for communication to the drive support circuitry 216. The state at 362 may be the initial state of a robotic system 100 upon power-up.

At 364, it is determined whether the brakes should be turned off. For example, the braking logic 234 may determine whether a "brakes off" command has been issued by the system-level compute hardware 124 (e.g., in response to a "brakes off" voice command by a user received at a microphone of the I/O devices 120 and recognized by the voice command logic 170 of the system-level compute hardware 124).

If it is determined at 364 that the brakes should be turned off, the method 360 proceeds to 366, at which the brakes are off and the motor drive is off. For example, at 366, the braking logic 234 may generate a "brakes on" signal for communication to the brake support circuitry 218 and the motor drive logic 230 may generate a "motor drive off" signal for communication to the drive support circuitry 216. In such a state, the joint 108 may be physically adjusted by a human user using typical human force. From 366, the method 360 may proceed to 368, at which it may be determined whether the brakes should be turned on. For example, the braking logic 234 may determine whether a "brakes on" command has been issued by the system-level compute hardware 124 (e.g., in response to a "brakes on" voice command by a user received at a microphone of the I/O devices 120 and recognized by the voice command logic 170 of the system-level compute hardware 124). In some embodiments, a robotic apparatus 101 may include a designated I/O device 120, such as a button, that, upon actuation, causes the braking logic 234 of each of the joints 108 of a robotic apparatus 101 to generate a "brakes on" signal for communication to the brake support circuitry 218 of that joint 108 without requiring receipt of a command from the system-level compute hardware 124; such an embodiment may allow a user to quickly brake all of the joints 108 in a robotic apparatus 101 independent of the operation of the system-level compute hardware 124. If it is determined at 368 that the brakes should be turned on, the method 360 returns to 362.

If it is determined at 364 that the brakes should not be turned off, or if it is determined at 368 that the brakes should be turned on, the method 360 may proceed to 370, at which it may be determined whether the motor drive should be turned on. For example, the braking logic 234 may determine whether a "motor drive on" command has been issued by the system-level compute hardware 124 (e.g., in response to a "control on" voice command by a user received at a microphone of the I/O devices 120 and recognized by the voice command logic 170 of the system-level compute hardware 124).

If it is determined at 370 that the motor drive should not be turned on, the method 360 returns to 362. If it is determined at 370 that the motor drive should be turned on, the method 360 proceeds to 372, at which the brakes are off and the motor drive is on. For example, at 372, the braking logic 234 may generate a "brakes off" signal for communication to the brake support circuitry 218 and the motor drive logic 230 may generate a "motor drive on" signal for communication to the drive support circuitry 216. In this state, the joint 108 may be moved by sending appropriate drive signals to the motor 212 of the joint 108.

From 372, the method 360 may proceed to 374, at which it may be determined whether a fault has been detected. For example, a fault may be detected by a joint-level safety method (e.g., as discussed below with reference to FIG. 30) or by system-level safety method (e.g., as discussed below with reference to FIGS. 40-41). The joint safety logic 236 of the joint-level compute hardware 210 may itself detect the fault (e.g., in accordance with the method of FIG. 30) or may receive an indication of the fault (e.g., a joint-level fault from another joint 108, or a system-level fault) from system-level compute hardware 124 via the communications hardware 226.

If it is determined at 374 that a fault has been detected, the method 360 returns to 362. If it is determined at 374 that a fault has not been detected, the method 360 proceeds to 376, at which it may be determined whether the motor drive should be turned off. For example, the braking logic 234 may determine whether a "motor drive off" command has been issued by the system-level compute hardware 124 (e.g., in response to a "control off" voice command by a user received at a microphone of the I/O devices 120 and recognized by the voice command logic 170 of the system-level compute hardware 124). If it is determined at 376 that the motor drive should not be turned off, the method 360 may return to 374. If it is determined at 376 that the motor drive should be turned off, the method 360 may return to 362.

Figure 31:
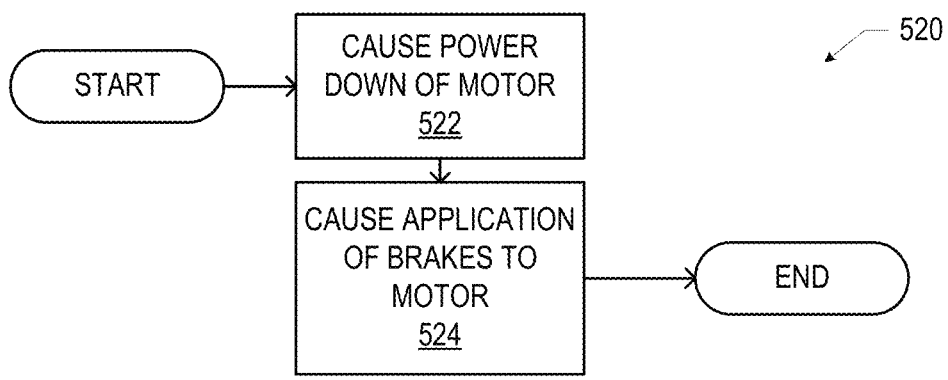
FIG. 31 is a flow diagram of a method of responding to faults in a robotic system, in accordance with various embodiments.

Safety and faults in a robotic system 100 may be monitored and controlled at both the joint-level and the system-level. For example, FIG. 31 is a flow diagram of a method 510 of detecting joint-level faults in a robotic system 100, in accordance with various embodiments. The method 510 may be carried out by the joint safety logic 236 of a joint-level compute hardware 210 (which may be located in the robotic apparatus 101, and physically proximate to the joint 108), and in some embodiments, may be performed upon startup of a robotic system 100. In some embodiments, each of the different joints 108 in a robotic apparatus 101 may include a joint-level compute hardware 210 having joint safety logic 236 that performs the method 510 for that particular joint 108. Further, although the method 510 refers to monitoring of a single joint performance variable, this is simply for ease of illustration, and multiple joint performance variables (with multiple associated safety ranges) may be monitored as part of the method 510.

At 512, a value of a joint performance variable may be measured. The joint performance variable may be any variable indicative of operation of the associated joint. For example, in some embodiments, the joint safety logic 236 of a joint-level compute hardware 210 of a joint 108 may measure joint position (e.g., the position of the joint output 258), joint velocity (e.g., the velocity of the joint output 258), current drawn by the motor 212, temperature at the joint 108, error in the control loop of 348 of the method 340 of FIG. 21, data from the accelerometer 224 (which may be part of data provided by an IMU, all of which may be measured at 236), velocity and/or acceleration data from the shaft encoder 222, and/or any other variable indicative of operation of the joint 108. The measurement of the joint performance variable may result from communication between the joint-level compute hardware 210 and a sensor (e.g., the shaft encoder 222, the accelerometer 224, temperature or current sensors included in the other hardware 227, etc.).

At 514, it may be determined whether the measured value is outside of a safety range or not. As used herein, a "safety range" may refer to one or more sets of values of a joint performance variable that represent acceptable operational conditions. For example, the data storage 229 of the joint 108 may store ranges of safe values of the joint performance variable and/or ranges of unsafe values of the joint performance variable; at 514, the joint safety logic 236 may compare the measured value of the joint performance variable to these range(s) to determine whether the value is within a safety range or outside of a safety range (e.g., whether the velocity of the joint 108 is less than a maximum allowable velocity, whether the temperature of the joint 108 is within a range over which the joint-level compute hardware 210 may perform reliably, etc.). Generally, thresholds, minimums, maximums, averages, derivatives, or any other suitable range for any measured variable or combination of variables may be set as a safety range. The safety range(s) used at 514 may be programmable, as desired.

If it is determined at 514 that the measured value is within a safety range, the method 510 may return to 512. If it is determined at 514 that the measured value is outside a safety range, a fault (corresponding to the measured value being outside the safety range) may be identified at 516. For example, the joint safety logic 236 may generate a fault signal upon detection of a measured value of a joint performance variable being outside a safety range. This fault signal may be utilized by other elements of the robotic system 100 in any of a number of ways, several of which are discussed in detail herein.

FIG. 31 is a flow diagram of a method 520 of responding to faults in a robotic system 100, in accordance with various embodiments. The method 520 may be carried out by the joint safety logic 236 of a joint-level compute hardware 210 (which may be located in the robotic apparatus 101, and physically proximate to the joint 108), and in some embodiments, may be performed in response to detection of a fault (e.g., a joint-level fault, as discussed above with reference to FIG. 30, or a system-level fault, as discussed above with reference to FIGS. 40-41). The fault may be identified to the joint safety logic 236 by the joint safety logic 236 itself (e.g., when the fault is detected in the joint 108 associated with the joint safety logic 236) or identified upon receipt of a fault signal from the system-level compute hardware 124 (e.g., when the fault is detected in another joint 108, and/or the fault is a system-level fault). In some embodiments, each of the different joints 108 in a robotic apparatus 101 may include a joint-level compute hardware 210 having joint safety logic 236 that performs the method 520 for that particular joint 108; in response to detection of a joint-level or system-level fault, all of the joints 108 of a robotic apparatus 101 may perform the method 520.

At 522, power down of the motor may be caused. For example, the joint safety logic 236 may communicate with the motor drive logic 230 to cause the motor drive logic 230 to slow down and stop the motor 212 (e.g., by reducing the drive current scale factor of the method 340 of FIG. 21 to zero).

At 524, application of the brakes to the motor may be caused. For example, the joint safety logic 236 may communicate with the braking logic 234 to cause the braking logic 234 to turn the brakes on (e.g., in accordance with any of the embodiments discussed above with reference to FIGS. 24-28).

Figure 32:
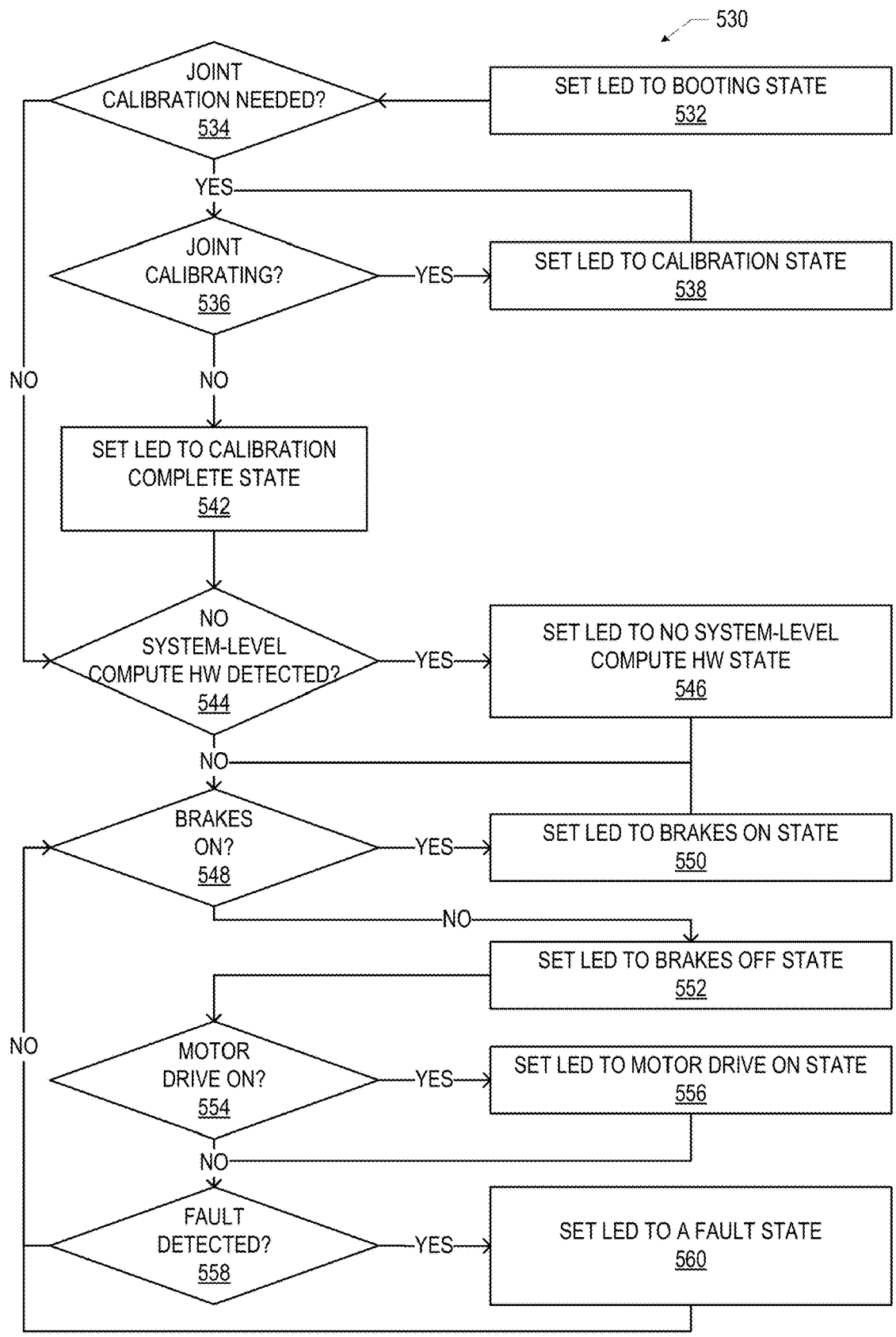
FIG. 32 is a flow diagram of a method of utilizing visual indicators at a joint in a robotic system, in accordance with various embodiments.

As noted above, in some embodiments, joints 108 of a robotic apparatus 101 may include LEDs 220. The LEDs 220 of a joint 108 may be used to indicate a status of the joint 108 and/or a status of the robotic apparatus 101. FIG. 32 is a flow diagram of a method 530 of utilizing visual indicators at a joint 108 in a robotic system 100, in accordance with various embodiments. The method 530 is discussed with reference to setting LEDs 220 to various states, but any suitable visual indicator (e.g., an alphanumeric display) may be used. The method 530 may be carried out by the LED control logic 238 of a joint-level compute hardware 210 (which may be located in the robotic apparatus 101, and physically proximate to the joint 108), and in some embodiments, may be performed upon power-on of the robotic apparatus 101. Further, although the discussion of the method 530 refers to a single "LED," this is simply for ease of illustration, and the method 530 may involve changing the state of multiple LEDs 220 of a joint 108.

At 532, the LED may be set to a booting state. For example, the LED control logic 238 may cause the LED to output a particular color and/or pattern (e.g., a turquoise color with a slow fade) to indicate booting. In some embodiments, the booting process may include performing a self-check; if the self-check fails, the LED control logic 328 may cause the LED to output a different color and/or pattern than that of the booting state (e.g., a purple color that is flashing).

At 534, it may be determined whether calibration of the joint is needed. For example, the LED control logic 238 may determine whether the joint 108 has been calibrated (e.g., by determining whether a "joint calibrated" indicator has been set in the data storage 229 by the joint calibration logic 232) or not. If it is determined at 534 that joint calibration is needed, the method 530 may proceed to 536, at which it may be determined whether the joint is calibrating. For example, the LED control logic 238 may determine whether the joint 108 is calibrating (e.g., by determining whether a "joint calibrating" indicator has been set in the data storage 229 by the joint calibration logic 232) or not. Calibration of a joint 108 may be performed in accordance with the embodiments discussed above with reference to FIGS. 15 and 16, for example. If it is determined at 536 that the joint is calibrating, the method 530 may proceed to 538 and an LED may be set to a calibration state. For example, the LED control logic 238 may cause the LED to output a particular color and/or pattern (e.g., a solid yellow color) to indicate calibration. After 538, the method 530 may return to 536, and the LED may be set to the calibration state until it is determined at 536 that the joint is no longer calibrating, at which point the method 530 may proceed to 542 and an LED may be set to a calibration complete state. For example, the LED control logic 238 may cause the LED to output a particular color and/or pattern (e.g., a fast fading green color) to indicate that calibration is complete.

If it is determined at 534 that joint calibration is not needed, or if the LED has been set to the calibration complete state at 542, the method 530 may proceed to 544 to determine if system-level compute hardware is detected. For example, the LED control logic 238 may determine whether system-level compute hardware 124 is detected (e.g., by detecting receipt of an expected command from the system-level compute hardware 124) or not. If it is determined at 544 that system-level compute hardware is not detected, the method 530 may proceed to 546 and an LED may be set to a no system-level compute hardware state. For example, the LED control logic 238 may cause the LED to output a particular color and/or pattern (e.g., a purple color with a slow fade) to indicate that no system-level compute hardware has been detected.

If it is determined at 544 that system-level compute hardware has been detected, or after the LED has been set to a no system-level compute hardware state, the method 530 may proceed to 548 at which it may be determined whether the brakes are on. For example, the LED control logic 238 may determine whether the braking logic 234 is outputting a "brakes on" signal. The brake and motor drive states may be controlled in accordance with the method 360 of FIG. 29. If it is determined at 548 that the brakes are on, the method 530 may proceed to 550 and an LED may be set to a brakes on state. For example, the LED control logic 238 may cause the LED to output a particular color and/or pattern (e.g., a solid white color) to indicate that the brakes are on. If it is determined at 548 that the brakes are off, the method 530 may proceed to 552 and an LED may be set to a brakes off state. For example, the LED control logic 238 may cause the LED to output a particular color and/or pattern (e.g., a white color with a slow fade) to indicate that the brakes are off.

After 552, the method 530 may proceed to 554 at which it may be determined whether the motor drive is on. For example, the LED control logic 238 may determine whether the motor drive logic 230 is outputting a "motor drive on" signal. As noted above, the brake and motor drive states may be controlled in accordance with the method 360 of FIG. 29. If it is determined at 554 that the motor drive is on, the method 530 may proceed to 556 and an LED may be set to a motor drive on state. For example, the LED control logic 238 may cause the LED to output a particular color and/or pattern (e.g., a solid green color) to indicate that the motor drive is on.

If it is determined at 554 that the motor drive is off, the method 530 may proceed to 558 at which it may be determined whether a fault has been detected. For example, the fault may be identified to the LED control logic 238 by the joint safety logic 236 (e.g., when the fault is detected in the joint 108 associated with the joint safety logic 236) or identified upon receipt of a fault signal from the system-level compute hardware 124 (e.g., when the fault is detected in another joint 108, and/or the fault is a system-level fault). If it is determined at 558 that a fault has been detected, the method 530 may proceed to 560 and an LED may be set to a fault state 560. For example, the LED control logic 238 may cause the LED to output a particular color and/or pattern to indicate the fault (e.g., a fast blinking yellow color for a control fault, a fast blinking orange color for a driver fault, a slow blinking orange color for a bad command, a fast blinking red color for a severe error, or a slow blinking red color when a self-test fails on boot). If it is determined at 558 that no fault has been detected, the method 530 may return to 548.

The selection of colors and patterns for the various states of the LEDs 220 may be selected to quickly communicate a state of the robotic apparatus 101 to a user. For example, in some embodiments, having an LED 220 take on a green color may indicate normal operating conditions. Having an LED 220 take on a red color may indicate severe and/or unanticipated errors. Having an LED 220 take on a solid color may indicate a stable condition, while a soft fading color may indicate that a transition is taking place or that action is required from a user, while a blinking color may indicate an error.

When the robotic system 100 is powered on, it may be desirable for the robotic apparatus 101 to move into a known, "zeroed" configuration before further movement. In such a configuration, each joint 108 of a robotic apparatus 101 may be oriented in a zeroed position from which further movement of the joints 108 (and thus the robotic apparatus 101) may be tracked and referenced. The zeroed position for each joint 108 in a robotic apparatus 101 may be set to any desired value (e.g., by storage of a desired position in the data storage 229). In addition to assuming the zeroed configuration upon power-on, a robotic apparatus 101 may move into a zeroed configuration on command (e.g., in response to a "home" or "go home" voice command by a user received at a microphone of the I/O devices 120 and recognized by the voice command logic 170 of the system-level compute hardware 124, and transmitted from the system-level compute hardware 124 to the joints 108 of the robotic apparatus 101 via the communications hardware 128). In a robotic system 100 in which the joints 108 include shaft encoders 222 and not joint encoders, the robotic system 100 can not uniquely determine the configuration of the robotic apparatus 101 upon startup; the output of a shaft encoder 222 for a particular joint 108 corresponds to up to G different joint positions, where G is the gear ratio of the drivetrain 214. Bringing the robotic apparatus 101 to a known zero position before attempting to move the robotic apparatus 101 to a controlled position allows the angle of each joint 108 to be properly tracked by monitoring the output of the associated shaft encoder 222.

Figure 33:
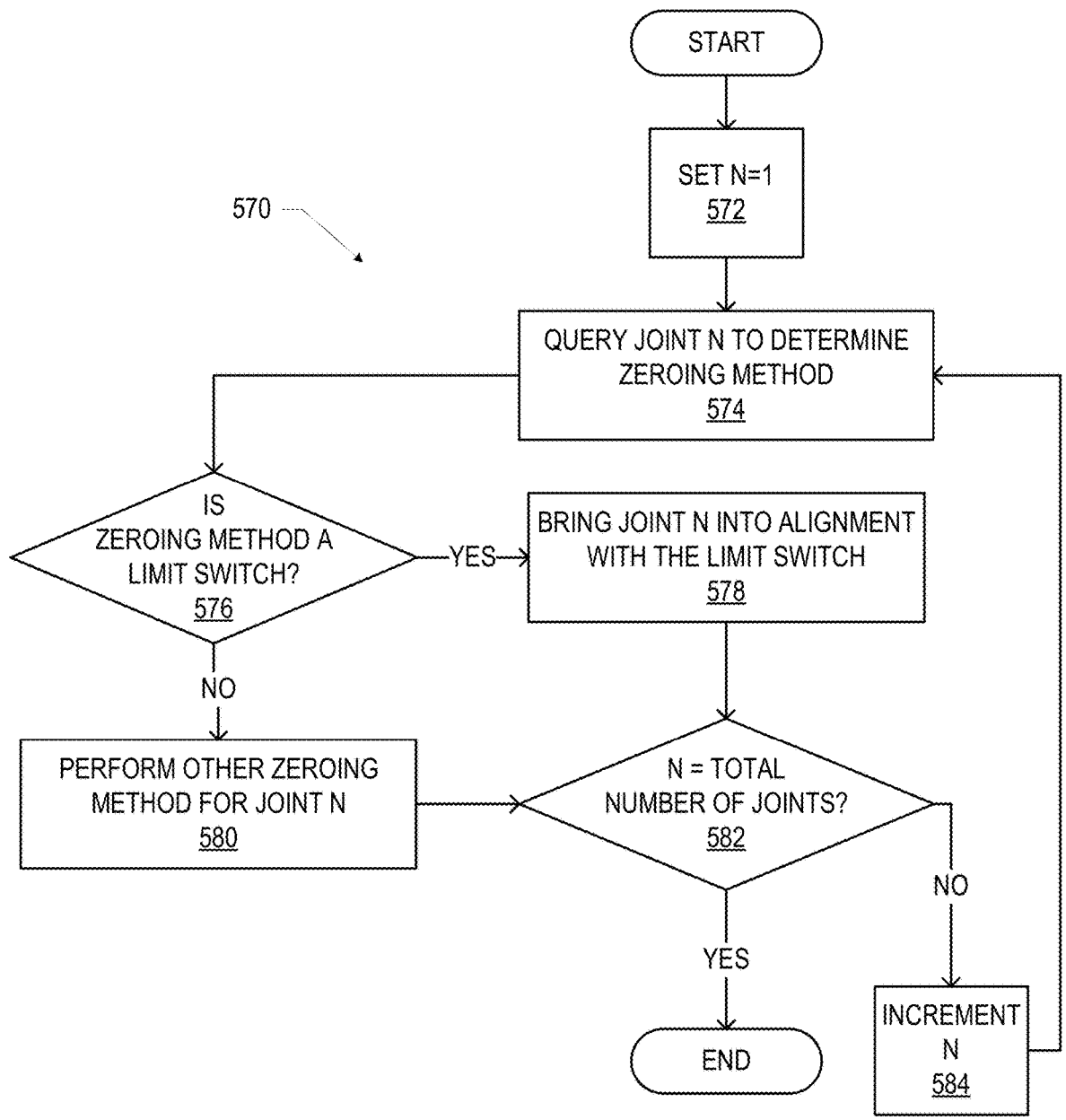
FIG. 33 is a flow diagram of a method of zeroing joints in a robotic system, in accordance with various embodiments.

FIG. 33 is a flow diagram of a gravity-based method 570 of zeroing joints 108 in a robotic system 100, in accordance with various embodiments. The method 570 may be carried out by the zeroing logic 148 of the system-level compute hardware 124 (which may or may not be located in the robotic apparatus 101), and in some embodiments, may be performed upon power-on of the robotic apparatus 101 or in response to a command (e.g., as discussed above). In the method 570, the joints 108 may be indexed using a counter variable N, and the indexing may represent the order in which the joints 108 are arranged relative to a support 112 or other "starting point". Thus, the Nth joint 108 may be mechanically between the N−1th joint 108 and the N+1th joint 108.

At 572, a counter variable N may be set equal to an initial value (e.g., 1). For example, the zeroing logic 148 may initialize a counter variable N to count through the joints 108 in a robotic apparatus 101, as discussed further below.

At 574, the joint N may be queried to determine the zeroing method to be applied to the joint N. For example, the zeroing logic 148 may query the data storage 229 of the Nth joint 108 via the communications hardware 128 to retrieve the value of a "zeroing method" parameter stored in the data storage 229. Alternately, the zeroing logic 148 may query the system-level data storage 150, which may store such "zeroing method" parameters for the joints 108 of a robotic apparatus 101.

At 576, it may be determined whether the zeroing method of joint N is a limit switch. As discussed above with reference to FIG. 9, in some embodiments, a joint 108 may include a limit switch 228 that may be triggered when the joint 108 (e.g., the joint output 258, as discussed above) reaches a particular, predetermined position. If it is determined at 576 that the zeroing method of joint N is a limit switch, the method 570 may proceed to 578, and the joint N may be brought into alignment with the limit switch. For example, the zeroing logic 148 may communicate with the joint 108 via the communications hardware 128 to cause the motor drive logic 230 to drive the motor 212 until the limit switch 228 of the joint 108 is triggered (indicating that alignment has been reached). The motor drive logic 230 may be communicatively coupled to the limit switch 228 so that driving of the motor 212 may stop once the limit switch 228 is triggered. If it is determined at 576 that the zeroing method of joint N is not a limit switch, the method 570 may proceed to 580, and another zeroing method (determined at 574) may be performed for joint N. An example of such another zeroing method is the method 610 of FIG. 34, discussed below). Note that, in some embodiments, a joint 108 may include a limit switch 228, and that limit switch 228 may be used as part of the zeroing of the joint 108, but the actual zeroed position of the joint 108 may be a position that is a predetermined number of degrees away from the position of the limit switch 228; in such an embodiment, the joint 108 may be brought into alignment with the limit switch 228, and then the zeroing logic 148 may cause the motor drive logic 230 to drive the joint 108 (i.e., the joint output 258) to the predetermined number of degrees away from the position of the limit switch 228. The particular number of degrees may be stored in the data storage 229, or in the system-level data storage 150.

After 578 or 580, the method 570 may proceed to 582, and it may be determined whether the counter variable N is equal to the total number of joints (and thus that all joints have been zeroed). If it is determined that the counter variable N is not equal to the total number of joints (and thus that all joints have not yet been zeroed), the method 570 may proceed to 584, at which the counter variable N may be incremented. The method 570 may then return to 574. If it is determined at 582 that the counter variable N is equal to the total number of joints (and thus that all joints have been zeroed), the method 570 may end.

Figure 34:
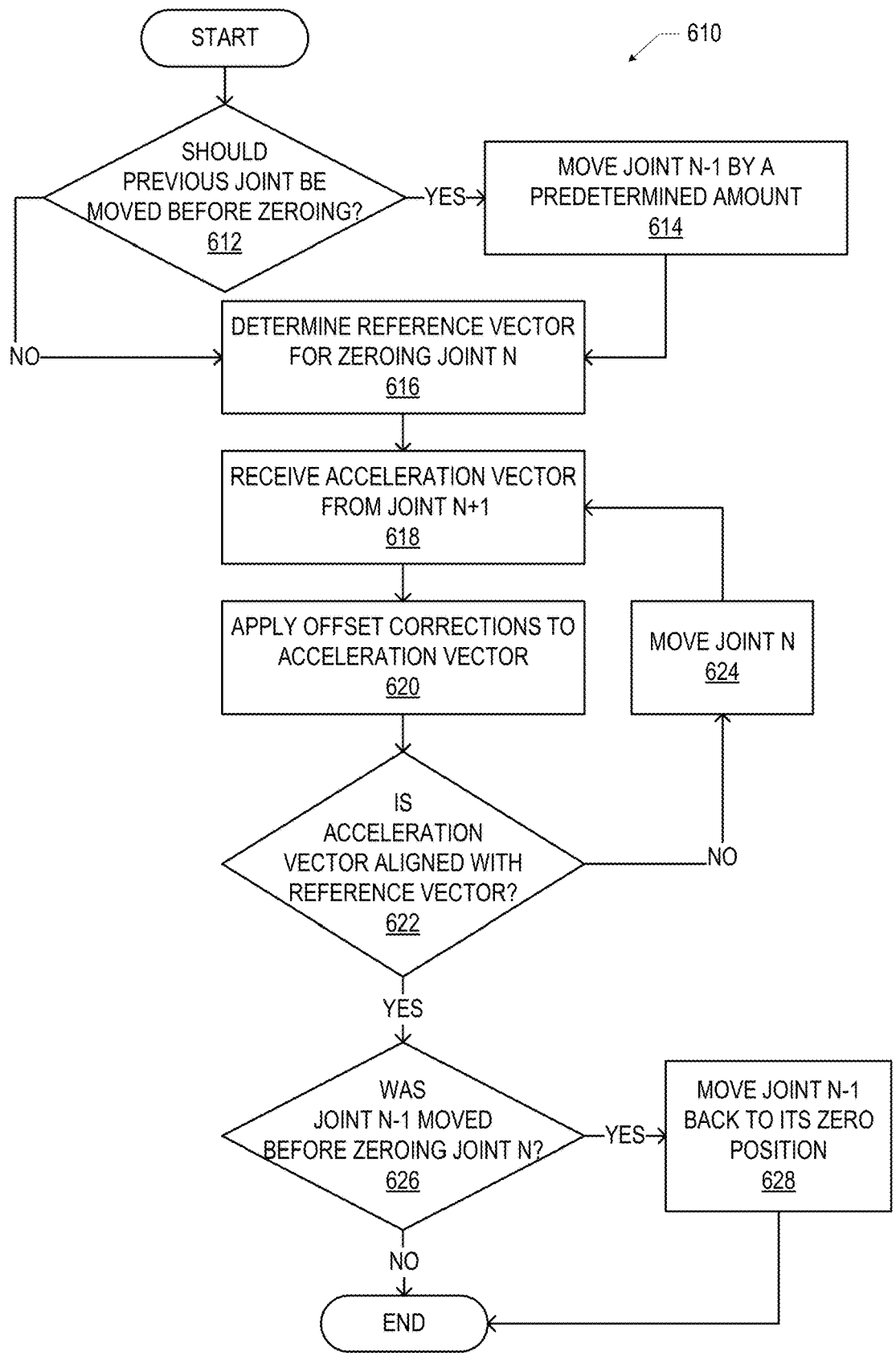
FIG. 34 is a flow diagram of a method of zeroing an individual joint in a robotic system, in accordance with various embodiments.

In some embodiments, a joint 108 may be zeroed using a method that does not involve a limit switch 228 at the joint 108. FIG. 34 is a flow diagram of a method 610 of zeroing the Nth joint 108 in a robotic system 100, in accordance with various embodiments. The method 610 may be carried out by the zeroing logic 148 of the system-level compute hardware 124 (which may or may not be located in the robotic apparatus 101), and in some embodiments, may be performed as part of a process of zeroing a robotic apparatus 101 (e.g., at 580 of the method 570 discussed above with reference to FIG. 33). In the discussion of the method 610 below, the terms "previous joint" and "N−1th joint" may be used; these terms may refer to the joint 108 that is immediately mechanically previous to the Nth joint 108 or other joint 108 that has already been zeroed, as appropriate. Similarly, the term "N+1th joint" may be used; this term may refer to the joint 108 that immediately mechanically follows the Nth joint 108, or another joint 108 that has not yet been zeroed, as appropriate.

At 612, it may be determined whether a previous joint (the N−1th joint) should be moved before zeroing the Nth joint. For example, the zeroing logic 148 may query the data storage 229 of the Nth joint 108 via the communications hardware 128 to retrieve the value of a "zeroing method" parameter stored in the data storage 229, and the "zeroing method" parameter may be used to determine whether the N−1th joint 108 should be moved to a predetermined position before proceeding with zeroing the Nth joint 108. Alternately, the zeroing logic 148 may query the system-level data storage 150, which may store such "zeroing method" parameters for the joints 108 of a robotic apparatus 101. Moving the N−1th joint before zeroing the Nth joint may be helpful in the gravity-based method 610 when the rotation of the Nth joint may be perpendicular to the force of gravity, and thus a rotation of the Nth joint may not produce a change in the acceleration of the N+1th joint due to gravity (as required for further zeroing operations, as discussed below).

If it is determined at 612 that the N−1th joint should be moved before zeroing the Nth joint, the method 610 may proceed to 610, at which the N−1th joint may be moved by a predetermined amount. The N−1th joint may have been previously zeroed (e.g., in accordance with the method 570 of FIG. 33), and thus moving the N−1th joint by a predetermined amount may start from a known, zeroed position. For example, the zeroing logic 148 may communicate with the motion/position logic 132 to cause the N−1th joint to rotate by 90 degrees (e.g., when the Nth joint 108 would otherwise rotate in a plane normal to the force of gravity).

If it is determined at 612 that the N−1th joint should not be moved before zeroing the Nth joint, or if the N−1th joint has been moved by a predetermined amount at 614, the method 610 may proceed to 616, at which a reference vector for zeroing the Nth joint may be determined. For example, the zeroing logic 148 may query the data storage 229 of the Nth joint 108 via the communications hardware 128 to retrieve the value of a "reference vector" parameter stored in the data storage 229, and the "reference vector" parameter may be used to determine the reference vector for the Nth joint 108. Alternately, the zeroing logic 148 may query the system-level data storage 150, which may store such "reference vector" parameters for the joints 108 of a robotic apparatus 101. In some embodiments, the reference vector for a joint 108 that is to be "vertically" oriented in its zeroed position may be generated from an accelerometer 224 in a support 112 (e.g., a base) of the robotic apparatus 101; the output of this accelerometer may reflect the orientation of the support 112 with respect to gravity (e.g., whether a table on which the robotic apparatus 101 sits is tilted), and may be used as a reference for the zeroing of some or all of the joints 108.

At 618, an acceleration vector may be received from the N+1th joint. For example, the zeroing logic 148 may receive, via the communication hardware 128, an output of the accelerometer 224 of the N+1th joint 108. When the N+1th joint 108 is stationary, the output of the accelerometer 224 of the N+1th joint 108 may align with the gravity vector, indicating the orientation of the N+1th joint 108 relative to the force of gravity. The acceleration vector of the N+1th joint 108 may be indicative of the current position of the Nth joint; for example, in the robotic apparatus 101 of FIGS. 5 and 6, the acceleration vector of the joint 108-6 may indicate the current position of the joint 108-5.

At 620, offset corrections may be applied to the acceleration vector 620. For example, if it is desired that the zeroed position of the Nth joint 108 is offset from the gravity vector by a particular amount (e.g., when the robotic apparatus 101 is mounted at an angle or imperfectly manufactured), the zeroing logic 148 may apply offset corrections to the acceleration vector 620 to "correct" the acceleration vector appropriately. In some embodiments, no offset corrections may be applied.

At 622, it may be determined whether the acceleration vector (received and, optionally, offset-corrected at 618-620) is aligned with the reference vector (determined at 616). "Alignment" here may refer to the acceleration vector and the reference vector being within a specified threshold of each other (e.g., 0.1 degrees or 0.01 degrees). For example, the zeroing logic 148 may determine whether the acceleration vector of the N+1th joint 108 is aligned with the reference vector of the Nth joint. If it is determined at 622 that the acceleration vector is not aligned with the reference vector, the method 610 may proceed to 624 and cause the movement of the Nth joint. For example, the zeroing logic 148 may communicate with the motion/position logic 132 to cause the Nth joint 108 to move in a direction to improve the alignment between the acceleration vector of the N+1th joint 108 and the reference vector of the Nth joint 108. The method may then return to 618.

If it is determined at 622 that the acceleration vector is aligned with the reference vector (e.g., the acceleration vector and the reference vector are within a predetermined tolerance of each other), the method 610 may proceed to 626, at which it may be determined whether the N−1th joint was moved before zeroing the Nth joint (e.g., at 614). If it is determined at 626 that the N−1th joint was moved before zeroing the Nth joint (e.g., at 614), the method 610 may proceed to 628, at which the N−1th joint may be moved back to its zero position (e.g., the position of the N−1th joint prior to 614). If it is determined at 626 that the N−1th joint was not moved before zeroing the Nth joint, the method 610 may end.

The zeroing methods 570 and 610 of FIGS. 33 and 34, respectively, may be illustrated with respect to a particular embodiment of the robotic apparatus 101 of FIGS. 5 and 6. In this particular embodiment, the joint 108-1 may include a limit switch 228. To zero this robotic apparatus 101, the joint 108-1 may first be zeroed, using the limit switch 228 of the joint 108-1 to bring the joint 108-1 into alignment with a desired position. Next, the joint 108-2 may be zeroed in accordance with the method 610 of FIG. 34. In particular, the joint 108-2 may be moved until the acceleration vector at the joint 108-3 is aligned with a reference vector associated with the joint 108-2; in some embodiments, the reference vector of the joint 108-2 may be the vector that is aligned with the axis of rotation 126-1 of the joint 108-1. Next, the joint 108-3 may be zeroed in accordance with the method 610 of FIG. 34. In particular, the joint 108-3 may be moved until the acceleration vector at the joint 108-4 is aligned with a reference vector associated with the joint 108-3; in some embodiments, the reference vector of the joint 108-3 may be the vector that is aligned with the axis of rotation 126-1 of the joint 108-1.

Next, the joint 108-4 may be zeroed in accordance with the method 610 of FIG. 34. In this particular example, the joint 108-3 may first be moved by 90 degrees (e.g., at 614 of the method 610) from its zeroed position, and then the joint 108-4 may be moved until the acceleration vector at the joint 108-5 is aligned with a reference vector associated with the joint 108-4; in some embodiments, the reference vector of the joint 108-4 may be the vector that is aligned with the axis of rotation 126-1 of the joint 108-1. The joint 108-3 may then be moved by 90 degrees (e.g., at 628 of the method 610) back to its zeroed position.

Next, the joint 108-5 may be zeroed in accordance with the method 610 of FIG. 34. In particular, the joint 108-5 may be moved until the acceleration vector at the joint 108-6 is aligned with a reference vector associated with the joint 108-5; in some embodiments, the reference vector of the joint 108-5 may be the vector that is aligned with the axis of rotation 126-1 of the joint 108-1.

Finally, the joint 108-6 may be zeroed in accordance with the method 610 of FIG. 34. In particular, the joint 108-5 may first be moved by 90 degrees (e.g., at 614 of the method 610) from its zeroed position, and then the joint 108-6 may be moved until the acceleration vector at the end effector 118 (e.g., an acceleration vector generated by an accelerometer or other appropriate device included in the end effector 118) is aligned with a reference vector associated with the joint 108-6; in some embodiments, the reference vector of the joint 108-6 may be the vector that is aligned with the axis of rotation 126-1 of the joint 108-1. The joint 108-5 may then be moved by 90 degrees (e.g., at 628 of the method 610) back to its zeroed position. The robotic apparatus 101 may then be oriented in the zeroed configuration illustrated in FIG. 6.

Calibration of a particular joint 108 by the associated joint calibration logic 232 was discussed above with reference to FIGS. 15 and 16, but the calibration logic 134 of the robotic system 100 may also perform system-level calibration operations. These system-level calibration operations may associate the positions of the joints 108 of a robotic apparatus 101 with a position of the end effector 118 of the robotic apparatus 101, thus ensuring the ability of the robotic apparatus 101 to achieve a desired position of the end effector 118 in space. Such system-level calibration may calibrate out errors and variations in the robotic apparatus 101, including modeling errors (e.g., discrepancies between the actual robotic apparatus 101 and computer models intended to simulate the robotic apparatus 101), manufacturing errors or tolerances (e.g., discrepancies between the positions/dimensions of various components and their intended positions/dimensions), and/or backlash or compliance in the motor drive (e.g., backlash or compliance introduced by lower cost drivetrains 214).

Figure 35:
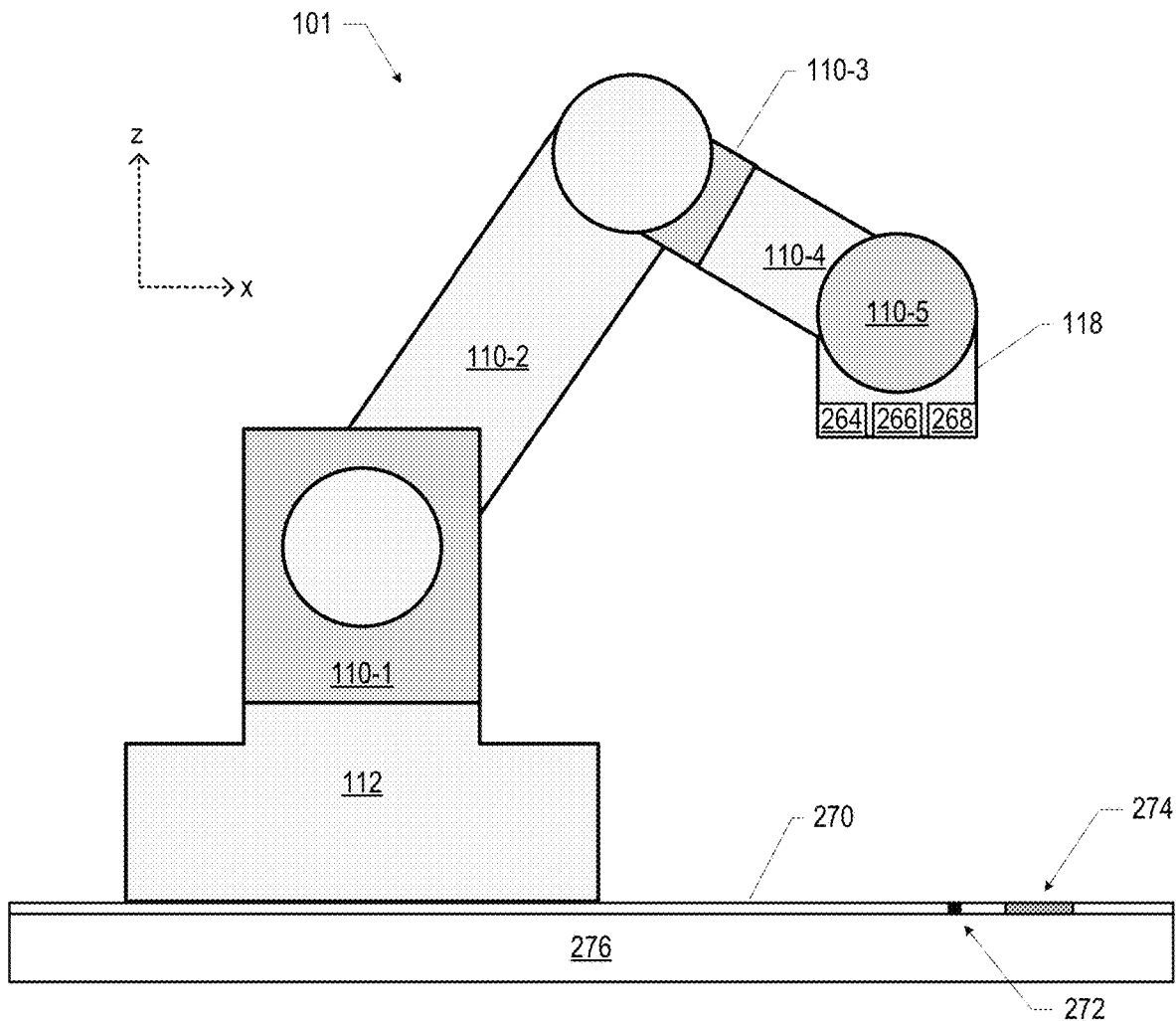
FIG. 35 is a side view of an example robotic apparatus in a calibration setting, in accordance with various embodiments.
Figure 69:
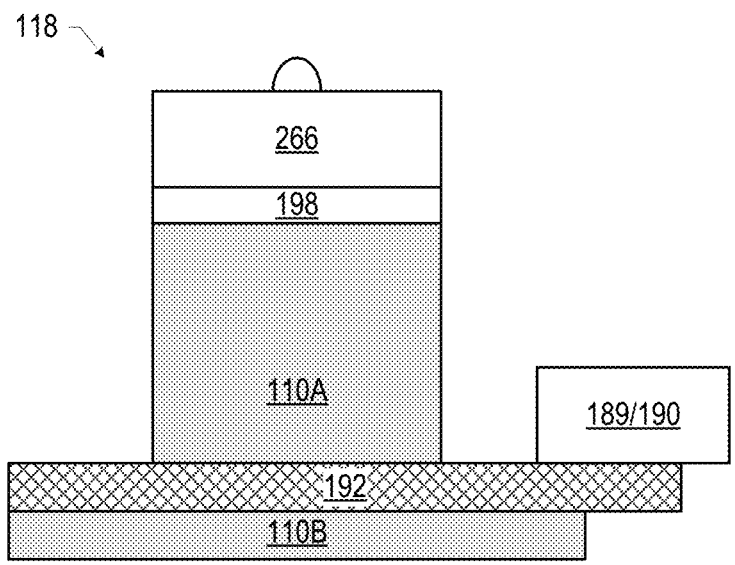

FIG. 35 is a side view of an example robotic apparatus 101 in a calibration setting, in accordance with various embodiments. The robotic apparatus 101 of FIG. 35 has the form of the robotic apparatus 101 of FIGS. 5 and 6, but this is simply illustrative, and the system-level calibration devices and techniques disclosed herein may be utilized with any suitable robotic apparatus 101. The robotic apparatus 101 of FIG. 35 has an end effector 118 that includes a depth sensor 264, a laser 266, and a camera 268. The depth sensor 264 may be any suitable device that measures the distance from the depth sensor 264 to a target surface (here, a surface of the reference structure 270, as discussed below). For example, the depth sensor 264 may include a camera that can generate an array of depth data, a scanner that can generate a line of depth data, or a laser that can generate a single point of depth data. In some embodiments, the depth sensor 264 may be an ultrasonic rangefinder. The laser 266 may be any suitable device that can generate a beam of light whose point of impingement on the surface of the reference structure 270 may be imaged by the camera 268. The camera 268 may be any suitable camera (e.g., a red-green-blue (RGB) camera). In some embodiments, one or more of the depth sensor 264, the laser 266, and the camera 268 may be integrated into a single device. For example, the depth sensor 264 and the camera 268 may be part of an integrated depth-sensing camera array. In another example, the depth sensor 264 and the laser 266 may be part of an integrated laser rangefinder. The end effector 118 may be specifically designed for calibration operations (and may be "swapped out" for a different end effector 118 during subsequent operations), or may be part of an end effector 118 that is used for other operations (e.g., inspection operations, as discussed further below). An example of an end effector 118 that may be used in the calibration arrangement of FIG. 35 is illustrated in FIG. 69 and discussed below.

Figure 36:
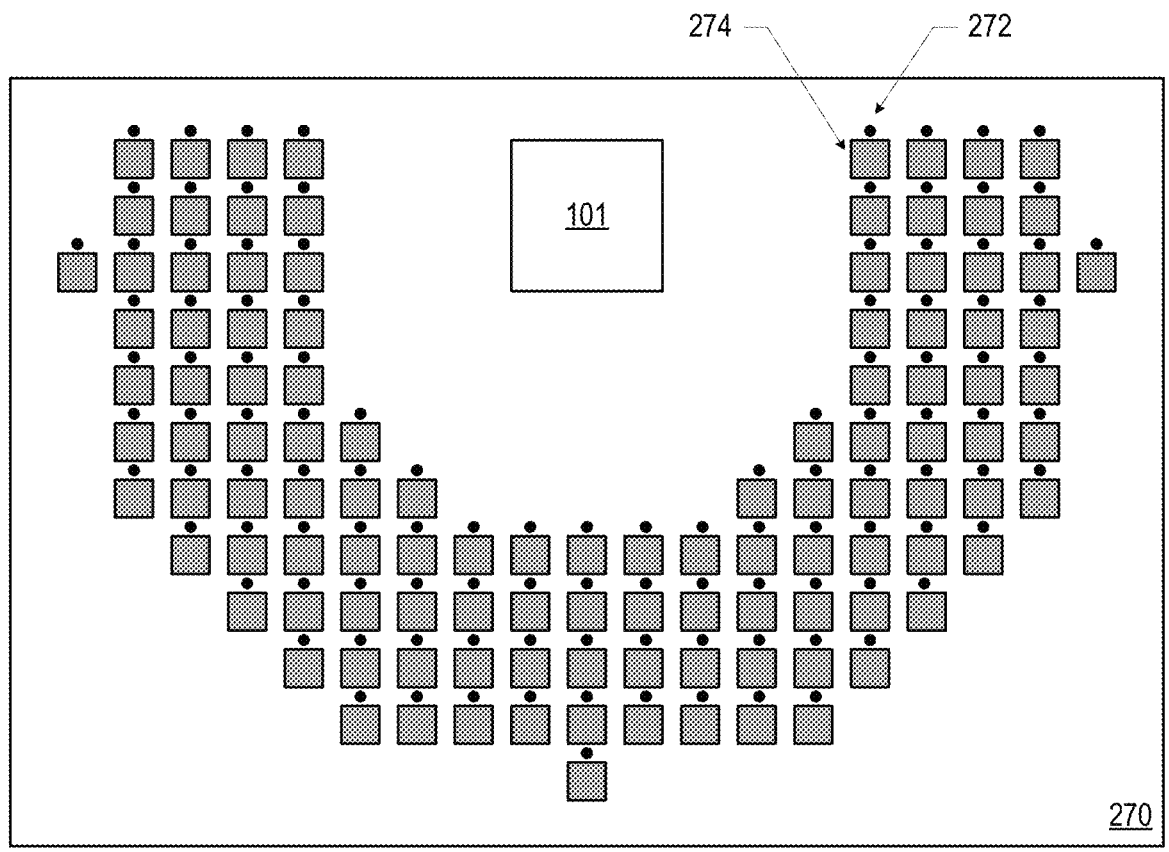
FIG. 36 is a top view of an example reference structure for use in calibrating a robotic apparatus, in accordance with various embodiments.

In the calibration arrangement of FIG. 35, the robotic apparatus 101 and a reference structure 270 are positioned on a surface 276, such as a table. The reference structure 270 of FIG. 35 may take the form of a mat (a "two-dimensional" reference structure 270), but the calibration operations and arrangements disclosed herein may be utilized with "three-dimensional" reference structures 270, as desired. A top view of the reference structure 270 of FIG. 35 is illustrated in FIG. 36; as shown, the reference structure 270 may include a plurality of calibration markers 272, each with an accompanying marker label 274. The calibration markers 272 may be visual markers identifying a location on the reference structure 270, and may have any suitable shape (e.g., a circle, a star, a rectangle, etc.). The marker labels 274 may include information indicative of the location of the associated calibration marker 272 (e.g., x-, y-, and z-locations, as appropriate). In some embodiments, the marker labels 274 may be alphanumeric, but this need not be the case; for example, in other embodiments, the marker labels 274 may be QR codes. In still other embodiments, the information in the marker labels 274 may be encoded in the calibration markers 272 themselves (e.g., by a color of the calibration marker 272), and thus no separate marker labels 274 may be included. In some embodiments, the calibration markers 272 may be placed a few centimeters apart. A support 112 of the robotic apparatus 101 may be positioned at a designated location relative to the reference structure 270.

Figure 37:
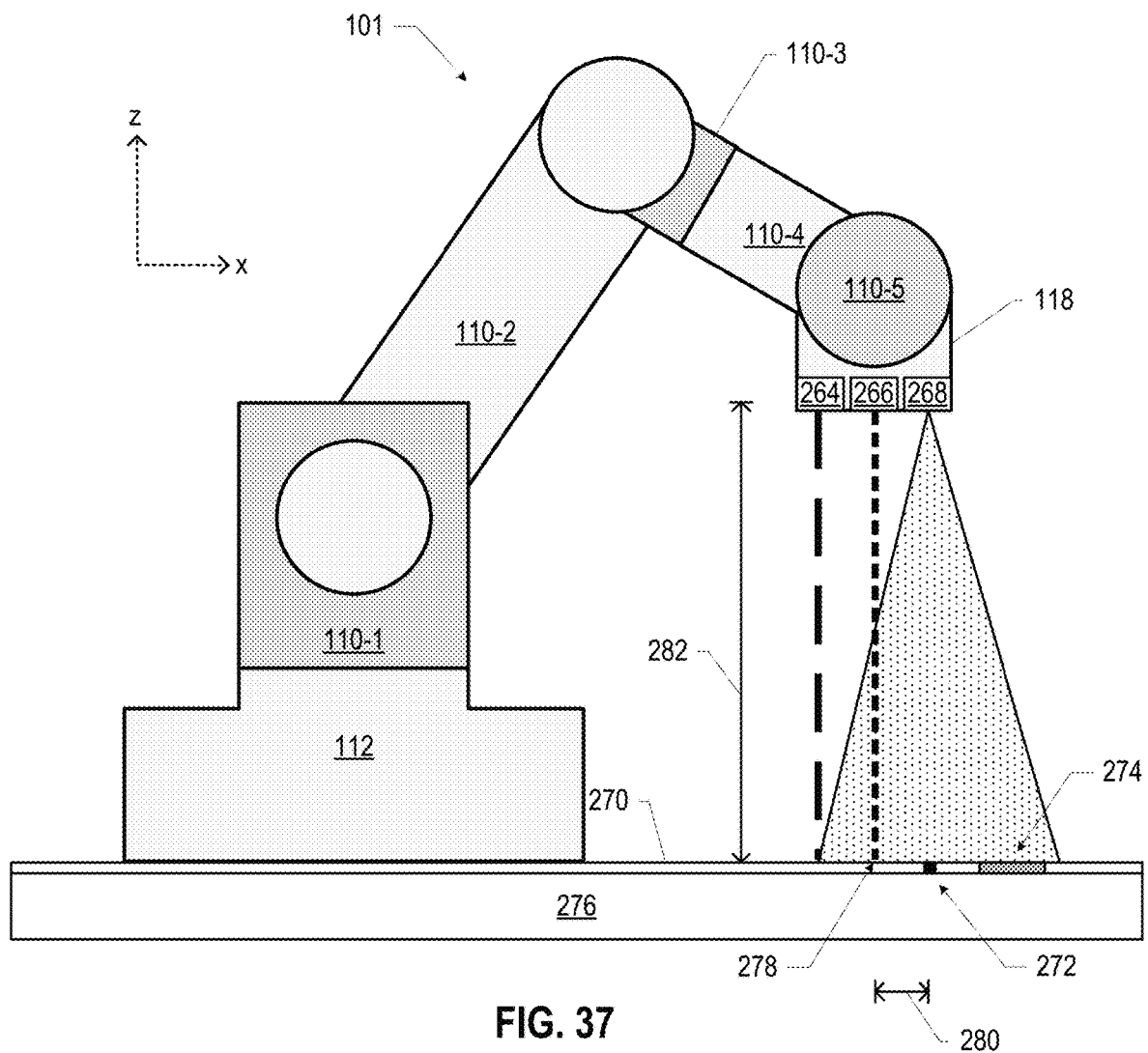
FIG. 37 is a side view of an example robotic apparatus during calibration, in accordance with various embodiments.

During calibration, the sensors of the end effector 118 of the robotic apparatus 101 may be used to determine the position of the end effector 118 in space relative to the calibration markers 272, and thus to calibrate the positions of the joints 108 of the robotic apparatus with respect to space. FIG. 37 is a side view of the example robotic apparatus 101 of FIG. 35 during calibration, in accordance with various embodiments. As shown, during calibration, the depth sensor 264 may measure a distance 282 between the end effector 118 and the reference structure 270, the laser 266 may shine a laser beam onto a surface of the reference structure 270, and the camera 268 may capture an image of the reference structure that includes the point of impingement 278 of the laser beam (generated by the laser 266) on the reference structure 270, as well as the proximate calibration markers 272 and marker labels 274. This image may be analyzed by the calibration logic 134 (e.g., of the system-level compute hardware 124) to determine the x-y distance 280 between the point of impingement 278 and the calibration marker 272 to which the laser beam is intended to point, as discussed further below.

In some embodiments, the laser 266 and/or the depth sensor 264 may be omitted from the end effector 118, and instead, the calibration-related functionality of these elements may be performed by the camera 268 in conjunction with image processing techniques. For example, the laser 266 and/or the depth sensor 264 may be omitted from the end effector 118 and, during calibration, images captured by the camera 268 may be analyzed using known image processing techniques (e.g., machine vision techniques) to determine a spatial position of the end effector 118 relative to the calibration markers 272 of the reference structure 270. Examples of such embodiments are discussed below with reference to FIG. 38.

Figure 38:
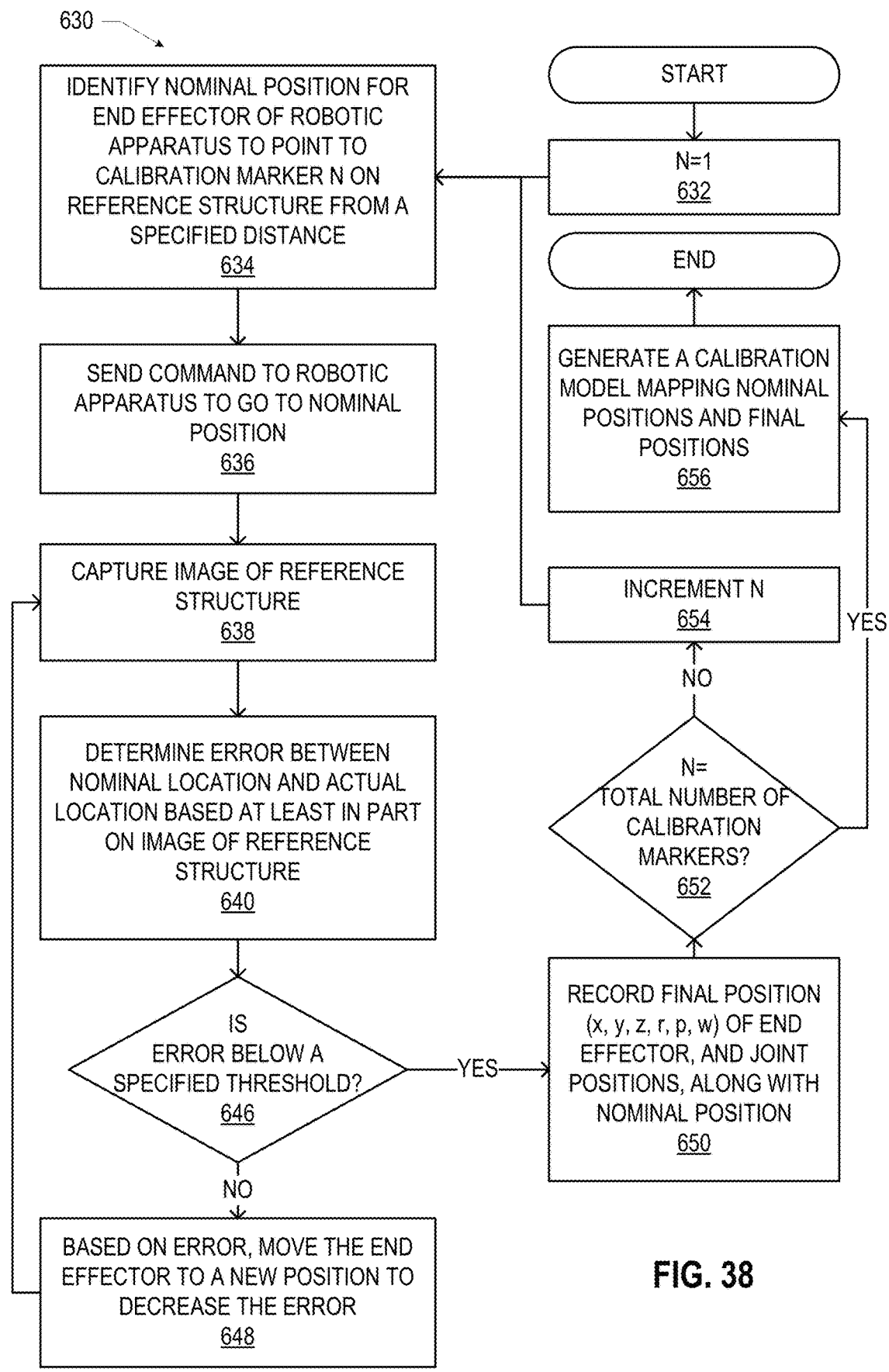
FIG. 38 is a flow diagram of a method of calibrating a robotic system, in accordance with various embodiments.

FIG. 38 is a flow diagram of a method 630 of calibrating a robotic system 100, in accordance with various embodiments. In particular, the method 630 may utilize a calibration arrangement like that of FIG. 37, and may be discussed with reference to the calibration arrangement of FIG. 37 for ease of illustration, but any calibration arrangement including a camera may implement the method 630. The method 630 may be carried out by the calibration logic 134 of the system-level compute hardware 124 (which may or may not be located in the robotic apparatus 101), and may be performed after joint-level calibration and zeroing, as discussed above.

At 632, a counter variable N may set to an initial value (e.g., 1). For example, the calibration logic 134 may initialize a counter variable N to count through all of the calibration markers 272 of a reference structure 270, as discussed further below.

At 634, a nominal position for an end effector of a robotic apparatus may be identified. The nominal position may be one at which the end effector may point to a calibration marker N on a reference structure from a specified-distance. For example, the calibration logic 134 may determine a nominal x-, y-, and z-position, as well as a nominal r-, p-, and w-position, for the end effector 118 in space that should cause the laser 266 to shine on the reference structure 270 such that the point of impingement 278 of the laser beam is aligned with the Nth calibration marker 272. In embodiments in which the end effector 118 does not include or utilize a laser, the calibration logic 134 may determine a nominal (x, y, z, r, p, w) position for the end effector 118 in space that should cause a camera 268 of the end effector 118 to point to the Nth calibration marker 272 from a specified distance.

At 636, a command may be sent to the robotic apparatus to go to the nominal position. For example, the calibration logic 134 may communicate with the motion/position logic 132 to cause the end effector 118 of a robotic apparatus 101 to move to the nominal position identified at 634.

At 638, an image of the reference structure may be captured. For example, the camera 268 (under the control of the calibration logic 134) may capture an image of the reference structure 270, including the point of impingement 278 of the laser beam, the Nth calibration marker 272, and the marker label 274 associated with the Nth calibration marker 272. In embodiments in which the end effector 118 does not include or utilize a laser, the camera 268 (under the control of the calibration logic 134) may capture an image of the reference structure 270, including the Nth calibration marker 272 and the marker label 274 associated with the Nth calibration marker 272.

At 640, the error between the actual location of the end effector and the nominal location of the end effector may be determined based at least in part on the image of the reference structure. For example, when the calibration arrangement of FIG. 37 is used, the calibration logic 134 may analyze the image captured at 638 to determine the x-y distance 280 between the point of impingement 278 and the Nth calibration marker 272 (corresponding to the desired point of impingement 278), the depth sensor 264 (under the control of the calibration logic 134) may determine a z-distance 282 between the end effector 118 and the reference structure 270, and the measured x-, y-, and z-distances may be compared to their nominal values to determine an error (which may be single- or vector-valued). In embodiments in which the end effector 118 does not include or utilize a laser, the calibration logic 134 may use the image of the reference structure (captured at 638) to generate the x-, y-, and z-errors (e.g., using known image processing and computer vision techniques). The calibration logic 134 may confirm that the Nth calibration marker is indeed the Nth calibration marker by analysis of the associated marker label 274.

At 646, it may be determined whether the error (determined at 640) is below a specified threshold. As noted above, the error and/or the threshold may be single-valued or vector-valued, as desired. For example, the calibration logic 134 may determine whether the x-, y-, and z-errors are within a desired tolerance (which may be the same for the x-, y-, and z-dimensions, or different, as desired). If it is determined at 646 that the error is not below the specified threshold, the method 630 may proceed to 648 and move the end effector to a new position to decrease the error. For example, the calibration logic 134 may communicate with the motion/position logic 132 to cause the joints 108 to move to cause the end effector 118 to move to a new (x, y, z, r, p, w) position that may decrease the x-, y-, and/or z-error. After 648, the method 630 may return to 638.

If it is determined at 646 that the error is below the specified threshold, the method 630 may proceed to 650, at which the final position of the end effector (e.g., the (x, y, z, r, p, w) position), and the positions of the individual joints, is recorded, along with the nominal position of the end effector. For example, the calibration logic 134 may store, in the system-level data storage 150, the (x, y, z, r, p, w) position of the end effector 118, the positions of the individual joints 108 and the nominal position identified at 634.

At 652, it is determined whether the counter variable N is equal to the total number of calibration markers (and thus that all calibration markers have been evaluated during the calibration method). If it is determined that the counter variable N is not equal to the total number of calibration markers (and thus that all calibration markers have not yet been considered), the method 630 may proceed to 654, at which the counter variable N may be incremented. The method 630 may then return to 634.

If it is determined at 652 that the counter variable N is equal to the total number of calibration markers (and thus that all calibration markers have been evaluated), the method 630 may proceed to 656, at which a calibration model mapping nominal positions (identified at 634) to the final position (recorded at 650) is generated. For example, the calibration logic 134 may generate a linear regression model, a polynomial regression model, or a deep learning model, using any suitable known techniques, to map the nominal positions to the final positions. This model may be saved in the system-level data storage 150. The method 630 may then end.

Figure 39:
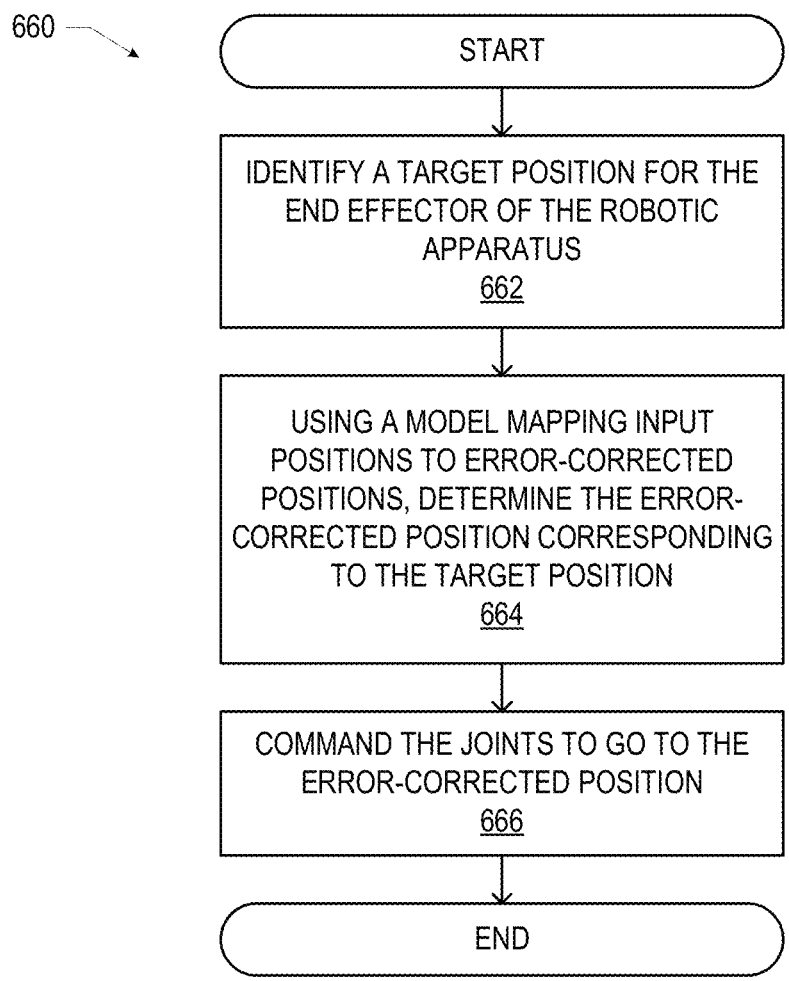
FIG. 39 is a flow diagram of a method of error-correction in driving joints of a robotic system, in accordance with various embodiments.

The calibration model generated by the method 630 of FIG. 38 may be used by the motion/position logic 132 to drive the end effector 118 of a robotic apparatus 101 accurately to a desired (x, y, z, r, p, w) position. FIG. 39 is a flow diagram of a method 660 of error-correction in driving joints 108 of a robotic system 100, in accordance with various embodiments. The method 660 may be carried out by the motion/position logic 132 of the system-level compute hardware 124 (which may or may not be located in the robotic apparatus 101), and may utilize the calibration model generated by the calibration logic 134 in accordance with the method 630 of FIG. 38, as discussed above.

At 662, a target position for the end effector of a robotic apparatus may be identified. For example, the motion/position logic may identify a target (x, y, z, r, p, w) position for the end effector 118 of a robotic apparatus 101 (e.g., a position that is part of an inspection path, as discussed further below).

At 664, a calibration model mapping input positions to error-corrected positions may be used to determine the error-corrected position corresponding to the target position. For example, the motion/position logic 132 may input the target (x, y, z, r, p, w) position to the calibration model generated at 656 of the method 630, and the calibration model may generate an error-corrected position such that, if the motion/position logic 132 commands the joints 108 of a robotic apparatus 101 to go to the error-corrected position, the end effector 118 of the robotic apparatus 101 will actually be positioned at the target position.

At 666, the joints may be commanded to go to the error-corrected position. For example, the motion/position logic 132 may communicate with the joints 108 via the communication hardware 128 to cause the individual joints 108 to go to the error-corrected positions, resulting in the end effector 118 being positioned at the target position.

Figure 40:
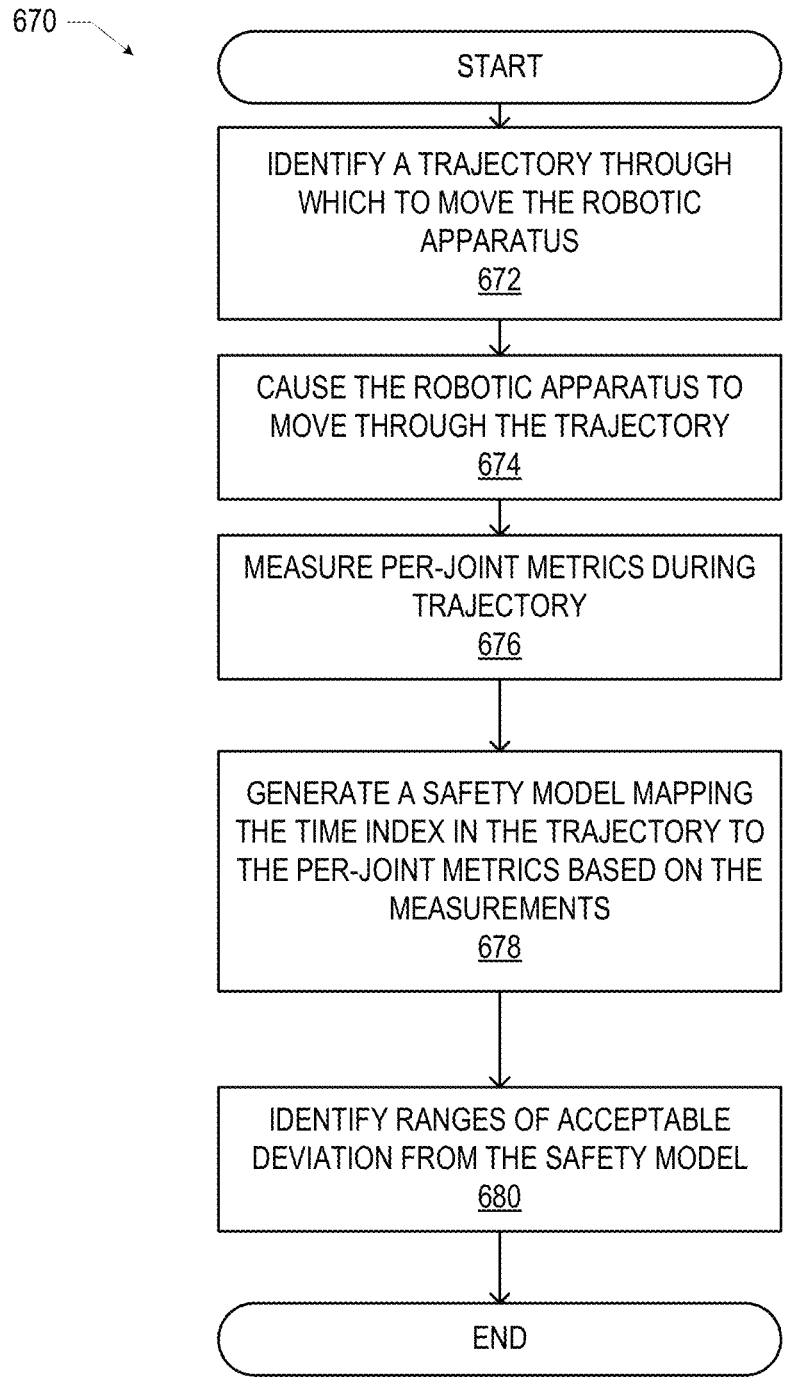
FIG. 40 is a flow diagram of a method of establishing allowable operational conditions for a robotic system, in accordance with various embodiments.

As noted above, a robotic system 100 may include joint-level safety features and system-level safety features. In some embodiments, a system-level safety procedure for the robotic system 100 may be the result of a learning process in which the robotic apparatus 101 is moved through a trajectory while data from the robotic apparatus 101 (e.g., the data packets discussed above with reference to the joints 108) is monitored by the system-level compute hardware 124. The safety logic 136 may generate a model identifying expected values of this data as a function of the time index after the start of the trajectory, and may then be able to flag any future data that falls outside a range around the model as a potential fault. FIG. 40 is a flow diagram of a method 670 of establishing system-level allowable operational conditions for a robotic system 100, in accordance with various embodiments. The method 670 may be carried out by the safety logic 136 of the system-level compute hardware 124 (which may or may not be located in the robotic apparatus 101), and may be performed after joint-level and system-level calibration, as discussed above. The method 670 may establish a safety model corresponding to a particular trajectory through which the robotic apparatus 101 may move; different safety models may be generated and stored for different trajectories, as desired.

At 672, a trajectory may be identified through which to move a robotic apparatus. For example, the safety logic 136 may specify a time series of positions of the joints 108 of a robotic apparatus 101. In some embodiments, the trajectory may be specified by a user through a GUI provided by an I/O device 120 (e.g., the trajectory may be part of an inspection path, as discussed below with reference to FIGS. 42-53), or by "recording" a trajectory as a user physically manipulates a robotic apparatus 101 when the joints 108 are in the "motor drive off" and "brakes off" state, as discussed above with reference to FIG. 29. For example, the safety logic 136 may determine whether a "start recording" voice command by a user has been received at a microphone of the I/O devices 120 and recognized by the voice command logic 170 of the system-level compute hardware 124; upon receipt of such a voice command, the positions of the joints 108 may be monitored and stored by the safety logic 136 (in conjunction with the motion/position logic 132) until a "stop recording" voice command by a user has been received at a microphone of the I/O devices 120 and recognized by the voice command logic 170 of the system-level compute hardware 124. A recorded trajectory may be "played back" (e.g., in response to a "play recording" voice command received at a microphone of the I/O devices 120 and recognized by the voice command logic 170). Further, a trajectory may be recorded and referred to by a particular name in these voice commands (e.g., "start recording X," "stop recording X," and "play recording X") in order to distinguish between multiple recorded trajectories. A speed of playback may be adjusted using a "speed X" voice command. Any other suitable technique for specifying a trajectory of a robotic apparatus 101 may be used in addition to or instead of these techniques.

At 674, the robotic apparatus may be caused to move through the trajectory. For example, the safety logic 136 may communicate with the motion/position logic 132, which may in turn communicate with the joints 108 via the communication hardware 128 to cause the joints 108 of the robotic apparatus 101 to move through the positions specified in the trajectory.

At 676, per-joint metrics may be measured during the trajectory. For example, the safety logic 136 may receive data from sensors included in the joints 108 (e.g., the accelerometer 224 or sensors included in the other hardware 227, such as temperature sensors, current sensors, etc., as discussed above with reference to the joint 108), and/or from internal variables tracked by the joint-level compute hardware 210, via the communication hardware 128 while the robotic apparatus 101 is moving through the trajectory, and may store that data in the system-level data storage 150.

At 678, a safety model may be generated, mapping the time index in the trajectory to per-joint metrics based on the measured per-joint metrics. For example, the safety logic 136 may generate a principal component model, a linear regression model, a polynomial regression model, or a deep learning model, using any suitable known techniques, to map the time index in the trajectory to the per-joint metrics (e.g., the model may determine that, at time T from the start of the trajectory, the expected x-position of the end effector 118 is X). This model may be saved in the system-level data storage 150. In some embodiments, generation of the safety model may include performing a Principal Components Analysis (PCA) in which the high-dimensional metric space is mapped into a lower-dimensional space (where thresholds may be applied, as discussed below).

At 680, one or more thresholds may be identified at which deviation from the safety model is not acceptable. For example, a user may specify a percentage or absolute deviation from the safety model that represents an unacceptable deviation, and the safety logic 136 may store the associated fault conditions.

Figure 41:
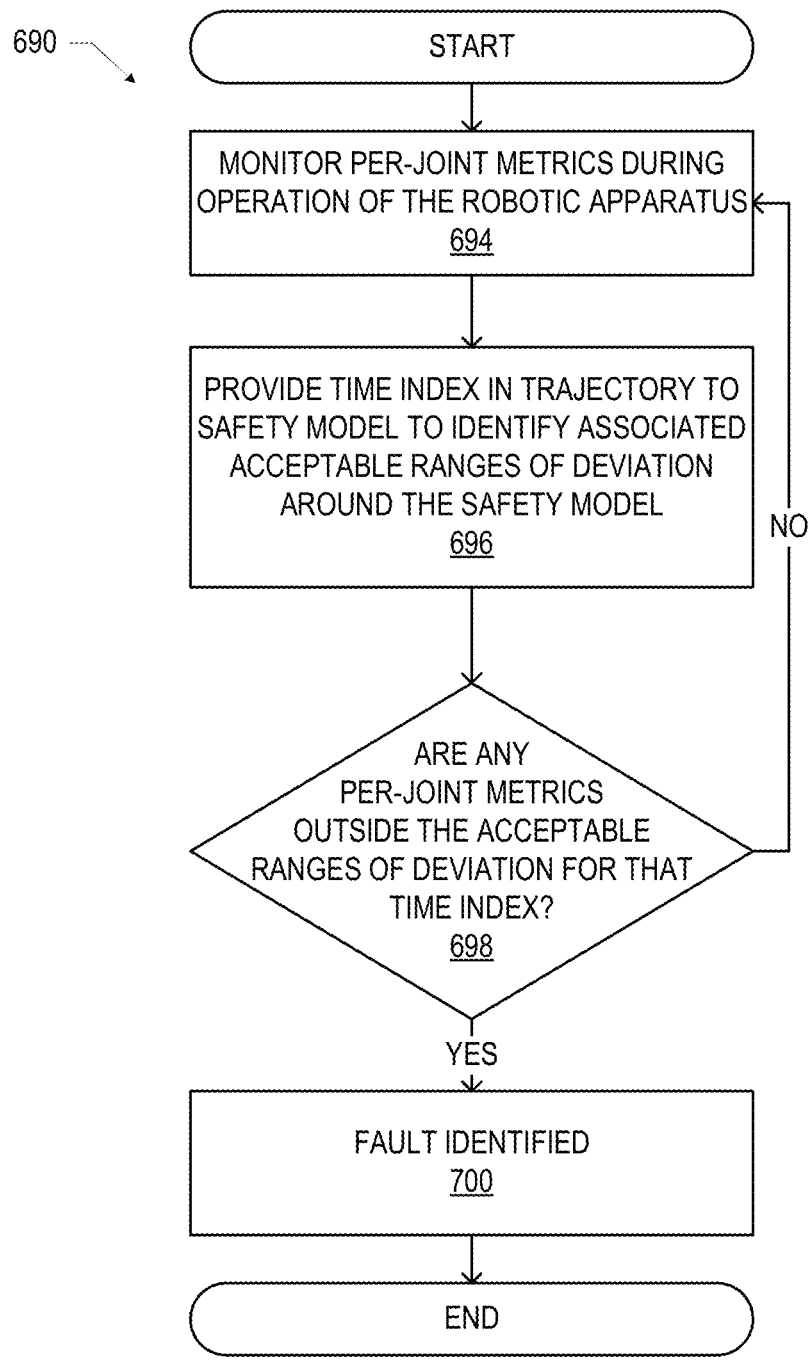
FIG. 41 is a flow diagram of a method of detecting faults in a robotic system, in accordance with various embodiments.

The system-level safety model generated by the method 670 of FIG. 40 may be utilized by the robotic system 100 to identify faults during operation of the robotic system 100. FIG. 41 is a flow diagram of a method 690 of detecting faults in a robotic system 100, in accordance with various embodiments. The method 690 may be carried out by the safety logic 136 of the system-level compute hardware 124 (which may or may not be located in the robotic apparatus 101), and may be performed when the robotic apparatus 101 moves through a trajectory after generation of a safety model for that trajectory in accordance with the method 670 of FIG. 40, as discussed above.

At 694, per-joint metrics of the robotic apparatus may be monitored during operation of the robotic apparatus. For example, the safety logic 136 may receive data from sensors included in the joints 108 (e.g., the accelerometer 224 or sensors included in the other hardware 227, such as temperature sensors, current sensors, etc.) via the communication hardware 128 while the robotic apparatus 101 is in operation (e.g., moving), and may store that data in the system-level data storage 150.

At 696, the time index in the trajectory of the robotic apparatus may be provided to the safety model to identify associated acceptable ranges of deviation around the safety model. For example, the safety logic 136 may input a time index in the trajectory (e.g., the trajectory started three seconds ago) to the safety model generated by the method 670 of FIG. 40, and the safety model may output expected values of the per-joint metrics for the trajectory at that time index (as discussed above with reference to 678 of FIG. 40), accompanied by acceptable ranges of deviation from these expected values (as discussed above with reference to 680 of FIG. 40).

At 698, it may be determined whether any per-joint metrics (measured at 694) fall outside the acceptable ranges of deviation from the safety model for the current time index in the trajectory. For example, the safety logic 136 may compare each of the per-joint metrics measured at 694 (or combinations of the per-joint metrics, as appropriate) to the acceptable ranges of deviation from the values of these per-joint metrics generated by the safety model as a function of the time index in the trajectory, and will determine whether any per-joint metrics or combinations thereof fall outside of the acceptable ranges.

If it is determined at 698 that there a per-joint metric, or combination of per-joint metrics, that falls outside the acceptable range, the method 690 may proceed to 700, at which a fault is identified. The robotic system 100 may then respond to the identification of this fault appropriately (e.g., as discussed above with reference to FIGS. 29, 31, and 32). If it is determined at 698 that no per-joint metric, or combination of per-joint metrics, that falls outside the acceptable range, the method 690 may return to 694.

As discussed above with reference to the task logic 106, a robotic system 100 in accordance with the present disclosure may perform any of a number of tasks, including inspection of one or more items (e.g., for quality, grading, the identification of defects, etc.). A number of inspection systems and techniques are discussed below. Any of these inspection systems and techniques may be used as suitable in a commercial setting. For example, some or all of the inspection systems and techniques disclosed herein may be utilized for incoming inspections (i.e., inspections performed on incoming raw materials or parts), in-line inspections (i.e., inspections performed during an assembly or other manufacturing process), or outgoing inspections (i.e., for completed items before shipping out).

In some embodiments, a robotic system 100 may inspect an item by following a programmed inspection path for that item to capture images of that item using an image capture device included in the end effector 118; the images may then be analyzed to assess the item. An inspection path may include one or more locations for the end effector 118 of a robotic apparatus 101 (i.e., (x, y, z) location), and for each location, the inspection path may include one or more angles (i.e., (r, p, w)) at which the end effector 118 of the robotic apparatus may be positioned to capture an image of the item. Thus, an inspection path for a robotic system 100 may include a series of locations of the end effector 118, with an image captured by the end effector 118 at each of one or more angles at each location. In some embodiments, the inspection logic 160 may utilize the safety logic 136 to generate and use a safety model for each inspection path, in accordance with the methods discussed above with reference to FIGS. 40-41.

Each angle in an inspection path may also be associated with a particular inspection function that may be run on the image of the item captured at that angle. As used herein, an "inspection function" may refer to a set of operations that takes data, captured by a robotic apparatus 101, about an item as an input, and generates, as an output, information about that item. For example, an inspection function may include a bar code reader; such an inspection function may take an image or other optical data of a bar code on an item as an input, and may output the data encoded in the bar code. Another example of an inspection function may be a dimensional analysis tool; such an inspection function may take an image of an item as an input, and may output one or more physical dimensions of that item (e.g., radius, area, length, etc.). Another example of an inspection function may be a resistance measurement tool; such an inspection function may take voltage and current measurements between two points in a device as an input, and may output the electrical resistance between those points. In some embodiments, an inspection function may include a computational classifier. As used herein, a "computational classifier," or simply a "classifier," may refer to a machine learning model that receives data representative of a particular item (e.g., an image of the item) as an input and returns a classification result (e.g., "pass," "fail," "unknown," or some other result). In some embodiments, a classifier may return "needs data" when its amount of training has not yet reached a predetermined, adequate level. In some embodiments, a classifier may return "error" when an error has occurred during execution of the classifier. Computational classifiers may include anomaly detection classifiers, which may detect whether a particular image is significantly different from the average image, or defect-specific classifiers. Examples of specific defects for which classifiers may be trained include missing components, solder bridges, bent pins, scratched lenses, etc.

Figures 42, 43:
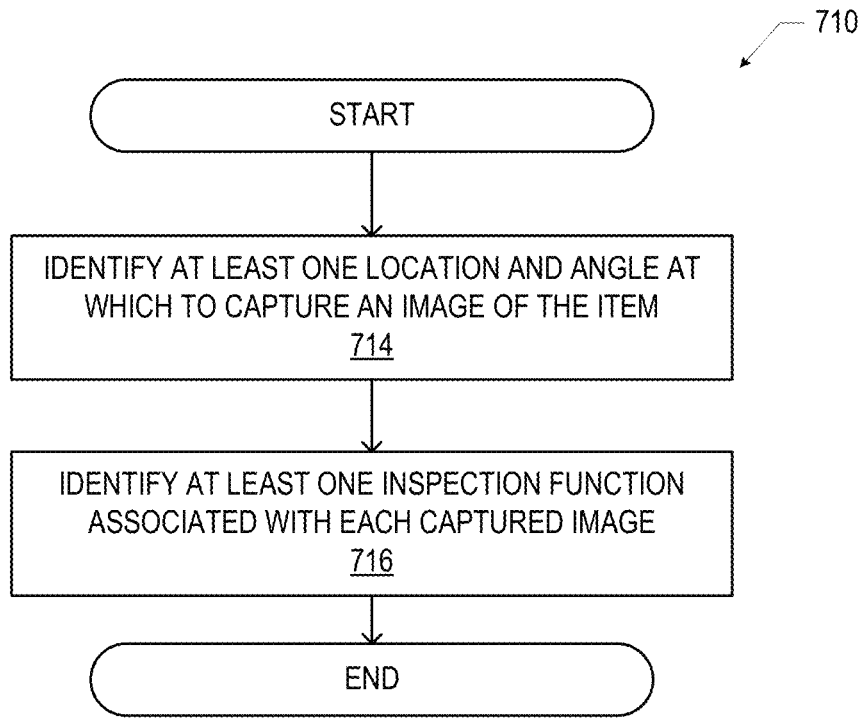
FIG. 42 is a flow diagram of a method of generating an inspection path for a robotic system, in accordance with various embodiments.
FIG. 43 is an example data structure that may be used to define an inspection path of a robotic system, in accordance with various embodiments.

FIG. 42 is a flow diagram of a method 710 of generating an inspection path for a robotic system 100, in accordance with various embodiments. The method 670 may be carried out by the inspection logic 160 of the system-level compute hardware 124 (which may or may not be located in the robotic apparatus 101), which may rely on the control logic 104 to reliably operate a robotic apparatus 101.

At 714, at least one location and angle at which to capture an image of an item may be identified. For example, the inspection logic 160 may receive an identification, from a user via an I/O device 120, of one or more locations and one or more associated angles at which the end effector 118 of a robotic apparatus 101 may capture an image of an item to be inspected. In some embodiments, the inspection path may be specified by a user through a GUI provided by an I/O device 120 (e.g., as discussed below with reference to FIGS. 46-53), by manually inputting and storing the locations and angles, or by "recording" an inspection path as a user physically manipulates a robotic apparatus 101 when the joints 108 are in the "motor drive off" and "brakes off" state, as discussed above with reference to FIG. 29. For example, the safety logic 136 may determine whether a "start task" voice command by a user has been received at a microphone of the I/O devices 120 and recognized by the voice command logic 170 of the system-level compute hardware 124; upon receipt of such a voice command, the positions of the joints 108 may be monitored and stored by the safety logic 136 (in conjunction with the motion/position logic 132) whenever an "waypoint" voice command has been received at a microphone of the I/O devices 120 and recognized by the voice command logic 170 of the system-level compute hardware 124. A recorded inspection path may be "played back" (e.g., in response to a "play task" voice command received at a microphone of the I/O devices 120 and recognized by the voice command logic 170). Further, an inspection path may be recorded and referred to by a particular name in these voice commands (e.g., "start task X" and "play task X") in order to distinguish between multiple recorded inspection paths. A speed of playback may be adjusted using a "speed X" voice command. Any other suitable technique for specifying an inspection path of a robotic apparatus 101 may be used in addition to or instead of these techniques.

At 716, at least one inspection function associated with each captured image may be identified. For example, the inspection logic 160 may receive an identification, from a user via an I/O device 120, of one or more inspection functions to apply to an image captured at each angle of the inspection path when the robotic apparatus 101 performs an inspection along the inspection path. In some embodiments, the inspection function(s) for each angle may be specified by a user through a GUI provided by an I/O device 120 (e.g., as discussed below with reference to FIGS. 46-53).

Figure 44:
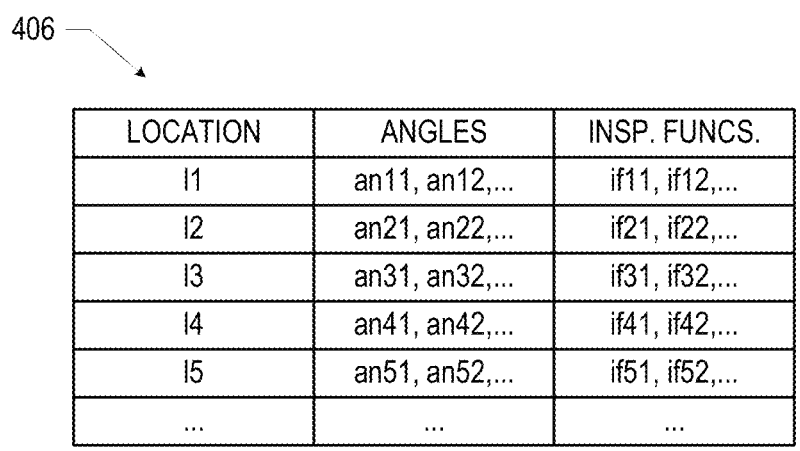
FIG. 44 is an example data structure that may be used as part of defining an inspection path of the robotic system, in accordance with various embodiments.

FIG. 43 is an example data structure 404 that may be used to define an inspection path of a robotic system 100 for inspecting an item, in accordance with various embodiments. The data structure 404 includes a location and angle at which an overview image of the item is to be captured (discussed further below with reference to FIGS. 46-53), one or more locations, and for each location, one or more angles at which an image is to be captured by an image capture device included in an end effector 118. Further, the data structure 404 includes, for each angle, an identification of at least one inspection function to be applied to the image captured at that angle. A data structure like the data structure 404 may be stored in the system-level data storage 150, to be accessed by the inspection logic 160 when the inspection path is to be run. FIG. 44 is an example data structure 406 that may be used as part of defining an inspection path of the robotic system 100, in accordance with various embodiments. In particular, the data structure 406 may store the locations, associated angles, and associated inspection functions for an inspection path. A data structure like the data structure 406 may be stored in the system-level data storage 150, to be accessed by the inspection logic 160 when the inspection path is to be run.

Figure 45:
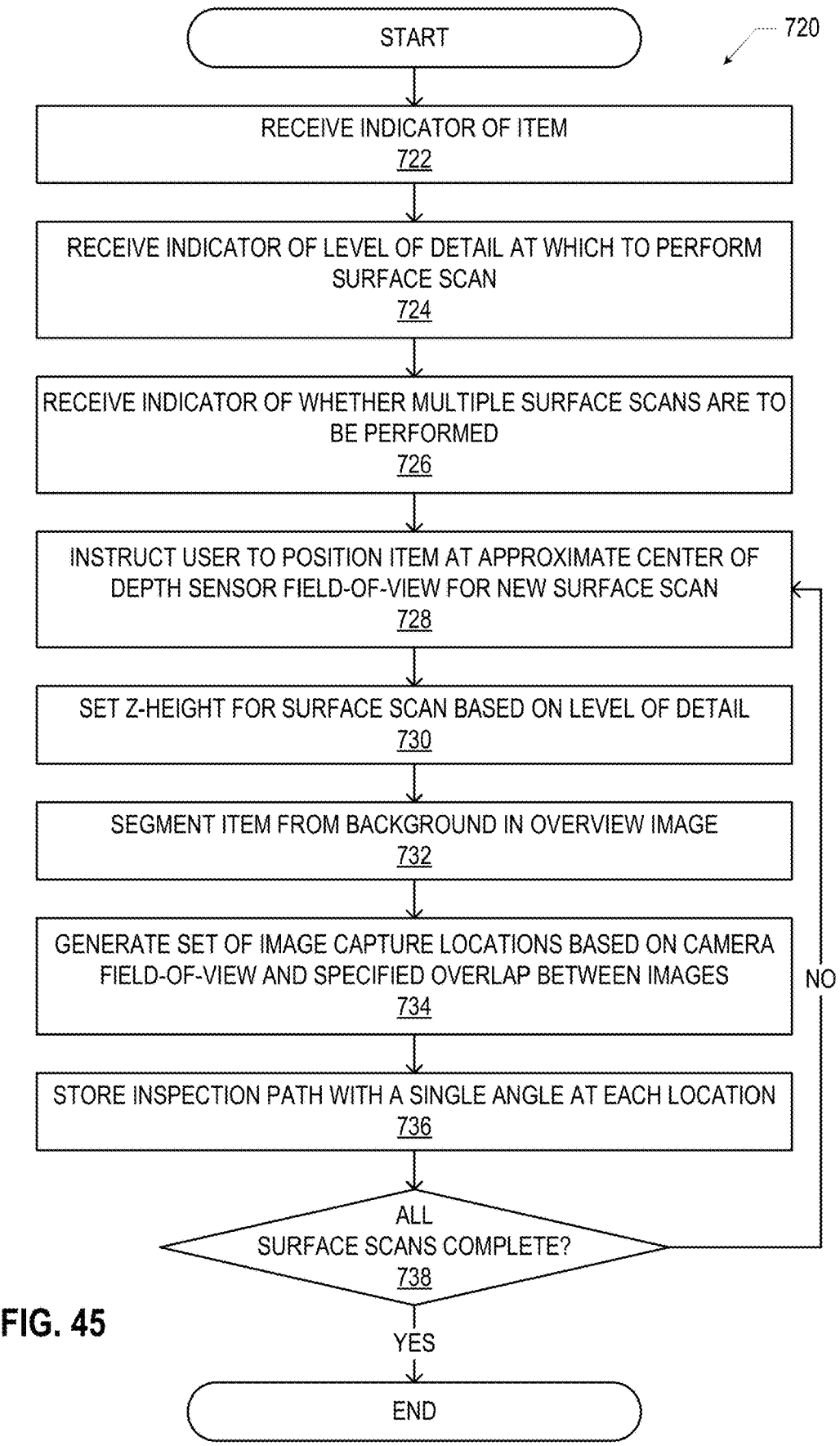
FIG. 45 is a flow diagram of a method of generating an inspection path for a robotic system, in accordance with various embodiments.

As noted above, an inspection path for a robotic system 100 may be generated in a number of ways. For example, in some embodiments, an inspection path may be at least partially (e.g., fully) generated by the inspection logic 160 based on an initial surface scan of the item. FIG. 45 is a flow diagram of a method 720 of generating an inspection path for a robotic system 100, in accordance with various embodiments. The method 720 may be a particular embodiment of the method 710 discussed above with reference to FIG. 42. Like the method 710 of FIG. 42, the method 720 of FIG. 45 may be carried out by the inspection logic 160 of the system-level compute hardware 124 (which may or may not be located in the robotic apparatus 101), which may rely on the control logic 104 to reliably operate a robotic apparatus 101. The robotic apparatus 101 that is operated during the execution of the method 720 may include an end effector 118 with a depth sensor 264 and a camera 268. Further, the method 720 may involve the end effector 118 positioned above the item to be inspected. For example, the robotic apparatus 101 (e.g., a gantry- or arm-type robotic apparatus 101) may be positioned on a table, floor, wall, or cart, and the item may be positioned so that the end effector 118 of the robotic apparatus 101 can move above and around at least a portion of the item in order to image desired surfaces of the item. In some embodiments, an arm-type robotic apparatus 101 may be positioned on a table, and the item to be inspected may also be positioned on the table.

At 722, an indicator of an item may be received. For example, the inspection logic 160 may receive a name of an item to be inspected from a user via a GUI provided by an I/O device 120. The indicator may be stored in the system-level data storage 150 (e.g., as part of a file name or an item field of a data structure that includes the inspection path).

At 724, an indicator of a level of detail at which to perform a surface scan of the item may be received. For example, the inspection logic 160 may receive an input, from a user via a GUI, indicating whether an initial surface scan of an item is to be performed at a high level of detail or at a low level of detail (e.g., via a slider element in the GUI).

At 726, an indicator of whether multiple surface scans are to be performed may be received. Multiple surface scans may be useful when an item has multiple surfaces (e.g., a front face and a back face, a top surface and one or more side surfaces, etc.) to be inspected. For example, the inspection logic 160 may receive an input, from a user via a GUI, indicating whether multiple surface scans of an item should be performed (e.g., using a GUI element that allows the user to specify how many surface scans should be performed).

At 728, a user may be instructed to position the item at an approximate center of the field-of-view (FOV) of a depth sensor for a new surface scan. For example, the inspection logic 160 may provide a visual or audio instruction, to a user via a GUI and/or one or more speakers included in the I/O devices 120, instructing the user to position the item to be inspected in the FOV of a depth sensor 264 (and in the FOV of a camera 268) of the end effector 118. In some embodiments, the GUI may display a current image from the camera 268 of the approximate FOV of the depth sensor 264 so that the user can see and position the item accordingly; note that, in some embodiments, the camera 268 and the depth sensor 264 may be part of an integrated depth-sensing camera array.

At 730, a z-height of the surface scan may be set based on the level of detail (specified at 724). For example, the inspection logic 160 may select a z-height above the surface of the item for the surface scan (corresponding to a particular z-distance between the item and the end effector 118) based on the desired level of detail received from the user; a smaller z-height (closer to the item) may be selected when a higher level of detail is desired, and a larger z-height (farther away from the item) may be selected when a lower level of detail is desired. In some embodiments, the operations of 724 may not be included in the method 720, and instead, a z-height of the surface scan may be automatically selected by the inspection logic 160 as the z-height that allows the item to maximally fill the FOV of the depth sensor 264 (with the item identified by segmentation, as discussed below with reference to 732).

At 732, the item may be segmented from the background in an overview image of the item. For example, the inspection logic 160 may cause a camera 268 of the end effector 118 to capture an overview image of the item (e.g., as specified in the data structure 404 of FIG. 43), and the inspection logic 160 may perform any suitable segmentation technique on the captured image to segment the item itself from the background of the image (e.g., the table or other surface on which the item rests).

At 734, a set of image capture locations may be generated based on the camera FOV and a specified overlap (e.g., 25% to 50%) between the images captured at the image capture locations. For example, the inspection logic 160 may use the results of the segmentation of 732 to identify where the item is in the depth sensor FOV, and then determine how many images of the item should be captured, with the camera 268, in order to fully cover the visible surface of the item with a specified overlap between images, and the (x, y) locations of the end effector 118 (at the specified z-height) in order to capture these items. The number and spacing of these images may depend on the size of the camera FOV. In some embodiments, the angle of the end effector 118 (e.g., (r, p, w)) for the capture of these images may be oriented directly downward (in the negative z-direction). The set of locations generated at 734 may be a set of locations at which images may be captured by the camera 268 to overlappingly image the desired surface of the item.

At 736, an inspection path may be stored including the locations generated at 734, with a single angle associated with each location. This angle may be normal to the surface of the item to be inspected. For example, the inspection logic 160 may use a data structure like the data structure 404 (FIG. 43) and/or the data structure 406 (FIG. 44) to store an inspection path that includes the locations generated at 734, and for each location, a single angle (e.g., so that the camera 268 faces the negative z-direction when the surface of the item is in the x-y plane). Inspection functions (not discussed in FIG. 45) may be separately assigned to the angles by a user (e.g., as discussed below with reference to FIGS. 46-53), or automatically (e.g., an "anomaly detection" inspection function may be automatically assigned to each angle). In this manner, an inspection path for a surface of an item may be automatically generated by the robotic system 100.

At 738, it may be determined whether all surface scans are complete (based on the number of surface scans indicated at 726). If it is determined at 738 that all surface scans are complete, the method 720 may end. If it is determined at 738 that additional surface scans are to be performed (e.g., to scan surfaces of the item other than the "top" surface), the method 720 may return to 728 and separate inspection paths may be generated for each of the other surfaces. In some embodiments, the operations of 726 may be omitted, and the robotic system 100 may perform a single surface scan by default; if additional surface scans are desired, the method 720 may be performed again.

As noted above, in some embodiments, the I/O devices 120 may be used to provide a GUI that allows a user to specify an inspection path. FIGS. 46-53 are examples of GUIs that may be used to generate an inspection path for a robotic system, in accordance with various embodiments. In some embodiments, a tablet or laptop computing device, or a desktop computing device with an associated touchscreen display, may provide an I/O device 120 through which the GUIs of FIGS. 46-53 may be run; in some embodiments, the tablet, laptop, or desktop computing device may provide some or all of the system-level compute hardware 124 and some or all of the system-level data storage 150. The GUIs may be provided by the user interface logic 162 in conjunction with the inspection logic 160. In some embodiments, the GUIs may be provided on a touchscreen display communicatively coupled, and proximate to, the robotic apparatus 101.

Figure 46:
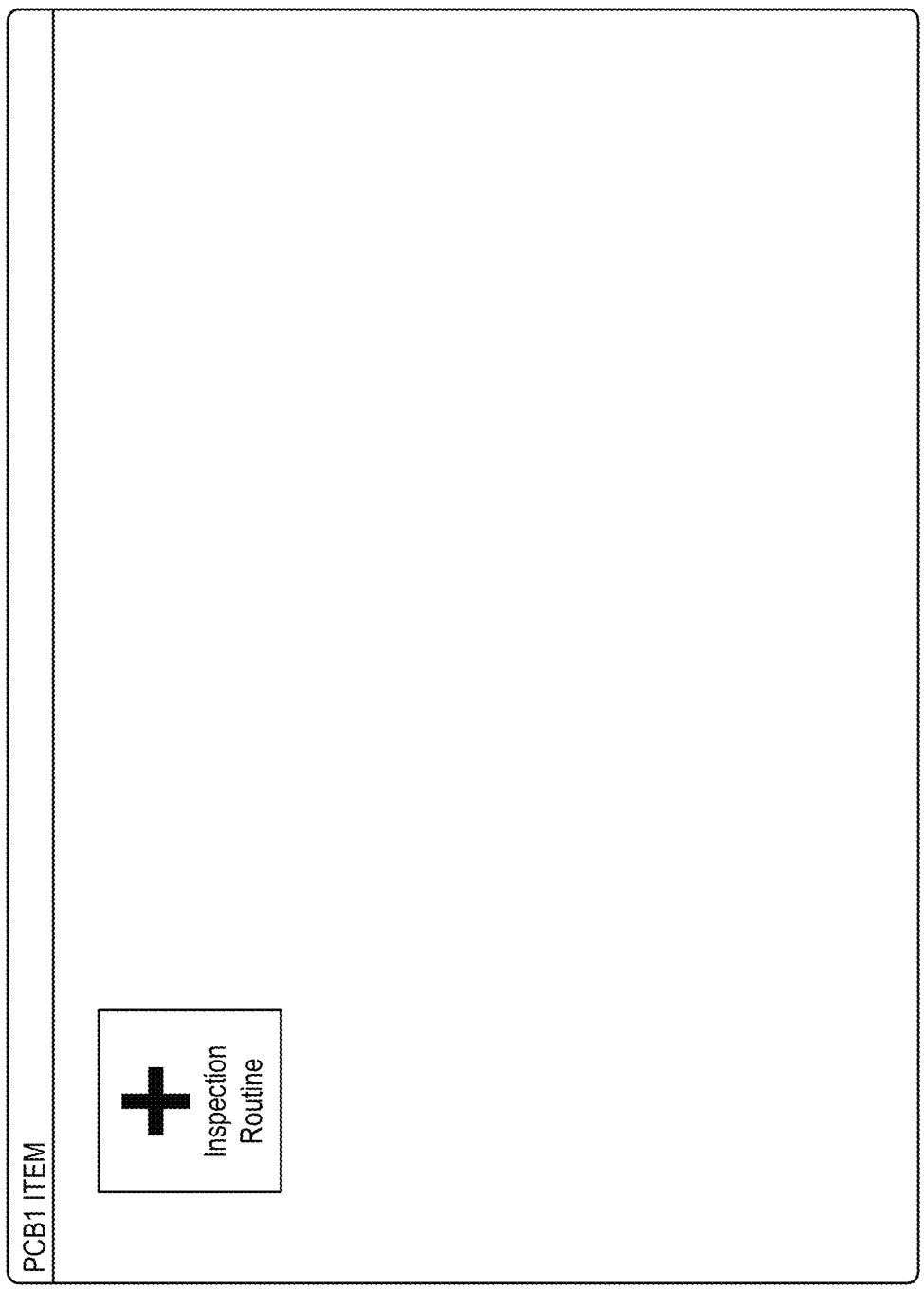
FIGS. 46-53 are examples of graphical user interfaces that may be used to generate an inspection path for a robotic system, in accordance with various embodiments.

FIG. 46 depicts a GUI 1000 that allows a user to define an inspection path for an item. An identifier of the item, "PCB1 Item" may have been previously provided to the user interface logic 162 (e.g., via another GUI, not shown). In use, a user may select the "+ Inspection Routine" element to begin to generate an inspection routine for the item.

Figure 47:
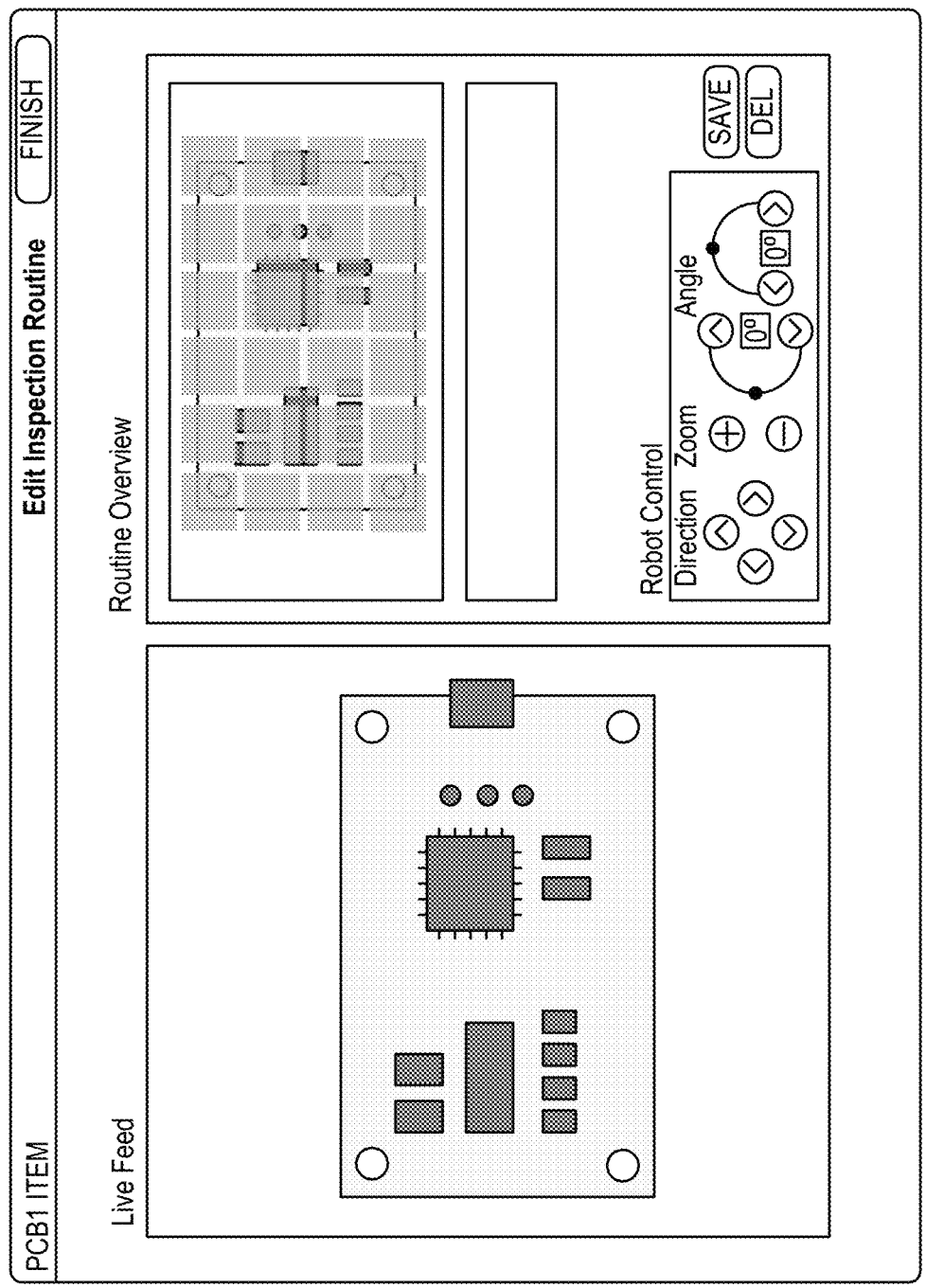

Upon selection of the "+ Inspection Routine" element of the GUI 1000 of FIG. 46, the user may be presented with the GUI 1002 of FIG. 47. The GUI 1002 may include a "Live Feed" showing the current view of a camera of the end effector 118 of the robotic apparatus 101 (showing the item, a PCB). The GUI 1002 may also include the results of the performance of the method 720 of FIG. 45 in a "Routine Overview" region. The "Routine Overview" region may show the overview image of the item with approximate coverage areas for each of the images to be captured by the inspection path (i.e., at the different locations of the inspection path generated by the method 720 of FIG. 45) shown as overlays over the overview image. In this manner, a user may see the images that will be captured upon execution of the automatically generated inspection path. The GUI 1002 also includes a "Robot Control" region that includes elements that a user may select in order to change the location of the end effector 118 (e.g., the (x, y) location), zoom in or out (e.g., by changing the distance to the surface of the item), and change the angle of the end effector 118 (e.g., the (r, p, w)); manipulation of these elements may cause the motion/position logic 132 to move the robotic apparatus 101 accordingly. The GUI 1002 may further include save ("SAVE") and delete ("DEL") elements to allow a user to save the current view in the "Live Feed" region as a new location in the inspection path, or to delete a location in the inspection path (e.g., by selecting a particular overlay in the "Routine Overview" region and then selecting the delete element).

Figure 48:
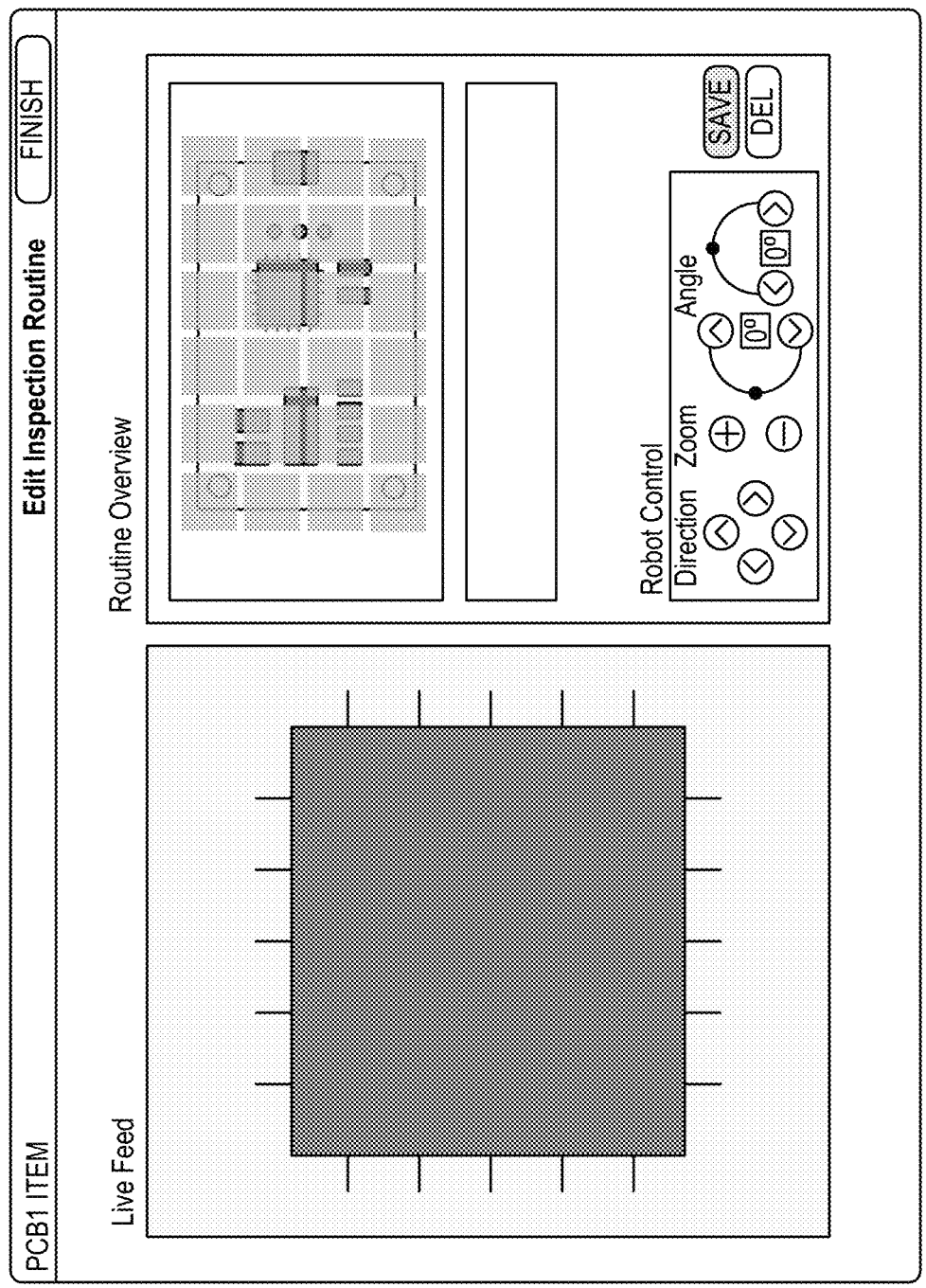

Upon using the controls in the "Robot Control" region to zoom and move the robotic apparatus 101 to zoom in on a particular portion of the item of the GUI 1002 of FIG. 47, the user may be presented with the GUI 1004 of FIG. 48.

Figure 49:
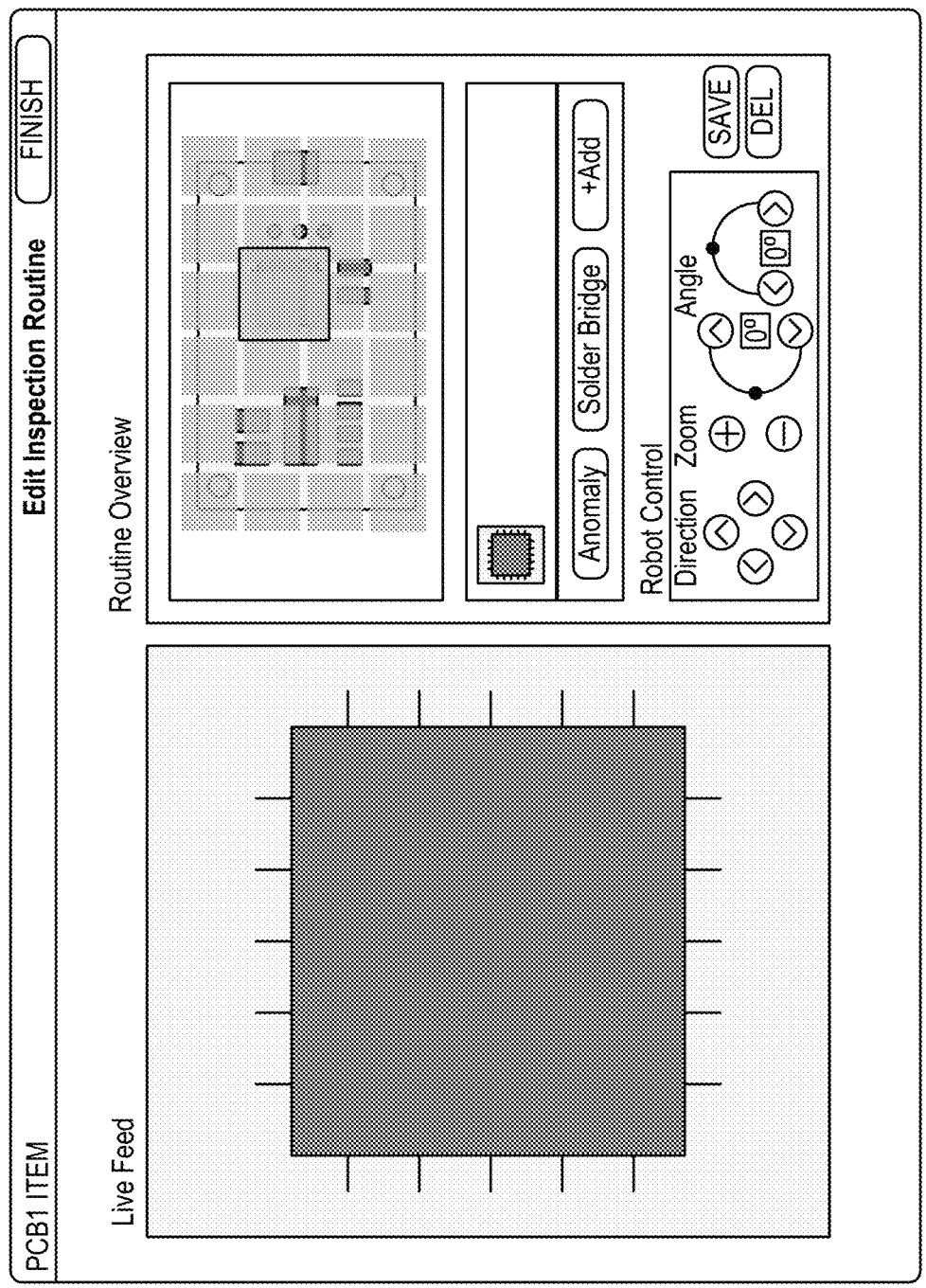

Upon selecting the save element of the GUI 1004 of FIG. 48, the user may be presented with the GUI 1006 of FIG. 49. In the GUI 1006, a new overlay has been added to the "Routine Overview" region, corresponding to the area currently highlighted in the "Live Feed" region and indicating that the location and angle of the end effector 118 at the time that the save element was selected has now been added to the inspection path. Further, the overlay associated with the new inspection path location may be highlighted, and the user may be presented with one or more inspection functions that may be applied to images captured at the new inspection path location. The GUI 1006 depicts "Anomaly" and "Solder Bridge" inspection functions, and also presents a selectable option "+Add" for a user to select from additional inspection functions. In some embodiments, a user may select multiple inspection functions for a particular angle of the inspection path.

Figure 50:
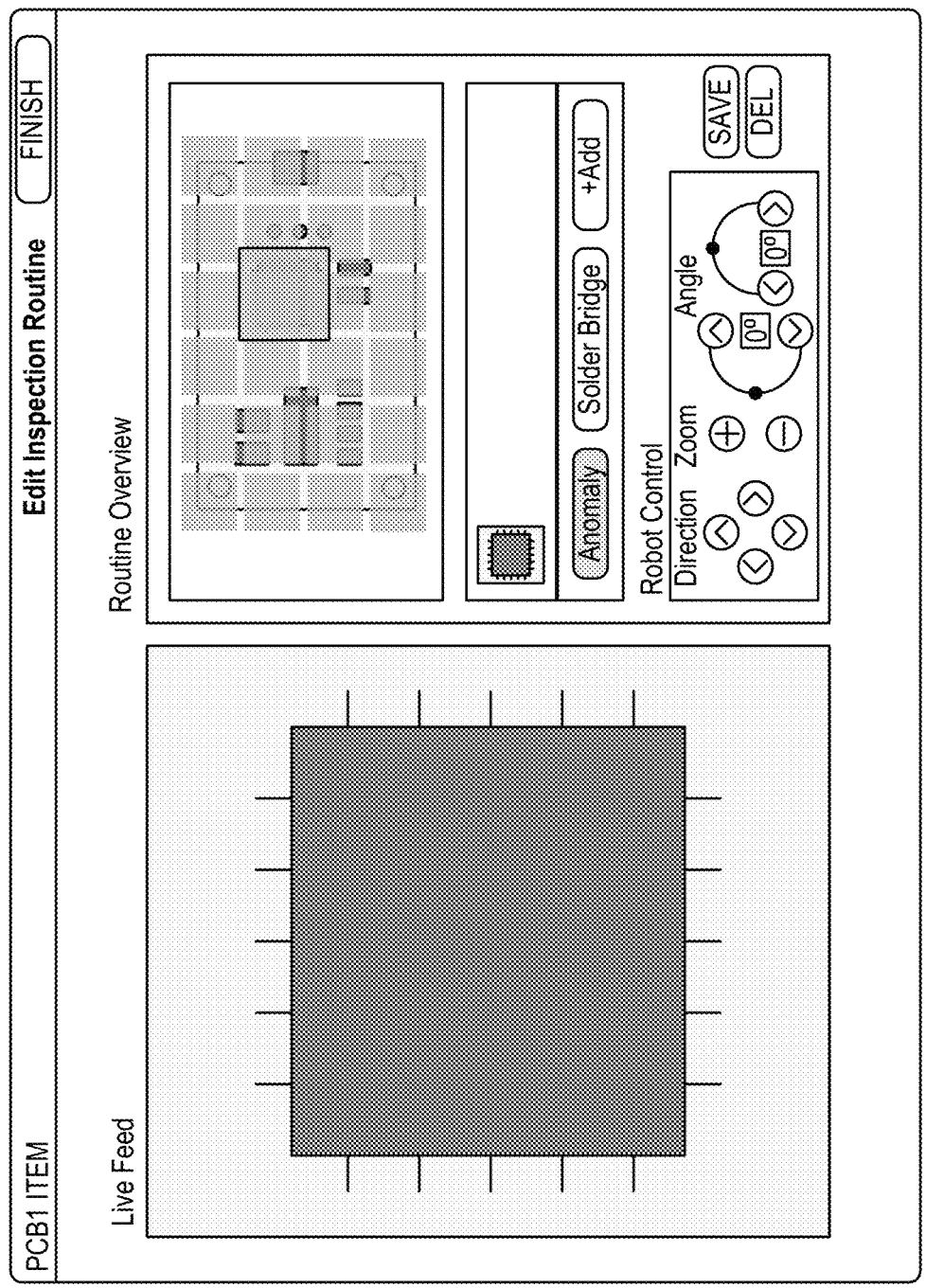

Upon selecting the "Anomaly" inspection function of the GUI 1006 of FIG. 49, the user may be presented with the GUI 1008 of FIG. 50.

Figure 51:
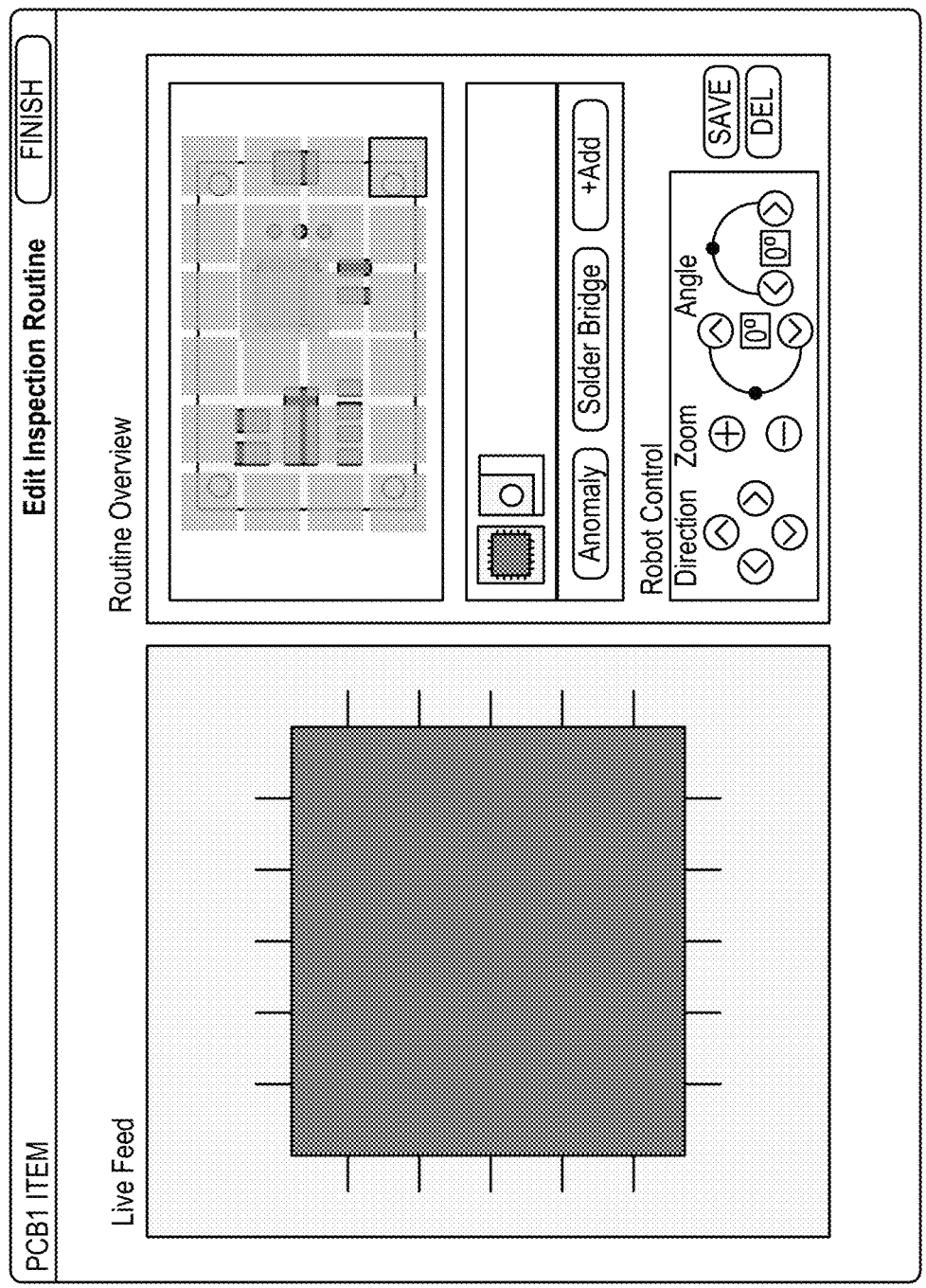

Upon selecting the bottom right hand overlay in the GUI 1008 of FIG. 50, the user may be presented with the GUI 1010 of FIG. 51. The bottom right hand overlay may be highlighted, and the user may be presented with one or more inspection functions that may be applied to images captured at this inspection path location.

Figure 52:
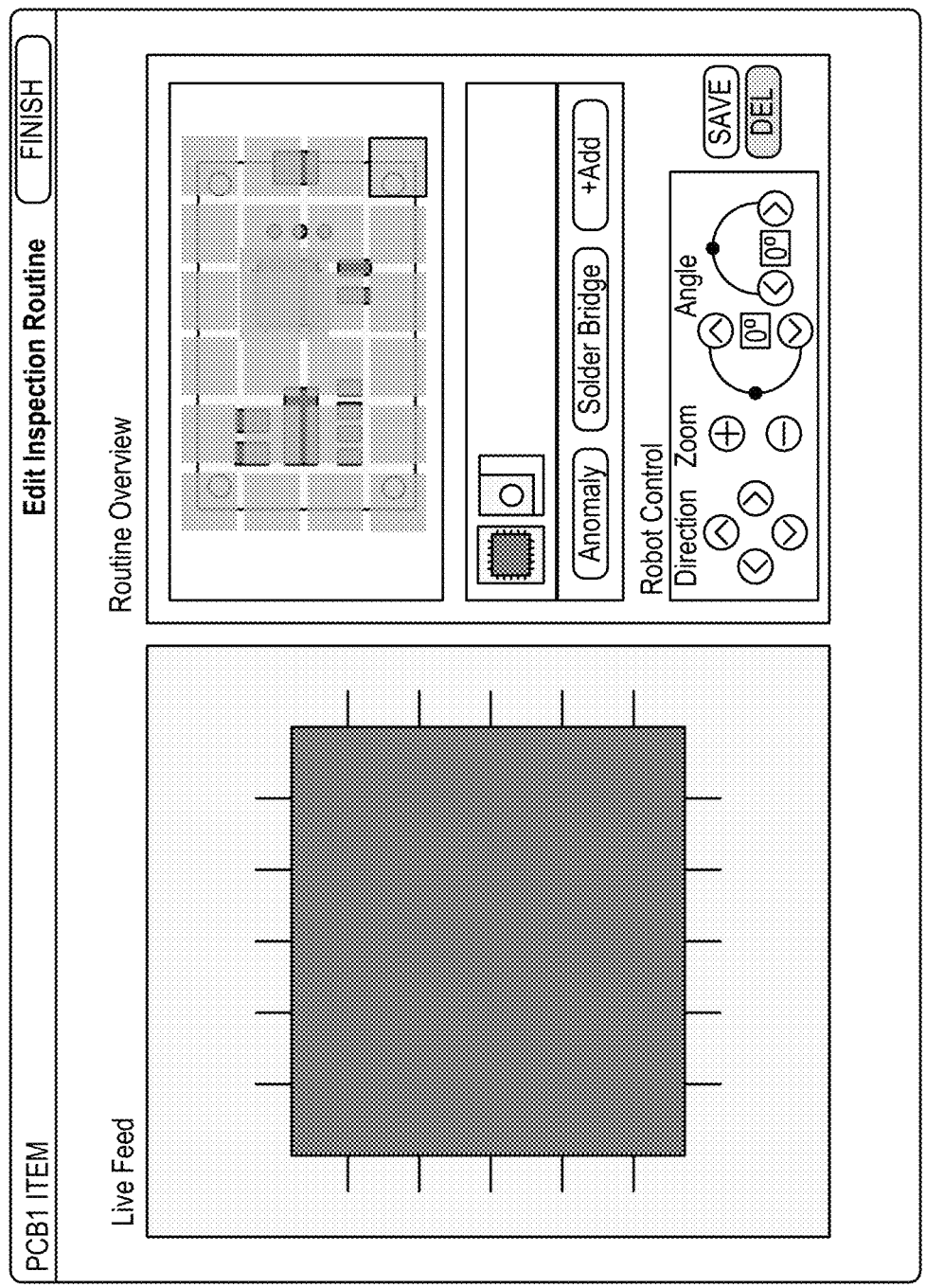
Figure 53:
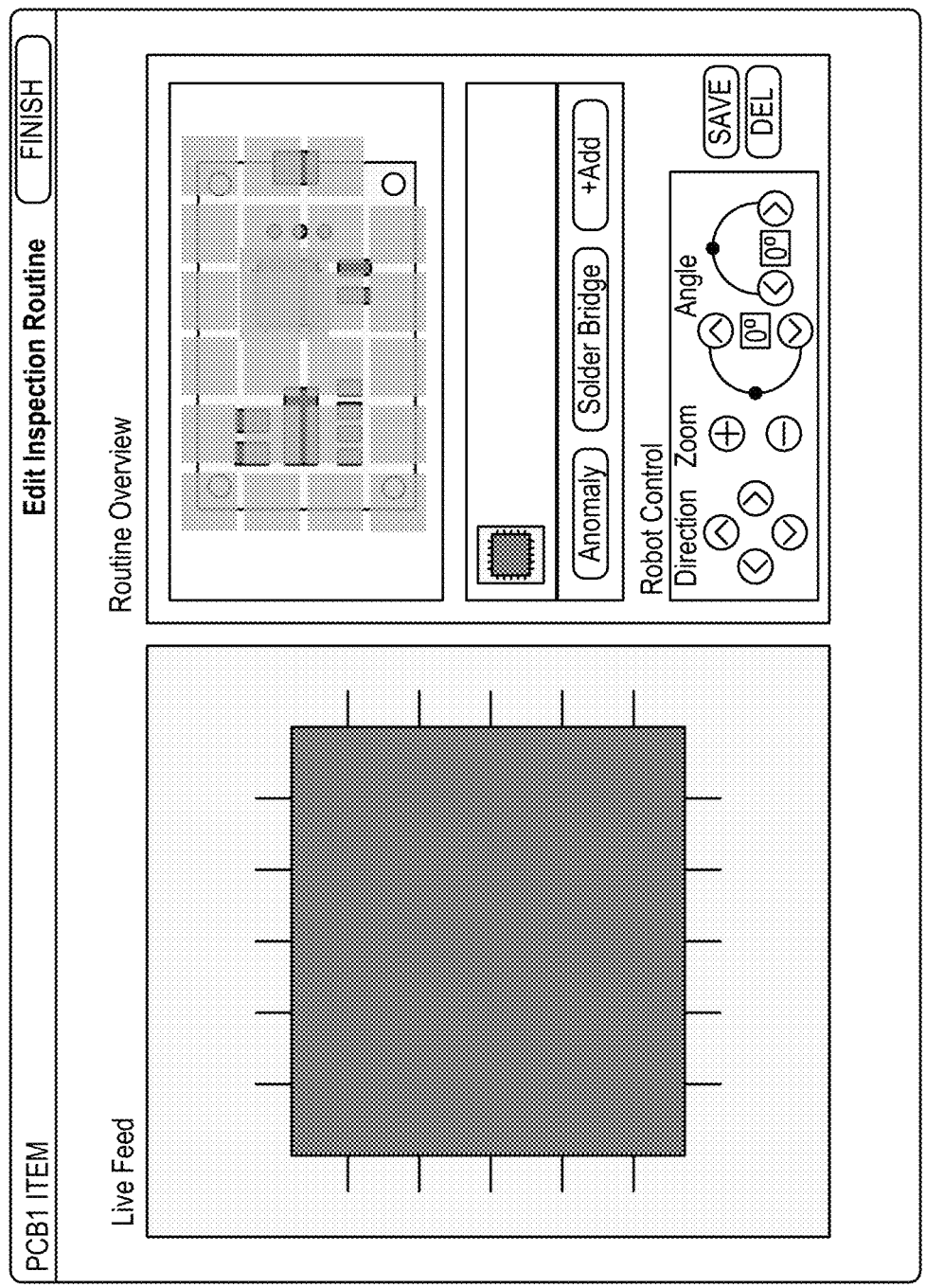

Upon selecting the delete element of the GUI 1010 of FIG. 51, the user may be presented with the GUI 1012 of FIG. 52, and then with the GUI 1014 of FIG. 53. In the GUI 1014 of FIG. 53, the overlay formerly at the bottom right hand corner of the "Routine Overview" region is gone, indicating that the location and angle associated with that overlay has been deleted from the inspection path. Using the GUIs of FIGS. 46-53, a user may add locations/angles to an inspection path, delete locations/angles from an inspection path, and select classifiers associated with each location/angle.

Figures 54, 55:
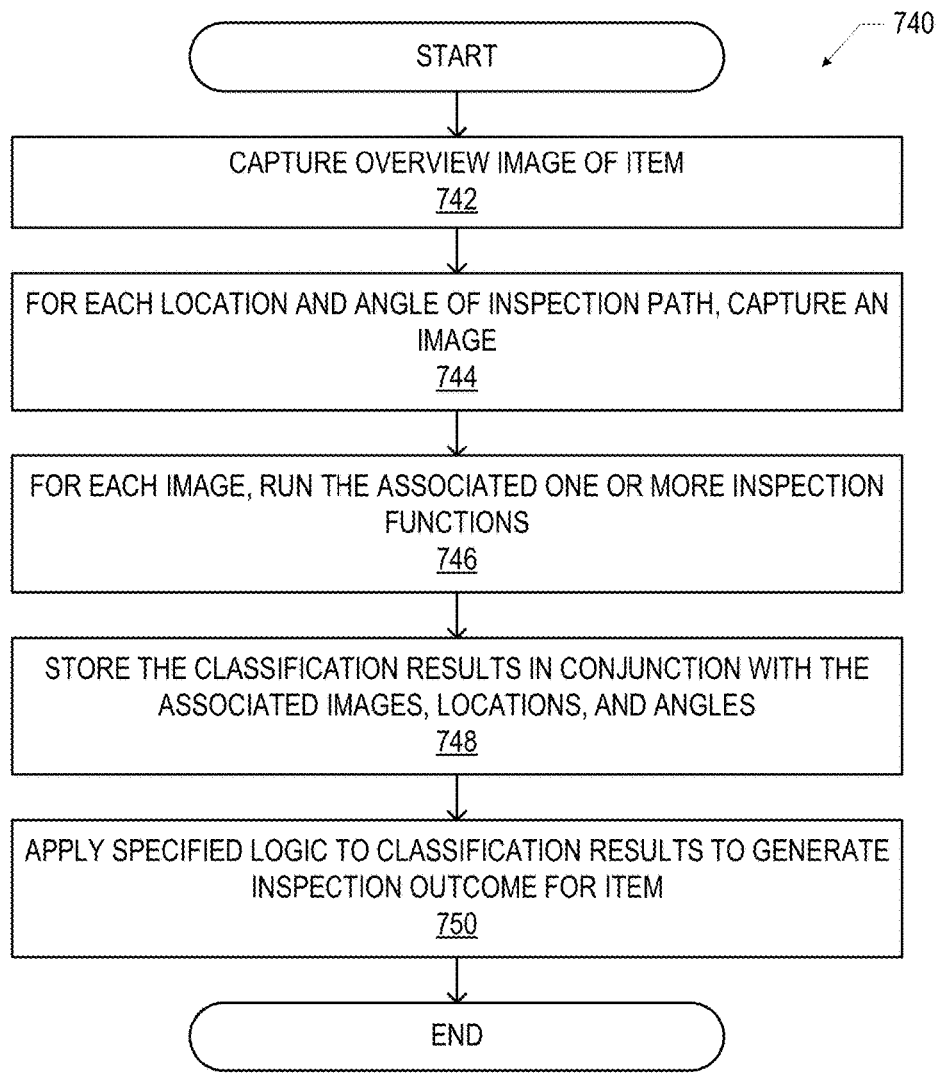
FIG. 54 is a flow diagram of a method of performing an inspection, by a robotic system, in accordance with an inspection path, in accordance with various embodiments.
FIG. 55 is an example data structure that may be used as part of an inspection performed by a robotic system, in accordance with various embodiments.

Once an inspection path is defined, the robotic system 100 may inspect items in accordance with the inspection path. Further, in some embodiments, the robotic system 100 may apply a set of specified logic to the classification results of an inspection in order to generate a particular inspection outcome for the inspected item (e.g., "pass," "fail," "Grade A," "Grade B," etc.). FIG. 54 is a flow diagram of a method 740 of performing an inspection, by a robotic system 100, in accordance with an inspection path, in accordance with various embodiments. The method 740 may be carried out by the inspection logic 160 of the system-level compute hardware 124 (which may or may not be located in the robotic apparatus 101), which may rely on the control logic 104 to reliably operate a robotic apparatus 101. Further, although various operations of the method 740 may be discussed with reference to "images" captured at "locations" and "angles," this is not intended to limit the use of this method to discrete, static images captured at disparate locations and angles, and any of the inspection methods disclosed herein (including the method 740) may be performed using video image capture.

At 742, an overview image of an item may be captured. For example, the inspection logic 160 may cause a camera of the end effector 118 to capture an image of the entire item to be inspected; this image may help users associate the outcome of the inspection with the particular item itself. The overview image may be stored in the system-level data storage 150.

At 744, for each location and angle of an inspection path, an image may be captured. For example, the inspection logic 160 may cause the robotic apparatus 101 to move through an inspection path, with a camera of the end effector 118 capturing an image of the item at each angle of the inspection path, as discussed above. The images captured may be stored in the system-level data storage.

At 746, for each image, one or more associated inspection functions may be run. For example, the inspection logic 160 may run one or more inspection functions on each image captured during the inspection path run (at 744). As discussed above, an inspection function may include a computational classifier; such a classifier may receive an image as an input, and may output a classification result (e.g., "pass," "fail," "anomaly detected," "grade A", "grade B," "unknown," etc.) in accordance with its training.

At 748, the classification results may be stored in conjunction with the associated images, locations, and angles. For example, FIG. 55 is an example data structure 408 that may be used as part of an inspection performed by a robotic system 100, in accordance with various embodiments. In particular, the data structure 408 may store the locations, associated angles, associated inspection functions, associated images, and associated results of running the inspection functions on the images. Data structures like the data structure 408 may be used by the inspection logic 160 to store inspection results in the system-level data storage 150.

Returning to FIG. 54, at 750, specified logic may be applied to the classification results to generate an inspection outcome for the item. The logic may be specified by a user (e.g., via a GUI) or automatically generated by the robotic system 100, applied by the inspection logic 160, and indicated to the user (e.g., via a GUI or report). For example, the logic may specify that if any one of the classification results for an item indicates that an anomaly has been detected, the inspection outcome for that item is "fail." In another example, the logic may specify that if any of the classification results for an item indicates that a solder bridge has been detected, and that none of the classification results indicate that another anomaly has been detected, the inspection outcome for that item is "send item for repair." In another example, the logic may specify that if the number of anomalies detected for an item is under a threshold number, the inspection outcome for that item is "first class," while if the number of anomalies detected for the item is greater than the threshold number, the inspection outcome for that item is "second class." These are simply examples, and any suitable logic may be used to generate any type of inspection outcome based on the classification results for that item. The inspection logic 160 may store the inspection outcome for an item in the system-level data storage 150.

Figure 56:
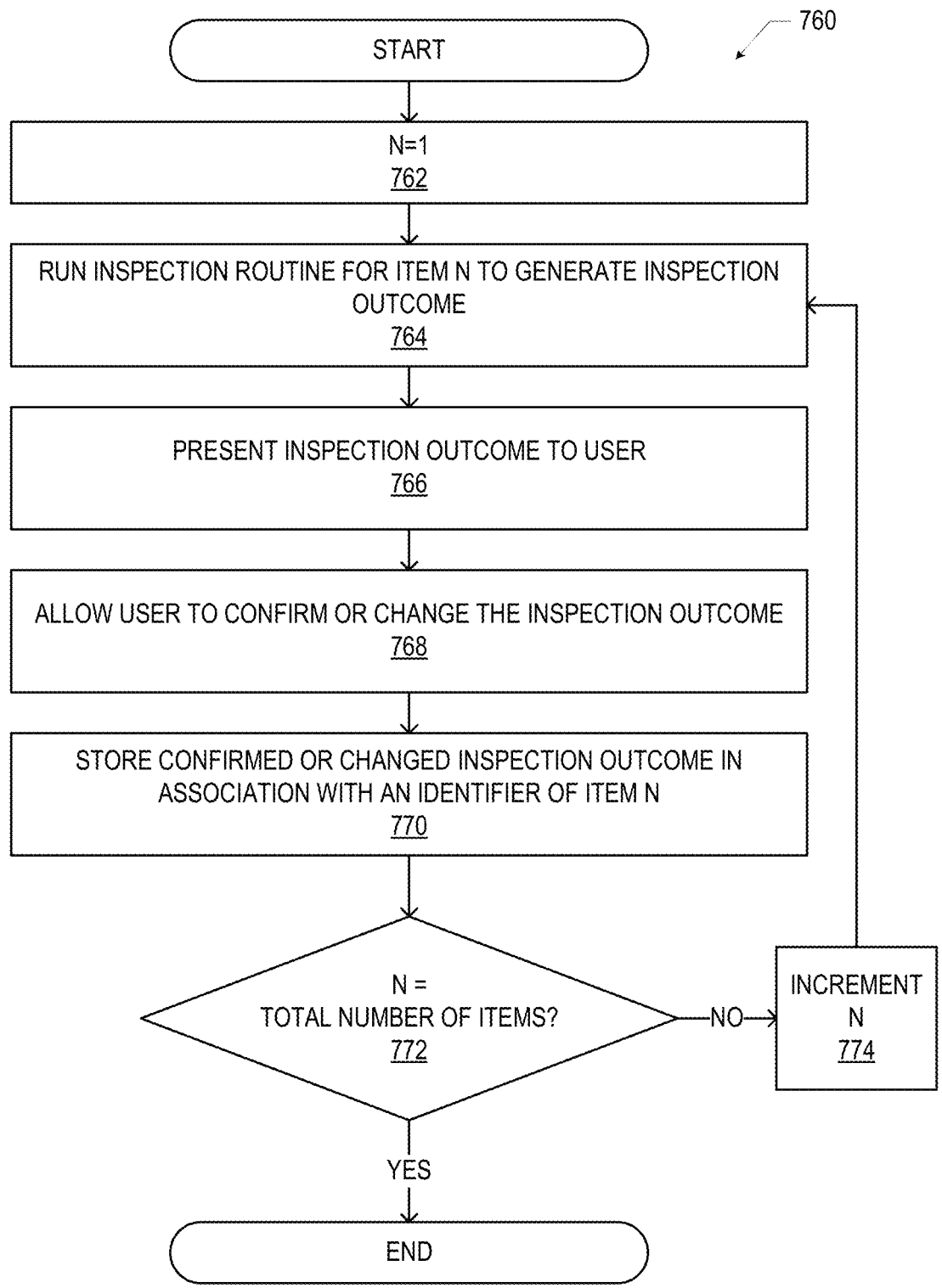
FIG. 56 is a flow diagram of a method of robot-aided inspection, in accordance with various embodiments.

The inspection process of the method 740 of FIG. 54 may be used to inspect multiple instances of an item (e.g., multiple PCBs manufactured to nominally have the same structure) as part of a human-in-the-loop inspection process that allows trained human inspectors to utilize their inspection expertise while accelerating the inspection process. FIG. 56 is a flow diagram of a method 760 of robot-aided inspection, in accordance with various embodiments. The method 760 may be carried out by the inspection logic 160 of the system-level compute hardware 124 (which may or may not be located in the robotic apparatus 101), which may rely on the control logic 104 to reliably operate a robotic apparatus 101.

At 762, a counter variable N may be set equal to an initial value (e.g., 1). For example, the inspection logic 160 may initialize a counter variable N to count through the instances of an item to be inspected by a robotic system 100, as discussed further below.

At 764, an inspection routine may be run on item N to generate an inspection outcome. For example, the inspection logic 160 may perform an inspection routine like the method 740 of FIG. 54 on an item N to generate an inspection outcome for the item N.

At 766, the inspection outcome may be presented to a user. For example, the inspection logic 160 may provide a GUI that includes one or more images of the item N and the inspection outcome for the item N. In some embodiments, a user may be allowed to select, via a GUI, to display images whose proposed classifications are "fail," images whose proposed classifications are "pass," images whose proposed classifications are "unknown," or any other subset of the images based on their classification result.

At 768, the user is allowed to confirm or change the inspection outcome. For example, the inspection logic 160 may provide a GUI that allows a user to confirm or change the inspection outcome for the item N (e.g., based on the user's knowledge of an appropriate outcome for the item N).

At 770, the confirmed or changed inspection outcome may be stored in association with an identifier of the item N. For example, the inspection logic 160 may store an identifier of the item N (e.g., a serial number) in association with the inspection outcome decided at 768. Note that, in some embodiments, confirming or changing an inspection outcome at 768 and 770 may include confirming or changing the classification results themselves, instead of or in addition to confirming or changing the inspection outcome itself. Examples of such embodiments are discussed below with reference to FIGS. 58-59.

At 772, it may be determined whether the counter variable N is equal to the total number of items (and thus that all items have been inspected). If it is determined that the counter variable N is not equal to the total number of items (and thus that all items have not yet been inspected), the method 760 may proceed to 774, at which the counter variable N may be incremented. In some embodiments, the voice command logic 170 may recognize a "next item" voice command that may restart the inspection process for another instance of the item. The method 760 may then return to 764. If it is determined at 772 that the counter variable N is equal to the total number of items (and thus that all items have been inspected), the method 760 may end.

FIGS. 57-60 are examples of GUIs that may be used during robot-aided inspection (e.g., as discussed above with reference to the method 760 of FIG. 56), in accordance with various embodiments. In some embodiments, a tablet or laptop computing device, or a desktop computing device with an associated touchscreen display, may provide an I/O device 120 through which the GUIs of FIGS. 57-60 may be run; in some embodiments, the tablet, laptop, or desktop computing device may provide some or all of the system-level compute hardware 124 and some or all of the system-level data storage 150. The GUIs may be provided by the user interface logic 162 in conjunction with the inspection logic 160. In some embodiments, the GUIs may be provided on a touchscreen display communicatively coupled, and proximate to, the robotic apparatus 101.

Figure 57:
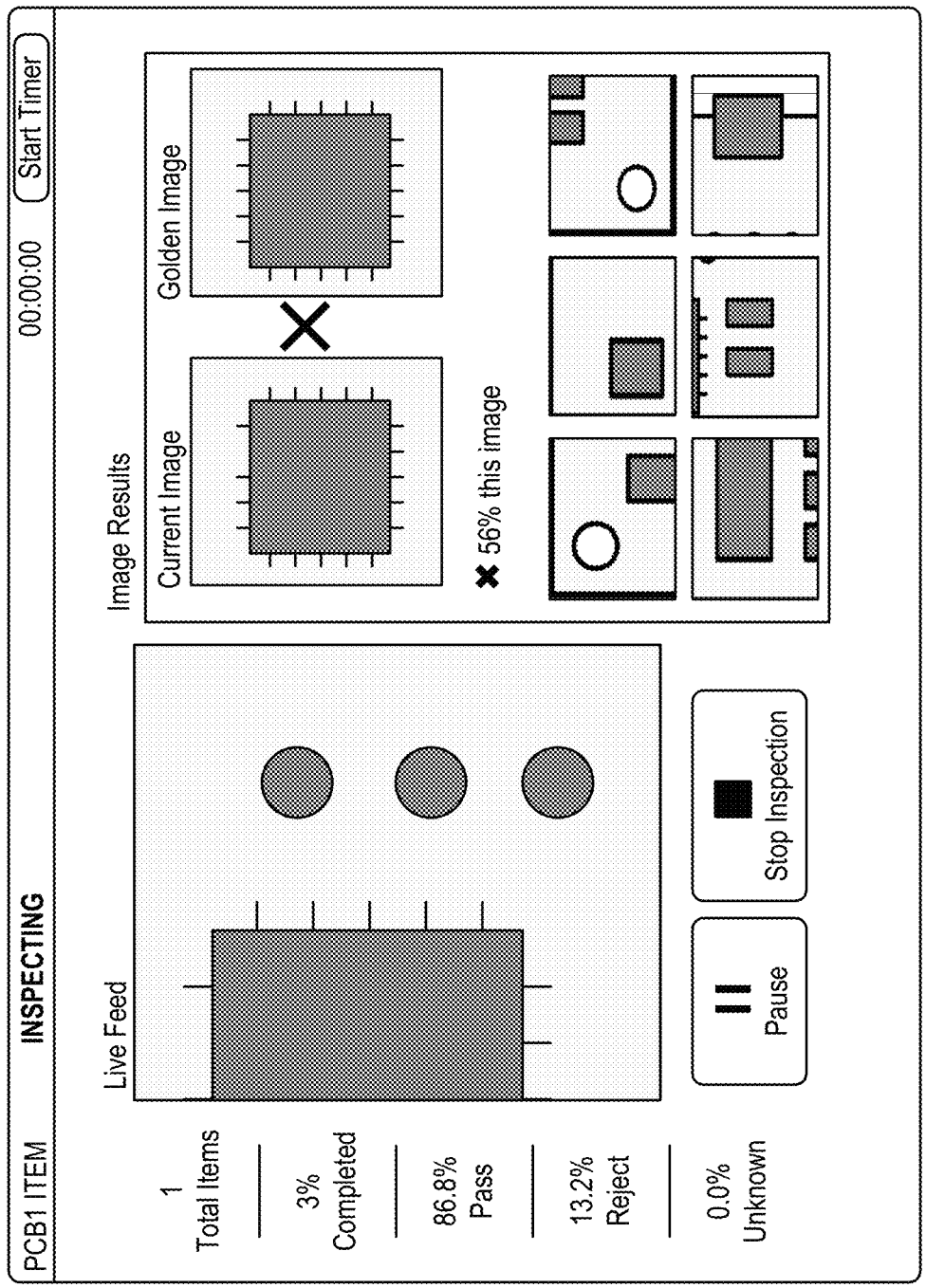
FIGS. 57-60 are examples of graphical user interfaces that may be used during robot-aided inspection, in accordance with various embodiments.

FIG. 57 depicts a GUI 1016 that may be used to facilitate robot-aided inspection, as discussed above. The GUI 1016 may include a "Live Feed" showing the current view of a camera of the end effector 118 of the robotic apparatus 101 (showing the item, a PCB). A timer in the upper righthand corner may be used to track the total inspection time, as desired. On the left side of the GUI 1016, inspection statistics are provided, including the number of items inspected in a current session, the percentage of the total number of items whose inspection has been completed, the cumulative percentage of items whose inspection outcome has been "pass," the cumulative percentage of items whose inspection outcome has been "reject," and the cumulative percentage of items whose inspection outcome has been "unknown." Control buttons ("Pause" and "Stop Inspection") may allow the user to control the flow of the inspection session; in some embodiments, "pause" and "stop" voice commands may be recognized by the voice command logic 170, in addition to the GUI. The GUI 1016 also includes an "Image Results" region that includes the most recently captured image of the item ("Current Image," associated with a particular location/angle of the inspection path, as discussed above) displayed next to a corresponding image of a known-good item ("Golden Image") so that a user may readily visually compare the two. An indicator between the two images indicates the classification result of the "Current Image"; in the case of the GUI 1016 of FIG. 57, the "X" indicates that the "Current Image" has been classified as "fail" (e.g., "anomaly detected"). A statistic below the "Current Image" indicates the percentage of images taken from this same location/angle for different items that are classified as "fail." The array of images below the statistic in the "Image Results" region are previously captured images of the item currently under inspection (i.e., images captured at earlier locations/angles in the inspection path).

Figure 58:
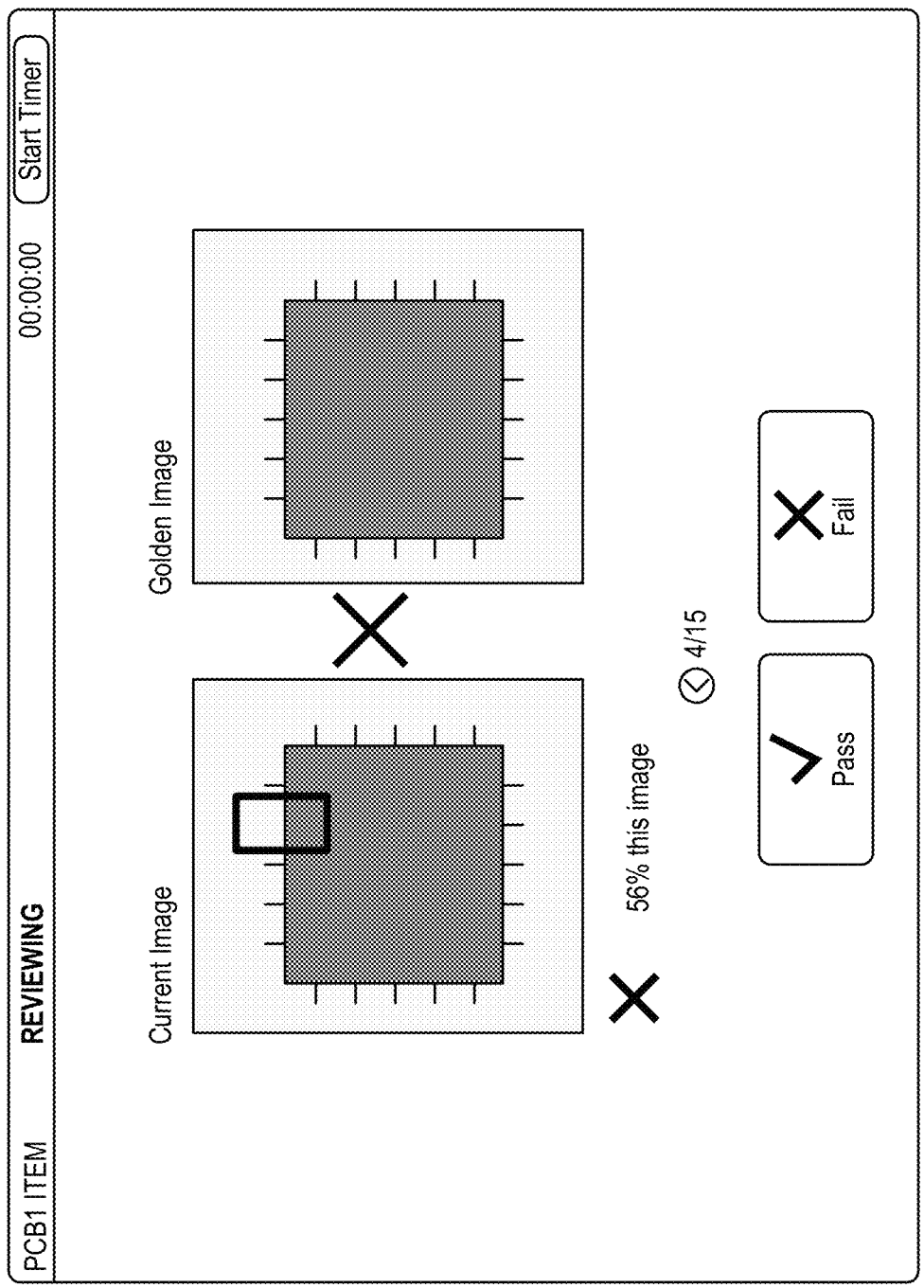

FIG. 58 depicts a GUI 1018 that may be used to facilitate robot-aided inspection; the GUI 1018 may be used after the inspection path has been run (e.g., in accordance with the method 740 of FIG. 54 and using the GUI 1016 of FIG. 57) and as part of a human user review process, as discussed above with reference to the method 760 of FIG. 56. The GUI 1018 may include the most recently captured image of the item ("Current Image," associated with a particular location/angle of the inspection path, as discussed above) displayed next to a corresponding image of a known-good item ("Golden Image") so that a user may readily visually compare the two. An indicator between the two images indicates the classification result of the "Current Image"; in the case of the GUI 1018 of FIG. 58, the "X" indicates that the "Current Image" has been classified as "fail" (e.g., "anomaly detected"). A statistic below the "Current Image" indicates the percentage of images taken from this same location/angle for different items that are classified as "fail." FIG. 58 also depicts a highlight box on a particular portion of the "Current Image," indicating the portion of the image that cased the "fail"; such a highlight box may be the result of a component detection process performed as part of the classification, as discussed below with reference to 786 of the method 780 of FIG. 61. The user may be given selectable options ("Pass" and "Fail") that they may use to confirm or change the classification result. The GUI 1018 also includes an option to return to classification results of previously considered images ("<4/15") if the user wishes to revisit her previous confirmations/changes. In some embodiments, in order for a user to evaluate the next classification result associated with the inspection path, the user must confirm or change the classification result currently presented in the GUI 1018.

Figure 59:
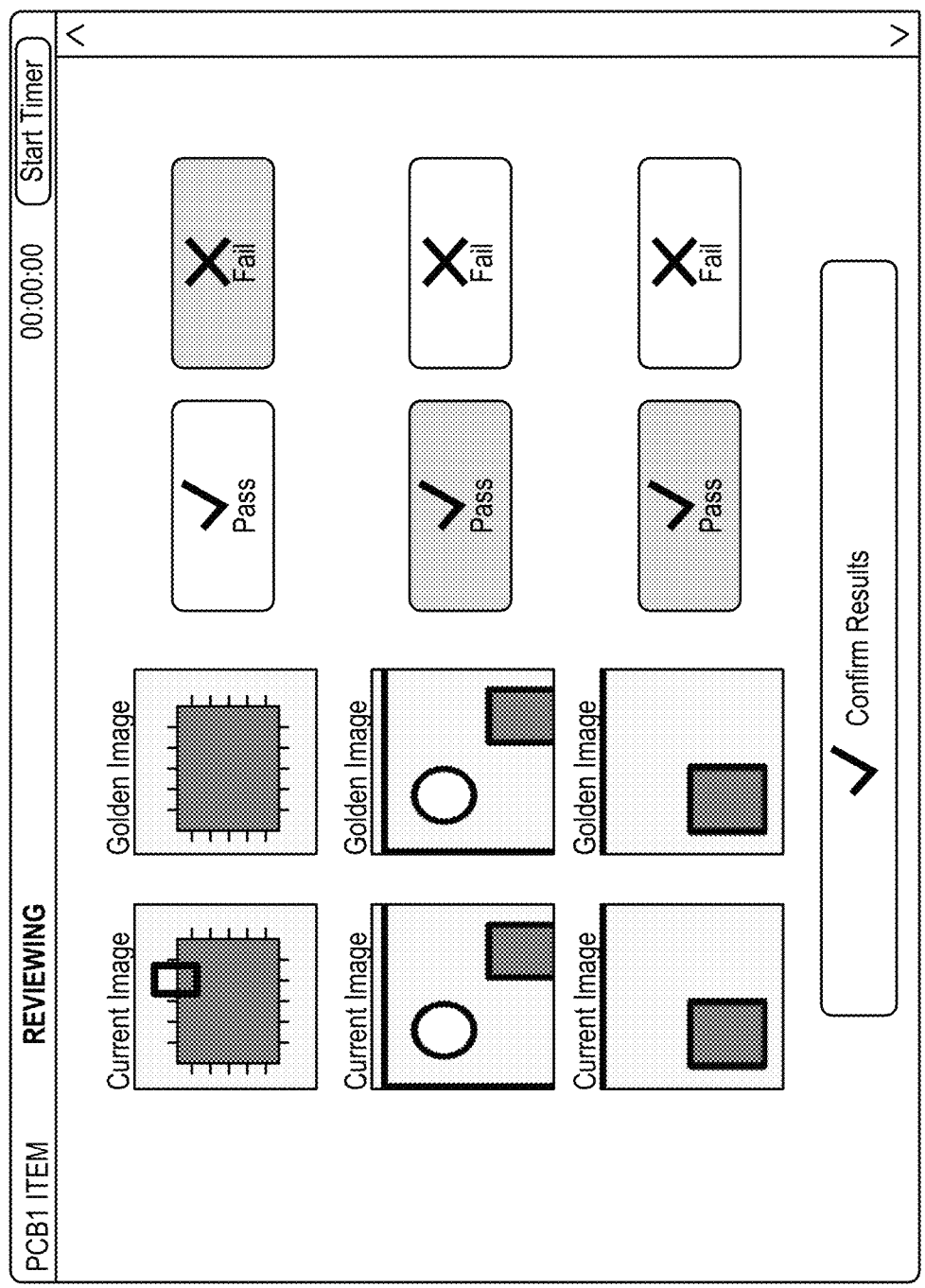

FIG. 59 depicts a GUI 1020 that may be used to facilitate robot-aided inspection; the GUI 1020 may be used after the inspection path has been run (e.g., in accordance with the method 740 of FIG. 54 and using the GUI 1016 of FIG. 57), and after the classification results have been confirmed or changed by a user (e.g., in accordance with the method 760 of FIG. 56 and using the GUI 1018 of FIG. 58), to perform a final review of the inspection of the item. The GUI 1020 may include a scrollable list of captured images of the item ("Current Image," associated with a particular location/angle of the inspection path, as discussed above) displayed next to a corresponding image of a known-good item ("Golden Image") so that a user may readily visually compare the two. An indicator beside each pair of two images indicates the confirmed/changed classification result of the "Current Image," as confirmed or changed by the user as discussed above with reference to the method 760 of FIG. 56 and the GUI 1018 of FIG. 58. In the case of the GUI 1020 of FIG. 59, an "X" indicates that the "Current Image" has been classified as "fail" (e.g., "anomaly detected") and a checkmark indicates that the "Current Image" has been classified as "pass" (e.g., "no anomaly detected"). The user may have an opportunity to review all of the classification results (and edit them, if needed) before she selects "Confirm Results."

Figure 60:
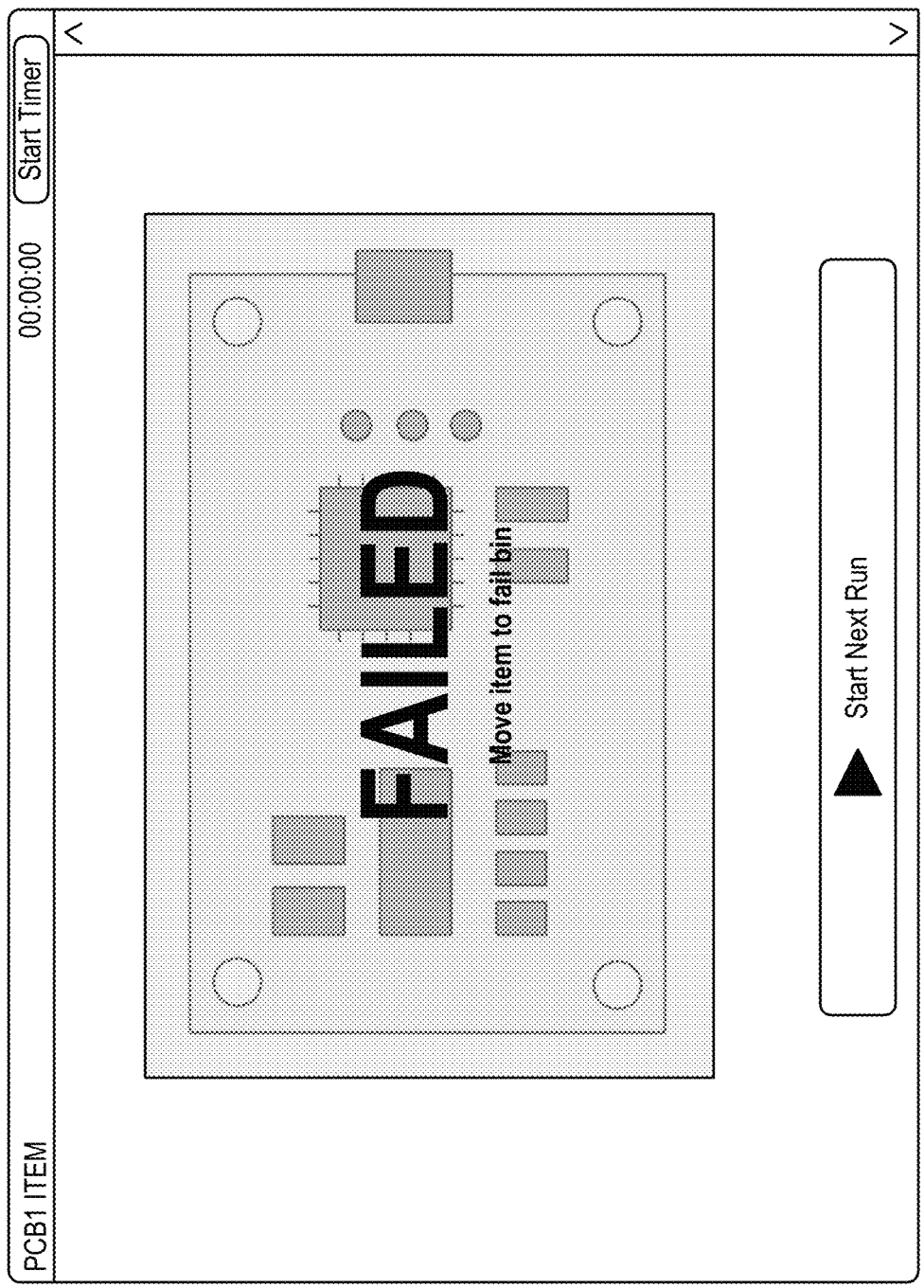

Upon selection of "Confirm Results" in the GUI 1020 of FIG. 59, the GUI 1022 of FIG. 60 may be presented. The GUI 1022 may include the overview image of the inspected item, along with the inspection outcome (i.e., "FAILED"). The GUI 1022 may also include a selectable option for the user to inspect another item. The process discussed with reference to the GUIs of FIGS. 56-60 may be repeated for any number of instances of a particular item. Further, the inspection outcome/classification results of a particular item may be reviewed as or immediately after the item is inspected, or multiple items may be inspected and then the inspection outcome/classification results for the multiple items may be reviewed.

Figure 61:
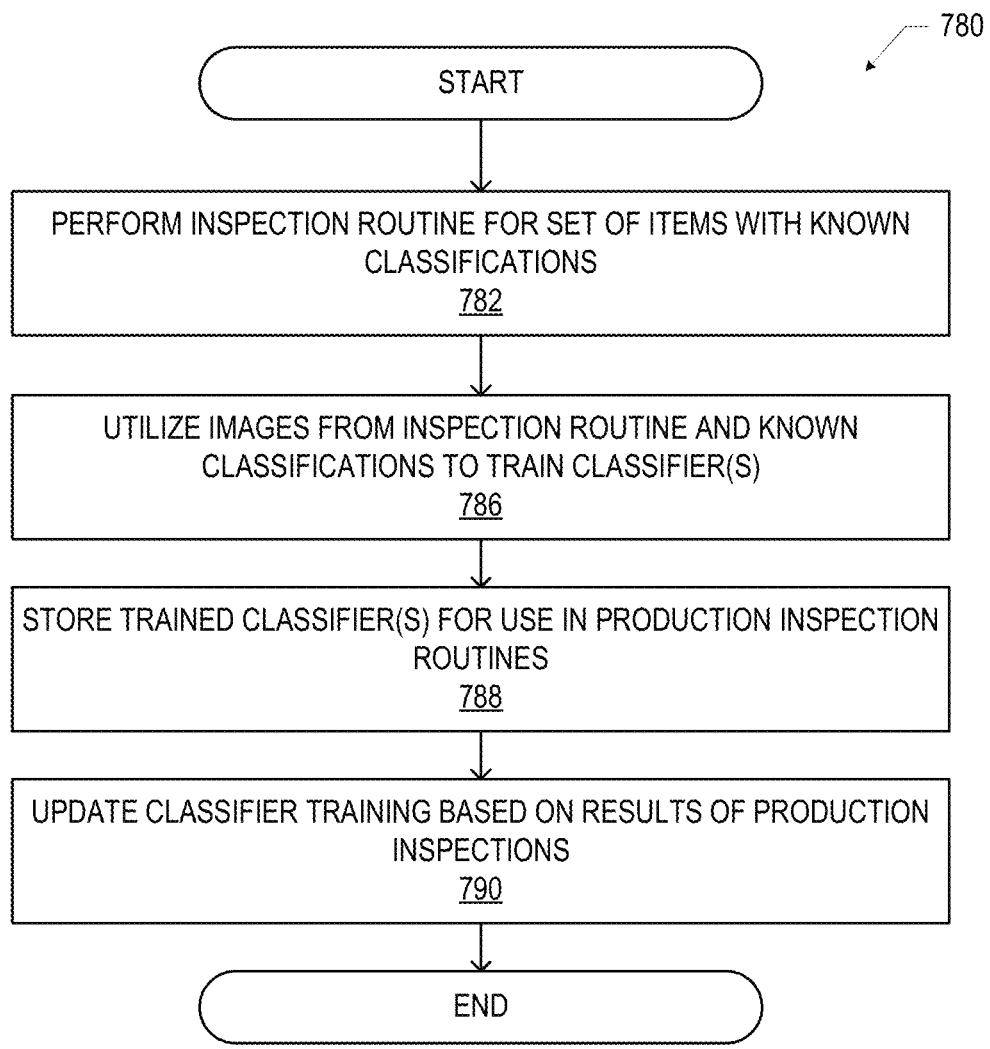
FIG. 61 is a flow diagram of a method of training classifiers for use with a robot-aided inspection system, in accordance with various embodiments.

In embodiments in which an inspection function includes computational classifier, such a classifier may be trained by running through test inspections and receiving input from experienced human users as to the proper classifications; this corpus of data may then be used to train the classifiers for use in a production inspection process. FIG. 61 is a flow diagram of a method 780 of training classifiers for use with a robot-aided inspection system (e.g., the robotic system 100), in accordance with various embodiments. The method 780 may be carried out by the inspection logic 160 of the system-level compute hardware 124 (which may or may not be located in the robotic apparatus 101), which may rely on the control logic 104 to reliably operate a robotic apparatus 101.

At 782, an inspection routine may be performed for a set of items with known classifications. In some embodiments, the inspection routine may be performed without the classification operations; for example, the method 740 of FIG. 54, minus the operations of 746-750, may be performed on a set of items with known classifications (e.g., "known-good" items, items with specific known defects, etc.). In other embodiments, the inspection routine may be performed with the classification operations (e.g., in accordance with the method 740 of FIG. 54); when the untrained classifiers attempt to classify an image, the result will likely be a classification of "unknown" until a training corpus is developed (as discussed below). When an anomaly detection classifier is being trained, for example, 10 to 100 "known-good" items may be inspected, with the classification results provided in advance or by a user in response to "unknown" classification results from the untrained classifier, as discussed below.

At 786, the images from the inspection routine, and the known classifications, may be used to train classifier(s). For example, the inspection logic 160 may provide the images and the known classifications as inputs to a classifier training routine; the classifiers to be trained may be specified as part of the inspection path, as discussed above with reference to the method 710 of FIG. 42 and various ones of the accompanying GUIs. In embodiments in which the classification operations were not performed at 784, the classification results may be manually provided to the inspection logic 160 (e.g., all "pass" results). In embodiments in which the classification operations were performed at 784, and the classifiers returned "unknown," a human user may be prompted (e.g., via a GUI) to select a classification result for each image based on their inspection expertise (e.g., using GUIs like those of FIGS. 57-59, where the classifiers return "unknown" and the user is able to select an appropriate classification result). This entered result will then be used to train the classifiers used in one or more inspection functions. Alternately, in some embodiments, when items are being scanned for training, all of the images of these items may be automatically marked "pass" in a GUI; a user may manually mark some of the images as "fail" based on their expertise, and the user may then mark the results as a training run or otherwise certify the results.

In some embodiments, an inspection function may include performing a component detection technique on the images before providing them to a computational classifier or otherwise performing further analysis. For example, when the item being inspected is a PCB, an inspection function may include performing a component detection technique such as R-CNN to identify components of the PCB, and then execution of different anomaly detection classifiers on images of the different individual components. In other embodiments, an inspection function may utilize additional information about the PCB (such as a Gerber file, a drill file, or a pick-and-place file) to identify particular components of the item, and then images of the individual components may be further analyzed (e.g., provided to an anomaly detection classifier for that particular component). In other embodiments, bounding boxes around different components may be manually entered into the robotic system 100 and stored for use during the execution of various inspection functions.

The classifiers that may be trained at 786 (and thereafter used during inspection) may include any suitable classifiers. For example, an anomaly detection neural network may be trained to detect anomalies in a set of images of an item. Further, as noted above, examples of specific defects for which classifiers may be trained include solder bridges, bent pins, scratched lenses, etc. In some embodiments, Generative Adversarial Networks (GAN) or other data generation techniques may be used to augment the training data set to reduce the number of items that need to be inspected before a classifier is trained adequately enough for use in production. In some embodiments, a classifier trained at 786 may be a "single-shot" classifier in which a single "known-good" image is provided to the classifier, against which other images may be compared in an embedded space; such an approach may have particularly low training data requirements.

At 788, the trained classifiers may be stored for use in production inspection routines. For example, the inspection logic 160 may store the trained classifiers in the system-level data storage 150 for use in future inspection routines (e.g., when an inspection function that utilizes that classifier is called).

At 790, the training of the classifiers may be updated based on the results of production inspections. For example, the inspection logic 160 may store the confirmed or changed classification results in conjunction with the associated images, as discussed above with reference to the method 760 of FIG. 56 and the GUIs of FIGS. 57-60, and these confirmed/changed classification results and images may be input to a classifier training routine (e.g., at the end of each business day or inspection shift) to update the training of the classifier with the input from the trained human inspectors. The updated trained classifiers may then be used in the next set of production inspections, and this process may continue during production, with the performance of the classifiers continuing to improve as inspection routines are repeated.

As noted above, any suitable end effector 118 may be used with a robotic apparatus 101 to enable the robotic apparatus 101 to perform a desired task. For example, various examples of end effectors 118 including depth sensors 264, lasers 266, and/or cameras 268 (used, e.g., for calibration and item inspection purposes) have been discussed. FIGS. 62-69 illustrate various end effectors 118 that may be part of a robotic apparatus 101 and controlled by the end effector logic 142 during operation of a robotic system 100. Any of the end effectors 118 disclosed herein may include, or may be modified to include, additional degrees of freedom; for example, any of the end effectors 118 disclosed herein may include one or more controllable gimbals to enable the rotation of some or all of the remaining elements of the end effector 118. Thus, the degrees of freedom of the robotic apparatus 101 may be extended by including an end effector 118 that brings additional degrees of freedom.

Figure 62:
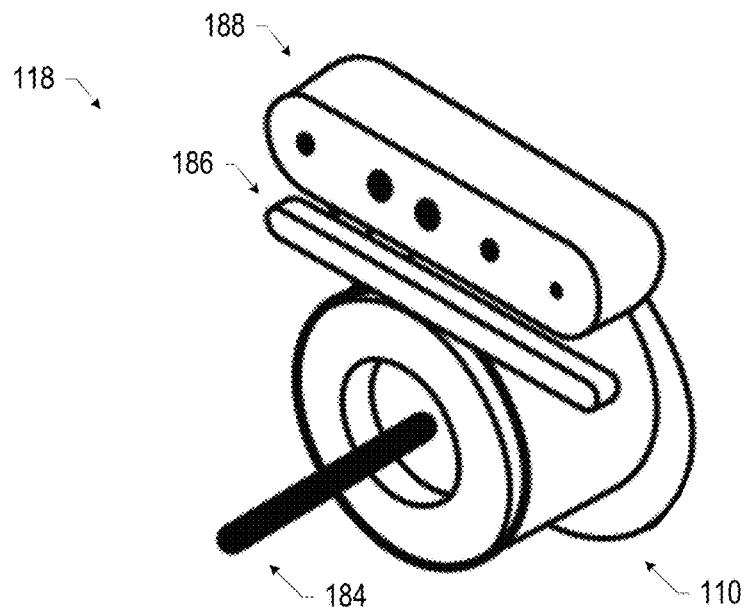
FIG. 62 is a perspective view of an example end effector that may be used in a robotic system, in accordance with various embodiments.
Figure 63:
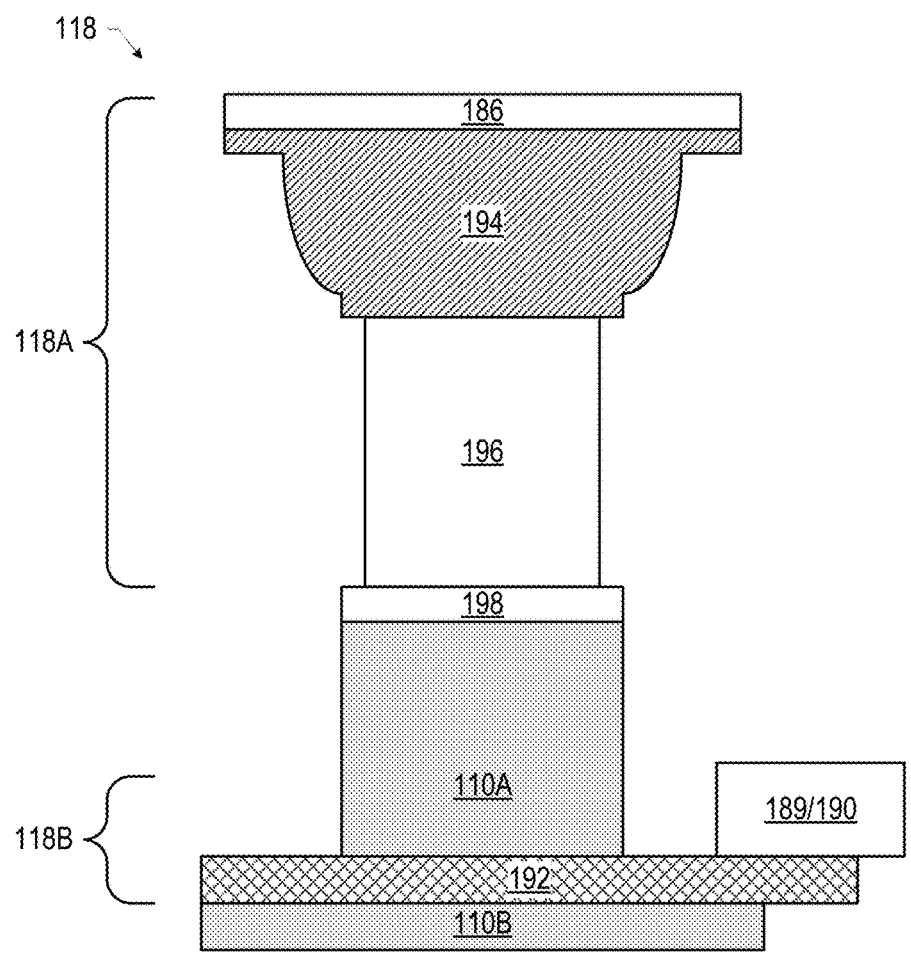
FIGS. 63-65 are various views of an example end effector that may be used in a robotic system, in accordance with various embodiments.

FIG. 62 is a perspective view of an example end effector 118 that may be used in a robotic system 100, in accordance with various embodiments. The end effector 118 of FIG. 63 is shown as mounted on a segment 110 of a robotic apparatus 101 (e.g., the segment 110-4 of the gantry-type robotic apparatus 101 of FIG. 3, or the segment 110-6 of the arm-type robotic apparatuses 101 of FIGS. 4-6). The end effector 118 of FIG. 63 may include an object manipulator 184, a lighting device 186, and a depth sensor 188. The object manipulator 184 may be any suitable device for picking up or otherwise moving an object (e.g., moving an item during an inspection process). An object manipulator 184 may be controlled by the object manipulation logic 166 and/or by the inspection logic 160, for example. In some embodiments, an object manipulator 184 may be a magnetic manipulator whose magnetic strength may be adjusted by electrical signals provided to the object manipulator 184; for example, the magnetic strength of the object manipulator 184 may be increased to allow the object manipulator 184 to pick up a magnetic object by magnetic force, and the magnetic strength of the object manipulator 184 may be decreased to allow the object manipulator 184 to release the magnetic object. In some embodiments, an object manipulator 184 may use adjustable vacuum suction to move an object; for example, the amount of suction generated at the end of a suction arm of the object manipulator 184 may be increased by a vacuum system (e.g., a pump) to pick up an object by suction force, and the amount of suction generated at the end of the suction arm of the object manipulator 184 may be decreased by the vacuum system to allow the object manipulator 184 to release the object. Other types of object manipulators 184 (e.g., grippers, pincers, etc.) may be used in the end effector 118 of FIG. 63; more generally, any of the end effectors 118 discussed herein may include, or may be modified to include, an object manipulator 184, as desired.

The lighting device 186 of the end effector 118 of FIG. 63 may be a bar-shaped array of LEDs or another lighting device. The depth sensor 188 of the end effector 118 of FIG. 63 may be a camera array, as discussed above with reference to the depth sensor 264 of FIG. 35, and more generally, may take any of the forms discussed above with reference to the depth sensor 264 of FIG. 35. In some embodiments, the depth sensor 188 may include an integrated RGB camera, as noted above. The lighting device 186 may be used to illuminate an object (e.g., an item under inspection) that is being manipulated by the object manipulator 184 and/or being measured/imaged by the depth sensor 188. In some embodiments, the end effector logic 142 may determine whether a "light on" voice command by a user has been received at a microphone of the I/O devices 120 and recognized by the voice command logic 170 of the system-level compute hardware 124; upon receipt of such a voice command, the end effector logic 142 may cause the lighting device 186 to illuminate. In some embodiments, the lighting device 186 of the end effector 118 of FIG. 63 (and of any of the other end effectors 118 disclosed herein) may generate light whose color is controllable (e.g., by commands issued by the system-level compute hardware 124 or other hardware, as appropriate). The ability to dynamically change the color of the light generated by a lighting device 186 may allow the robotic system 100 to more readily detect various defects in an item under inspection. For example, scratches in certain plastic materials may not be readily apparent when the material is illuminated by white light, but may be readily apparent when the material is illuminated by blue or pink light.

Figure 64:
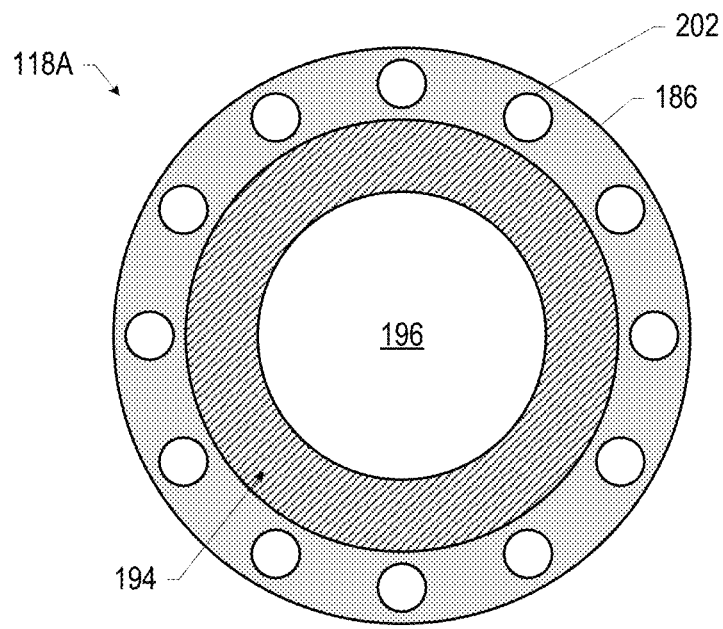
Figure 65:
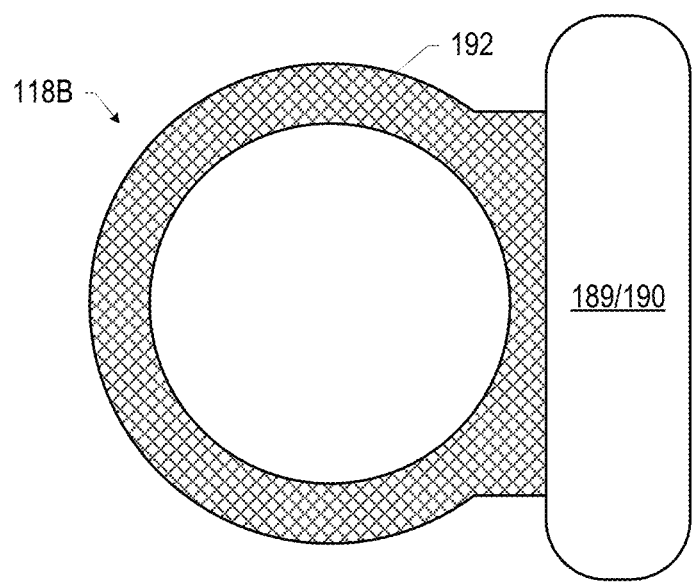
Figure 66:
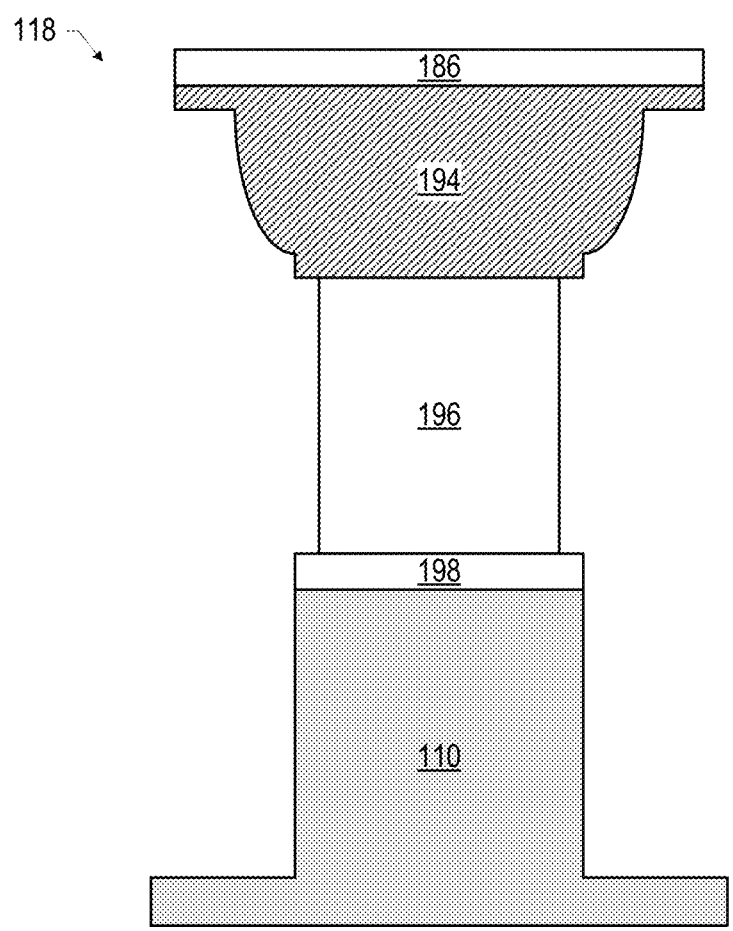
FIGS. 66-69 are side, cross-sectional views of example end effectors that may be used in a robotic system, in accordance with various embodiments.

FIGS. 63-65 are various views of an example end effector 118 that may be used in a robotic system 100, in accordance with various embodiments. In particular, FIG. 64 is a side, cross-sectional view of the end effector 118, FIG. 65 is a top view of the first portion 118A of the end effector 118, and FIG. 66 is a top view of the second portion 118B of the end effector 118. FIG. 65 illustrates the end effector 118 positioned on a segment 110 of a robotic apparatus 101 (e.g., the segment 110-4 of the gantry-type robotic apparatus 101 of FIG. 3, or the segment 110-6 of the arm-type robotic apparatuses 101 of FIGS. 4-6) that itself has two portions: a first portion 110A and a second portion 110B, with the second portion 110B between the first portion 110A and the rest of the robotic apparatus 101 (not shown). The first portion 118A of the end effector 118 may be mounted to the first portion 110A of the segment 110, and the second portion 118B of the end effector 118 may be mounted to the second portion 110B of the segment 110.

The first portion 118A of the end effector 118 of FIGS. 63-65 may include a lighting device 186 mounted on a lighting device support 194. In some embodiments, the lighting device support 194 may be a funnel-shaped structure formed of plastic and/or metal, with the lighting device 186 mounted at a top portion of the lighting device support 194. The lighting device 186 of FIGS. 63-65 may be a ring-shaped lighting device, with LEDs 202 positioned in a ring configuration, as shown. The top portion of the lighting device support 194 may have a diameter that is greater than a diameter of the bottom portion of the lighting device support, and the bottom portion of the lighting device support 194 may couple to a first camera 196 of the end effector 118. In particular, the bottom portion of the lighting device support 194 may act as a sleeve into which the first camera 196 extends so that the first camera 196 may capture images "through" the lighting device support 194, with the lighting device 186 providing illumination for these images. In a visual inspection process, providing a lighting device 186 close to the item to be inspected may ensure sufficient illumination in captured images to permit accurate computational classification; inadequate lighting may reduce the efficacy of such classification. In some embodiments, the end effector logic 142 may control operation of the lighting device 186 and the first camera 196 of the end effector 118 of FIGS. 63-65 so that the lighting device 186 is activated when the first camera 196 captures an image, and is otherwise inactivated ("dark"). The first camera 196 may be mounted to the first portion 110A of the segment 110 by a first support 198, which may bolt or otherwise attach to the first portion 110A of the segment 110.

The second portion 118B of the end effector 118 of FIGS. 63-65 may include a second support 192 on which a second camera 189 and a depth sensor 190 is mounted. The second support 192 may have a ring shape, and in use, may be disposed around the first portion 118A and may be mounted to the second portion 118B of the segment 110 (e.g., by one or more bolts or other attachment mechanisms). The second camera 189 and the depth sensor 190 may be mounted to the second support 192, as shown. The depth sensor 190 may take the form of any of the depth sensors discussed herein. In particular, in some embodiments, the second camera 189 and the depth sensor 190 be integrated into a single device (as discussed above with reference to FIG. 35). The relative spacing between the lighting device 186 and the depth sensor 190 may ensure that, when the end effector 118 is being used to inspect an object, the depth sensor 190 is farther away from the object than the lighting device 186 and the depth sensor 190. As some commercially available depth sensors 190 (e.g., those including a camera array and an integrated RGB camera) require a specified minimum distance between the depth sensor 190 and the surface to which depth is to be measured for reliable operation (e.g., a spacing of at least 10 centimeters), setting the depth sensor 190 "back" from the lighting device 186 and the first camera 196 may help achieve this minimum distance.

The end effector 118 of FIGS. 63-65 may be used when an inspection process like those discussed above with reference to FIGS. 42-61 is being performed by a robotic system 100. In some embodiments of the end effector 118 of FIGS. 63-65, the second camera 189 may have lower resolution than the first camera 196. For example, when the end effector 118 of FIGS. 63-65 is used to perform an inspection process as discussed above with reference to FIG. 54, the second camera 189 may be used to capture an overview image of an item (e.g., as discussed above with reference to 742 of the method 740 of FIG. 54) and the first camera 196 may be used to capture the images of the item to which inspection function(s) will be applied (e.g., as discussed above with reference to 744 of the method 740 of FIG. 54). In some embodiments, no second camera 189 may be included in the end effector 118 of FIGS. 63-65, and/or the first camera 196 may be used to capture the overview image of an item during an inspection process (e.g., as discussed above with reference to 742 of the method 740 of FIG. 54).

FIG. 66 is a side, cross-sectional view of another end effector 118 that may be used in a robotic system 100, in accordance with various embodiments. The end effector 118 of FIG. 66 shares a number of elements in common with the end effector 118 of FIGS. 63-65; a discussion of these common elements is not repeated here, and these common elements may take the form of any of the embodiments discussed above with reference to FIGS. 63-65. Compared to the end effector 118 of FIGS. 63-65, the end effector 118 of FIG. 66 does not include a second camera 189, a depth sensor 190, or a second support 192. The end effector 118 of FIG. 66 may be used when an inspection process like those discussed above with reference to FIGS. 42-61 is being performed by a robotic system 100; such a process may be configured so that depth information is not needed, or so that depth information may be obtained in another way.

Figure 67:
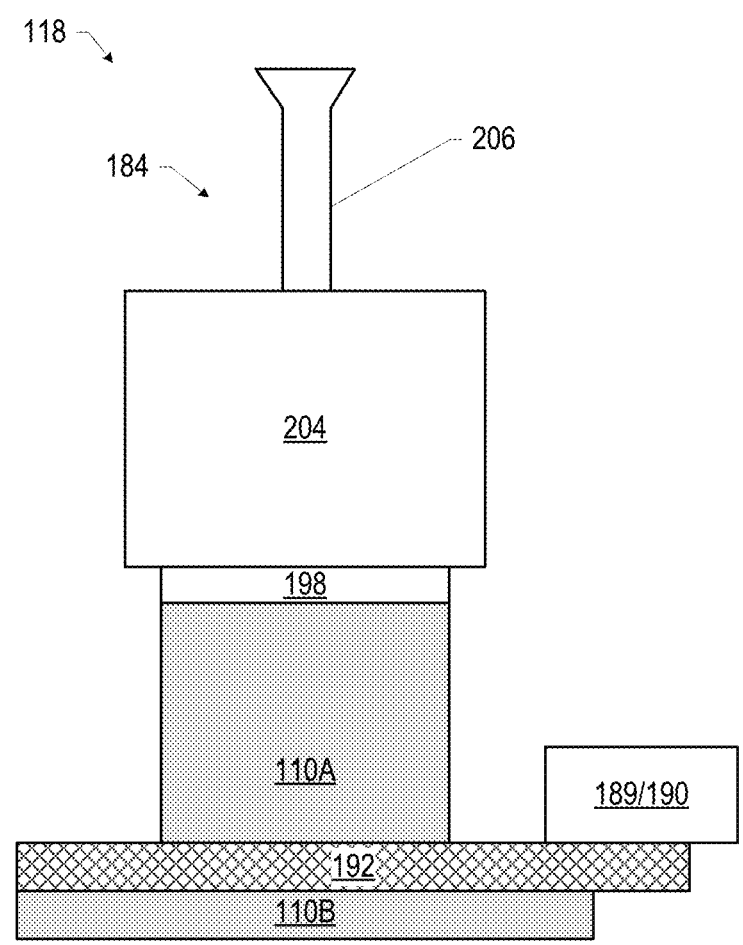

FIG. 67 is a side, cross-sectional view of another end effector 118 that may be used in a robotic system 100, in accordance with various embodiments. The end effector 118 of FIG. 67 shares a number of elements in common with the end effectors 118 of FIGS. 63-65 and FIG. 66; a discussion of these common elements is not repeated here, and these common elements may take the form of any of the embodiments discussed above. Compared to the end effector 118 of FIGS. 63-65, the end effector 118 of FIG. 67 does not include a first camera 196, a lighting device support 194, or a lighting device 186, but the end effector 118 of FIG. 67 includes an object manipulator 184. In particular, the object manipulator 184 of FIG. 67 includes a suction arm 206 (e.g., having a suction cup at an end of a tube) and a vacuum system 204 (including, e.g., a pump). As discussed above with reference to FIG. 62, the object manipulator 18 of FIG. 67 may use adjustable vacuum suction to move an object; for example, the amount of suction generated at the end of the suction arm 206 may be increased by the vacuum system 204 to allow the suction arm 206 to pick up an object by suction force, and the amount of suction generated at the end of the suction arm 206 may be decreased by the vacuum system 204 to allow the suction arm 206 to release the object. The end effector 118 of FIG. 66 may be used when an inspection process like those discussed above with reference to FIGS. 42-61 is being performed by a robotic system 100, and manipulation of the items under inspection is desired. Such a process may be configured so that the images captured by the second camera 189 have adequate resolution for performing inspection functions during inspection.

Figure 68:
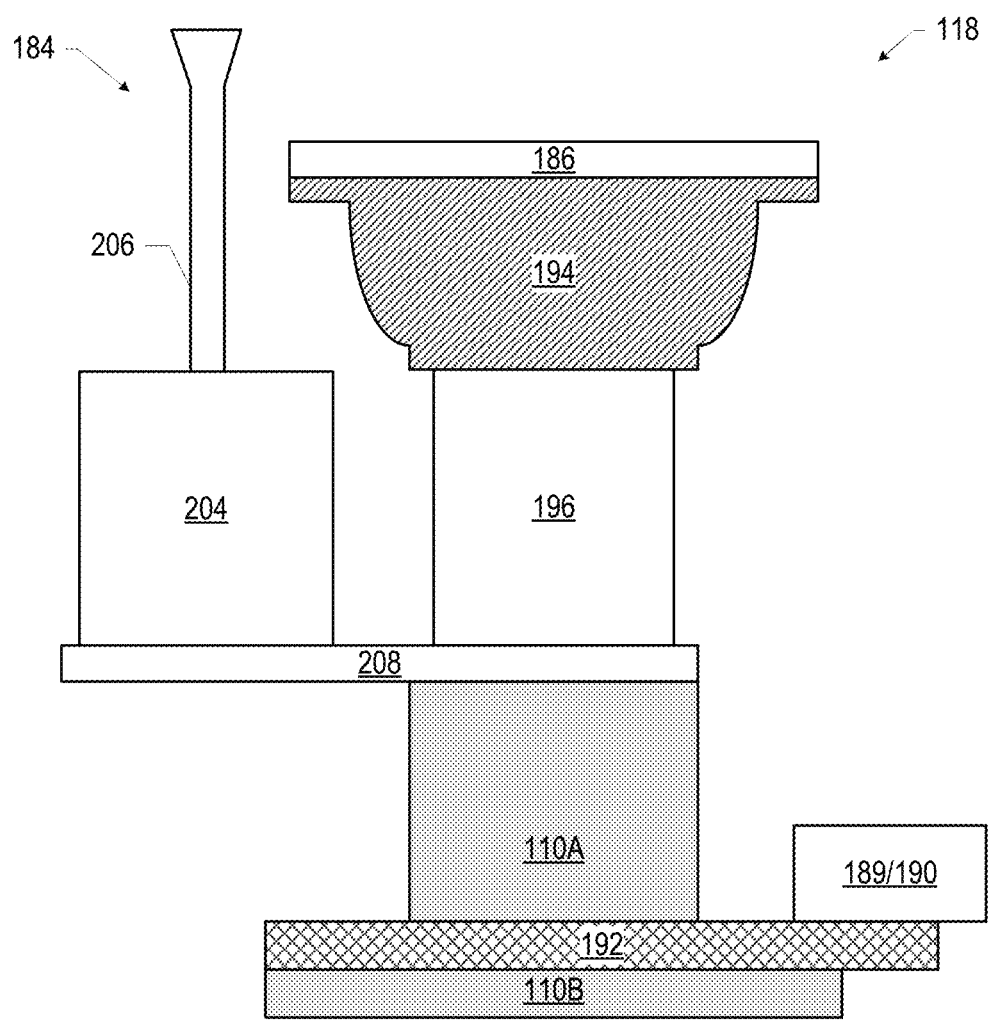

FIG. 68 is a side, cross-sectional view of another end effector 118 that may be used in a robotic system 100, in accordance with various embodiments. The end effector 118 of FIG. 68 shares a number of elements in common with the end effectors 118 of FIGS. 63-67; a discussion of these common elements is not repeated here, and these common elements may take the form of any of the embodiments discussed above. In particular, the end effector 118 of FIG. 68 includes all of the elements of the end effector 118 of FIGS. 63-65 and the object manipulator 184 of FIG. 67; both the object manipulator 184 and the camera 196 may be mounted to the first portion 110A of the segment 110 by a first support 208 (which may itself be bolted or otherwise attached to the first portion 110A). The end effector 118 of FIG. 66 may be used when an inspection process like those discussed above with reference to FIGS. 42-61 is being performed by a robotic system 100, and manipulation of the items under inspection is desired.

FIG. 69 is a side, cross-sectional view of another end effector 118 that may be used in a robotic system 100, in accordance with various embodiments. The end effector 118 of FIG. 69 shares a number of elements in common with the end effectors 118 of FIGS. 63-68; a discussion of these common elements is not repeated here, and these common elements may take the form of any of the embodiments discussed above. Compared to the end effector 118 of FIG. 67, the end effector 118 of FIG. 69 does not include an object manipulator 184, but the end effector 118 of FIG. 69 includes a laser 266 (e.g., as discussed above with reference to FIG. 35). The end effector 118 of FIG. 69 may be particularly useful as a "calibration" end effector 118, and may be used during system-level calibration of the robotic apparatus 101 (e.g., as discussed above with reference to FIGS. 35-38) and then replace with another end effector 118 (e.g., the end effectors 118 of any of FIGS. 63-68) when further tasks are performed (e.g., inspection tasks).

Figure 70:
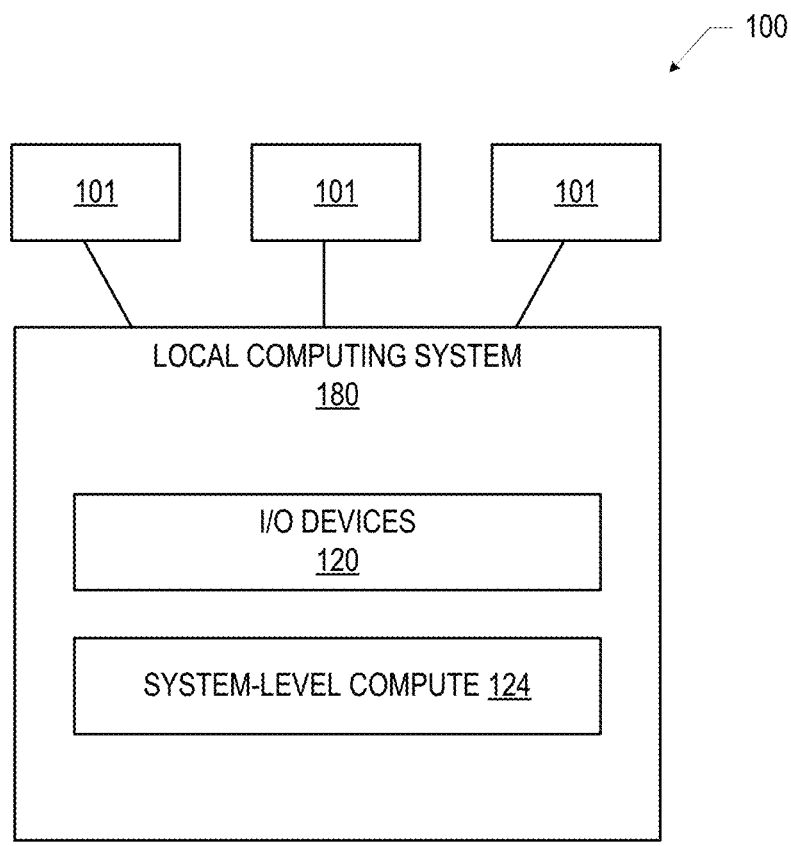
FIGS. 70-72 are block diagrams of example robotic systems in which any of the embodiments disclosed herein may be used.
Figure 71:
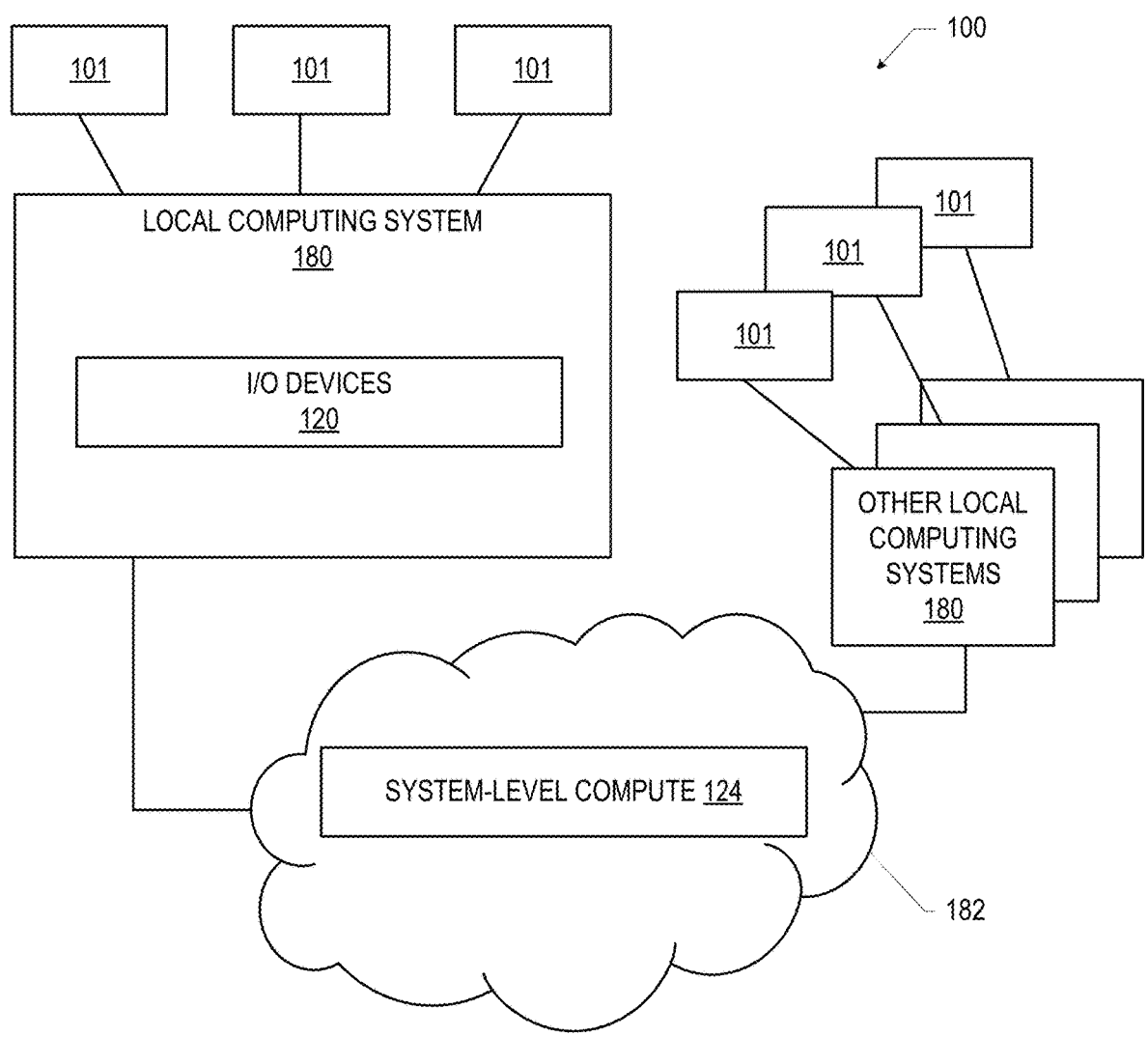
Figure 72:
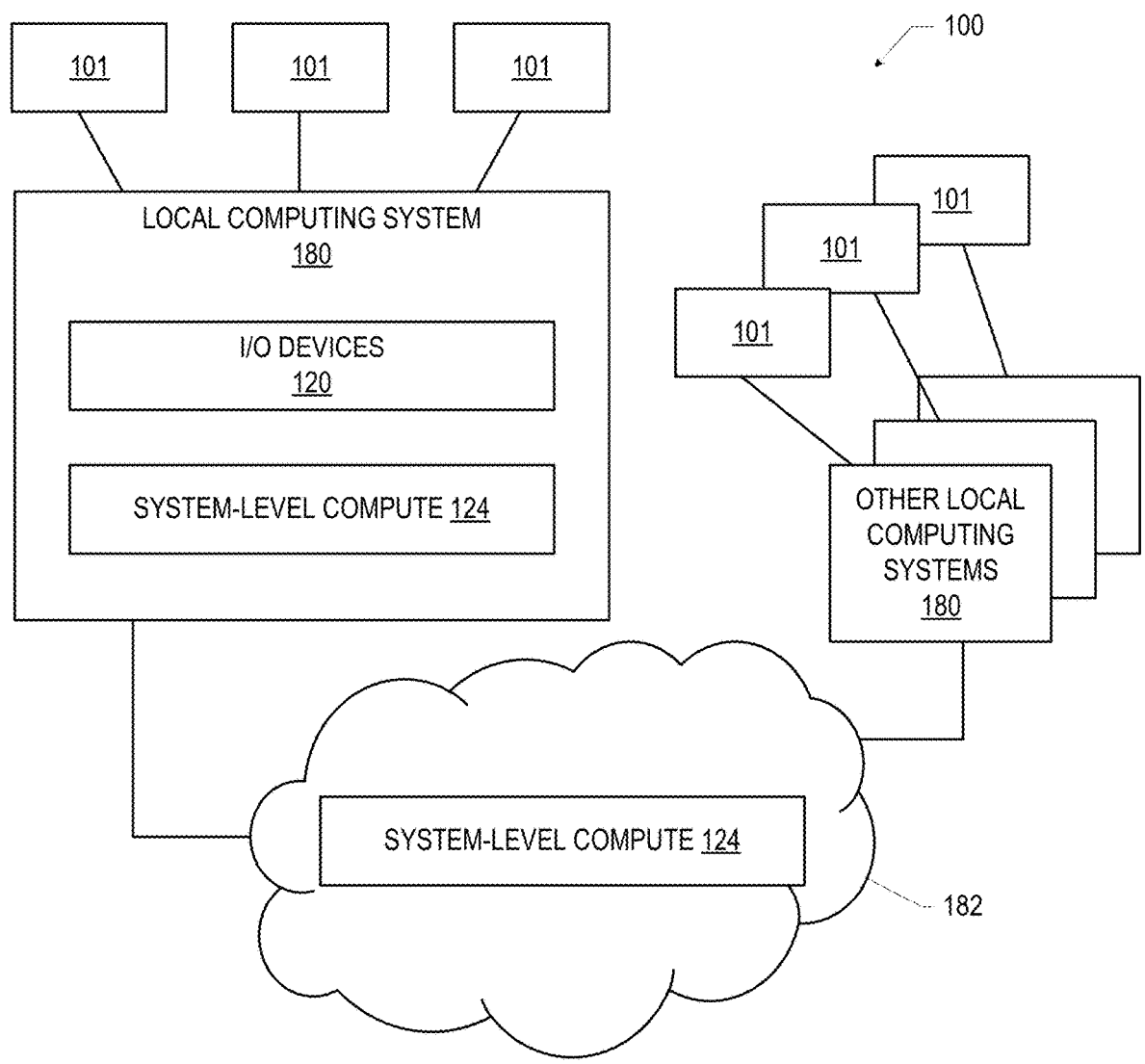

Various elements of the hardware 102 of a robotic system 100 may be distributed in any of a number of ways, including sharing a housing with the robotic apparatus 101, being local to the robotic apparatus 101 (e.g., coupled to the robotic apparatus 101 in a same room via a cable or wireless communication connection), or being remote from the robotic apparatus 101 (e.g., with memory or processing devices located in the cloud). Further, a robotic system 100 may include more than one robotic apparatus 101, and different robotic apparatus 101 may be local to each other (e.g., in the same room) or remote from one another (e.g., on different floors of a building, in different buildings, in different cities, etc.). In some embodiments, a robotic apparatus 101 may be connected to an Internet of Things (IoT) stack that allows for command and control of the robotic apparatus 101 through a web-based application, a virtual or augmented reality application, a mobile application, and/or a desktop application. The IoT stack may further allow for the logging and aggregation of data on a per-robotic apparatus 101 basis or based on multiple (e.g., a fleet) of robotic apparatuses 101; such data may include logs of critical events and/or failures, movements per unit time, and inspections per unit time. Further, the IoT stack may enable the redeployment of inspection functions (e.g., including updated classifiers) for use in inspection, as desired. FIGS. 70-72 are block diagrams of example arrangements of the hardware 102 of example robotic systems 100; any of the embodiments disclosed herein may implemented in any of these arrangements.

FIG. 70 illustrates an embodiment of a robotic system 100 in which the system-level compute hardware 124 is part of a local computing system 180, and the robotic system 100 includes one or more robotic apparatuses 101 that are also local to the local computing system 180. The I/O devices 120 and other elements of the hardware 102 (e.g., some or all of the system-level data storage 150) may be part of the local computing system 180. In some embodiments, the local computing system 180 may include a laptop computing device, a tablet computing device, a desktop computing device, and/or a server computing device (or multiple ones of any of these devices, coupled together using any suitable communication protocol), and the local computing system 180 may be coupled via local communication connections to the robotic apparatuses 101.

FIG. 71 illustrates an embodiment of a robotic system 100 in which some or all of the system-level compute hardware 124 is part of a remote computing system 182, with one or more robotic apparatuses 101 that are each coupled to a local computing system 180 that is in remote communication with the remote computing system 182. The I/O devices 120 and other elements of the hardware 102 (e.g., some or all of the system-level data storage 150, and/or some or all of the system-level compute hardware 124) may be part of the local computing systems 180. The local computing systems 180 may take the form of any of the embodiments discussed above with reference to FIG. 70. In some embodiments, the remote computing system 182 may be a cloud computing system, implementing some or all of the system-level compute hardware 124 (and/or some or all of the system-level data storage 150, not shown). The local computing systems 180 may communicate with the remote computing system 182 via any suitable communication protocol, such as wired or wireless Internet communication protocols.

FIG. 72 illustrates an embodiment of a robotic system 100 in which some of the system-level compute hardware 124 is part of a remote computing system 182, one or more robotic apparatuses 101 are each coupled to a local computing system 180 that is in remote communication with the remote computing system 182, and some of the system-level compute hardware 124 is part of the local computing systems 180. The embodiment of FIG. 72 may thus represent a hybrid arrangement of the robotic systems 100 of FIGS. 70 and 71. Similarly, some of the system-level data storage 150, not shown, may be included in the local computing systems 180, and some of the system-level data storage 150 may be included in the remote computing system 182.

The system-level compute hardware 124 and the joint-level compute hardware 210 may include any suitable processing device(s). As used herein, the term "processing device" or "processor" may refer to any device or portion of a device that processes electronic data from registers and/or memory to transform that electronic data into other electronic data that may be stored in registers and/or memory. The processing device(s) included in the system-level compute hardware 124 and/or the joint-level compute hardware 210 may include one or more digital signal processors (DSPs), application-specific integrated circuits (ASICs), central processing units (CPUs), graphics processing units (GPUs), tensor processing units (TPUs), cryptoprocessors (specialized processors that execute cryptographic algorithms within hardware), server processors, or any other suitable processing devices.

As noted above, the system-level data storage 150 and/or the joint-level data storage 229 may include any suitable storage devices, such as volatile memory (e.g., dynamic RAM (DRAM)), nonvolatile memory (e.g., ROM), Flash memory, solid state memory, networked drives, cloud drives, and/or local hard drives.

In some embodiments, the communications hardware 128 of a robotic system 100 may include one or more communication chips. For example, a communication chip may be configured for managing wireless communications for the transfer of data to/from or within the robotic system 100. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not. A communication chip may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. A communication chip may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. A communication chip may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). A communication chip may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. A communication chip may operate in accordance with other wireless protocols in other embodiments. The robotic system 100 may include an antenna (not shown) to facilitate wireless communications and/or to receive other wireless communications (such as AM or FM radio transmissions).

In some embodiments, a communication chip may manage wired communications, such as electrical, optical, or any other suitable communication protocols (e.g., Ethernet). As noted above, a communication chip may include multiple communication chips. For instance, a first communication chip may be dedicated to shorter-range wireless communications such as Wi-Fi or Bluetooth, and a second communication chip may be dedicated to longer-range wireless communications such as global positioning system (GPS), EDGE, GPRS, CDMA, WiMAX, LTE, EV-DO, or others. In some embodiments, a first communication chip may be dedicated to wireless communications, and a second communication chip may be dedicated to wired communications.

The following paragraphs provide various examples of the embodiments disclosed herein.

Example A1 is an apparatus for collaborative robotics, including: a first segment; a second segment; and a joint assembly, wherein the joint assembly includes a stepper motor and a drivetrain to control a relative position of the first and second segments, and the drivetrain has a gear ratio that is less than 30:1.

Example A2 includes the subject matter of Example A1, and further specifies that the gear ratio is less than 20:1.

Example A3 includes the subject matter of any of Examples A1-2, and further specifies that the joint assembly further includes an angle encoder to detect an angular position of a shaft of the stepper motor.

Example A4 includes the subject matter of Example A3, and further specifies that the angle encoder is contactless.

Example A5 includes the subject matter of any of Examples A3-4, and further specifies that the angle encoder is magnetic.

Example A6 includes the subject matter of any of Examples A3-5, and further specifies that a diametric magnet is at an end of the shaft of the stepper motor, proximate to the angle encoder.

Example A7 includes the subject matter of any of Examples A3-6, and further specifies that the angle encoder is spaced away from the shaft of the stepper motor.

Example A8 includes the subject matter of any of Examples A1-7, and further specifies that the apparatus does not include a joint encoder for the joint assembly.

Example A9 includes the subject matter of any of Examples A1-8, and further specifies that the joint assembly is one of a plurality of joint assemblies of the apparatus, and individual ones of the joint assemblies include a stepper motor and a drivetrain with a gear ratio that is less than 30:1.

Example A10 includes the subject matter of Example A9, and further specifies that individual ones of the joint assemblies further include an angle encoder to detect an angular position of a shaft of the stepper motor of that joint assembly.

Example A11 includes the subject matter of any of Examples A9-10, and further specifies that different ones of the joint assemblies are communicatively coupled by a Universal Serial Bus (USB) link, a Controller Area Network (CAN) link, or an RS-485 link.

Example A12 includes the subject matter of any of Examples A9-11, and further specifies that the apparatus includes at least three joint assemblies.

Example A13 includes the subject matter of Example A12, and further specifies that the apparatus includes at least six joint assemblies.

Example A14 includes the subject matter of any of Examples A1-13, and further specifies that the first segment includes a substantially cylindrical housing.

Example A15 includes the subject matter of any of Examples A14, and further specifies that the second segment includes a substantially cylindrical housing.

Example A16 includes the subject matter of any of Examples A1-15, and further specifies that the apparatus includes an end effector.

Example A17 includes the subject matter of Example A16, and further specifies that the end effector includes at least one camera.

Example A18 includes the subject matter of any of Examples A16-17, and further specifies that the end effector includes at least one object manipulator.

Example A19 includes the subject matter of any of Examples A1-18, and further specifies that the joint assembly includes an accelerometer.

Example A20 includes the subject matter of any of Examples A1-19, and further specifies that the joint assembly includes one or more H-bridges electrically coupled to the stepper motor.

Example A21 includes the subject matter of any of Examples A1-20, and further specifies that the joint assembly includes a Universal Serial Bus (USB) hub or a Controller Area Network (CAN) port.

Example A22 includes the subject matter of any of Examples A1-21, and further specifies that the joint assembly includes one or more light-emitting diodes (LEDs).

Example A23 includes the subject matter of any of Examples A1-22, and further specifies that the joint assembly includes a processing device.

Example A24 includes the subject matter of any of Examples A1-23, and further specifies that the joint assembly is part of a robotic arm.

Example A25 includes the subject matter of any of Examples A1-23, and further specifies that the joint assembly is part of a robotic gantry.

Example A26 includes the subject matter of any of Examples A1-25, and further specifies that the apparatus is part of a product inspection system.

Example A27 is an apparatus for use in a robotic system, including: a processing device to perform a position-encoder output association operation, wherein the position-encoder output association operation includes: causing a stepper motor in a joint assembly of the robotic system to move by a known increment, causing storage of a cumulative incremental motor position in a memory, receiving an output of an angle encoder in the joint assembly, wherein the output of the angle encoder is indicative of an angular position of a shaft of the stepper motor, and causing storage of an indicator of the output of the angle encoder in the memory in association with the cumulative incremental motor position.

Example A28 includes the subject matter of Example A27, and further specifies that the processing device is to: repeat the position-encoder output association operation for a full rotation of the shaft of the stepper motor.

Example A29 includes the subject matter of Example A28, and further specifies that the processing device is to: interpolate between the cumulative incremental motor positions and the associated indicators of angle encoder output stored in the memory to generate an interpolated set of position-encoder output associations.

Example A30 includes the subject matter of Example A29, and further specifies that the processing device is to: cause the interpolated set of position-encoder output associations to be stored in a memory device in the joint assembly.

Example A31 includes the subject matter of any of Examples A27-30, and further specifies that the processing device is a first processing device, and the first processing device is to: before performing the position-encoder output association operation, query a second processing device of the joint assembly to determine whether the joint assembly has been previously calibrated; wherein the first processing device is to perform the position-encoder output association operation in response to a determination that the joint assembly has not been previously calibrated.

Example A32 includes the subject matter of any of Examples A27-31, and further specifies that the angle encoder is a magnetic angle encoder.

Example A33 includes the subject matter of any of Examples A27-32, and further specifies that the angle encoder is contactless.

Example A34 includes the subject matter of any of Examples A27-33, and further specifies that the angle encoder is spaced away from the shaft of the stepper motor.

Example A35 includes the subject matter of any of Examples A27-34, and further specifies that a diametric magnetic is at an end of the shaft of the stepper motor.

Example A36 includes the subject matter of any of Examples A27-35, and further specifies that the joint assembly includes a drivetrain with a gear ratio that is less than 30:1.

Example A37 includes the subject matter of any of Examples A27-36, and further specifies that the joint assembly is part of a robotic arm.

Example A38 includes the subject matter of any of Examples A27-36, and further specifies that the joint assembly is part of a robotic gantry.

Example A39 includes the subject matter of any of Examples A27-38, and further specifies that the robotic system is a product inspection system.

Example A40 is an apparatus for use in a robotic system, including: a processing device to receive an indication of a value of a performance variable of a stepper motor of a joint assembly of a robotic apparatus, compare the value to a target value, and cause drive currents to be provided to the stepper motor to bring the value closer to the target value.

Example A41 includes the subject matter of Example A40, and further specifies that causing drive currents to be provided to the stepper motor includes identifying a current position of the stepper motor in a step cycle.

Example A42 includes the subject matter of Example A41, and further specifies that causing drive currents to be provided to the stepper motor further includes: determining a position of the stepper motor a predetermined number of steps away from the current position of the stepper motor in the step cycle; identifying nominal drive currents for each phase of the stepper motor at the determined position; and causing drive currents to be provided to the phases of the stepper motor based on the nominal drive currents.

Example A43 includes the subject matter of Example A42, and further specifies that the predetermined number of steps is one step.

Example A44 includes the subject matter of any of Examples A42-43, and further specifies that comparing the value to a target value includes determining an error, and causing drive currents to be provided to the stepper motor includes: providing the error to a control loop to generate a drive current magnitude; scaling the nominal drive currents by the drive current magnitude; and causing drive currents to be provided to phases of the stepper motor based on the scaled nominal drive currents.

Example A45 includes the subject matter of Example A44, and further specifies that the control loop includes a proportional control element, an integral control element, or a derivative control element.

Example A46 includes the subject matter of any of Examples A40-45, and further specifies that the processing device is a first processing device, the first processing device is in the joint assembly, and the first processing device is to: receiving the target value from a second processing device in communication with the first processing device via a communications bus.

Example A47 includes the subject matter of any of Examples A40-46, and further specifies that the performance variable includes position, velocity, current, or torque.

Example A48 includes the subject matter of any of Examples A40-47, and further specifies that the processing device us to receive the indication of the value of the performance variable, compare the value to the target value, and cause drive currents to be provided to the stepper motor at a frequency between 1 kilohertz and 100 kilohertz.

Example A49 includes the subject matter of any of Examples A40-48, and further specifies that the stepper motor is powered by a battery.

Example A50 includes the subject matter of any of Examples A40-49, and further specifies that causing drive currents to be provided to the stepper motor includes causing drive currents for one phase of the stepper motor to be provided to a discrete logic circuit to generate drive currents for another phase of the stepper motor.

Example A51 includes the subject matter of any of Examples A40-49, and further specifies that the joint assembly is part of a robotic arm or a robotic gantry.

Example A52 includes the subject matter of any of Examples A40-51, and further specifies that the robotic system is a product inspection system.

Example A53 is a method of calibrating a joint assembly of a robotic apparatus, including: performing a position-encoder output association operation, including: causing a stepper motor in the joint assembly to move by a known increment, causing storage of a cumulative incremental motor position in a memory, receiving an output of an angle encoder in the joint assembly, wherein the output of the angle encoder is indicative of an angular position of a shaft of the stepper motor, and causing storage of an indicator of the output of the angle encoder in the memory in association with the cumulative incremental motor position.

Example A54 includes the subject matter of Example A53, and further includes: repeating the position-encoder output association operation for a full rotation of the shaft of the stepper motor.

Example A55 includes the subject matter of Example A54, and further includes: interpolating between the cumulative incremental motor positions and the associated indicators of angle encoder output stored in the memory to generate an interpolated set of position-encoder output associations.

Example A56 includes the subject matter of Example A55, and further includes: causing the interpolated set of position-encoder output associations to be stored in a memory device in the joint assembly.

Example A57 includes the subject matter of any of Examples A53-56, and further includes: before performing the position-encoder output association operation, querying a processing device of the joint assembly to determine whether the joint assembly has been previously calibrated; wherein the position-encoder output association operation is performed in response to a determination that the joint assembly has not been previously calibrated.

Example A58 includes the subject matter of any of Examples A53-57, and further specifies that the angle encoder is a magnetic angle encoder.

Example A59 includes the subject matter of any of Examples A53-58, and further specifies that the angle encoder is contactless.

Example A60 includes the subject matter of any of Examples A53-59, and further specifies that the angle encoder is spaced away from the shaft of the stepper motor.

Example A61 includes the subject matter of any of Examples A53-60, and further specifies that a diametric magnetic is at an end of the shaft of the stepper motor.

Example A62 includes the subject matter of any of Examples A53-61, and further specifies that the joint assembly includes a drivetrain with a gear ratio that is less than 30:1.

Example A63 includes the subject matter of any of Examples A53-62, and further specifies that the joint assembly is part of a robotic arm.

Example A64 includes the subject matter of any of Examples A53-62, and further specifies that the joint assembly is part of a robotic gantry.

Example A65 includes the subject matter of any of Examples A53-64, and further specifies that the robotic apparatus is part of a product inspection system.

Example A66 is a method of moving a stepper motor in a joint assembly of a robotic apparatus, including: receiving an indication of a value of a performance variable of the stepper motor; comparing the value to a target value; and causing drive currents to be provided to the stepper motor to bring the value closer to the target value.

Example A67 includes the subject matter of Example A66, and further specifies that causing drive currents to be provided to the stepper motor includes identifying a current position of the stepper motor in a step cycle.

Example A68 includes the subject matter of Example A67, and further specifies that causing drive currents to be provided to the stepper motor further includes: determining a position of the stepper motor a predetermined number of steps away from the current position of the stepper motor in the step cycle; identifying nominal drive currents for each phase of the stepper motor at the determined position; and causing drive currents to be provided to the phases of the stepper motor based on the nominal drive currents.

Example A69 includes the subject matter of Example A68, and further specifies that the predetermined number of steps is one step.

Example A70 includes the subject matter of any of Examples A68-69, and further specifies that comparing the value to a target value includes determining an error, and causing drive currents to be provided to the stepper motor includes: providing the error to a control loop to generate a drive current magnitude; scaling the nominal drive currents by the drive current magnitude; and causing drive currents to be provided to phases of the stepper motor based on the scaled nominal drive currents.

Example A71 includes the subject matter of Example A70, and further specifies that the control loop includes a proportional control element, an integral control element, or a derivative control element.

Example A72 includes the subject matter of any of Examples A66-71, and further specifies that the method is performed by a first processing device in the joint assembly, and the method further includes: receiving the target value from a second processing device in communication with the first processing device via a communications bus.

Example A73 includes the subject matter of any of Examples A66-72, and further specifies that the performance variable includes position, velocity, current, or torque.

Example A74 includes the subject matter of any of Examples A66-73, and further specifies that the method is repeated at a frequency between 1 kilohertz and 100 kilohertz.

Example A75 includes the subject matter of any of Examples A66-74, and further specifies that the stepper motor is powered by a battery.

Example A76 includes the subject matter of any of Examples A66-75, and further specifies that the joint assembly is part of a robotic arm.

Example A77 includes the subject matter of any of Examples A66-75, and further specifies that the joint assembly is part of a robotic gantry.

Example A78 includes the subject matter of any of Examples A66-77, and further specifies that the robotic apparatus is part of a product inspection system.

Example A79 is one or more computer readable media having instructions thereon that, when executed by one or more processing devices of a computing system, cause the computing system to perform any of the methods of Examples A53-78.

Example A80 is an apparatus for collaborative robotics, including means for performing any of the methods of Examples A53-78.

Example B1 is an apparatus for collaborative robotics, including: a first segment; a second segment; and a joint assembly, wherein the joint assembly includes a stepper motor to control a relative position of the first and second segments, and a phase of the stepper motor is shorted when the apparatus is unpowered.

Example B2 includes the subject matter of Example B1, and further specifies that the joint assembly further includes a drivetrain, and the drivetrain has a gear ratio that is less than 30:1.

Example B3 includes the subject matter of Example B2, and further specifies that the gear ratio is less than 25:1.

Example B4 includes the subject matter of Example B3, and further specifies that the gear ratio is less than 20:1.

Example B5 includes the subject matter of any of Examples B1-4, and further specifies that the joint assembly includes a mechanical relay to short the phase.

Example B6 includes the subject matter of any of Examples B1-4, and further specifies that the joint assembly includes a solid state relay to short the phase.

Example B7 includes the subject matter of any of Examples B1-4, and further specifies that the joint assembly includes an H-bridge to short the phase.

Example B8 includes the subject matter of any of Examples B1-7, and further specifies that the apparatus does not include a mechanical brake to brake the joint assembly.

Example B9 includes the subject matter of any of Examples B1-8, and further specifies that, when the apparatus is unpowered, a braking force of the joint assembly may be overcome by typical human force.

Example B10 includes the subject matter of any of Examples B1-9, and further specifies that the joint assembly further includes an angle encoder to detect an angular position of a shaft of the stepper motor.

Example B11 includes the subject matter of any of Examples B1-10, and further specifies that the apparatus does not include a joint encoder for the joint assembly.

Example B12 includes the subject matter of any of Examples B1-8, and further specifies that the joint assembly is one of a plurality of joint assemblies of the apparatus, and individual ones of the joint assemblies include a stepper motor, and a phase for an individual stepper motor is shorted when the apparatus is unpowered.

Example B13 includes the subject matter of Example B12, and further specifies that individual joint assemblies include a drivetrain with a gear ratio that is less than 30:1.

Example B14 includes the subject matter of any of Examples B12-13, and further specifies that different ones of the joint assemblies are communicatively coupled by a Universal Serial Bus (USB) link, a Controller Area Network (CAN) link, or an RS-485 link.

Example B15 includes the subject matter of any of Examples B12-14, and further specifies that the apparatus includes at least three joint assemblies.

Example B16 includes the subject matter of Example B15, and further specifies that the apparatus includes at least six joint assemblies.

Example B17 includes the subject matter of any of Examples B1-16, and further specifies that the first segment includes a substantially cylindrical housing.

Example B18 includes the subject matter of Example B17, and further specifies that the second segment includes a substantially cylindrical housing.

Example B19 includes the subject matter of any of Examples B1-18, and further specifies that the apparatus includes an end effector.

Example B20 includes the subject matter of Example B19, and further specifies that the end effector includes at least one camera.

Example B21 includes the subject matter of any of Examples B19-20, and further specifies that the end effector includes at least one object manipulator.

Example B22 includes the subject matter of any of Examples B1-21, and further specifies that the joint assembly includes an accelerometer.

Example B23 includes the subject matter of any of Examples B1-22, and further specifies that the joint assembly includes one or more H-bridges electrically coupled to the stepper motor.

Example B24 includes the subject matter of any of Examples B1-23, and further specifies that the joint assembly includes a Universal Serial Bus (USB) hub or a Controller Area Network (CAN) port.

Example B25 includes the subject matter of any of Examples B1-24, and further specifies that the joint assembly includes one or more light-emitting diodes (LEDs).

Example B26 includes the subject matter of any of Examples B1-25, and further specifies that the joint assembly includes a processing device.

Example B27 includes the subject matter of any of Examples B1-26, and further specifies that the joint assembly is part of a robotic arm.

Example B28 includes the subject matter of any of Examples B1-26, and further specifies that the joint assembly is part of a robotic gantry.

Example B29 includes the subject matter of any of Examples B1-28, and further specifies that the apparatus is part of a product inspection system.

Example B30 is an apparatus for use in a robotic system, including: a processing device to identify a signal to brake a joint assembly, wherein the joint assembly is driven by a stepper motor, and in response to identification of the signal, cause a phase of the stepper motor to be shorted.

Example B31 includes the subject matter of Example B30, and further specifies that the joint assembly further includes a drivetrain, and the drivetrain has a gear ratio that is less than 30:1.

Example B32 includes the subject matter of Example B31, and further specifies that the gear ratio is less than 25:1.

Example B33 includes the subject matter of Example B32, and further specifies that the gear ratio is less than 20:1.

Example B34 includes the subject matter of any of Examples B30-33, and further specifies that causing the phase to be shorted includes causing a mechanical relay to short the phase.

Example B35 includes the subject matter of any of Examples B30-33, and further specifies that causing the phase to be shorted includes causing a solid state relay to short the phase.

Example B36 includes the subject matter of any of Examples B30-33, and further specifies that causing the phase to be shorted includes causing an H-bridge to short the phase.

Example B37 includes the subject matter of any of Examples B30-36, and further specifies that the signal is generated in response to a fault condition.

Example B38 includes the subject matter of any of Examples B30-36, and further specifies that the signal is generated in response to a command to turn brakes on.

Example B39 includes the subject matter of any of Examples B30-36, and further specifies that the signal is generated in response to a command to turn motor drive off.

Example B40 includes the subject matter of any of Examples B30-37, and further specifies that the processing device is part of the joint assembly.

Example B41 includes the subject matter of any of Examples B30-40, and further specifies that the signal is a first signal, and the processing device is to: identify a second signal to stop braking the joint assembly; and in response to identification of the second signal, cause the phase to no longer be shorted.

Example B42 includes the subject matter of Example B41, and further specifies that the second signal is generated in response to a command to turn brakes off.

Example B43 includes the subject matter of Example B41, and further specifies that the second signal is generated in response to a command to turn motor drive on.

Example B44 includes the subject matter of any of Examples B41-43, and further specifies that the processing device is part of the joint assembly.

Example B45 includes the subject matter of any of Examples B30-44, and further specifies that the processing device is a first processing device, and the first processing device is to: receive the signal from a second processing device in communication with the first processing device via a communications bus.

Example B46 includes the subject matter of any of Examples B30-45, and further specifies that the joint assembly is part of a robotic arm.

Example B47 includes the subject matter of any of Examples B30-45, and further specifies that the joint assembly is part of a robotic gantry.

Example B48 includes the subject matter of any of Examples B30-47, and further specifies that the robotic system is a product inspection system.

Example B49 is an apparatus for use in a robotic system, including: a processing device to cause a phase of a stepper motor to be shorted to brake the stepper motor, and cause the phase of the stepper motor to not be shorted together to allow the stepper motor to move.

Example B50 includes the subject matter of Example B49, and further specifies that the gear ratio is less than 30:1.

Example B51 includes the subject matter of Example B50, and further specifies that the gear ratio is less than 20:1.

Example B52 includes the subject matter of any of Examples B49-50, and further specifies that causing the phase to be shorted includes causing a mechanical relay to short the phase.

Example B53 includes the subject matter of any of Examples B49-50, and further specifies that causing the phase to be shorted includes causing a solid state relay to short the phase.

Example B54 includes the subject matter of any of Examples B49-50, and further specifies that causing the phase to be shorted includes causing an H-bridge to short the phase.

Example B55 includes the subject matter of any of Examples B49-54, and further specifies that shorting the phase of the stepper motor is caused in response to a fault condition.

Example B56 includes the subject matter of any of Examples B49-54, and further specifies that shorting the phase of the stepper motor is caused in response to a command to turn brakes on.

Example B57 includes the subject matter of any of Examples B49-54, and further specifies that shorting the phase of the stepper motor is caused in response to a command to turn motor drive off.

Example B58 includes the subject matter of any of Examples B49-57, and further specifies that causing the phase of the stepper motor to not be shorted is performed in response to a command to turn brakes off.

Example B59 includes the subject matter of any of Examples B49-57, and further specifies that causing the phase of the stepper motor to not be shorted is performed in response to a command to turn motor drive on.

Example B60 includes the subject matter of any of Examples B49-59, and further specifies that the stepper motor is part of a robotic arm.

Example B61 includes the subject matter of any of Examples B49-60, and further specifies that the stepper motor is part of a robotic gantry.

Example B62 includes the subject matter of any of Examples B49-61, and further specifies that the robotic system is a product inspection system.

Example B63 is a method of braking a joint assembly of a robotic apparatus, including: identifying a signal to brake the joint assembly, wherein the joint assembly is driven by a stepper motor; and in response to identification of the signal, causing a phase of the stepper motor to be shorted.

Example B64 includes the subject matter of Example B63, and further specifies that the joint assembly further includes a drivetrain, and the drivetrain has a gear ratio that is less than 30:1.

Example B65 includes the subject matter of Example B64, and further specifies that the gear ratio is less than 50:1.

Example B66 includes the subject matter of Example B65, and further specifies that the gear ratio is less than 20:1.

Example B67 includes the subject matter of any of Examples B63-66, and further specifies that causing the phase to be shorted includes causing a mechanical relays to short the phase.

Example B68 includes the subject matter of any of Examples B63-66, and further specifies that causing the phase to be shorted includes causing a solid state relay to short the phase.

Example B69 includes the subject matter of any of Examples B63-66, and further specifies that causing the phase to be shorted includes causing an H-bridge to short the phase.

Example B70 includes the subject matter of any of Examples B63-69, and further specifies that the signal is generated in response to a fault condition.

Example B71 includes the subject matter of any of Examples B63-69, and further specifies that the signal is generated in response to a command to turn brakes on.

Example B72 includes the subject matter of any of Examples B63-69, and further specifies that the signal is generated in response to a command to turn motor drive off.

Example B73 includes the subject matter of any of Examples B63-72, and further specifies that a processing device in the joint assembly generates the signal and causes the phase to be shorted.

Example B74 includes the subject matter of any of Examples B63-73, and further specifies that the signal is a first signal, and the method further includes: identifying a second signal to stop braking the joint assembly of the robotic apparatus; and in response to identification of the second signal, causing the phase to no longer be shorted.

Example B75 includes the subject matter of Example B74, and further specifies that the second signal is generated in response to a command to turn brakes off.

Example B76 includes the subject matter of Example B74, and further specifies that the second signal is generated in response to a command to turn motor drive on.

Example B77 includes the subject matter of any of Examples B74-76, and further specifies that a processing device in the joint assembly generates the second signal and causes the phase to no longer be shorted.

Example B78 includes the subject matter of any of Examples B63-77, and further specifies that a first processing device in the joint assembly causes the phase to be shorted, and the method further includes: receiving the signal from a second processing device in communication with the first processing device via a communications bus.

Example B79 includes the subject matter of any of Examples B63-78, and further specifies that the robotic apparatus includes a robotic arm.

Example B80 includes the subject matter of any of Examples B63-78, and further specifies that the robotic apparatus includes a robotic gantry.

Example B81 includes the subject matter of any of Examples B63-80, and further specifies that the robotic apparatus is part of a product inspection system.

Example B82 is a method of controlling a stepper motor in a robotic system, including: causing a phase of a stepper motor to be shorted to brake the stepper motor; and causing the phase of the stepper motor to not be shorted to allow the stepper motor to move.

Example B83 includes the subject matter of Example B82, and further specifies that the gear ratio is less than 30:1.

Example B84 includes the subject matter of Example B83, and further specifies that the gear ratio is less than 20:1.

Example B85 includes the subject matter of any of Examples B82-84, and further specifies that causing the phase to be shorted includes causing a mechanical relay to short the phase.

Example B86 includes the subject matter of any of Examples B82-84, and further specifies that causing the phase to be shorted includes causing a solid state relay to short the phase.

Example B87 includes the subject matter of any of Examples B82-84, and further specifies that causing the two leads for each phase to be shorted includes causing an H-bridge to short the phase.

Example B88 includes the subject matter of any of Examples B82-87, and further specifies that the shorting of the phase of the stepper motor is caused in response to a fault condition.

Example B89 includes the subject matter of any of Examples B82-87, and further specifies that the shorting of the phase of the stepper motor is caused in response to a command to turn brakes on.

Example B90 includes the subject matter of any of Examples B82-87, and further specifies that the shorting of the phase of the stepper motor is caused in response to a command to turn motor drive off.

Example B91 includes the subject matter of any of Examples B82-90, and further specifies that causing the phase of the stepper motor to not be shorted is performed in response to a command to turn brakes off.

Example B92 includes the subject matter of any of Examples B82-90, and further specifies that causing the phase of the stepper motor to not be shorted is performed in response to a command to turn motor drive on.

Example B93 includes the subject matter of any of Examples B82-92, and further specifies that the stepper motor is part of a robotic arm.

Example B94 includes the subject matter of any of Examples B82-92, and further specifies that the stepper motor is part of a robotic gantry.

Example B95 includes the subject matter of any of Examples B82-94, and further specifies that the apparatus is part of a product inspection system.

Example B96 is one or more computer readable media having instructions thereon that, when executed by one or more processing devices of a computing system, cause the computing system to perform any of the methods of Examples B63-95.

Example B97 is an apparatus for collaborative robotics, including means for performing any of the methods of Examples B63-95.

Example C1 is an apparatus for collaborative robotics, including: a first segment; a second segment; and a joint assembly, wherein the joint assembly includes a processing device and a stepper motor, the stepper motor is to control a relative position of the first and second segments, the processing device is to perform closed-loop control of the stepper motor and monitor one or more performance metrics, and the processing device is to cause drive of the stepper motor to cease when a value of at least one of the performance metrics is outside an allowable range.

Example C2 includes the subject matter of Example C1, and further specifies that the joint assembly includes a drivetrain coupled to the stepper motor, and the drivetrain has a gear ratio that is less than 30:1.

Example C3 includes the subject matter of Example C2, and further specifies that the gear ratio is less than 20:1.

Example C4 includes the subject matter of any of Examples C1-3, and further specifies that the one or more performance metrics include joint position, joint velocity, joint acceleration, motor current, joint temperature, an error in a control loop, joint accelerometer data, or joint gyroscope data.

Example C5 includes the subject matter of Example C4, and further specifies that the one or more performance metrics include a combination of joint position, joint velocity, motor current, joint temperature, an error in a control loop, joint accelerometer data, or joint gyroscope data.

Example C6 includes the subject matter of any of Examples C1-5, and further specifies that the allowable range is updateable during movement of the joint assembly.

Example C7 includes the subject matter of any of Examples C1-5, and further specifies that the allowable range is stored in a Flash memory of the joint assembly.

Example C8 includes the subject matter of any of Examples C1-7, and further specifies that the allowable range includes a minimum allowable value or a maximum allowable value.

Example C9 includes the subject matter of any of Examples C1-8, and further specifies that the value of the at least one of the performance metrics is compared to the allowable range at a frequency equal to a frequency of execution of a control loop.

Example C10 includes the subject matter of any of Examples C1-9, and further specifies that the joint assembly is one of a plurality of joint assemblies of the apparatus, and individual ones of the joint assemblies include a processing device and a stepper motor, the processing device of an individual joint assembly is to perform closed-loop control of the stepper motor of the individual joint assembly and monitor one or more performance metrics of the individual joint assembly, and the processing device of the individual joint assembly is to cause drive of the stepper motor of the individual joint assembly to cease when a value of at least one of the performance metrics is outside an allowable range.

Example C11 includes the subject matter of Example C10, and further specifies that different ones of the joint assemblies are to monitor one or more performance metrics of the associated joint assembly independently of other joint assemblies.

Example C12 includes the subject matter of any of Examples C10-11, and further specifies that individual ones of the joint assemblies include a drivetrain with a gear ratio that is less than 30:1.

Example C13 includes the subject matter of any of Examples C10-12, and further specifies that different ones of the joint assemblies are communicatively coupled by a Universal Serial Bus (USB) link, a Controller Area Network (CAN) link, or an RS-485 link.

Example C14 includes the subject matter of any of Examples C10-13, and further specifies that the apparatus includes at least three joint assemblies.

Example C15 includes the subject matter of Example C14, and further specifies that the apparatus includes at least six joint assemblies.

Example C16 includes the subject matter of any of Examples C1-15, and further specifies that the joint assembly further includes an angle encoder to detect an angular position of a shaft of the stepper motor.

Example C17 includes the subject matter of Example C16, and further specifies that the angle encoder is contactless.

Example C18 includes the subject matter of any of Examples C16-17, and further specifies that the angle encoder is magnetic.

Example C19 includes the subject matter of any of Examples C16-18, and further specifies that a diametric magnet is at an end of the shaft of the stepper motor, proximate to the angle encoder.

Example C20 includes the subject matter of any of Examples C16-19, and further specifies that the angle encoder is spaced away from the shaft of the stepper motor.

Example C21 includes the subject matter of any of Examples C1-20, and further specifies that the apparatus does not include a joint encoder for the joint assembly.

Example C22 includes the subject matter of any of Examples C1-21, and further specifies that the first segment includes a substantially cylindrical housing.

Example C23 includes the subject matter of Example C22, and further specifies that the second segment includes a substantially cylindrical housing.

Example C24 includes the subject matter of any of Examples C1-23, and further specifies that the apparatus includes an end effector.

Example C25 includes the subject matter of Example C24, and further specifies that the end effector includes at least one camera.

Example C26 includes the subject matter of any of Examples C24-25, and further specifies that the end effector includes at least one object manipulator.

Example C27 includes the subject matter of any of Examples C1-26, and further specifies that the joint assembly includes an accelerometer.

Example C28 includes the subject matter of any of Examples C1-27, and further specifies that the joint assembly includes one or more H-bridges electrically coupled to the stepper motor.

Example C29 includes the subject matter of any of Examples C1-27, and further specifies that the joint assembly includes a Universal Serial Bus (USB) hub or a Controller Area Network (CAN) port.

Example C30 includes the subject matter of any of Examples C1-29, and further specifies that the joint assembly includes one or more light-emitting diodes (LEDs).

Example C31 includes the subject matter of any of Examples C1-30, and further specifies that the joint assembly includes a processing device.

Example C32 includes the subject matter of any of Examples C1-31, and further specifies that the joint assembly is part of a robotic arm.

Example C33 includes the subject matter of any of Examples C1-31, and further specifies that the joint assembly is part of a robotic gantry.

Example C34 includes the subject matter of any of Examples C1-33, and further specifies that the apparatus is part of a product inspection system.

Example C35 includes the subject matter of any of Examples C1-34, and further specifies that the processing device is to cause braking of the stepper motor when the value of at least one of the performance metrics is outside the allowable range, and causing braking of the stepper motor includes shorting a phase of the stepper motor.

Example C36 is an apparatus for robotic control, including: a processing device to identify a trajectory through which to run a robotic apparatus, wherein the robotic apparatus includes one or more joints, cause the robotic apparatus to run through the trajectory, receive data indicative of performance metrics of the one or more joints while the robotic apparatus is running through the trajectory, generate a computational model mapping a time index of the trajectory to the received data, and identify one or more fault conditions for a difference between the computational model and performance of the robotic apparatus.

Example C37 includes the subject matter of Example C36, and further specifies that the one or more performance metrics include joint position, joint velocity, joint acceleration, motor current, joint temperature, an error in a control loop, joint accelerometer data, or joint gyroscope data.

Example C38 includes the subject matter of any of Examples C36-37, and further specifies that the processing device is a first processing device, the first processing device is to receive the data indicative of performance metrics from one or more second processing devices via a communications bus, and individual ones of the second processing devices are associated with individual ones of the one or more joints.

Example C39 includes the subject matter of Example C38, and further specifies that the communications bus is a Universal Serial Bus (USB) or a Controller Area Network (CAN).

Example C40 includes the subject matter of any of Examples C36-39, and further specifies that the trajectory is specified by a user via a Graphical User Interface (GUI) or by an Application Programming Interface (API).

Example C41 includes the subject matter of any of Examples C36-39, and further specifies that the trajectory is recorded during manual manipulation of the robotic apparatus by a user.

Example C42 includes the subject matter of any of Examples C36-41, and further specifies that the computational model is a principal component model, a linear regression model, a polynomial regression model, or a deep learning model.

Example C43 includes the subject matter of any of Examples C36-42, and further specifies that the one or more fault conditions are specified as a percentage deviation from the computational model.

Example C44 includes the subject matter of any of Examples C36-43, and further specifies that the processing device is to: in response to detection of a fault condition during operation of the robotic apparatus, cause movement of the robotic apparatus to cease.

Example C45 includes the subject matter of Example C44, and further specifies that causing movement of the robotic apparatus to cease includes causing shorting of a phase of a stepper motor associated with at least one of the joints.

Example C46 includes the subject matter of any of Examples C36-45, and further specifies that individual ones of the joints include a stepper motor and a drivetrain.

Example C47 includes the subject matter of Example C46, and further specifies that the drivetrain has a gear ratio that is less than 30:1.

Example C48 includes the subject matter of Example C47, and further specifies that the drivetrain has a gear ratio that is less than 20:1.

Example C49 includes the subject matter of any of Examples C36-48, and further specifies that individual ones of the joints include an angle encoder to monitor angular position of a shaft of a stepper motor of the joint.

Example C50 includes the subject matter of any of Examples C36-49, and further specifies that the robotic apparatus includes a robotic arm.

Example C51 includes the subject matter of any of Examples C36-49, and further specifies that the robotic apparatus includes a robotic gantry.

Example C52 includes the subject matter of any of Examples C36-51, and further specifies that the robotic apparatus is part of a product inspection system.

Example C53 includes the subject matter of any of Examples C36-52, and further specifies that identify one or more fault conditions includes store one or more fault conditions in a memory.

Example C54 includes the subject matter of any of Examples C36-53, and further specifies that the processing device is in a housing of the robotic apparatus.

Example C55 includes the subject matter of any of Examples C36-53, and further specifies that the processing device has a housing separate from a housing of the robotic apparatus.

Example C56 includes the subject matter of any of Examples C36-55, and further specifies that the processing device is part of a desktop computing device, a laptop computing device, or a tablet computing device.

Example C57 includes the subject matter of any of Examples C36-56, and further includes: the robotic apparatus.

Example C58 includes the subject matter of any of Examples C36-57, and further specifies that the processing device is to communicate with the robotic apparatus via a Universal Serial Bus (USB) or a Controller Area Network (CAN).

Example C59 is a method of operating a stepper motor in a joint assembly of a robotic apparatus, including: performing closed-loop control of the stepper motor; monitoring one or more performance metrics of the joint assembly; and causing braking of the stepper motor when a value of at least one of the performance metrics is outside an allowable range.

Example C60 includes the subject matter of Example C59, and further specifies that the joint assembly includes a drivetrain coupled to the stepper motor, and the drivetrain has a gear ratio that is less than 30:1.

Example C61 includes the subject matter of Example C60, and further specifies that the gear ratio is less than 20:1.

Example C62 includes the subject matter of any of Examples C59-61, and further specifies that the one or more performance metrics include joint position, joint velocity, joint acceleration, motor current, joint temperature, an error in a control loop, joint accelerometer data, or joint gyroscope data.

Example C63 includes the subject matter of Example C62, and further specifies that the one or more performance metrics include a combination of joint position, joint velocity, motor current, joint temperature, an error in a control loop, joint accelerometer data, or joint gyroscope data.

Example C64 includes the subject matter of any of Examples C59-63, and further specifies that the allowable range is updateable during movement of the joint assembly.

Example C65 includes the subject matter of any of Examples C59-63, and further specifies that the allowable range is stored in a Flash memory of the joint assembly.

Example C66 includes the subject matter of any of Examples C59-65, and further specifies that the allowable range includes a minimum allowable value or a maximum allowable value.

Example C67 includes the subject matter of any of Examples C59-66, and further specifies that the value of the at least one of the performance metrics is compared to the allowable range at a frequency equal to a frequency of execution of a control loop.

Example C68 includes the subject matter of any of Examples C59-67, and further specifies that the joint assembly is part of a robotic arm.

Example C69 includes the subject matter of any of Examples C59-67, and further specifies that the joint assembly is part of a robotic gantry.

Example C70 includes the subject matter of any of Examples C59-69, and further specifies that the apparatus is part of a product inspection system.

Example C71 includes the subject matter of any of Examples C59-70, and further specifies that causing braking of the stepper motor includes causing shorting of a phase of the stepper motor.

Example C72 is a method for generating fault conditions for a robotic apparatus, including: identifying a trajectory through which to run the robotic apparatus, wherein the robotic apparatus includes one or more joints, causing the robotic apparatus to run through the trajectory, receiving data indicative of performance metrics of the one or more joints while the robotic apparatus is running through the trajectory, generating a computational model mapping a time index of the trajectory to the received data, and identifying one or more fault conditions for a difference between the computational model and performance of the robotic apparatus.

Example C73 includes the subject matter of Example C72, and further specifies that the one or more performance metrics include joint position, joint velocity, joint acceleration, motor current, joint temperature, an error in a control loop, joint accelerometer data, or joint gyroscope data.

Example C74 includes the subject matter of any of Examples C72-73, and further specifies that the receiving the data indicative of performance metrics includes receiving the data indicative of performance metrics from one or more processing devices via a communications bus, and individual ones of the processing devices are associated with individual ones of the one or more joints.

Example C75 includes the subject matter of Example C74, and further specifies that the communications bus is a Universal Serial Bus (USB) or a Controller Area Network (CAN).

Example C76 includes the subject matter of any of Examples C72-75, and further specifies that the trajectory is specified by a user via a Graphical User Interface (GUI) or an Application Programming Interface (API).

Example C77 includes the subject matter of any of Examples C72-75, and further specifies that the trajectory is recorded during manual manipulation of the robotic apparatus by a user.

Example C78 includes the subject matter of any of Examples C72-77, and further specifies that the computational model is a principal component model, a linear regression model, a polynomial regression model, or a deep learning model.

Example C79 includes the subject matter of any of Examples C72-78, and further specifies that the one or more fault conditions are specified as a percentage deviation from the computational model.

Example C80 includes the subject matter of any of Examples C72-79, and further includes: in response to detection of a fault condition during operation of the robotic apparatus, causing movement of the robotic apparatus to cease.

Example C81 includes the subject matter of any of Examples C72-79, and further specifies that causing movement of the robotic apparatus to cease includes causing shorting of a phase of a stepper motor associated with least one of the joints.

Example C82 includes the subject matter of any of Examples C72-81, and further specifies that individual ones of the joints include a stepper motor and a drivetrain.

Example C83 includes the subject matter of Example C82, and further specifies that the drivetrain has a gear ratio that is less than 30:1.

Example C84 includes the subject matter of Example C83, and further specifies that the drivetrain has a gear ratio that is less than 20:1.

Example C85 includes the subject matter of any of Examples C72-84, and further specifies that individual ones of the joints include an angle encoder to monitor angular position of a shaft of a stepper motor of the joint.

Example C86 includes the subject matter of any of Examples C72-85, and further specifies that the robotic apparatus includes a robotic arm.

Example C87 includes the subject matter of any of Examples C72-85, and further specifies that the robotic apparatus includes a robotic gantry.

Example C88 includes the subject matter of any of Examples C72-87, and further specifies that the robotic apparatus is part of a product inspection system.

Example C89 includes the subject matter of any of Examples C72-88, and further specifies that identifying one or more fault conditions includes storing one or more fault conditions in a memory.

Example C90 includes the subject matter of any of Examples C72-89, and further specifies that the method is performed by a processing device, and the processing device is part of a desktop computing device, a laptop computing device, or a tablet computing device.

Example C91 is one or more computer readable media having instructions thereon that, when executed by one or more processing devices of a computing system, cause the computing system to perform any of the methods of Examples C59-90.

Example C92 is an apparatus for collaborative robotics, including means for performing any of the methods of Examples C59-90.

Example D1 is an apparatus for robotic zeroing, including: a processing device to perform a joint zeroing operation on a first joint assembly of a robotic apparatus, wherein the joint zeroing operation includes determining a reference vector for zeroing the first joint assembly, wherein the first joint assembly is mechanically coupled to a support of the robotic apparatus, identifying an acceleration vector representative of an orientation of a second joint assembly of the robotic apparatus, wherein the first joint assembly is mechanically between the support and the second joint assembly determining whether the acceleration vector is aligned with the reference vector, and in response to a determination that the acceleration vector is not aligned with the reference vector, causing the first joint assembly to move.

Example D2 includes the subject matter of Example D1, and further specifies that the joint zeroing operation further includes: before determining whether the acceleration vector is aligned with the reference vector, determining whether a third joint assembly is to be moved away from its zeroed position prior to identification of the acceleration vector representative of the orientation of the second joint assembly, wherein the first joint assembly is mechanically between the third joint assembly and the second joint assembly; and in response to the determination that the third joint assembly is to be moved away from its zeroed position, causing the third joint assembly to move to a predetermined position prior to identification of the acceleration vector representative of the orientation of the second joint assembly.

Example D3 includes the subject matter of Example D2, and further specifies that the predetermined position is 90 degrees away from the zeroed position of the third joint assembly.

Example D4 includes the subject matter of any of Examples D2-3, and further specifies that the joint zeroing operation further includes: after causing a third joint assembly to move to the predetermined position, determining whether the acceleration vector is aligned with reference vector, and in response to determination that the acceleration vector is aligned with the reference vector, maintaining the first joint assembly in its current position and cause the third joint assembly to be moved to its zeroed position.

Example D5 includes the subject matter of any of Examples D1-4, and further specifies that the joint zeroing operation further includes: in response to a determination that the acceleration vector is aligned with the reference vector, maintaining the first joint assembly in its current position.

Example D6 includes the subject matter of Example D5, and further specifies that the processing device is to: after performing the joint zeroing operation on the first joint assembly of the robotic apparatus, perform the joint zeroing operation on an other joint assembly of the robotic apparatus, wherein the first joint assembly is mechanically between the support and the other joint assembly.

Example D7 includes the subject matter of any of Examples D1-6, and further specifies that identifying the acceleration vector representative of the orientation of the second joint assembly includes receiving data from an accelerometer of the second joint assembly.

Example D8 includes the subject matter of Example D7, and further specifies that identifying the acceleration vector representative of the orientation of the second joint assembly includes adjusting the receive data with a set of known offset corrections.

Example D9 includes the subject matter of any of Examples D1-8, and further specifies that the joint zeroing operation further includes: prior to identifying the acceleration vector, determine that the first joint assembly does not include a zeroing limit switch.

Example D10 includes the subject matter of Example D9, and further specifies that determining that the first joint assembly does not include a zeroing limit switch includes querying another processing device in the first joint assembly.

Example D11 includes the subject matter of any of Examples D1-10, and further specifies that the first joint assembly includes a stepper motor and a drivetrain.

Example D12 includes the subject matter of Example D11, and further specifies that the drivetrain has a gear ratio that is less than 30:1.

Example D13 includes the subject matter of Example D12, and further specifies that the gear ratio is less than 20:1.

Example D14 includes the subject matter of any of Examples D1-13, and further specifies that the robotic apparatus includes at least three joint assemblies.

Example D15 includes the subject matter of Example D14, and further specifies that the apparatus includes at least six joint assemblies.

Example D16 includes the subject matter of any of Examples D1-15, and further specifies that the processing device is in a housing of the robotic apparatus.

Example D17 includes the subject matter of any of Examples D1-15, and further specifies that the processing device has a housing separate from a housing of the robotic apparatus.

Example D18 includes the subject matter of any of Examples D1-17, and further specifies that the processing device is included in a desktop computing device, a laptop computing device, or a tablet computing device.

Example D19 includes the subject matter of any of Examples D1-18, and further specifies that the robotic apparatus includes a robotic arm.

Example D20 includes the subject matter of any of Examples D1-18, and further specifies that the robotic apparatus includes a robotic gantry.

Example D21 includes the subject matter of any of Examples D1-20, and further specifies that the processing device is part of a product inspection system.

Example D22 includes the subject matter of any of Examples D1-21, and further includes: the robotic apparatus.

Example D23 includes the subject matter of any of Examples D1-22, and further specifies that the processing device is to communicate with the robotic apparatus via a Universal Serial Bus (USB) or a Controller Area Network (CAN).

Example D24 is an apparatus for robotic calibration, including: a processing device to perform a marker calibration operation, wherein the marker calibration operation includes: causing a robotic apparatus to move its end effector to a nominal position associated with a marker on a reference structure, determining an error between the nominal position and the actual position, adjusting the actual position of the end effector of the robotic apparatus to reduce the error between the nominal position and the actual position, and causing storage of the nominal position and the adjusted actual position; repeat the marker calibration operation for different markers of the reference structure; generate a computational model mapping nominal positions of the robotic apparatus and the adjusted actual positions; and use the computational model to determine, for a target position of the end effector, the position command to send to the robotic apparatus.

Example D25 includes the subject matter of Example D24, and further specifies that the robotic apparatus includes a plurality of joint assemblies, and causing storage of the adjusted actual position includes causing storage of the positions of individual ones of the joint assemblies.

Example D26 includes the subject matter of Example D25, and further specifies that individual ones of the joint assemblies include a stepper motor and a drivetrain.

Example D27 includes the subject matter of Example D26, and further specifies that the drivetrain has a gear ratio that is less than 30:1.

Example D28 includes the subject matter of any of Examples D24-27, and further specifies that the end effector includes a camera and a laser.

Example D29 includes the subject matter of Example D28, and further specifies that determining an error between the nominal position and the actual position includes: causing the camera to capture an image that includes the laser location on the reference structure and the marker; and determining a distance between the laser location and the marker based on the image.

Example D30 includes the subject matter of Example D29, and further specifies that the image includes a marker label on the reference structure.

Example D31 includes the subject matter of Example D30, and further specifies that the marker label includes a Quick Response (QR) code.

Example D32 includes the subject matter of any of Examples D24-31, and further specifies that the end effector includes a depth sensor.

Example D33 includes the subject matter of Example D32, and further specifies that determining an error between the nominal position and the actual position includes: causing the depth sensor to measure a distance to the reference structure; and determining a difference between the measured distance to the reference structure and a distance to the reference structure from the nominal position.

Example D34 includes the subject matter of any of Examples D32-33, and further specifies that the depth sensor includes a camera array.

Example D35 includes the subject matter of any of Examples D24-34, and further specifies that the reference structure is a two-dimensional structure.

Example D36 includes the subject matter of Example D35, and further specifies that the reference structure is a mat.

Example D37 includes the subject matter of Example D36, and further specifies that the robotic apparatus is to sit on the mat.

Example D38 includes the subject matter of any of Examples D24-34, and further specifies that the reference structure is a three-dimensional structure.

Example D39 includes the subject matter of any of Examples D24-38, and further specifies that the marker is printed on a surface of the reference structure.

Example D40 includes the subject matter of any of Examples D24-39, and further specifies that the computational model is a principal component model, a linear regression model, a polynomial regression model, or a deep learning model.

Example D41 includes the subject matter of any of Examples D24-40, and further specifies that the processing device is a first processing device, the first processing device is to adjust the actual position of the end effector by sending commands to one or more second processing devices via a communications bus, and individual ones of the second processing devices are associated with individual joints of the robotic apparatus.

Example D42 includes the subject matter of Example D41, and further specifies that the communications bus is a Universal Serial Bus (USB) or a Controller Area Network (CAN).

Example D43 includes the subject matter of any of Examples D24-42, and further specifies that the processing device is in a housing of the robotic apparatus.

Example D44 includes the subject matter of any of Examples D24-42, and further specifies that the processing device has a housing separate from a housing of the robotic apparatus.

Example D45 includes the subject matter of any of Examples D24-44, and further specifies that the processing device is included in a desktop computing device, a laptop computing device, or a tablet computing device.

Example D46 includes the subject matter of any of Examples D24-45, and further includes: the robotic apparatus.

Example D47 includes the subject matter of any of Examples D24-46, and further specifies that the processing device is to communicate with the robotic apparatus via a Universal Serial Bus (USB) or a Controller Area Network (CAN).

Example D48 includes the subject matter of any of Examples D24-47, and further includes: the reference structure.

Example D49 is an apparatus for robotic zeroing, including: a processing device, wherein the processing device is to perform a zeroing operation on a robotic apparatus, the robotic apparatus includes a support, and the zeroing operation includes causing individual joints of the robotic apparatus to move to a zeroed position one at a time and sequentially, beginning with an individual joint mechanically closest to the support.

Example D50 includes the subject matter of Example D49, and further specifies that the zeroing operation further includes: for a particular joint, moving a prior joint away from its zeroed position, zeroing the particular joint, and then moving the prior joint back to its zeroed position.

Example D51 includes the subject matter of Example D50, and further specifies that moving the prior joint away from its zeroed position includes moving the prior joint 90 degrees away from its zeroed position.

Example D52 includes the subject matter of any of Examples D49-51, and further specifies that the zeroing operation further includes: zeroing a particular joint by utilizing a limit switch associated with that joint.

Example D53 includes the subject matter of any of Examples D49-52, and further specifies that individual joints include a stepper motor and a drivetrain.

Example D54 includes the subject matter of Example D53, and further specifies that the drivetrain has a gear ratio that is less than 30:1.

Example D55 includes the subject matter of Example D54, and further specifies that the gear ratio is less than 20:1.

Example D56 includes the subject matter of any of Examples D49-55, and further specifies that the robotic apparatus includes at least three joint assemblies.

Example D57 includes the subject matter of Example D56, and further specifies that the apparatus includes at least six joint assemblies.

Example D58 includes the subject matter of any of Examples D49-57, and further specifies that the processing device is in a housing of the robotic apparatus.

Example D59 includes the subject matter of any of Examples D49-57, and further specifies that the processing device has a housing separate from a housing of the robotic apparatus.

Example D60 includes the subject matter of any of Examples D49-59, and further specifies that the processing device is included in a desktop computing device, a laptop computing device, or a tablet computing device.

Example D61 includes the subject matter of any of Examples D49-60, and further specifies that the robotic apparatus includes a robotic arm.

Example D62 includes the subject matter of any of Examples D49-60, and further specifies that the robotic apparatus includes a robotic gantry.

Example D63 includes the subject matter of any of Examples D49-62, and further specifies that the processing device is part of a product inspection system.

Example D64 includes the subject matter of any of Examples D49-63, and further includes: the robotic apparatus.

Example D65 includes the subject matter of any of Examples D49-64, and further specifies that the processing device is to communicate with the robotic apparatus via a Universal Serial Bus (USB) or a Controller Area Network (CAN).

Example D66 is an apparatus for robotic calibration, including: a processing device to perform a marker calibration operation, wherein the marker calibration operation includes causing a robotic apparatus to move to a nominal position to shine a laser on a marker on a reference structure, and causing the robotic apparatus to adjust its position to reduce the error between the laser location and the marker; wherein the processing device is to repeat the marker calibration operation for different markers on the reference structure.

Example D67 includes the subject matter of Example D66, and further specifies that the robotic apparatus includes a plurality of joint assemblies, and individual ones of the joint assemblies include a stepper motor and a drivetrain.

Example D68 includes the subject matter of Example D67, and further specifies that the drivetrain has a gear ratio that is less than 30:1.

Example D69 includes the subject matter of any of Examples D66-68, and further specifies that the robotic apparatus further includes a camera.

Example D70 includes the subject matter of any of Examples D66-69, and further specifies that the robotic apparatus further includes a depth sensor.

Example D71 includes the subject matter of Example D70, and further specifies that the depth sensor includes a camera array.

Example D72 includes the subject matter of any of Examples D66-71, and further specifies that the reference structure is a two-dimensional structure.

Example D73 includes the subject matter of Example D72, and further specifies that the reference structure is a mat.

Example D74 includes the subject matter of Example D73, and further specifies that the robotic apparatus is to sit on the mat.

Example D75 includes the subject matter of any of Examples D66-71, and further specifies that the reference structure is a three-dimensional structure.

Example D76 includes the subject matter of any of Examples D66-75, and further specifies that the marker is printed on a surface of the reference structure.

Example D77 includes the subject matter of any of Examples D66-76, and further specifies that the reference structure includes a marker label for individual markers.

Example D78 includes the subject matter of Example D77, and further specifies that the marker label includes a Quick Response (QR) code.

Example D79 includes the subject matter of any of Examples D66-78, and further specifies that the processing device is a first processing device, the first processing device is to adjust the actual position of the end effector by sending commands to one or more second processing devices via a communications bus, and individual ones of the second processing devices are associated with individual joints of the robotic apparatus.

Example D80 includes the subject matter of Example D79, and further specifies that the communications bus is a Universal Serial Bus (USB) or a Controller Area Network (CAN).

Example D81 includes the subject matter of any of Examples D66-80, and further specifies that the processing device is in a housing of the robotic apparatus.

Example D82 includes the subject matter of any of Examples D66-80, and further specifies that the processing device has a housing separate from a housing of the robotic apparatus.

Example D83 includes the subject matter of any of Examples D66-82, and further specifies that the processing device is included in a desktop computing device, a laptop computing device, or a tablet computing device.

Example D84 includes the subject matter of any of Examples D66-83, and further includes: the robotic apparatus.

Example D85 includes the subject matter of any of Examples D66-84, and further specifies that the processing device is to communicate with the robotic apparatus via a Universal Serial Bus (USB) or a Controller Area Network (CAN).

Example D86 is a method performed by any of the processing devices of Examples D1-85.

Example D87 is one or more computer readable media having instructions thereon that, when executed by one or more processing devices of a computing system, cause the computing system to perform any of the methods of Example D86.

Example D88 is an apparatus for collaborative robotics, including means for performing any of the methods of Example D86.

Example E1 is an inspection apparatus, including: a processing device to communicatively couple to a robotic apparatus, wherein the processing device is to generate an inspection path for the robotic apparatus to follow to inspect an item, the inspection path includes a set of positions of an end effector of the robotic apparatus, and the processing device is to cause a camera of the end effector to capture an image of the item at each position.

Example E2 includes the subject matter of Example E1, and further specifies that a position of an end effector includes a spatial location and an angular position.

Example E3 includes the subject matter of any of Examples E1-2, and further specifies that at least some of the positions are indicated to the processing device via a user input device.

Example E4 includes the subject matter of Example E3, and further specifies that the processing device is to receive commands, via the user input device, to move the end effector of the robotic apparatus.

Example E5 includes the subject matter of any of Examples E3-4, and further specifies that the processing device is to receive a command, via the user input device, to store a current position of the end effector as a position in the inspection path.

Example E6 includes the subject matter of any of Examples E1-5, and further specifies that the processing device is to generate at least some of the positions.

Example E7 includes the subject matter of Example E6, and further specifies that the processing device is to receive an instruction, via a user input device, to generate at least some of the positions.

Example E8 includes the subject matter of any of Examples E6-7, and further specifies that the processing device is to cause the robotic apparatus to: capture an overview image of the item; segment the item from a background in the overview image; using the segmentation results, generate a set of positions for the end effector of the robotic apparatus at which images of the item may be captured so as to cover a surface of the item.

Example E9 includes the subject matter of Example E8, and further specifies that the end effector includes a first camera and a second camera, the second camera has a higher resolution than the first camera, and the processing device is to cause the robotic apparatus to capture the overview image of the item with the first camera.

Example E10 includes the subject matter of any of Examples E6-8, and further specifies that the processing device is to: receive an indication, via the user input device, of a level of detail with which the user would like to perform the inspection; and based on the indicated level of detail, control a distance between the item and the end effector in the set of positions.

Example E11 includes the subject matter of any of Examples E1-10, and further specifies that the processing device is to communicate with a display device, and is to: prompt a user to select positions for the inspection path from a set of candidate positions.

Example E12 includes the subject matter of Example E11, and further specifies that the processing device is to cause an overview image of the item to be displayed during prompting of the user.

Example E13 includes the subject matter of any of Examples E11-12, and further includes: the display device.

Example E14 includes the subject matter of any of Examples E1-13, and further specifies that the processing device is to store an inspection function identifier in association with each position, and the inspection function identifier identifies an inspection function that is to be applied to images captured by the camera when the end effector is at the associated position.

Example E15 includes the subject matter of Example E14, and further specifies that the processing device is to receive a selection of an inspection function, via a user input device, for a particular position.

Example E16 includes the subject matter of any of Examples E14-15, and further specifies that the processing device is to present a plurality of inspection functions from which a user may choose, via a user input device, for association with a particular position.

Example E17 includes the subject matter of any of Examples E14-16, and further specifies that the inspection function includes anomaly detection, recognition of a particular defect, or optical character recognition.

Example E18 includes the subject matter of any of Examples E1-17, and further specifies that the processing device is to communicatively couple to a display device and a user input device to provide a Graphical User Interface (GUI) through which a user may specify the inspection path.

Example E19 includes the subject matter of Example E18, and further includes: the display device.

Example E20 includes the subject matter of any of Examples E18-19, and further includes: the user input device.

Example E21 includes the subject matter of any of Examples E18-20, and further specifies that the display device and the user input device are provided by a touchscreen device.

Example E22 includes the subject matter of any of Examples E1-21, and further specifies that the robotic apparatus includes a stepper motor and a drivetrain.

Example E23 includes the subject matter of Example E22, and further specifies that the drivetrain has a gear ratio that is less than 30:1.

Example E24 includes the subject matter of Example E23, and further specifies that the gear ratio is less than 20:1.

Example E25 includes the subject matter of any of Examples E1-24, and further specifies that the robotic apparatus includes at least three joints.

Example E26 includes the subject matter of Example E25, and further specifies that the apparatus includes at least six joints.

Example E27 includes the subject matter of any of Examples E1-26, and further specifies that the processing device is in a housing of the robotic apparatus.

Example E28 includes the subject matter of any of Examples E1-26, and further specifies that the processing device has a housing separate from a housing of the robotic apparatus.

Example E29 includes the subject matter of any of Examples E1-28, and further specifies that the processing device is included in a desktop computing device, a laptop computing device, or a tablet computing device.

Example E30 includes the subject matter of any of Examples E1-29, and further specifies that the robotic apparatus includes a robotic arm.

Example E31 includes the subject matter of any of Examples E1-29, and further specifies that the robotic apparatus includes a robotic gantry.

Example E32 includes the subject matter of any of Examples E1-31, and further includes: the robotic apparatus.

Example E33 is an inspection apparatus, including: a processing device to communicatively couple to a robotic apparatus, wherein the processing device is to cause the robotic apparatus to follow an inspection path to inspect an item, the inspection path includes a set of positions to which an end effector of the robotic apparatus is to move, and the processing device is to cause a camera of the end effector to capture an image of the item at each position.

Example E34 includes the subject matter of Example E33, and further specifies that a position of an end effector includes a spatial location and an angular position.

Example E35 includes the subject matter of any of Examples E33-34, and further specifies that the end effector includes a first camera and a second camera, the second camera has a higher resolution than the first camera, and the processing device is to use the second camera to capture the image of the item at each position.

Example E36 includes the subject matter of Example E35, and further specifies that the processing device is to use the first camera to capture the overview image of the item.

Example E37 includes the subject matter of any of Examples E33-36, and further specifies that the processing device is to communicatively couple to a display device, and the processing device is to cause the images to be presented on the display device.

Example E38 includes the subject matter of Example E37, and further includes: the display device.

Example E39 includes the subject matter of Example E38, and further specifies that the processing device is to cause the images to be presented on the display along with images captured from the same positions of a known-good item.

Example E40 includes the subject matter of any of Examples E33-39, and further specifies that the robotic apparatus includes a stepper motor and a drivetrain.

Example E41 includes the subject matter of Example E40, and further specifies that the drivetrain has a gear ratio that is less than 30:1.

Example E42 includes the subject matter of Example E41, and further specifies that the gear ratio is less than 20:1.

Example E43 includes the subject matter of any of Examples E33-42, and further specifies that the robotic apparatus includes at least three joints.

Example E44 includes the subject matter of Example E43, and further specifies that the apparatus includes at least six joints.

Example E45 includes the subject matter of any of Examples E33-44, and further specifies that the processing device is in a housing of the robotic apparatus.

Example E46 includes the subject matter of any of Examples E33-44, and further specifies that the processing device has a housing separate from a housing of the robotic apparatus.

Example E47 includes the subject matter of any of Examples E33-46, and further specifies that the processing device is included in a desktop computing device, a laptop computing device, or a tablet computing device.

Example E48 includes the subject matter of any of Examples E33-47, and further specifies that the robotic apparatus includes a robotic arm.

Example E49 includes the subject matter of any of Examples E33-47, and further specifies that the robotic apparatus includes a robotic gantry.

Example E50 includes the subject matter of any of Examples E33-49, and further specifies that the inspection path is a first inspection path, and the processing device is to: after completion of the first inspection path, causing a user to be prompted to move the item; and receiving an indication, from a user input device, that a second inspection path is to be followed to inspect the moved item; and after receipt of the indication that the second inspection path is to be followed, cause the robotic apparatus to follow the second inspection path to inspect the moved item.

Example E51 includes the subject matter of any of Examples E33-50, and further specifies that the processing device is to communicatively couple to the robotic apparatus via a communications port, and the communications port is a Universal Serial Bus (USB) port or a Controller Area Network (CAN) port.

Example E52 includes the subject matter of any of Examples E33-51, and further includes: the robotic apparatus.

Example E53 is a method performed by any of the processing devices of Examples E1-52.

Example E54 is one or more computer readable media having instructions thereon that, when executed by one or more processing devices of a computing system, cause the computing system to perform any of the methods of Example E53.

Example E55 is an apparatus for collaborative robotics, including means for performing any of the methods of Example E53.

Example F1 is an inspection apparatus, including: a processing device to communicatively couple to a robotic apparatus, to a display device, and to a user input device, wherein the processing device is to receive an image of an item, wherein the image was captured by the robotic apparatus, generate a proposed classification for the image, wherein the classification indicates an attribute of the item based on the image, cause the image to be displayed on the display device along with the proposed classification, and receive an indication from the user input device of a final classification of the image.

Example F2 includes the subject matter of Example F1, and further specifies that receive the indication from the user input device of the final classification of the image includes receiving an indication from the user input device that the user accepts or rejects the proposed classification of the image.

Example F3 includes the subject matter of any of Examples F1-2, and further specifies that receive the indication from the user input device of the final classification of the image includes receiving an indication that the user has selected a final classification that is different than the proposed classification.

Example F4 includes the subject matter of Example F3, and further specifies that the proposed classification is an unknown classification.

Example F5 includes the subject matter of any of Examples F1-4, and further specifies that causing the image to be displayed on the display device includes causing a visual indicator to be displayed, and the visual indicator indicates a portion of the image on which the proposed classification is based.

Example F6 includes the subject matter of Example F5, and further specifies that the visual indicator includes a box.

Example F7 includes the subject matter of any of Examples F1-6, and further specifies that causing the image to be displayed on the display device along with the proposed classification includes causing the image to be displayed on the display device along with the proposed classification and along with a known-good image of the item.

Example F8 includes the subject matter of Example F7, and further specifies that the known-good image is captured from the same position as the image.

Example F9 includes the subject matter of any of Examples F1-8, and further specifies that the processing device is to: after receipt of the indication from the user input device of the final classification of the image, cause storage of the final classification in association with the image.

Example F10 includes the subject matter of Example F9, and further specifies that generating a proposed classification for the image includes executing an inspection function with the image as an input, the inspection function includes a computational classifier, and the processing device is to: after causing storage of the final classification in association with the image, retrain the computational classifier on a training set that includes the image and the final classification.

Example F11 includes the subject matter of Example F10, and further specifies that the training set includes images captured from the same position as the image.

Example F12 includes the subject matter of any of Examples F1-11, and further specifies that generate the proposed classification for the image includes executing an anomaly detection classifier based on stored images of the item.

Example F13 includes the subject matter of Example F12, and further specifies that the stored images are captured from the same position as the image.

Example F14 includes the subject matter of any of Examples F1-13, and further specifies that generate the classification for the image includes executing a missing component detection classifier or a solder bridge detection classifier.

Example F15 includes the subject matter of any of Examples F1-14, and further specifies that the image is one of a plurality of images of the item captured by the robotic apparatus from different positions, and the processing device is to: generate a proposed classification for each image; cause each image to be displayed on the display device along with the associated proposed classification; and receive an indication from the user input device of a final classification for each image.

Example F16 includes the subject matter of Example F15, and further specifies that the processing device is to: generate a classification for the item based at least in part on the final classifications of the plurality of images.

Example F17 includes the subject matter of Example F16, and further specifies that the item is classified as failed when at least one of the images is classified as failed.

Example F18 includes the subject matter of any of Examples F1-17, and further specifies that the processing device is to: before receipt of the image of the item, cause the robotic apparatus to follow an inspection path to inspect the item, wherein the inspection path includes a set of positions of an end effector of the robotic apparatus, and the processing device is to cause a camera of the end effector to capture an image of the item at each position.

Example F19 includes the subject matter of Example F18, and further specifies that a position of an end effector includes a spatial location and an angular position.

Example F20 includes the subject matter of any of Examples F18-19, and further specifies that the processing device is to store an inspection function identifier in association with each position, and the inspection function identifier identifies an inspection function that is to be applied to images captured by the camera when the end effector is at the associated position.

Example F21 includes the subject matter of any of Examples F1-20, and further includes: the robotic apparatus.

Example F22 includes the subject matter of any of Examples F1-21, and further includes: the display device.

Example F23 includes the subject matter of any of Examples F1-22, and further specifies that the robotic apparatus includes a stepper motor and a drivetrain.

Example F24 includes the subject matter of Example F23, and further specifies that the drivetrain has a gear ratio that is less than 30:1.

Example F25 includes the subject matter of Example F24, and further specifies that the gear ratio is less than 20:1.

Example F26 includes the subject matter of any of Examples F1-25, and further specifies that the robotic apparatus includes at least three joints.

Example F27 includes the subject matter of Example F26, and further specifies that the apparatus includes at least six joints.

Example F28 includes the subject matter of any of Examples F1-27, and further specifies that the processing device is in a housing of the robotic apparatus.

Example F29 includes the subject matter of any of Examples F1-27, and further specifies that the processing device has a housing separate from a housing of the robotic apparatus.

Example F30 includes the subject matter of any of Examples F1-29, and further specifies that the processing device is included in a desktop computing device, a laptop computing device, or a tablet computing device.

Example F31 includes the subject matter of any of Examples F1-30, and further specifies that the robotic apparatus includes a robotic arm.

Example F32 includes the subject matter of any of Examples F1-30, and further specifies that the robotic apparatus includes a robotic gantry.

Example F33 includes the subject matter of any of Examples F1-32, and further includes: the user input device.

Example F34 is an inspection apparatus, including: a processing device to communicatively couple to a robotic apparatus, to a display device, and to a user input device, wherein the processing device is to: receive a plurality of images of an item, wherein the plurality of images were captured by a camera of an end effector of the robotic apparatus, and different ones of the images were captured at different positions of the end effector, generate a proposed classification for individual ones of the images, wherein the classification indicates an attribute of the item based on the associated image, cause the proposed classifications to be displayed on the display device, and allow a user to indicate, via the user input device, which images to display on the display device based on their associated proposed classifications.

Example F35 includes the subject matter of Example F34, and further specifies that allow the user to indicate which images to display includes allowing a user to display images whose proposed classifications are failed.

Example F36 includes the subject matter of any of Examples F34-35, and further specifies that allow the user to indicate which images to display includes allowing a user to display images whose proposed classifications are unknown.

Example F37 includes the subject matter of any of Examples F34-36, and further specifies that allow the user to indicate which images to display includes allowing a user to display images whose proposed classifications are unknown or failed.

Example F38 includes the subject matter of any of Examples F34-37, and further specifies that the processing device is further to: allow a user to, via the user input device, specify a final classification for each image.

Example F39 includes the subject matter of Example F38, and further specifies that allowing a user to specify a final classification for each image includes allowing a user to confirm or change the proposed classifications.

Example F40 includes the subject matter of any of Examples F38-39, and further specifies that allowing a user to specify a final classification for each image includes allowing a user to select an option to set the final classifications of all images as passed.

Example F41 includes the subject matter of any of Examples F38-40, and further specifies that the processing device is to: after receipt of the specification of the final classification of each image, cause storage of the final classifications in association with the images.

Example F42 includes the subject matter of any of Examples F34-41, and further specifies that the processing device is to: before receipt of the images of the item, cause the robotic apparatus to follow an inspection path to inspect the item, wherein the inspection path includes a set of positions of an end effector of the robotic apparatus, and the processing device is to cause a camera of the end effector to capture an image of the item at each position.

Example F43 includes the subject matter of Example F42, and further specifies that a position of an end effector includes a spatial location and an angular position.

Example F44 includes the subject matter of any of Examples F42-43, and further specifies that the processing device is to store an inspection function identifier in association with each position, and the inspection function identifier identifies an inspection function that is to be applied to images captured by the camera when the end effector is at the associated position.

Example F45 includes the subject matter of any of Examples F34-44, and further includes: the robotic apparatus.

Example F46 includes the subject matter of any of Examples F34-45, and further includes: the display device.

Example F47 includes the subject matter of any of Examples F34-46, and further specifies that the robotic apparatus includes a stepper motor and a drivetrain.

Example F48 includes the subject matter of Example F47, and further specifies that the drivetrain has a gear ratio that is less than 30:1.

Example F49 includes the subject matter of Example F48, and further specifies that the gear ratio is less than 20:1.

Example F50 includes the subject matter of any of Examples F34-49, and further specifies that the robotic apparatus includes at least three joints.

Example F51 includes the subject matter of Example F50, and further specifies that the apparatus includes at least six joints.

Example F52 includes the subject matter of any of Examples F34-51, and further specifies that the processing device is in a housing of the robotic apparatus.

Example F53 includes the subject matter of any of Examples F34-51, and further specifies that the processing device has a housing separate from a housing of the robotic apparatus.

Example F54 includes the subject matter of any of Examples F34-53, and further specifies that the processing device is included in a desktop computing device, a laptop computing device, or a tablet computing device.

Example F55 includes the subject matter of any of Examples F34-54, and further specifies that the robotic apparatus includes a robotic arm.

Example F56 includes the subject matter of any of Examples F34-54, and further specifies that the robotic apparatus includes a robotic gantry.

Example F57 includes the subject matter of any of Examples F34-56, and further includes: the user input device.

Example F58 is a method performed by any of the processing devices of Examples F1-57.

Example F59 is one or more computer readable media having instructions thereon that, when executed by one or more processing devices of a computing system, cause the computing system to perform any of the methods of Example F58.

Example F60 is an apparatus for collaborative robotics, including means for performing any of the methods of Example F58.

Example G1 is an apparatus for robotic calibration, including: an end effector for a robotic apparatus, wherein the end effector is couplable to the robotic apparatus, and the end effector includes a communication port for coupling to the robotic apparatus, a laser, a camera, and a depth sensor.

Example G2 includes the subject matter of Example G1, and further specifies that the depth sensor includes a camera array.

Example G3 includes the subject matter of any of Examples G1-2, and further specifies that the end effector has an axis normal to a lens of the camera, and the camera and the depth sensor are spaced apart in a direction parallel to the axis.

Example G4 includes the subject matter of Example G3, and further specifies that the camera and the depth sensor are spaced apart by a distance greater than 10 centimeters.

Example G5 includes the subject matter of any of Examples G1-4, and further specifies that the end effector has an axis normal to a lens of the camera, and the laser is oriented to direct a laser beam parallel to the axis.

Example G6 includes the subject matter of any of Examples G1-5, and further specifies that the laser is to be powered by an output of a microcontroller of the robotic apparatus.

Example G7 includes the subject matter of any of Examples G1-6, and further specifies that the camera and depth sensor are controllable via the communication port.

Example G8 includes the subject matter of any of Examples G1-7, and further specifies that data from the camera and depth sensor is communicable to the robotic apparatus via the communication port.

Example G9 includes the subject matter of any of Examples G1-8, and further specifies that the communication port is a Universal Serial Bus (USB) port or a Controller Area Network (CAN) port.

Example G10 includes the subject matter of any of Examples G1-9, and further includes: the robotic apparatus.

Example G11 includes the subject matter of any of Examples G1-10, and further specifies that the robotic apparatus includes a stepper motor and a drivetrain.

Example G12 includes the subject matter of Example G11, and further specifies that the drivetrain has a gear ratio that is less than 30:1.

Example G13 includes the subject matter of Example G12, and further specifies that the gear ratio is less than 20:1.

Example G14 includes the subject matter of any of Examples G1-13, and further specifies that the robotic apparatus includes at least three joints.

Example G15 includes the subject matter of Example G14, and further specifies that the apparatus includes at least six joints.

Example G16 includes the subject matter of any of Examples G1-15, and further specifies that the robotic apparatus includes a robotic arm.

Example G17 includes the subject matter of any of Examples G1-15, and further specifies that the robotic apparatus includes a robotic gantry.

Example G18 includes the subject matter of any of Examples G1-17, and further specifies that the end effector includes: a mechanical fastener to secure the end effector to the robotic apparatus.

Example G19 includes the subject matter of any of Examples G1-18, and further includes: a processing device to control operation of the end effector via the robotic apparatus.

Example G20 includes the subject matter of Example G19, and further specifies that the processing device is in a housing of the robotic apparatus.

Example G21 includes the subject matter of Example G19, and further specifies that the processing device has a housing separate from a housing of the robotic apparatus.

Example G22 includes the subject matter of any of Examples G19, and further specifies that the processing device is included in a desktop computing device, a laptop computing device, or a tablet computing device.

Example G23 is a method of robotic calibration, including: performing a marker calibration operation, wherein the marker calibration operation includes causing a robotic apparatus to move its end effector to a nominal position associated with a marker on a reference structure, wherein the end effector includes a laser, a camera, and a depth sensor, causing the laser of the end effector to shine a laser beam on the reference structure; using the depth sensor to measure a distance to the reference structure in the direction of the laser beam; and using the camera to capture an image of the reference structure, wherein the image includes the marker and a point of impingement of the laser beam on the reference structure; and repeating the marker calibration operation for different markers on the reference structure.

Example G24 includes the subject matter of Example G23, and further specifies that the marker calibration operation further includes: causing the robotic apparatus to adjust its position to reduce an error between the marker and the point of impingement.

Example G25 includes the subject matter of any of Examples G23-24, and further specifies that the robotic apparatus includes a plurality of joint assemblies, and individual ones of the joint assemblies include a stepper motor and a drivetrain.

Example G26 includes the subject matter of Example G25, and further specifies that the drivetrain has a gear ratio that is less than 30:1.

Example G27 includes the subject matter of any of Examples G23-26, and further specifies that the depth sensor includes a camera array.

Example G28 includes the subject matter of any of Examples G23-27, and further specifies that the reference structure is a two-dimensional structure.

Example G29 includes the subject matter of Example G28, and further specifies that the reference structure is a mat.

Example G30 includes the subject matter of Example G29, and further specifies that the robotic apparatus is to sit on the mat.

Example G31 includes the subject matter of any of Examples G23-27, and further specifies that the reference structure is a three-dimensional structure.

Example G32 includes the subject matter of any of Examples G23-31, and further specifies that the marker is printed on a surface of the reference structure.

Example G33 includes the subject matter of any of Examples G23-32, and further specifies that the reference structure includes a marker label for individual markers.

Example G34 includes the subject matter of Example G33, and further specifies that the marker label includes a Quick Response (QR) code.

Example G35 is an apparatus for inspection, including: an end effector for a robotic apparatus, wherein the end effector is couplable to the robotic apparatus, and the end effector includes a communication port for coupling to the robotic apparatus, a camera, and a lighting device, wherein a lighting color of the lighting device is controllable via the communication port.

Example G36 includes the subject matter of Example G35, and further specifies that the lighting device includes one or more light-emitting diodes.

Example G37 includes the subject matter of Example G36, and further specifies that the lighting device includes a plurality of light-emitting diodes arranged in a ring formation.

Example G38 includes the subject matter of Example G37, and further specifies that an axis normal to a center of a lens of the camera extends through the ring.

Example G39 includes the subject matter of any of Examples G35-38, and further specifies that the end effector includes: a depth sensor.

Example G40 includes the subject matter of Example G39, and further specifies that the depth sensor includes a camera array.

Example G41 includes the subject matter of any of Examples G39-40, and further specifies that the end effector has an axis normal to a center of a lens of the camera, and the camera and the depth sensor are spaced apart in a direction parallel to the axis.

Example G42 includes the subject matter of Example G41, and further specifies that the camera and the depth sensor are spaced apart by a distance greater than 10 centimeters.

Example G43 includes the subject matter of any of Examples G35-42, and further specifies that the camera is a first camera, and the end effector further includes: a second camera, wherein the second camera has a lower resolution than the first camera.

Example G44 includes the subject matter of any of Examples G35-43, and further specifies that the end effector further includes: an object manipulator.

Example G45 includes the subject matter of Example G44, and further specifies that the object manipulator includes a suction device.

Example G46 includes the subject matter of any of Examples G44-45, and further specifies that the object manipulator includes a clamping device.

Example G47 includes the subject matter of any of Examples G35-47, and further specifies that data from the camera is communicable to the robotic apparatus via the communication port.

Example G49 includes the subject matter of any of Examples G35-48, and further specifies that the communication port is a Universal Serial Bus (USB) port or a Controller Area Network (CAN) port.

Example G50 includes the subject matter of any of Examples G35-49, and further includes: the robotic apparatus.

Example G51 includes the subject matter of any of Examples G35-50, and further specifies that the robotic apparatus includes a stepper motor and a drivetrain.

Example G52 includes the subject matter of Example G51, and further specifies that the drivetrain has a gear ratio that is less than 30:1.

Example G53 includes the subject matter of Example G52, and further specifies that the gear ratio is less than 20:1.

Example G54 includes the subject matter of any of Examples G35-53, and further specifies that the robotic apparatus includes at least three joints.

Example G55 includes the subject matter of Example G54, and further specifies that the apparatus includes at least six joints.

Example G56 includes the subject matter of any of Examples G35-55, and further specifies that the robotic apparatus includes a robotic arm.

Example G57 includes the subject matter of any of Examples G35-55, and further specifies that the robotic apparatus includes a robotic gantry.

Example G58 includes the subject matter of any of Examples G35-57, and further specifies that the end effector includes: a mechanical fastener to secure the end effector to the robotic apparatus.

Example G59 includes the subject matter of any of Examples G35-58, and further includes: a processing device to control operation of the end effector via the robotic apparatus.

Example G60 includes the subject matter of Example G59, and further specifies that the processing device is in a housing of the robotic apparatus.

Example G61 includes the subject matter of Example G59, and further specifies that the processing device has a housing separate from a housing of the robotic apparatus.

Example G62 includes the subject matter of Example G59, and further specifies that the processing device is included in a desktop computing device, a laptop computing device, or a tablet computing device.

Example G63 is a method of inspecting an item, including: causing a robotic apparatus to follow an inspection path to inspect the item, wherein the inspection path includes a set of identified positions to which an end effector of the robotic apparatus is to move; and at each identified position, causing a lighting device of the end effector to illuminate with a controllable light color, and a camera of the end effector to capture an image.

Example G64 includes the subject matter of Example G63, and further includes: at each identified position, causing a depth sensor of the end effector to measure a depth to the item.

Example G65 includes the subject matter of Example G64, and further specifies that the depth sensor includes a camera array.

Example G66 includes the subject matter of any of Examples G64-65, and further specifies that the end effector has an axis normal to a center of a lens of the camera, and the camera and the depth sensor are spaced apart in a direction parallel to the axis.

Example G67 includes the subject matter of Example G66, and further specifies that the camera and the depth sensor are spaced apart by a distance greater than 10 centimeters.

Example G68 includes the subject matter of any of Examples G63-67, and further specifies that the lighting device includes one or more light-emitting diodes.

Example G69 includes the subject matter of Example G68, and further specifies that the lighting device includes a plurality of light-emitting diodes arranged in a ring formation.

Example G70 includes the subject matter of Example G69, and further specifies that an axis normal to a center of a lens of the second camera extends through the ring.

Example G71 includes the subject matter of any of Examples G63-70, and further specifies that the camera is a first camera, and the method further includes: causing a second camera of the end effector to capture an overview image of the item, wherein the second camera has a lower resolution than the first camera.

Example G72 includes the subject matter of any of Examples G63-71, and further includes: causing an object manipulator of the end effector to move the item.

Example G73 includes the subject matter of Example G72, and further specifies that the object manipulator includes a suction device.

Example G74 includes the subject matter of any of Examples G72-73, and further specifies that the object manipulator includes a clamping device.

Example G75 includes the subject matter of any of Examples G63-74, and further specifies that the robotic apparatus includes a stepper motor and a drivetrain.

Example G76 includes the subject matter of Example G75, and further specifies that the drivetrain has a gear ratio that is less than 30:1.

Example G77 is an apparatus for inspection, including an end effector for a robotic apparatus, wherein the end effector is couplable to the robotic apparatus, and the end effector includes: a communication port for coupling to the robotic apparatus, a camera, and a gimbal, wherein the camera is mechanically coupled to the gimbal.

Example G78 includes the subject matter of Example G77, and further specifies that the end effector further includes a lighting device, and the lighting device includes one or more light-emitting diodes.

Example G79 includes the subject matter of Example G78, and further specifies that the lighting device includes a plurality of light-emitting diodes arranged in a ring formation.

Example G80 includes the subject matter of Example G79, and further specifies that an axis normal to a center of a lens of the camera extends through the ring.

Example G81 includes the subject matter of any of Examples G77-80, and further specifies that the end effector includes: a depth sensor.

Example G82 includes the subject matter of any of Examples G77-81, and further specifies that the end effector further includes: an object manipulator.

Example G83 includes the subject matter of any of Examples G77-84, and further specifies that data from the camera is communicable to the robotic apparatus via the communication port.

Example G86 includes the subject matter of any of Examples G77-85, and further specifies that the communication port is a Universal Serial Bus (USB) port or a Controller Area Network (CAN) port.

Example G87 includes the subject matter of any of Examples G77-86, and further includes: the robotic apparatus.

Example G88 includes the subject matter of any of Examples G77-87, and further specifies that the robotic apparatus includes a stepper motor and a drivetrain.

Example G89 includes the subject matter of Example G88, and further specifies that the drivetrain has a gear ratio that is less than 30:1.

Example G90 includes the subject matter of Example G89, and further specifies that the gear ratio is less than 20:1.

Example G91 includes the subject matter of any of Examples G77-90, and further specifies that the robotic apparatus includes at least three joints.

Example G92 includes the subject matter of Example G91, and further specifies that the robotic apparatus includes at least six joints.

Example G93 includes the subject matter of any of Examples G77-92, and further specifies that the robotic apparatus includes a robotic arm.

Example G94 includes the subject matter of any of Examples G77-92, and further specifies that the robotic apparatus includes a robotic gantry.

Example G95 includes the subject matter of any of Examples G77-94, and further specifies that the end effector includes: a mechanical fastener to secure the end effector to the robotic apparatus.

Example G96 includes the subject matter of any of Examples G77-95, and further includes: a processing device to control operation of the end effector via the robotic apparatus.

Example G97 includes the subject matter of Example G96, and further specifies that the processing device is in a housing of the robotic apparatus.

Example G98 includes the subject matter of Example G96, and further specifies that the processing device has a housing separate from a housing of the robotic apparatus.

Example G99 includes the subject matter of Example G96, and further specifies that the processing device is included in a desktop computing device, a laptop computing device, or a tablet computing device.

Example G100 is one or more computer readable media having instructions thereon that, when executed by one or more processing devices of a computing system, cause the computing system to perform any of the methods of Examples G23-34 or Examples G63-75.

Example G101 is an apparatus for collaborative robotics, including means for performing any of the methods of Examples G23-34 or Examples G63-75.

The invention claimed is:

1. An inspection apparatus, comprising:
a processing device to communicatively couple to a robotic apparatus, to a display device, and to a user input device, wherein the processing device is to:
receive an image of an item, wherein the image was captured by the robotic apparatus,
generate a proposed classification for the image, wherein the classification indicates an attribute of the item based on the image,
cause the image to be displayed in a graphical user interface on the display device along with the proposed classification, and
receive an indication from the user input device of a final classification of the image, the indication comprising user-generated input by way of the graphical user interface.

2. The inspection apparatus of claim 1, wherein receive the indication from the user input device of the final classification of the image includes receiving an indication from the user input device that the user accepts or rejects the proposed classification of the image.

3. The inspection apparatus of claim 1, wherein receive the indication from the user input device of the final classification of the image includes receiving an indication that the user has selected a final classification that is different than the proposed classification.

4. The inspection apparatus of claim 3, wherein the proposed classification is an unknown classification.

5. The inspection apparatus of claim 1, wherein causing the image to be displayed on the display device includes causing a visual indicator to be displayed, and the visual indicator indicates a portion of the image on which the proposed classification is based.

6. The inspection apparatus of claim 5, wherein the visual indicator includes a box.

7. The inspection apparatus of claim 1, wherein causing the image to be displayed on the display device along with the proposed classification includes causing the image to be displayed on the display device along with the proposed classification and along with a known-good image of the item.

8. The inspection apparatus of claim 1, wherein the processing device is to:
after receipt of the indication from the user input device of the final classification of the image, cause storage of the final classification in association with the image.

9. The inspection apparatus of claim 8, wherein generating a proposed classification for the image includes executing an inspection function with the image as an input, the inspection function includes a computational classifier, and the processing device is to:

after causing storage of the final classification in association with the image, retrain the computational classifier on a training set that includes the image and the final classification.

10. The inspection apparatus of claim 9, wherein the training set includes images captured from the same position as the image.

11. The inspection apparatus of claim 1, wherein the image is one of a plurality of images of the component captured by the robotic apparatus from different positions, and the processing device is to:

generate a proposed classification for each image;
cause each image to be displayed on the display device along with the associated proposed classification; and
receive an indication from the user input device of a final classification for each image.

12. The inspection apparatus of claim 11, wherein the processing device is to:

generate a classification for the component based at least in part on the final classifications of the plurality of images.

13. The inspection apparatus of claim 12, wherein the component is classified as failed when at least one of the images is classified as failed.

14. The inspection apparatus of claim 1, wherein the processing device is to:

before receipt of the image of the component, cause the robotic apparatus to follow an inspection path to inspect the component, wherein the inspection path includes a set of positions of an end effector of the robotic apparatus, and the processing device is to cause a camera of the end effector to capture an image of the component at each position.

15. An inspection apparatus, comprising:

a processing device to communicatively couple to a robotic apparatus, to a display device, and to a user input device, wherein the processing device is to:

receive a plurality of images of an item, wherein the plurality of images were captured by a camera of an end effector of the robotic apparatus, and different ones of the images were captured at different positions of the end effector,
generate a proposed classification for individual ones of the images, wherein the classification indicates an attribute of the item based on the associated image,
cause the proposed classifications to be displayed on the display device, and
allow a user to indicate, via the user input device, which images to display on the display device based on their associated proposed classifications.

16. The inspection apparatus of claim 15, wherein allow the user to indicate which images to display includes allowing a user to display images whose proposed classifications are failed.

17. The inspection apparatus of claim 15, wherein allow the user to indicate which images to display includes allowing a user to display images whose proposed classifications are unknown.

18. The inspection apparatus of claim 15, wherein the processing device is further to:

allow a user to, via the user input device, specify a final classification for each image.

19. The inspection apparatus of claim 18, wherein allowing a user to specify a final classification for each image includes allowing a user to confirm or change the proposed classifications.

20. The inspection apparatus of claim 18, wherein allowing a user to specify a final classification for each image includes allowing a user to select an option to set the final classifications of all images as passed.

* * * * *